United States Patent [19]
Kon

[11] Patent Number: 5,842,202
[45] Date of Patent: Nov. 24, 1998

[54] SYSTEMS AND METHODS FOR DATA QUALITY MANAGEMENT

[75] Inventor: Henry B. Kon, Somerville, Mass.

[73] Assignee: Massachusetts Institute of Technology, Cambridge, Mass.

[21] Appl. No.: 757,759

[22] Filed: Nov. 27, 1996

[51] Int. Cl.⁶ .................................................. G06F 17/00
[52] U.S. Cl. ........................ 707/3; 707/2; 707/4; 707/5; 707/6; 707/7
[58] Field of Search ................................ 707/1–10, 102, 707/100–104, 200–206, 500–536

[56] References Cited

U.S. PATENT DOCUMENTS

| | | | |
|---|---|---|---|
| 5,410,493 | 4/1995 | Konayaga | 364/496 |
| 5,495,567 | 2/1996 | Iizawa et al. | 395/161 |
| 5,524,240 | 6/1996 | Barabara et al. | 395/600 |
| 5,553,284 | 9/1996 | Barbara et al. | 395/600 |
| 5,625,767 | 4/1997 | Bartell et al. | 395/140 |
| 5,671,403 | 9/1997 | Shekita et al. | 395/603 |

OTHER PUBLICATIONS

Ballou, D.P., & Pazer, H. L., "Modeling Data and Process Quality in Multi–input, Multi–output Information Systems", *Management Science*, Vol. 31, No. 2, pp. 150–162, 1985.

Bunge, Mario, *Treatise on Basic Philosophy, Epistemology and Methodology I: Exploring the World*, vol. 5, pp. 72–75, 250–253, Reidel, Boston, 1983.

Fuller, W. A., *Measurement Error Models*, pp. 1–13, John Wiley & Sons, New York, 1987.

Groves, R. M., "Measurement Error Across the Disciplines," in Biemer, P., Groves, R., Lyberg, L, Mathiowetz, N., and Sudman, S. (Ed(s)),*Measurement Errors in Surveys*, pp. 1–25, John Wiley and Sons, New York, 1991.

Kennedy, P., *A Guide to Econometrics*, pp. 111–125, MIT Press, Cambridge, Mass, 1985.

Kish, L., "Diverse Adjustments for Missing Data", *Proceedings of the 1980 Conference on Census Undercount*, pp. 83–87, Arlington, Va., 1980.

LePage, N., "Data Quality Control at United States Fidelity and Guaranty Company", In Liepens, G. E. & Uppuluri, V. R. R., (Ed(s.)), *Data Quality Control: Theory and Pragmatics*, pp. 25–41, Marcel Dekker, Inc., New York, 1990.

McCarthy, J. L., "Scientific Information = Data + Meta–data", LBL–19086, Lawrence Berkeley Laboratory, University of California, Berkeley, California, 1985.

Morey, R. C., "Estimating and Improving Quality of Information in the MIS", *Communications of the Association for Computing Machinery*, vol. 25, No. 5, pp. 337–342, no date.

Reiter, R., "Towards a Logical Reconstruction of Relational Database Theory", In Brodie, M., Mylopolous, J., & Schmidt, J., (Ed(s.)), *On Conceptual Modeling: Perspectives from AI, Databases, and Programming Languages*, pp. 191–233, Springer–Verlag, New York, 1984.

Wand, Y., & Weber, R., "Mario Bunge's Ontology as a Formal Foundation for Information Systems Concepts", In Weingartner P., & Dorn, G. J. W., (Ed(s.)), *Studies on Mario Bunge's Treatise*, pp. 123–150, Rodopi, Amsterdam, 1990.

Barbara, D., Garcia–Molina, H., Porter, D., "The Management of Probabilistic Data", *IEEE Transactions on Knowledge and Data Engineering*, vol. 4, No. 5, pp. 487–502 (Oct. 1992).

(List continued on next page.)

*Primary Examiner*—Thomas G. Black
*Assistant Examiner*—David Yiuk Jung
*Attorney, Agent, or Firm*—Testa, Hurwitz & Thibeault LLP

[57] ABSTRACT

Systems and methods that model and measure the propagation of error within information systems. The invention provides data management systems that determine an error measure that represent the accuracy, or inaccuracy of a query result achieved for processing a structured data set. In one embodiment, the invention provides systems that have a model of error which exists within a structured data set. The system can further include an error propagation monitor that processes the error model and the structured data set to determine errors within the structured data set that will propagate to a query result generated by performing a query process on the structured data set. The propagated error represents the error that exists within the query result signal.

29 Claims, 6 Drawing Sheets

OTHER PUBLICATIONS

Biskup, J., "A Foundation of Codd's Relational Maybe–Operations", *ACM Transactions on Database Systems*, vol. 8, No.4, pp. 608–636 (Dec. 1983).

Cavallo, R., Pittarelli, M., "The Theory of Probabilistic Database", *Proceedings of the 13th VLDB Conference*, Brighton, England, pp. 71–81 (1987).

Imielinski, T., Lipski, W. Jr., "Incomplete Information in Relational Databases", *Journal of the Association for Computing Machinery*, vol. 31, No.4, pp. 761–791 (Oct. 1984).

Kon, H. B., Madnick, S. E., Siegel, M. D., "Good Answers from Bad Data: A Data Management Strategy", *MIT Sloan School of Management WP#3868*, pp. Abstract, 1–16 (Dec. 1995).

Meyen, D. M., Willshire, M. J., "A Data Quality Engineering Process"*Proceedings of the 1996 Conference on Information Quality*, Massachusetts Institute of Technology, pp. 221–236 (Oct. 1996).

Motro, A., "Integrity = Validity + Completeness", *ACM Transactions on Database Systems*, vol. 14, No. 4, pp. 480–502 (Dec. 1989).

Motro, A., Rakov, I., "estimating the Quality of Data in Relational Databases", *Proceedings of the 1996 Conference on Information Quality*, Massachusetts Institute of Technology, pp. 94–106 (Oct. 1996).

Orman, L., Storey, V. C., Wang, R. Y., "Systems Approaches to Improving Data Quality", *Proceedings of the 1996 Conference on Information Quality*, Massachusetts Institute of Technology pp. 117–126 (Oct., 1996).

Agmon, N., & Ahituv, N., "Assessing Data Reliability in an Information System", *Journal of Management Information Systems*, vol. 4, No. 2, pp. 34–44, Fall, 1987.

Ballou, D. P., & Kumar Tayi, G., "Methodology for Allocating Resources for Data Quality Enhancement", *Communications of the ACM*, vol. 32, No. 3, pp. 320–329, Mar., 1989.

Barabba, V. P., "Welcome and Introduction"*Proceedings of the 1980 Conference on Census Undercount*, pp. 9–11, Arlington, Virginia, Jul., 1980.

Biemer, P., & Stokes, S. L., "Approaches to the Modeling of Measurement Error", In Biemer, P., Groves, R., Lyberg, L., Mathiowetz, N., & Sudman, S. (Ed(s)), *Measurement Errors in Surveys*, pp. 487–497, John Wiley & Sons, New York, 1991.

Codd, E. F., "Extending the Database Relational Model to Capture More Meaning", *ACM Transactions on Database Systems*, vol. 4, pp. 397–434, Dec., 1979.

Codd, E. F., "A Relational Model of Data for Large Shared Data Banks", *Communications of the ACM*, vol. 13, No. 6, pp. 377–387, Jun. 1970.

Collett, C., Huhns, M. N., & Shen, W., "Resource Integration Using a Large Knowledge Base in Carnot", *Computer*, pp. 55–62, Dec., 1991.

Demichiel, L. G., "Resolving Database Incompatibility: An Approach to Performing Relational Operations over Mismatched Domains", *IEEE Transactions on Knowledge and Data Engineering*, vol. 1, No. 4, pp. 485–493, Dec., 1989.

Erickson, E. P., "Can Regression Be Used to Estimate Local Undercount Adjustments?", *Proceedings of the 1980 Conference on Census Undercount*, pp. 55–61, Arlington, Virginia, Jul., 1980.

Grant, J., "Incomplete Information in a Relational Database", *Annales Societatis Mathematicae Polonae; Series IV: Fundamenta Informaticae III* vol. 3, pp. 363–377, 1980.

Howard J. A., "Introduction: Noisy Data—A Common Problem in Social Research" in Farley, J. U., & Howard, J. A., *Control of Error in Market Research Data*, pp. 1–9, Lexington Books, Lexington, Massachusetts, 1975.

Johnson, J. R., Leitch, R. A., & Neter, J., "Characteristics of Errors in Accounts Receivable and Inventory Audits", *Accounting Review*, vol. 56, No. 2, pp. 270–293, Apr., 1981.

Johnston, D. C., "IRS Is Preparing a Tough Audit for Groups of Unwary Taxpayers", *NY Times*, (Jul. 19, 1995), p. 1.

Klug, A., "Equivalence of Relational Algebra and Relational Calculus Query Languages Having Aggregate Functions", *Journal of the Association for Computing Machinery*, vol. 29, No. 3, pp. 669–717, Jul. 1982.

Laudon, K. C., "Data Quality and Due Process in Large Interorganizational Record Systems", *Communications of the ACM*, vol. 29, No. 1, pp. 4–11, Jan., 1986.

Lipski, W., "On Semantic Issues Connected With Incomplete Information Databases", *ACM Transactions on Database Systems*, vol. 4, No. 3, pp. 262–296, Sep., 1979.

Litwin, W., & Abdellatif, A., "Multidatabase Interoperability", *Computer*, pp. 10–18, Dec., 1986.

Madnick, S. E., "From VLDB to VMLDB (Very MANY Large Data Bases): Dealing with Large–Scale Semantic Heterogeneity", *Proceedings of the 21st International Very Large Database Conference*, pp. 11–16, Zurich, Switzerland, 1995.

Madnick, S. E., "The Voice of the Customer: Innovative and Useful Research Directions", *Proceedings of the 19th International Very Large Database Conference*, pp. 701–704, Dublin, Ireland, 1993.

Madnick, S. E., & Wang, R. Y. (1992). *Introduction to the TDQM Research Program*; TDQM Working Paper, TDQM–92–01. pp. 1–7, Massachusetts Institute of Technology, Cambridge, Massachusetts, May, 1992.

McCarthy, J. L., "Metadata Management for Large Statistical Databases", *Proceedings of the 8th International Very Large Database Conference*, pp. 234–243, Mexico City, Mexico, 1982.

Paradice, D. B., & Fuerst, W. L., "An MIS Data Quality Methodology Based on Optimal Error Detection", *Journal of Information Systems*, pp. 48–66, Spring, 1991.

Patterson, B., "The Need for Data Quality", *Proceedings of the 19th International Very Large Database Conference*, p. 709, Dublin, Ireland, 1993.

Reddy, M. P., & Wang, R. Y., "Estimating Data Accuracy in a Federated Database Environment", *Proceedings of the 6th International CISMOD Conference*, pp. 115–134, Bombay, India, 1995.

Reiter, R., "A Sound and Sometimes Complete Query Evaluation Algorithm for Relational Databases with Null Values", *Journal of the ACM*, vol. 33, No. 2, pp. 349–370, Apr., 1986.

Sciore, E., Siegel, M., & Rosenthal, A., "Using Semantic Values to Facilitate Interoperability Among Heterogenous Information Systems", *ACM Transactions on Database Systems*, vol. 19, No. 2, pp. 254–290, Jun. 1994.

Selinger, P. G., "Predictions and Challenges for Database Systems in the Year 2000", *Proceedings of the 19th International Very Large Database Conference*, pp. 667–675, Dublin, Ireland, 1993.

Siegel, M., & Madnick, S., "Context Interchange: Sharing the Meaning of Data." *SIGMOD Record*, (ACM Press) vol. 20, No. 4, pp. 77–79, Dec., 1991.

Siegel, M., & Madnick, S. E., "A Metadata Approach to Resolving Semantic Conflicts", *Proceedings of the 17th International Very Large Data Base Conference*, pp. 133–145, Barcelona, Spain, 1991.

Wand, Y., & Wang, R. Y., "Anchoring Data Quality Dimensions in Ontological Foundations." *Communications of the ACM*, vol. 39, No. 11, pp. 86–95, Nov., 1996.

Wang, R. Y., Kon, H. B., & Madnick, S. E., "Data Quality Requirements Analysis and Modeling", *9th IEEE Computer Society Conference on Data Engineering*, pp. 670–676, Vienna, Austria, 1993.

Wang, Y. R., & Madnick, S. E., "A Polygen Model for Heterogeneous Database Systems: The Source Tagging Perspective", *Proceedings of the 16th International Very Large Database Conference*, pp. 519–538, Brisbane, Australia, 1990.

Wang, R. Y., Reddy, M. P., & Kon, H. B., "Toward Quality Data: An Attribute–based Approach", *Decision Support Systems*, vol. 13, pp. 349–372, 1995.

Wang, R. Y., Storey, V. C., & Firth, C. P., "A Framework for Analysis of Data Quality Research." *IEEE Transactions on Knowledge and Data Engineering*, vol. 7, No. 4, pp. 623–639, Aug. 1995.

Weddell, G. E., "Reasoning about Functional Dependencies Generalized for Semantic Data Models", *ACM Transactions on Database Systems*, vol. 17, No. 1, pp. 32–64, Mar., 1992.

West, M. & Winkler, R. L., "Data Base Error Trapping and Prediction", *Journal of the American Statistical Association*, vol. 86, No. 416, pp. 987–996, Dec., 1991.

Wiederhold, G., "Mediators in the Architecture of Future Information Systems", *Computer*, pp. 38–49, Mar. 1992.

Wong, E., "A Statistical Approach to Incomplete Information in Database Systems", *ACM Transactions on Database Systems*, vol. 7, No. 3, pp. 470–488, Sep., 1982.

Alumni (Major U.S. active alumni) — 30

| Record # | Alum-name | Home state | Degree | Major | Year of grad. | 5-year donation |
|---|---|---|---|---|---|---|
| 1 | Mae Ray | RI | BS | Law | | 800,000 |
| 2 | Lisa Jordan | RI | MS | CS | 1982 | 500,000 |
| 3 | Tom Jones | ME | MS | | 1988 | 420,233 |
| 4 | Jon Wales | CT | BS | Eng'g | 1953 | 600,000 |
| 5 | Frank Ames | NY | PhD | Biology | 1986 | 820,000 |
| 6 | | VT | MS | Business | | 243,000 |

*FIG. 2*

$r_{em}$ (alumni mismembers) — 32

| Record # in r | Name | Home state | Degree | Major | Year of grad. | 5-year donation |
|---|---|---|---|---|---|---|
| 4 | Jon Wales | | | | | |
| 6 | | | | | | |

$r_{ea}$ (alumni inaccurates) — 34

| | | | | | | |
|---|---|---|---|---|---|---|
| 1 | Mae Ray | - | - | - | 1991 | - |
| 2 | Lisa Jordan | - | - | - | - | 400,000 |
| 3 | Tom Jones | - | - | CS | - | - |

$r_{ei}$ (alumni incompletes) — 36

| | | | | | | |
|---|---|---|---|---|---|---|
| | John Junto | VT | MS | Psych | 1984 | 243,000 |

*FIG. 3*

SYSTEMS AND METHODS FOR DATA QUALITY MANAGEMENT

STATEMENT REGARDING FEDERALLY SPONSORED RESEARCH

This invention was made with government support under contract Number F30602-93-C-0160 awarded by the Air Force. The government has certain rights in the invention.

FIELD OF THE INVENTION

The invention relates to systems and methods for processing structured data sets, and more particularly, to systems and methods that determine a measure of the error that exists within the results that are returned by operations on structured data sets.

BACKGROUND OF THE INVENTION

Today, database systems take data and information and organize the data and information into logical groups and categories that present the data as a logically structured table of information. Query mechanisms allow a user to examine and analyze these tables and to extract information both implicitly and explicitly stored therein. One common example of a query mechanism is a search engine that employs the structured query language that allows a database user to develop complex logical processing operations that sort through and process the data within the structured data set and provide a search result that extracts information explicitly and implicitly held within the structured data set.

Although these query systems work well to manipulate logically the structured data set and thereby produce search results, the accuracy of these search results is often questionable. Inaccuracies in search results arise from data errors existing within the structured data sets. These errors come from a multitude of sources including aging of the database, transcription errors, as well as from inaccurate data values being collected as valid input to the structured data set. All these errors within the structured data set result in an unknown source of error that undermines the integrity of any query result generated from that structured data set.

Accordingly, it is an object of the invention to provide systems and methods for providing a measure of the error within query results generated from the processing of a structured data set.

It is a further object of the invention to provide systems and methods for testing the integrity of a structured data set and for enumerating how input errors affect output errors.

It is still a further object of the invention to provide database administrators with systems that allow for measuring the utility of a database of information and for performing sensitivity analysis to relate input errors to output errors when no measure of input error is available.

Other objects of the invention will, in part, be obvious, and, in part, be disclosed within the following description of the invention.

SUMMARY OF THE INVENTION

The invention provides systems and methods that model and measure the propagation of error in information systems. The system provides a means to measure the error in a database, and to model the propagation of that error through queries applied to that database. In particular, the invention provides data management systems that provide an error measure that represents the accuracy, or inaccuracy, of a query result achieved from processing a structured data set.

In one embodiment, the invention provides systems that have a model of the error which exists within a structured data set. The structured data set may be encoded as database tables, with the error model also encoded as a database table wherein each entry of the error model corresponds to respective entries within the structured data set. The error model can include three separate tables. A first table describes each inaccurate or missing attribute value within the structured data set. A second table describes incompleteness in the class represented by the structured data set, and a third table identifies each member of the structured data set that is misclassified within that structured data set. These three tables provide an integrated class level and attribute level model of the error that exists within each table of the structured data set.

The system includes an interface that couples to a query mechanism employed for processing the structured data set. The system monitors the query instructions being employed to process the structured data set. As each logical operation of the query instruction can cause a portion of the errors within the structured data set to propagate through to the query result, the interface includes a processor that generates for the logical operations of the query instructions, a second set of logical operations which process the error model and the structured data set to determine how errors within the structured data set will propagate through to the output of the database query. Thus the error measure on the query input is transformed to an error measure on the query output. Those errors which propagate through will be processed by the invention to create an error measure that is representative of the error in the query results. The terms error model and error measure will be used interchangeably.

More particularly, in one aspect the invention can be understood as a system for performing data processing on the structured data set, which includes a query mechanism for providing logical instructions for selectively processing the structured data set to generate a query result signal, a memory device that has storage for error model data which is representative of error that exists within the structured data set as query input, and a propagation monitor that detects and models the propagation of the error from the structured data set as query input into the query result signal and further for generating in response thereto an error measure signal which is representative of error in query result signal.

The propagation monitor can, in one embodiment, include a query interface that couples to the query mechanism for monitoring the logical instructions, and can further include a memory interface that couples to the memory device for accessing the error model data. In this embodiment the propagation monitor processes the input error model data as a function of the query instruction signals in order to generate the query result error measure signal. In one particular embodiment, the system includes an instruction parser which is responsive to the instruction signals for generating a set of query instructions for processing the error model data and the structured data set to generate the error measure signal.

The systems of the invention can include table generators that provide the error measure signal in a table format having storage for error tuples wherein each error tuple is representative of an error in an associated tuple or table of the query result. Commonly, structured data sets are organized with a classification and attribute level structure. Systems according to the invention for operating on structured data sets that include classification and attribute organization can further include a processor for generating the error measure as a set of tables that store classification level errors and attribute level errors of the query result signal. In these systems, the query mechanism is operating on a structured data set which allows organization into classes and attributes. Accordingly, the query results which are generated from processing such a structured set of data are typically also organized as a structured data set that includes class and attribute level organization. In one embodiment of the invention, the systems include an element for generating the error measure as a set of tables which have entries which correspond to the tables which form the query result signal, or which form a portion of the query result signals. In this way the errors information is also organized according to class and attribute level errors.

In one embodiment, the system can also include a component for modifying portions of the error data as a function of an interpretation map.

Systems according to the invention identify or employ a set of error states that define the universe of errors and error combinations which can occur within a structured data set. In one embodiment, systems according to the invention measure three error types to define the error that exists within a structured data set. The system employs this set of error types to define the error within the structured data set that is being processed, and within the structured data set that is generated as the query results. Systems according to the invention monitor the propagation of each of these errors. Accordingly, the systems can include an attribute monitor for detecting the propagation of an attribute inaccuracy, or propagation of a missing attribute, from the input dataset to the query result signal. Similarly, systems according to the invention can include a class mismember monitor for monitoring the propagation of a class mismember error from the input data set to the query result signal. Similarly, a system according to the invention can include a class incompleteness monitor that monitors the propagation of a class incompleteness error from the input data set to the query result signal.

In one embodiment, the invention includes a memory device that stores error model data representative of a probability distribution of error within the structured data set. Alternatively, or in combination therewith, the memory device can store error model data that is representative of possibility or interval data, in that it provides for the representation of a non-zero probability of error within the structured data set.

In these embodiments, the systems can include an iteration processor for iteratively processing the logical error model data as a function of the probability data to generate a plurality of error measure signals representative of a probability distribution of error within the query result signal.

In alternative embodiments, systems according to the invention can include functional processors for selecting, in response to the probability data, a closed form statistical function for processing the probability data.

Systems of the invention can further include a data characteristic processor for generating portions of the probability data as a function of a predetermined characteristic of an element of the structured data set.

In another aspect, the invention can be understood as methods for measuring error in a query result generated from a structured data set. These methods comprise the steps of providing an error model which is representative of error within the structured data set, identifying an instruction signal representative of an operation for processing the structured data set to generate the query result signal, and processing the structured data set and the error model as a function of the instruction signal to generate an error measure representative of error within the query result.

In this aspect, the step of providing an error model can include the steps of providing a reference data set, and comparing the reference data set with the structured data set to determine differences therebetween. The methods can also include the step of organizing the error model as a data table having class level and attribute level characteristics and having a plurality of error tuples each corresponding to a tuple or table within the structured data set or within the query result dataset. Accordingly, the invention can provide an error model that provides tuple level error measures, as well as column level, row level, and class level error measures. The data within the error model can be provided as deterministic, i.e. numerical error data, as well as probabilistic or possibilistic data.

In further embodiments, processes according to the invention can include the steps of identifying a portion of the data table as corresponding to a selected characteristic, e.g., those portions of the data that are associated with female alumni. In this embodiment, the system can provide conditional probability data for this identified portion, wherein certain probability data is known to be different for certain portions of the input data.

The invention will now be described with reference to certain illustrated embodiments, which are provided to illustrate and describe the invention set forth herein, and which are not to be understood as limiting the invention to the depicted embodiments.

BRIEF DESCRIPTION OF THE ILLUSTRATED EMBODIMENTS

FIG. 2 illustrates one structured data set for processing by the system depicted in FIG. 1;

FIG. 3 illustrates a description of errors within the structured data set depicted in FIG. 2;

DETAILED DESCRIPTION OF THE INVENTION

Figure 1:
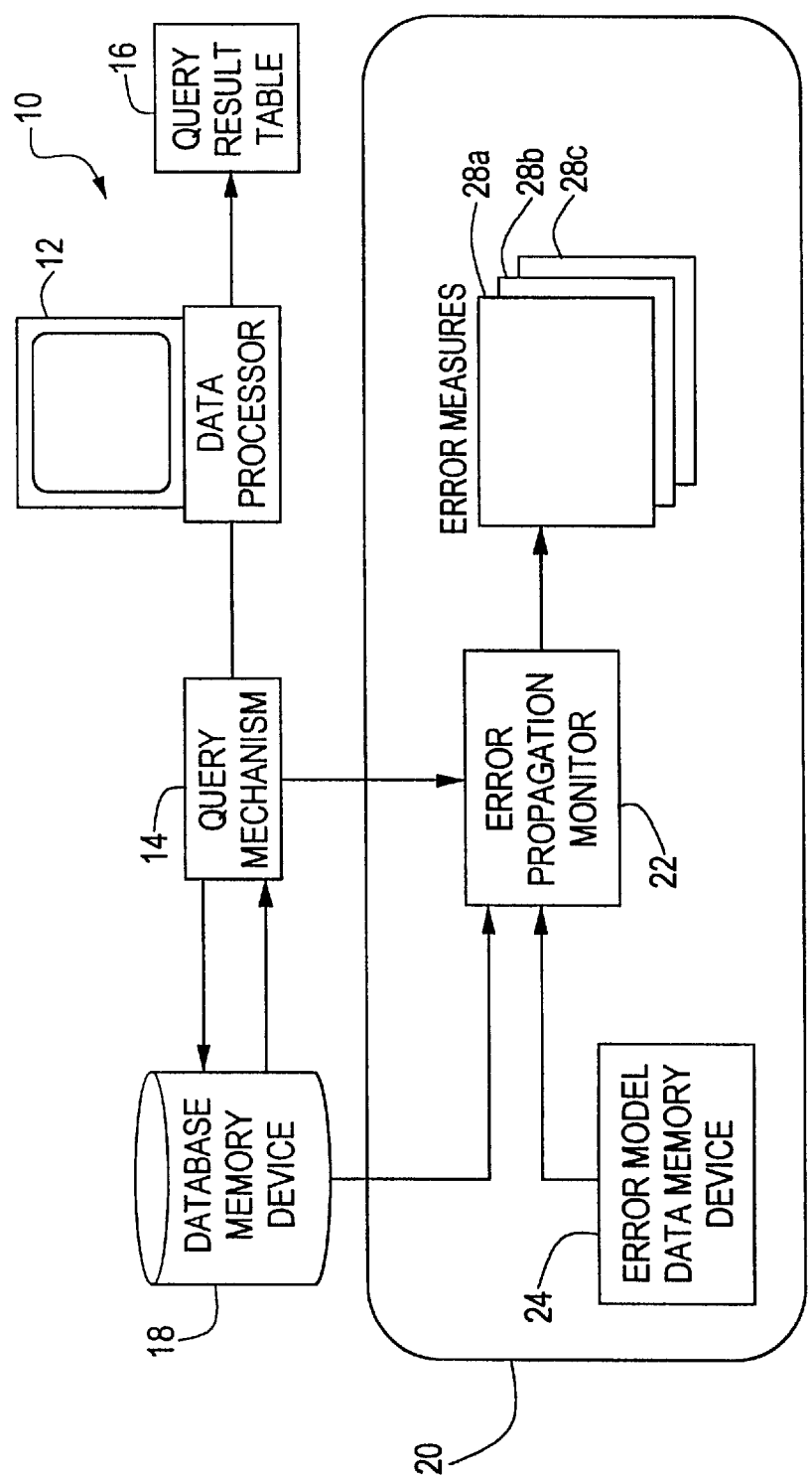
FIG. 1 illustrates one embodiment of a system according to the invention for providing a measure of error within the result of a data set query.

FIG. 1 illustrates one embodiment of a system according to the invention for providing a deterministic measure of error within the query results generated by processing of a structured data set. FIG. 1 illustrates a system 10 that includes a data processor 12, a query mechanism 14, a query result table 16, a database memory device 18, and an error measurement system 20 that includes an error propagation monitor 22, a memory device 24 for storing error model data, and a set of error measure tables 28a–28c.

The illustrated embodiment of FIG. 1 is a database system that employs a query mechanism 14, such as the software query language mechanism (SQL), to perform logical operations on the structured data set stored within the database memory device 18. This example of employing the error measurement system 20 according to the invention for measuring the error that can occur within query results generated by processing a database 18 is provided for illustrative purposes, and the invention itself is not to be limited to such database systems, but for employment as an error measurement system for any system suitable for processing a structured data set.

As figuratively illustrated in FIG. 1, the depicted error measurement system 20 is a device that sits on top of and is separate from the database system that is providing the query results. To this end, the error measurement system 20 interfaces at two points with the database system, at a first point to interface to the query mechanism, and at a second point to interface with the database memory device 18 that stores the structured data set. Accordingly, the error measurement system 20 depicted in FIG. 1 has the advantage of being employable with a conventional database query system and avoids modifications to the database or the data in database memory device 18.

In FIG. 1, the database query system to which the error measurement system 20 interfaces is depicted by the elements 12, 14, 16, and 18. To that end, the data processor 12 depicted in FIG. 1 can be a conventional data processing system suitable for operating a query mechanism, such as the query mechanism 14. The query mechanism 14 can be any query mechanism suitable for performing logical operations on the structured data set stored in the memory device 18.

For example, the query mechanism 14 can be a software database query mechanism, such as an SQL compliant database processor and search engine, such as the Oracle SQL query system. The query mechanism generates, typically in response to user inputs, a set of logical operations that process the structured dataset. The logical operations can be sorting operations, counting, joining or any other such operation. The output of the processing operation is the query result. Typically, it is this query result that the database user takes as the answer to the query entered into the system and employed by the query mechanism 14 to generate the set of logical operations. The illustrated database memory 18 that stores the database information as a structured data set can be any memory device including a hard-disk, tapedrive, or remote database, suitable for storing computer readable information in a format that facilitates processing by the query mechanism 14. The query result and its appended error measure can serve again as input to the database query mechanism and the error propagation monitor.

FIG. 2 illustrates an example of a structured data set that can be stored within the memory device 18 for processing by the query mechanism 14. This example refers to the hypothetical alumni(ae) or a university. The structured data set 30 illustrated in FIG. 2 is comprised of six separate records, each being one tuple of the structured data set 30. The structured data set 30 depicted in FIG. 2 is an organized aggregation of different data types, including text and numerical data. The text and numerical data is organized into the six records depicted. Each tuple of the depicted structured data set 30 has seven fields, including a record number field, an alumni name field, a home state field, a degree field, a major field, a year of graduation field, and a five-year donation field. The structured data set 30, and the data and logical organization of that table, represent the total information known to a database administrator or database user, regarding the actual real-world state of the alumni objects.

Accordingly, any error in this world representation can affect the accuracy of query results generated from processing the structured data set 30.

Figure 7:
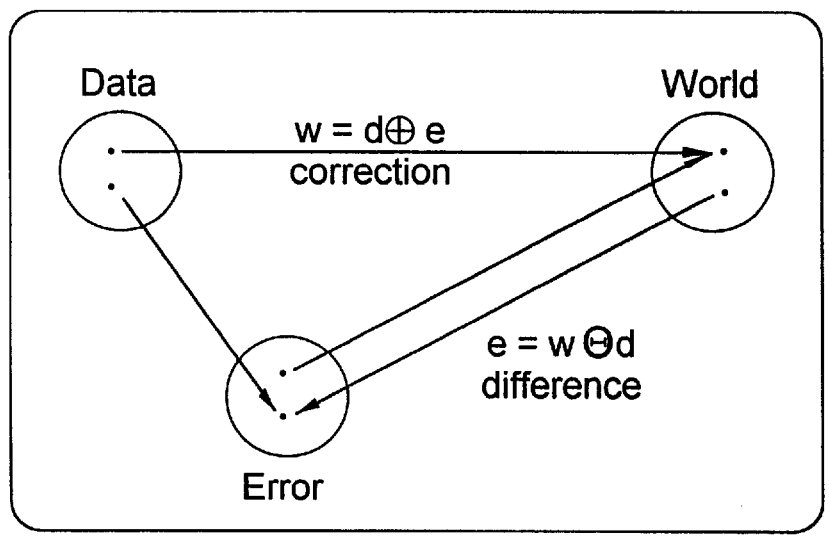
FIG. 7 is a diagrammatic view of the relationship between data, true value for data, and error.

Data error is defined relative to the true state of the world. A logical error measure is defined on a structured data set as a difference between the true data and the structured data, as depicted in FIG. 7, where the World (W) denotes data that correctly represents the true world state. Data (D) is an approximation of that true world. Error (E) documents the difference or discrepancies between D and W. The difference operator $\Theta$ maps from <D, W> to E. The correction operator $\oplus$ maps from <D, E> to W.

Figure 4:
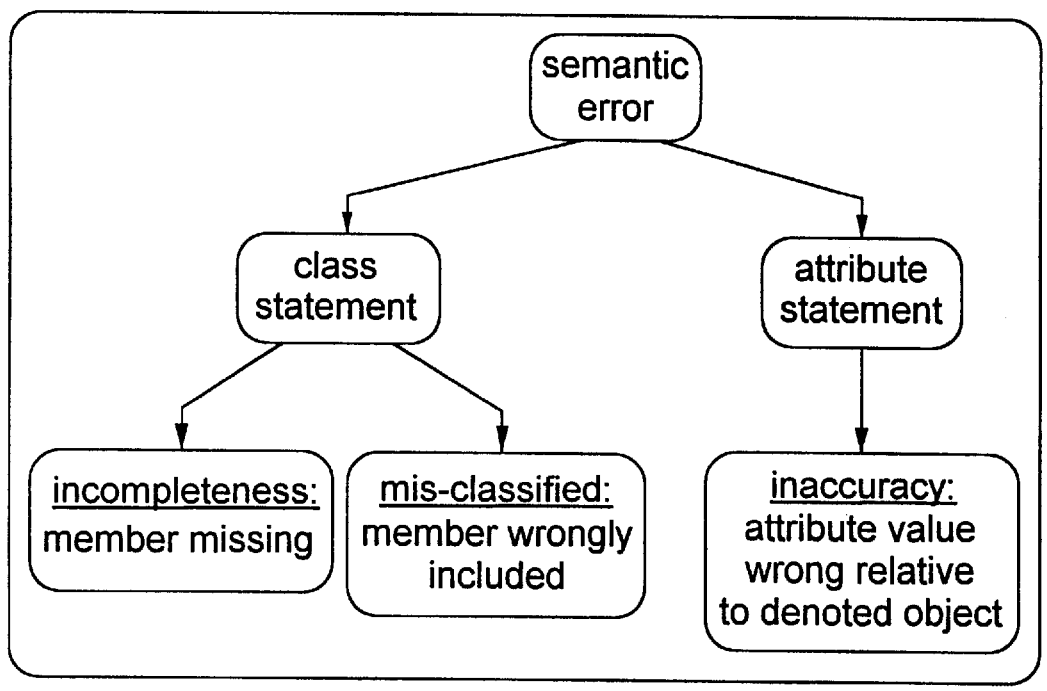
FIG. 4 illustrates the error conceptualization leading to the formulation depicted in FIG. 3.

To measure error within the structured data set 30, systems according to the invention define statements that recite the errors that can occur within the database data. For example, the system can organize error into three categories, that as a set are understood to provide a complete representation of error within a structured data set. One such error definition is depicted in FIG. 4. The depicted error definition integrates class and attribute statement level errors. This error definition provides a more precise, general, and quantitative formulation of error than frequently used error related terminology including accuracy, completeness, integrity, and consistency, which are often vague and poorly defined.

The integrated definition which includes class statement and attribute statement error measures allows error to apply differently to a data set than to a data value, and allows systems according to the invention to operationalize error differently to categorical and numerical data. As the term class is used herein, it will be understood to encompass a category in which a particular object either is or is not a member. An object is a thing or concept that may be denoted by an identifier, for example, a text string, or a number. An object can be either classified, e.g. wealthy, or big number, or can be assigned an attribute value such as a specific number, or text string. The same symbol may be an attribute in one table and an object in another, while referring to the same concept. Attribute and class concepts are convertible during query processing.

Accordingly, attribute level errors referred to as inaccuracies within the structured data set 30 can, as a result of the query operation, result in classification level errors within query results. Systems according to the invention track the propagation of error from the input table, structured data set 30, to the query results, even if a conversion of error type occurs within the error propagation path.

As further depicted in FIG. 4, attribute statement level errors are understood as inaccuracies within the recorded data wherein the attribute value is wrong relative to the denoted object, either because it is incorrect or missing. Class statement level errors include incompleteness errors and misclassification errors. An incompleteness error occurs when a member of a class which should properly be recorded within that class, fails to be accurately recorded as a member of the class. Misclassification occurs when a defined class incorrectly records an object as a member of that class, when the actual characteristics of the real-world object fail to qualify the object for membership in the defined class.

With reference again to FIG. 2, examples of errors within the structured data set 30 can be described. The table depicted in FIG. 2 lists active alumni of a college who have made large donations and live in the United States. FIG. 3 depicts the errors believed to exist in the table of FIG. 2. Firstly, record 2 contains an inaccurate attribute value. In particular, Lisa Jordan's donation amount is actually $400,000.00. Included in this category is the null attribute value (record numbers 1 and 3): these are values which exist but are unknown to the database. For example, the true value for Mae-Ray's year of graduation is 1991. The true value for Tom Jones' major is CS.

Class incompleteness occurs within the structured data set 30 as exemplified by the tuple for the alumnus John Junto as incomplete, i.e. missing (perhaps the corrupt record number 6 was to correspond to the Junto data). He is an actual alumnus who satisfies the class definition, but is not listed. This is an error within the input structured data set.

Class mismembership is exemplified in record numbers 4 and 6. For example, John Wales is a mismember—he is no longer active. Record number 6 is a mismember, as it represents a spurious object—null or corrupt keys are modeled as mismembers.

In one embodiment, systems according to the invention can create the error model stored in memory device 24 by generating three tables, that describe the errors of the structured data set 30 depicted in FIG. 2. These tables are depicted in FIG. 3 as tables 32, 34, and 36. Table 32 denoted $r_{em}$ models the alumni mismembers errors that occur within the structured data set 30. Table 34 denoted $r_{ea}$ models the alumni inaccuracies that occur within the structured data set 30. Table 36 denotes $r_{ei}$ models the alumni incompletion errors within the structured data set 30. These three tables together, termed an error triple, can be understood to provide a complete representation of the errors within one table of the structured data set 30, wherein this error triple is understood to define the structured data set 30's failure to record the accurate state of the major U.S. active alumni. Accordingly, the error triple is data that models the differences in the data recorded within the structured data set 30 and the actual data which represents the real-world state of major U.S. active alumni.

The above description illustrates one system according to the invention for providing an error measure on the input data on which a query will operate. Systems according to the invention include an error propagation processor that employ this error measure on the input data, data set 30, to determine an error measure 28 for a query result 16, wherein the errors in the query result 16 arise from the propagation of the input errors from the input data 30 to the query result 16.

To that end, as depicted in FIG. 1, systems according to the invention include an error propagation monitor 22. The error propagation monitor can be a software module that has an interface to the query mechanism 14 to monitor the query instructions entered by a database user for processing the structured data set stored within the database memory 14 or on a remote server.

The interface can be a software interface that acts as a background process running on the data processing system that supports the query mechanism 14 or on a remote server. The software interface can generate a file of the instructions and pass the file to the error propagation processor 22. Alternatively, the interface can be a hardware interface, such as a data cable, that directs queries to both the database memory 18 and the error propagation processor 22. It will be apparent that any interface suitable for monitoring the instructions can be practiced with the invention. The instructions can be a set of logical operands, such as AND, OR, NOT EQUALS, GREATER THAN, LESS THAN, or other such logical operations, or additionally, a set of more abstract instructions, such as SELECT, JOIN, OR PROJECT which incorporate within this more abstract instruction a set of primitive logical operations such as those enumerated above. The instructions can also include operations such as COUNT and SUM, that direct the query mechanism 14 to aggregate data, either to provide the aggregated data as output to the user, or to create new intermediate data for further processing by the instruction signals.

In one embodiment, the error propagation processor includes a parser and a compiler that parses out the instruction signals generated by the query mechanism 14 to generate a set of error propagation instructions that can process the structured data sets of the error model 24 and the data set stored in database memory 18. The error propagation instructions query these structured data sets to analyze the propagation of error from the input data to the output data and to generate an error measure representative of error within the query results provided by query mechanism 14. Accordingly, the parser can generate from the query operations a set of error propagation operations that process the error model 24 and the structured data set of database memory 18 to develop an error measure 28a, 28b, 28c that again can be represented as an error triple that identifies error in the query result as three tables that measure inaccuracy, class incompleteness and class mismembership within the query results.

The following example describes a system for processing a database using an SQL compliant query mechanism. The parser/compiler of the error propagation processor can be written in LEX/YACC, and operates as a software module running on a conventional data processor, such as the data processor 12 depicted in FIG. 1. The error propagation processor can be a layer of software that sits above the query mechanism 14 to monitor the query mechanism and to generate a set of error propagation query instructions. In one embodiment of the invention, the query mechanism 14 and the error propagation processor 22 operate in parallel, with the query mechanism 14 operating on the database 18 in one step to determine the query results, and with the error propagation processor 22 operating in a second independent step to determine an error measure for that query result. This allows the system 20 to employ the architecture of the query system, including the interface with memory 18 and the data processor 12.

The error propagation processor 22 depicted in FIG. 1 determines the form and parameters of the query generated by query mechanism 14 and compiles the appropriate error propagation calculus sub-expressions as a set of SQL expressions that can query the error model data in memory 24 and the structured data sets stored in memory device 18. After submitting this SQL query against the error model data 24 and the structured data set stored in memory device 18, an output error triple, such as that shown in FIG.3 is produced. These can represent the computed corrections to the query result tables 16 generated by query mechanism 14 that will correct the errors in query result table 16.

In one practice, a database user operates the data processor 12 by manipulating an interface that is written in HTML/PERL using a CGI script. The database user types a valid SQL query into the text area on a web browser screen. Hitting a send button on that screen invokes the error propagation processor 22 which operates separate from, and induced by, the query mechanism processing 14 to provide a nonintrusive system for measuring error. Accordingly, the underlying database system does not have to change to accommodate the system 20 depicted in FIG. 1.

In this example, a database of structured commercial financial data shown in Table 1, was intentionally corrupted with known errors to facilitate the provision of an error model 24 and a database of flawed information. The errors introduced into the financial database are illustrated in Tables 2, 3, and 4. Table 2 shows a table of inaccuracies within that input database, Table 3 shows the table of incomplete classes and Table 4 shows the mismembers existing within the input database.

This provides actual error data, in that the errors are known and the error corrections necessary can be stated deterministically. Accordingly, the logical error model can be built as an error triple that definitely states the error within a table of the structured data set. In practice such as an error model can be created by comparing data in one database against a reference database of the same information. The reference database can be a more expensive database or a collection of data that has been more carefully gathered and updated.

TABLE 1

Sample data from the California Data Co. table
Connected to:
ORACLE7 Server Release 7.0.15.4.0-Production
With the procedural and distributed options
PL/SQL Release 2.0.17.1.0-Production
SQL> select * from disc where comp_name like 'A%';

| COMP_NAME | NUM_EMPLOYEES | TOTAL_ASSETS | NET_SALES |
|---|---|---|---|
| A O SMITH CORP | 10800 | 823099 | 1193870 |
| A SCHULMAN INC | 1582 | 407865 | 685112 |
| ABBOTT LABORATORIES | 49659 | 7688569 | 8407843 |
| ACX TECHNOLOGIES INC | 4200 | 653999 | 641852 |
| ADOLPH COORS CO | 6200 | 1350944 | 1946592 |
| ADVANCED MICRO DEVICES INC | 12060 | 1929231 | 1648280 |
| AG PROCESSING INC | 2128 | 465796 | 1218614 |
| AGWAY INC | 7900 | 1204764 | 1710577 |
| AIR PRODUCTS & CHEMICALS INC | 14075 | 4761500 | 3327700 |
| ALBERTO CULVER CO. | 8600 | 593046 | 1147990 |
| . . . | | | |

TABLE 2

Inaccuracies in input relation
SQL> select * from disc_ea;

| COMP_NAME | NUM_EMPLOYEES | TOTAL_ASSETS | NET_SALES |
|---|---|---|---|
| INTERNATIONAL BUSINESS MACHINES CORP | 302196 | 81113000 101000000 | 62716000 |
| FORD MOTOR CO | 322213 | 198938000 98938000 | 108521000 |
| GENERAL ELECTRIC CO | 222000 | 251506000 251506731 | 59827000 |
| GENERAL MOTORS CORP | 710800 71100 | 188200900 | 133621900 |

TABLE 3

Incompletes from input relation
SQL> select * from disc_ei;

| COMP_NAME | NUM_EMPLOYEES | TOTAL_ASSETS | NET_SALES |
|---|---|---|---|
| NORTHERN TELECOM LTD | 60293 | 9485000 | 8148000 |
| AMERICAN EXPRESS CO | 64493 | 101132000 | 14173000 |

TABLE 4

Mismembers in input relation
SQL> select * from disc_em;

| COMP_NAME | NUM_EMPLOYEES | TOTAL_ASSETS | NET_SALES |
|---|---|---|---|
| DAIMLER BENZ CORP | | 9.0926E + 10 | 9.7737E + 10 |
| SEARS ROEBUCK and CO | 359000 | 90807800 | 50837500 |
| CITICORP | 81500 | 216574000 | 32196000 |

Table 5 shows the output from an SQL Plus program (of the type sold by the Oracle Company, Redwood Shores, Calif.) as it operates on the financial database. The parser compiler of the error propagation processor 22 creates an associated script resulting in an SQL Plus script, whose execution is shown as the SQL Plus program of Table 5.

TABLE 5

Sample of SQL compiler execution-the logical calculus implementation

1. Connected to:
2. ORACLE7 Server Release 7.0.15.4.0-Production
3. SQL>>
4. SQL> EPC-processing standard select-from-where query:
5. SQL>>
6. SQL> dropping 3 output error tables: inacc, incompl, mismem . . .
7. Table dropped.
8. Table dropped.
9. Table dropped.
10. SQL> The user query was:
11. select  total_assets, comp_name from disc where total_assets > 100,000,000;
12. SQL> table = [disc]
13. SQL> key_attr = [comp_name]
14. SQL> attr_list = [total_assets, comp_name]
15. SQL> where_clause = [ total_assets > '100000000']
16. SQL> INACCURACY
17. SQL> compiling inaccuracy EPC.
18. SQL> result:
19. SQL>> CREATE table error_table_inacc as
20. SQL>> SELECT total_assets, comp_name
21. SQL>> FROM disc_ea
22. SQL>> WHERE
23. SQL>> (total_assets > '100000000')
24. SQL>> AND
25. SQL>> (comp_name IN
26. SQL>> ( SELECT comp_name
27. SQL>> FROM disc
28. SQL>> WHERE ( total_assets > '100000000')
29. SQL>>   )
30. SQL>> )
31. SQL>> AND
32. SQL>> (total_assets, comp_name) NOT IN
33. SQL>> ( SELECT total_assets, comp_name
34. SQL>> FROM disc)
35. SQL>>
36. SQL>> executing EPC to compute output inaccuracy
37. Table created.
38. SQL> INCOMPLETENESS
39. SQL> compiling incompleteness EPC
40. SQL> result:
41. SQL>> CREATE table error_table_incomp as
42. SQL>> SELECT total_assets, comp_name
43. SQL>> FROM disc_ei
44. SQL>> WHERE ( total_assets >'100000000' )
45. SQL>> UNION
46. SQL>> SELECT total_assets, comp_name
47. SQL>> FROM disc_ea
48. SQL>> WHERE
49. SQL>> ( total_assets > '100000000' )
50. SQL>> AND
51. SQL>> comp_name NOT IN
52. SQL>> (SELECT comp_name
53. SQL>> FROM disc
54. SQL>> WHERE ( total_assets >'100000000' )
55. SQL>> )
56. SQL>>
57. SQL> executing EPC to compute output incompleteness
58. Table created.
59. SQL> MISMEMBERSHIP
60. SQL> compiling mismembership EPC
61. SQL> result:
62. SQL>> CREATE table error_table_mismem as
63. SQL>> SELECT total_assets, comp_name
64. SQL>> FROM disc_em
65. SQL>> WHERE ( total_assets > '100000000" )
66. SQL>> UNION
67. SQL>> SELECT total_assets comp_name
68. SQL>> FROM disc TABLE 5-continued Sample of SQL compiler execution-the logical calculus implementation 69. SQL>> WHERE
70. SQL>> ( total_assets > '100000000' )
71. SQL>> AND
72. SQL>> comp_name IN
73. SQL>> (SELECT comp_name
74. SQL>> FROM disc_ea
75. SQL>> WHERENOT ( total_assets > '100000000' )
76. SQL>> )
77. SQL>>
78. SQL> END OF EPC OUTPUT
79. SQL> executing EPC to compute output mismembers
80. Table created.

In this example, the user query is:
  select total_assets comp_name, from disc where total_assets>"100000000".

By this query, the database user wishes to see which companies have greater than one hundred billion dollars and what is their asset amount. The listing of Table 5 shows the output of the script as executed in the SQL Plus environment. The user query is shown on line 11. The LEX and YACC parse and transform input queries into error propagation expressions in lines 16, 38, and 58 of the listing of Table 5 respectively. The compiler generates a separate SQL expression set for inaccuracy, incompleteness, and mismembership errors.

Lines 19–35 provide an example of the error propagation instructions generated by the error propagation processor 22. The parser generates from the SQL command select, a subset of instructions that identifies the set of tuples that are inaccurate within the query results generated by the query mechanism 14. The selection operation is a logical formula on the data of database memory 18 that will select from that data a subset of the data which meets the criterion of the selection operation. Inaccuracies result in the selection operation due to the existence of an inaccurate tuple in the input data structure that will be selected during the SQL selection operation entered by the user. This relationship can be represented by the following formula:

$$S_{ea} = \{r_2 | \exists r_1 \epsilon r, \exists r_2 \epsilon r_{ea}, r_1.R_k = r_2.R_k, f(r_1) \wedge f(\oplus r_1)\}$$

Wherein the expression $\exists r_1 \epsilon r$ means there exists a tuple in $r_1$ in R. "$r_1.R_k = r_2.R_k$" matches $r_1$ in R with a tuple $r_2$ in $R_{ea}$ on the key columns $R_k$. So, $r_1$ is inaccurate and $r_2$ contains attribute value corrections to $r_1$. "$f(r_1)$" indicates that $r_1$ was selected by f. "$f(r_1)$"indicates that $r_1$ should have been selected, i.e. if the attribute values in the input data $r_1$ had been corrected before applying f, the tuple would still have been selected. This is understood to ensure that the inaccuracy in $r_1$ did not result in an S mismember due to false selection of $r_1$. This formula is represented by the SQL query instructions set forth in lines 19–35 of Table 5.

Selection incompleteness errors arise from two conditions. An incomplete from the input data would have been selected had the tuple been present, and inaccuracy in the input data caused the select condition to fail where it would have succeeded otherwise. These criteria are set forth by the expressions 3a and 3b below.

Selection mismemberships in the query results can arise from two causes; a mismember of the input data is selected by a selection operation so that the mismember remains, and where an inaccurate tuple is selected by the selection operation only due to its inaccuracy and should not have been selected. This logical formula is set forth in expressions 2a and 2b. Other query operations are described besides SELECT in Appendix A attached hereto, and still others will be apparent to those of ordinary skill in the art. Accordingly, it will be understood the invention set forth herein which measures error propagation is not to be limited to any particular set of operations, nor to any particular set of error definitions.

The parser of the error propagation of monitor 22 generates, as set forth in lines 41 through 56, a set of query instructions for processing the error model 24 and the data sets stored in database memory 18 to generate an error measure of the incompleteness within the query results. Similarly, the parser at lines 62 through 78 of Table 5 generate a set of query instructions for determining mismemberships within the query results. These three derived SQL queries relate to the error propagation formalisms set forth in formulas 1 through 3. When executed against the error model 24 and the data in database 18, the error propagation processor 22 generates an error measure represented in FIG. 1 as three output tables 28a, 28b, and 28c. Each of these tables corresponds to one portion of an error triple, i.e. inaccuracy, mismembership, or incompleteness. The contents of these three tables are set forth in Table 6 below. A short review of Table 6 indicates that the error measurement system 20 according to the invention has identified those errors that exist within the query result 16 depicted in FIG. 1. The system is mathematically closed in that the output of one error propagation calculus expression can serve as input to another.

TABLE 6

Output error triple: <output_ea, output_ei, output_em>

81. SQL> *********** OUTPUT INACCURACIES ****
82. SQL> select * from output_ea;
83. TOTAL_ASSETS COMP_NAME
84. —
85. 251506000 GENERAL ELECTRIC CO
86. SQL> ************** OUTPUT INCOMPLETES ****
87. SQL> select * from output_ei;
88. TOTAL_ASSETS COMP_NAME
89. —
90. 101132000 AMERICAN EXPRESS CO
91. 198938000 FORD MOTOR CO
92. SQL> *********** OUTPUT MISMEMBERS ****
93. SQL> select * from output_em;
94. TOTAL_ASSETS COMP_NAME
95. —
96. 101000000 INTERNATIONAL BUSINESS MACHINES CORP
97. 216574000 CITICORP
98. 9.0926E + 10 DAIMLER BENZ CORP
99. SQL> Disconnected from ORACLE7 Server Release 7.0.15.4.0-Production The above description describes a method for measuring error within query results and provides a deterministic evaluation of the error within those query results. To this end, the system depicted in FIG. 1 employs an error model 24 that contains, as described in the above example, values which indicate the actual errors existing in the input data stored in the database memory 18. Accordingly, this logical error model represents error as deterministic corrections to individual facts. Such a deterministic error model 24 allows a database administrator to document or verify the integrity and value of the structured data set stored within the database memory 18. For example, the database administrator can generate a deterministic error model 24 by selecting a portion of the data stored within the database memory 18 and manually researching the data therein to identify any inaccuracies, incompleteness, or mismemberships.

For example, a database administrator can be in charge of a database that stores records on 35,000 alumni. The database administrator can select a representative 500 records from that database. The database administrator can review and analyze these records to create an error model 24 that is representative of a portion of the data records stored in the database memory 18. The database administrator can then conduct query searches of those 500 records to get error measures that indicate the accuracy of the query result being generated from the database. The error measures generated by the error measurement system of the invention provides the database administrator with the integrity of the search results being produced on searches of the full database. If error measurements indicate that the search results are of little value, the database administrator can draw the inference that the database needs to be overhauled.

Alternatively, if the error measures indicated that query results being produced from the database 18 are generally accurate, the database administrator can choose to avoid the expensive process of updating the database. Similarly, a database administrator that is choosing between a number of available databases that contain similar information can select the highest quality database, perhaps the most expensive, and determine differences between that high quality database and other less expensive ones. These differences can be employed to generate a deterministic error model 24. If error measures produced upon processing less expensive databases indicates an acceptable level of error within the query results, then the database administrator can select to purchase the less expensive database. Alternatively, if the error measure results indicate that the less expensive database produces query results highly inaccurate and of little value, the database administrator can justify the expense of purchasing the more expensive database.

It is understood, that the system allows a database administrator to get a measure of how error in an input database propagates to query results. The propagation of error is not necessarily intuitive. Accordingly, an error model that indicates a high level of inaccuracy in a certain attribute may nonetheless fail to translate into any type of significant error for the queries generally performed by the database administrator. Consequently, the invention provides database administrators with systems and method for comparing, maintaining, and selecting databases.

Figure 5:
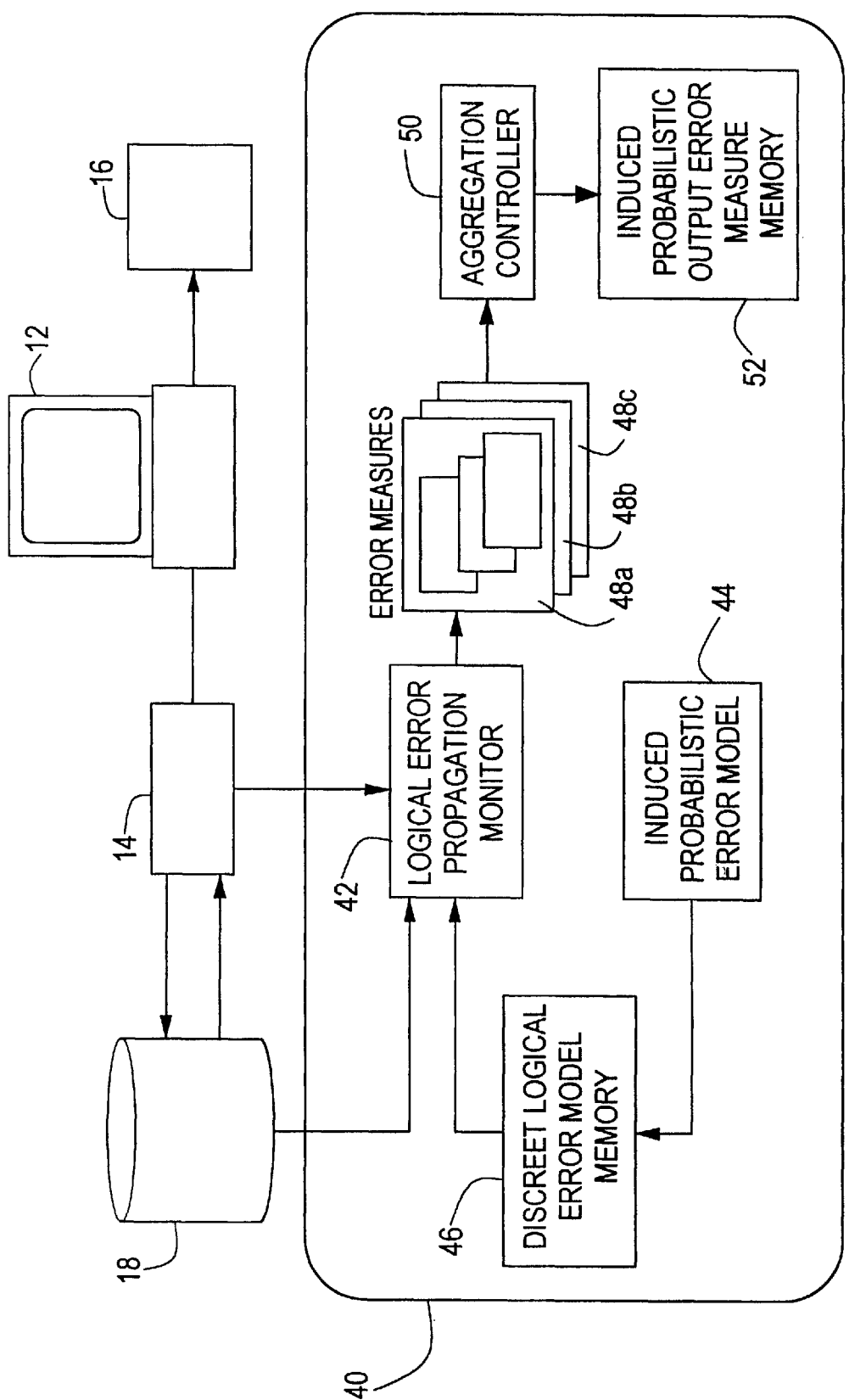
FIG. 5 illustrates in functional block diagram form an embodiment of the invention for processing probabilistic error models.

In an alternative embodiment of the invention, the system employs an error model 24 that represents error within the structured data set by probabilistic data. In a probabilistic sense, knowing error fully implies having a probability distribution on the error sample space so that each error state can be individually quantified for likelihood. A probabilistic error representation consisting of expressions such as those described below in Table 7, can be one way of defining these probability distributions. FIG. 5 depicts one embodiment of the invention for use with probabilistic error models. This error and error propagation model define a simulation mechanism for iterating over the logical error states.

FIG. 5 depicts the induced probabilistic error measurement system 40 that includes a logical error propagation monitor 42, an induced probabilistic error model 44, a discrete logical error model memory 46, a discrete logical error measure memory 48 having storage for error measure triples 48a, 48b, and 48c, an aggregation controller 50, and an induced probabilistic output error measure memory 52.

In the system 40 depicted in FIG. 5, the probabilistic error data stored in the probabilistic error model 44 is employed to generate an error measure that defines error within query results as a probability distribution. In this embodiment, the system 40 generates probabilistic error measures by iteratively testing each possible error state of the database memory 18 to generate a plurality of error measures, each being representative of one possible output error state for the query results. Thus the system 40 can also be termed the induced probability error measurement and propagation system, as this model results from probabilistic iterations over the logical model.

As further depicted in FIG. 5, the system 40 includes an aggregation controller 50 that aggregates the probabilities of the individual logical output error measurements to generate an output error measure that represents the probability distribution of error within the query result separately for each type of error and for various subsets of the query result. To this end, the error propagation monitor 42 contains an iteration processor that employs the probabilistic data stored in the probabilistic error model 44 to generate randomly one discrete logical error measure which is stored in error model memory 46. This discrete logical error measure represents one possible logical error model for the data of database memory 18. The system 40 processes this single discrete logical error measure as described above with reference to the system 20 of FIG. 1, to generate an error measure representative of an output error that would occur for this one discrete logical error measure stored in error model memory 46. This output measure is then stored within the error measure memory 48. The iteration processor of error propagation monitor 42 then randomly generates, using the probability error model 44, another discrete logical error measure which can be stored in error model memory 46. Again, the error propagation monitor 42 generates an output error measure signal for this possible error measure and stores the output measure within the error measure memory 48. This iterative process continues until sufficient iterations have been performed to generate a sufficient number of logical output error measures to define the probability distribution of the error within the query result signal.

In particular, as further illustrated in FIG. 5, each iteration of the logical model produces an error triple that can be stored within the error measure memory 48. Each error measure stored within error measure memory 48 represents one point of the error space of the logical measure of error for the query results signal 16. In the depicted embodiment, the error measure memory 48 couples to the aggregation controller 50. The aggregation controller 50 can, optionally, sum together the multiple logical executions provided by the iterative processor of the propagation monitor 42. In particular, the aggregation controller generates an aggregate statistic over the multiple logical executions performed by the error propagation monitor 42. For example, the iterative processor can perform one hundred iterations of the simulation. Random logical error measures are generated according to probabilistic error statements such as those in Table 7 and in formulas 1, 2, and 3 below. The output of each iteration is a logical output error measure. This output error measure is a probability density function of its outputs over one hundred iterations and constitutes the induced model's output distribution for each of the error types. This output distribution can be graphically plotted to depict the probability distribution of the error within the query result signal 16. The probabilistic output error measure memory 52 can store the aggregated output error data for subsequentive use by the database administrator.

It will be apparent that other query operations and error propagation calculus expressions can be employed with the invention without departing from the scope thereof.

In a further alternative embodiment of the invention, the systems can employ error model data that is represented as probabilistic expressions. For example a statistical methodology can determine that an error term on income for Alumni is some (discretized) normal distribution (call it P (income-error)). These probabilistic error statements can be processed by statistical operations to directly determine the error probability distribution of the query result signal 16. Continuing with the example, if a selection predicate asks for the number of individuals with income greater than some amount, this input normal distribution of error become a distribution on inaccuracy, incompleteness, and mismembership by operation of a functional processor that employs a sum of binomial random variables to model the number of incompletes and mismembers in the output. Such a functional view of error representation and propagation directly determines the probabilistic output error without requiring the iterative processes previously described with reference to FIG. 5. The statistical processing operations employed by the functional processor for combining probability statements of error are well known in the art of probability and statistics.

Figure 6:
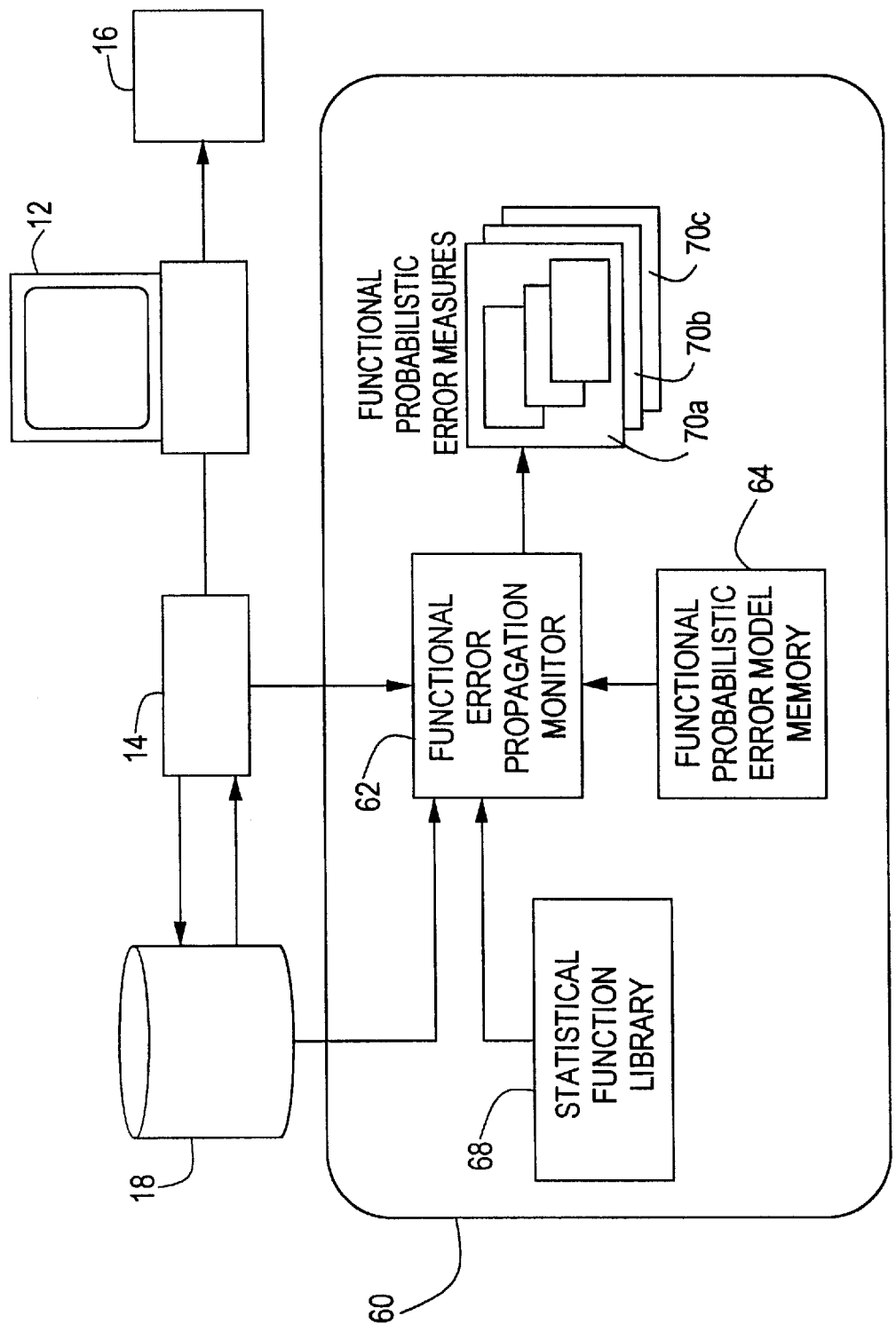
FIG. 6 illustrates a further alternative embodiment of the invention.

One such system is the functional probabilistic error measurement system 60 depicted in FIG. 6. The depicted system 60 includes a functional error propagation monitor 62, a functional probabilistic error model memory 64 having probability data stored therein, a statistical function library 68, and functional probabilistic error measure memory devices 70a, 70b, and 70c.

Accordingly, in this embodiment, the error model data stored in memory device 64 can be stated as closed form statements of probability distributions. For example, an error statement that alumni under-report or over-report their income as a function of region (Europe, Texas, etc.) and employment category (CEO, manager, etc.), can take the form:

$$P(\text{Income-error}=x|\text{Region}=y\char`^\text{Employment-category}=z)(\text{Statement 1})$$

Further, mismembers may be represented as: (1) "the probability that a randomly chosen tuple in the table is a mismember is 0.1", and (2) "the distribution of values in a tuple given it is a mismember is $P_x(x)$" where $x \in X$ is a tuple variable on the table's scheme. These can be stated in the form: P (mismember) and P(X=x|mismember). Other probabilistic statements of error will be apparent to those of ordinary skill in the art, and the use thereof does not depart from the scope of the invention.

Table 7 illustrates probability statements in an error model data set. In Table 7, t is a random tuple in a relation r, $\oplus$t is the correction to t necessary to correct any error therein, o is a random object in the world which is in fact in r's class, x and y are tuple variables on r's scheme. Then the following statements describe alternative ways of structuring knowledge about data error for each error type. Member (t) is the event that the tuple t is in fact a member of the table's class. Mismember (t) is the event that the tuple t is in fact not a member of the table's class. Incomplete (o) is the event that the object o is in fact a member of the table's class, but is not listed in the table.

| error type | item | functional representation expression |
|---|---|---|
| inaccuracy | 1 | P ($\oplus$t = y \| member(t) $\char`^$ t = x) |
|  | 1' | P (member(t) $\char`^$ t = x) |
|  | or |  |
|  | 2 | P (t = y \| member(t) $\char`^$ $\oplus$t = x) |
|  | 2' | P (member(t) $\char`^$ $\oplus$t = x) |
| incompleteness | 3 | P (incomplete(o)\|o = x) |
|  | 3' | P (o = x) |
|  | or |  |

-continued

| error type | item | functional representation expression |
|---|---|---|
| | 4 | P (o = x | incomplete(o)) |
| | 4' | P(incomplete(o)) |
| mismembership | 5 | P (mismember(t) | t = x) |
| | 5' | P (t = x) |
| | or | |
| | 6 | P (t = x | mismember(t)) |
| | 6' | P (mismember(t)) |

For encoding knowledge about the error type inaccuracy, an error data model can structure the information based on either of the two expressions of item 1 and 1' or on 2 and 2' above as these are alternative statements. This can be similarly done for incompleteness and mismembership. Accordingly, memory 64 can store an error triple data model having three tables of errors each providing tuple level representation of error recited as statements of probability. This system 60 can also be termed the functional probabilistic error measurement and propagation system. This is because it operates directly on probability functions.

The functional probability representation can also provide error models that include conditional descriptions of error. To this end, the probability statement of error expressed for a tuple in the error model can provide a first statement of error probability that applies under a first condition, and a second statement of probability of error that applies under a second condition. For example, the probability statement of error for the accuracy of an address field in the input data set may be conditional upon the age of the associated alumni member, given that younger people have a tendency to move more frequently that older people. Accordingly, the parameters of a probability statement, e.g., the mean of a binomial distribution, may be different conditioned upon the age of the alumni. Error can may also be conditioned upon evidence of other error contained in the table. The evidence of error can be any information which leads to a belief that error may exist in a particular subset of the data which is different than the error that exists for the other portions of the data. One such form of evidence includes a recording of the processing history of data, including its source, age, and collection method.

As with the embodiments described above, the error propagation monitor 62 determines errors in the input data set that will propagate through to the query results 70 given the input errors and the operations employed in the query.

For example, mismembers can propagate for a select operation. For example, variable r represents a table that is input to a database query, and variable s represents a table that is output from that query. The scheme of both is R, with $r_e$ and $s_e$ are the respective error triples. $s_e$ can be computed by the calculus. Let $K \subset R$ be the key of R. As an example of the probabilistic events, let $s_1$ be a random tuple drawn from the output table s. Let $s_1.K \in s_{em}.K$ be the event that $s_1.K$ is a mismember of s. Then $P(s_1.K \in s_{em}.K)$ is the probability of this event. As discussed above, a conditional distribution such as $P(s_1.K \in s_{em}.K | s_1=x)$ allows assignment of a higher likelihood or degree of error to some subsets of the data (world) than to others (where x is a tuple variable on R).
mismembership in the select result $$P(s_1 \cdot K \in s_{em} \cdot K | s_1 = x) = P(s_1 \cdot K \in r_{em} \cdot K | s_1 = x) \quad (2a)$$

$$+ P(s_1 \cdot K \in r_{ea} \cdot K \wedge f(s_1) \wedge \neg f(\oplus s_1) | s_1 = x) \quad (2b)$$

Expressions 2a and 2b above state that two exclusive events among input tuples can result in an s mismember. 2a covers the event that $s_1.K$ was a mismember in r, in which case (by definition of a selection) it is also a mismember in s. 2b describes the other way a tuple may be a mismember in s—when an inaccuracy in r causes a tuple to be wrongly selected into s.

The probability of an output mismembership is a function of the probabilities of the these two types of input error events. The probability that a random output tuple $s_1 \in s$ is a mismember (given $s_1=x$) is the probability that, for the tuple $s_1 \in r$, and given $f(s_1)$, then what is the conditional probability—in r—that $s_1$ is either a mismember of r or $s_1$ is inaccurate resulting in false selection by $f$. And, because of the conditionals, a probabilistic "filtering" of error occurs. The selectivity of $f$ over conditioning variables may lead to different proportions of tuples in each error category.

Inaccuracy error concerns an attribute value vis-a-vis an object. As in mismembership, a conditional interpretation of inaccuracy can be adopted. y below is another tuple variable on R.
inaccuracy in the select result $$P(s_1 \cdot K \in s_{ea} \cdot K \wedge \oplus s_1 = y | s_1 = x) = \quad (1a)$$

$$P(s_1 \cdot \epsilon r_{ea} \cdot K \wedge \oplus s_1 = y, f(\oplus s_1) | s_1 = x)$$

This equation describes the single event in the input event space that results in an inaccuracy in the output. This is the case where an inaccurate tuple $s_1$ of r satisfies $f$, and the satisfaction is not spurious, i.e., it would have occurred even if the inaccuracy were corrected.

For incompleteness, let o be a random tuple missing from $\oplus s$ where $\oplus s$ represents the true output. Let t be the corresponding inaccurate tuple in r such that t.K=o.K. Two conditions can cause incompleteness: an incomplete from r would have been selected had the tuple been present and an inaccuracy in r causes the select condition to fail where it would have succeeded otherwise. $P_s$ and $P_r$ represent probabilities on s and r respectively.
incompleteness in the select result $$P(o \cdot K \in s_{ei} \cdot K | o = x) = P(o \cdot K \in r_{ei} \cdot K \wedge f(o) | o = x) \quad (3a)$$

$$+ P(o \cdot K \in r_{ea} \cdot K \wedge f(o) \wedge \neg f(t) | o = x) \quad (3b)$$

$$P_s(o = x) = P_r(o = x) | f(o)) \quad (3c)$$

An error calculus can be provided to detect errors that arise from attribute level errors crossing over into class-level errors. For example, Major was an attribute column in context of Alumni, but will generate an object in the Major table due to a projection operation. A propagation calculus can account for such semantic transformations and convert across error measures from one interpretation of data to another. Let r and s be input and output respectively for a projection: $s=\Pi_s(r)$. Probabilistic project propagation depends on the relationship between the projection list S and the key K of the input scheme R. If S includes the entire key of R, then the key of S and R are the same, and the incompleteness and mismembership of s and r are the same. If the key is removed, then a new key arises (as in Major above) and error is to be computed accordingly.

Another factor in the projection can be the relationship between S and the set of columns that are conditioning in the error representation. If conditioning columns are removed, then a new marginal distribution of error is to be computed for the remaining columns in order to maintain (the now reduced) error information. For example, the formula below describes the calculus for projection incompleteness when the conditioning columns are kept and the key is removed.

Let $R_k$ be the key of R. Because S is disjoint from $R_k$, there is a key change so that $S_k=S$. Define o as in 3a–c above.

The functional processor can compute incompleteness as:

$$P(o \cdot K \in s_{ei} | o \cdot k = x) = P(x \in s_{ei}) = P(x \in \oplus r \cdot S \wedge x \notin r \cdot S).$$

$$P(x \in \oplus r \cdot S \wedge x \notin r \cdot S.) = (a)\ 0\ \text{for}\ x \in r \cdot S,$$

and (b) for $x \notin r \cdot S$: $P(x \in r_{ei} \cdot S \vee x \in \{\oplus t | \oplus t \in r_{ea} \cdot K\}) =$ $$1 - P(x \notin r_{ei} \cdot s \wedge x \in \{\oplus t | t \in r_{ea} \cdot K\}).$$

This error propagation calculus expression indicates that object $o.S_k$ will be incomplete from s if either incompleteness or inaccuracy in r masked the fact that a member of r in fact had S value $o.S_k$.

A probabilistic aggragation calculus can also be determined. A count operation reflects how many tuples are in a given table. In the above described error model, the true count can be derived random variable. Let x be the number of tuples actually present in a table. Let y be the number of incomplete objects, and let z be the number of mismember tuples. Then by simple observation the true count is equal to $$x+y-z.$$

The data defines x. So as long as the probabilistic error term gives a distribution on the number of incompletes (y) and mismembers (z), then the true count is fully (i.e., probabilistically) defined. For example, if the alumni DBA states:

300 people are incorrectly listed as deceased then the query select name from alumni where Deceased= 'no' would result in a table of exactly 300 missing. The DBA might have stated instead: the likelihood of any individual reporting him or herself as dead is 1 in 1,000 Then, given 70,000 alive and 30,000 dead tuples, a simple binomial model of lying about death can determine the distribution of numbers of incompletes in the result.

A probabilistic calculus for a sum operation can also be determined. Let T be a table having a numeric attribute column $a_1$, and having n tuples. Let the aggregation be over $\alpha_1$. Let $$\Sigma \alpha_1$$
$$i=1,\ldots,n$$

be the sum over $\alpha_1$, counting blanks as zeros. First make adjustment to $S.\alpha_1$ to address the incompletes. Let $P_y(y)$ be the probability that the number of incomplete objects is y. Then, to adjust $S.\alpha_1$ for incompleteness in T, the functional processor can add z, where z is the random sum of a random variable. The random sum is over the random number ($|T_{ei}|$) of incomplete objects. The random variable is the value $t_1$. $a_1$ for a missing tuple $t_1$. A similar operation corrects for mismembers, but the random sum of random variables is subtracted. Let m be that mismember adjustment, Then the true sum random variable can be expressed as:

$$\Sigma \alpha_1 + z - m.$$

Thus, the probability distribution for the statistic "total-income of Boston area alumni" can be computed, from which various derivative metrics can be computed, such as confidence intervals on this statistic.

The count and sum calculi described above for the functional processor, compute the same output distributions as the embodiment depicted in FIG. 5. The semantics are a clearer from this discussion, however, because they acknowledge the conditional structure of error and the formulation of error as random sums of random variables, allowing for (increasingly) closed-form solutions. Propagating such sums functionally (e.g., without the simulations of the induced model of FIG. 5) will depend on the particular underlying distributions involved. Accordingly, the functional model manipulates conditional probability distributions explicitly and leads, where possible, to increasingly closed form analytic formulas for probability distribution propagation. Many uncertainty models embody assumptions about the "shape" of uncertainty (e.g., uniformity, independence, and normality). These may or may not be valid in a given setting. The current model makes no assumptions about distributions, but specifies what probabilities are relevant.

It will be apparent that other aggregate query expressions, such as average, and union, can be employed with the invention without departing from the scope thereof.

In operation the propagation monitor 62 monitors the instructions generated by query mechanism 14 and parsers the queries, as described above, to generate a set of propagation queries to determine how errors from the probabilistic error model 64 propagate to the output error measure in memory device 70. As described above, the operations of the logical instructions for processing the database 18 determine how error propagates to the query results. For example, for a select operation, errors that exist within the structured data set generally, if selected, propagate right through to the output error measure stored in 70. However, when the query requests data to be aggregated, either for counting, summing, or averaging, the propagation monitor 62 determines the type of probability statement, e.g., normal distribution, associated with the appropriate attributes in the error model 64 and accesses the statistical function library 68 to select a statistical function, i.e. a binomial sum of normal random variables, for generating the probability statements to achieve the proper probability statement for the error measure. In this way, the propagation monitor 62 acts as a functional processor for directly determining probability statements of error within the error measure signal stored in the memory devices 70a, 70b, and 70c.

In the alternative embodiment depicted in FIG. 6, the error model can also store possibility data. Possibility data is understood to be probabilistic data which is less certain than probability data, in that it merely indicates that error can exist within the data measurement. However, possibility data typically provides no measure as to the likelihood of that error. However, in some embodiments, it is useful for database administrator to determine whether or not the possibility of error propagates through into his query results.

The above description illustrates the systems and methods according to the invention that are suitable for determining an error measure signal representative of the error that occurs within a query result generated from processing a structured data set. The error models shown herein can be provided to the systems of the invention or can be generated for use with such systems. As described above, the error models can be generated by comparing a reference data set to an existing data set to determine an error measure, which in one embodiment can be represented as the corrections which are necessary to make to the structured data set to bring the structured data set into correspondence with the reference data set.

Additionally, the error models can include probability data which can be gathered either through known statistical processes for measuring error within a set of data, or by less deterministic, and empirical methods, wherein a database administrator who has substantial knowledge of what the accuracy of data within the database is interviewed to determine rough estimates or subjective statement about error within the data. Other techniques, including database integrity constraints, can be employed by the invention for measuring the error within database and for generating the error models suitable for use with the invention described herein.

The systems and methods of the invention can be employed for determining or stimulating the integrity of an existing database as well as for allowing a database administrator to compare multiple databases for purposes of selecting between the multiple databases. Additionally, systems of the invention can be employed for determining measures of error produced by application of an interpretation map to the query results of a database system. In this application, an interpretation map can be applied to the query results provided by a database system for purposes of translating the query results received from a first context to a second context. For example, an interpretation map can be provided to translate query results achieved from processing a database having pre-tax financial information into query results represented in post-tax dollars. As the interpretation from pre-tax to post-tax dollars can be inexact, and create errors within the query results, systems of the invention can be employed for modeling the generated error and for determining the error that gets propagated through to the post-tax query results. Other applications that employ these systems and methods of the invention described herein will be apparent to those of ordinary skill in the art of database systems and statistical analyses.

It will thus be seen that the invention provides systems and methods for measuring error within a structured data set and for measuring and modeling the propagation of that error through the structured data set to a query result.

Appendix H

Data Quality Management:
Foundations in Error Measurement and Propagation by

Henry B. Kon

B. S., Electrical Engineering,
Rutgers University 1982

M. S., Computer Science,
New York University 1989

Submitted to the Alfred P. Sloan School of Management in Partial Fulfillment of
the Requirements for the Degree of Doctor of Philosophy in Management
at the
Massachusetts Institute of Technology
June 1996

© 1996 Massachusetts Institute of Technology. All rights reserved.

Signature of Author: _____
Department of Management Science
May 13, 1996

Certified by: _____
Stuart E. Madnick
John Norris Maguire Professor of Information Technology and
Leaders for Manufacturing Professor of Management Science
Dissertation Committee Chair Accepted by: _____
Birger Wernerfelt
Chairman, Ph.D. Committee
Sloan School of Management Data Quality Management:
Foundations in Error Measurement and Propagation by Henry B. Kon Submitted to the Alfred P. Sloan School of Management on May 13, 1996 in Partial Fulfillment of the Requirements for the Degree of Doctor of Philosophy in Management

ABSTRACT

Bad data leads to bad decisions. Non-trivial error levels have been observed, however, in a variety of applications including inventory, financial, military personnel, and criminal justice. The growth of data sharing networks (e.g., the web) and increased computer processing of data (e.g., data mining) suggest the importance of data quality management. Error reduction, although desirable, is not always necessary or feasible. This thesis concerns the modeling, measurement, and propagation of error in information systems. What can we say when two data sources disagree, or when not sure to trust a given source? How do particular forms and degrees of input error impact a given analysis?

A closed set of three error types is defined: attribute value inaccuracy (and null values), object mismembership in a class, and class incompleteness. An error measure is a probability distribution over event spaces defined by these error types. Given a measure of error in query inputs, the error calculus computes and explains error in the context of individual query outputs.

As a theoretical foundation, this work suggests managing data error in practice by instituting measurement of persistent data and extending database output to include an error term - akin to the confidence interval of a statistical estimate. The formal mathematical model is complemented by field experiments in error knowledge acquisition (i.e., error measurement), by error representation and calculus implementation in software, and by simulation on university Alumni data.

Thesis Supervisor: Professor Stuart E. Madnick (Chair)
Title: John Norris Maguire Professor of Information Technology and Leaders for Manufacturing Professor of Management Science

ACKNOWLEDGMENTS

Many good people have enabled completion of this thesis. Only some are mentioned here. First, I would like to thank my advisor Professor Stuart E. Madnick. He is gracious and intelligent. His encouragement and faith were critical. He asks important and fundamental questions - his first challenge to me was to answer "What does the data mean?" This, and my work with Data Quality champion Professor Richard Y. Wang, led me to the question "Can I trust the data?" - the basis of this thesis.

Dr. Michael Siegel brought fresh perspectives to my work. He helped me shift my thinking from breadth-first to something more penetrating. Michael is the most "alive" person I've known. The inspiration for this thesis derives largely from Stuart and Michael's Context Interchange Architecture.

Professors John D.C. Little and Bin Zhou were instrumental. My understanding of the probabilistic and methodological aspects of the model was greatly enhanced by their questions and suggestions. Both were generous with their time.

I thank my wife Leah Baigell - the love of my life. She is to be congratulated for putting up with me for the last $n$ years. Leah has provided endless support, understanding, and sacrifice. Her stability has kept me on track many times. Thank you to my children Maxwell and Zachary who kept their sweet smiles and sense of humor when I lost mine. My family has been a constant reminder that there are other things besides Thesis. I wish that the time I spent on this thesis had been spent with them.

My brother Mark helped in developing basic elements of the mathematical model and in providing spiritual guidance. He once said to me "I guarantee that you'll graduate". Where else but from a big brother can one get such a guarantee? To my mother, father, sister, and all others I've omitted - thanks for the years of encouragement - now maybe I can go earn a living!

I also want to thank my fellow doctoral student Jacob Lee. Jacob was able to articulate various strategies and frustrations inherent in our PhD experience. His insights helped shape various aspects of this thesis. Mark Ackerman, Ajit Kambil, Chris Kemerer, Wanda Orlikowski, Paul Resnick, and many other upper-classmen and professors were kind enough to let me come in as a Freshman, invading their lives with questions I see only in retrospect as being a tweedly-dee bit silly.

TABLE OF CONTENTS

Chapter 1 Introduction and Overview ..........................................................8

1.1 Applicability of This Effort ..........................................................10

1.2 Examples: Error in Practice ..........................................................12

1.2.1 Example 1: Error logging at Socio-economic Data Co. ....................12
    1.2.2 Example 2: Error as discrepancies across sources ...........................14
    1.2.3 Example 3: Error as updates..............................................14
    1.2.4 Example 4: Error as multiple meanings...........................................15
    1.2.5 Example 5: Probabilistic error: untimeliness and lies...................16
    1.2.6 Example 6: Probabilistic error and the IRS audit............................17
    1.2.7 Example 7: Error knowledge and the data warehouse...................17

1.3 Examples of the Representation and Propagation Model ........................18

1.4 Goals, Benefits, Desiderata ..........................................................22

1.4.1 Goals ..........................................................22
    1.4.2 Benefits..........................................................22
    1.4.3 Desiderata: Success Criteria..........................................................23

1.5 Measurement and Cause of Error ..........................................................24

1.6 Overview of Technique ..........................................................26

1.7 Summary of Properties and Theorems ..........................................................27

1.8 Thesis organization..........................................................28

Chapter 2 Literature Review ..........................................................31

2.1 Logical and Possibilistic Approaches to Incomplete Data ........................36

2.1.1 Codd - nulls: 3-valued logic and maybe tuples..................................36
    2.1.2 Biskup - a model theoretic algebra over nulls..................................37
    2.1.3 Imielinski & Lipski - meaningful query over nulls........................38
    2.1.4 Imielinski..........................................................39
    2.1.5 Reiter - logical approach to query over nulls....................................39
    2.1.6 How our model relates to research on null values........................39
    2.1.7 Motro - qualifying (subsets of) query answers..................................40
    2.1.8 Grant - interval-based approach to query over nulls......................41
    2.1.9 DeMichiel - query over mismatched domains..................................42

2.1.10 Summary of logical/ possibilistic approaches ............................... 43

2.2 Probabilistic Approaches to Incomplete and Inaccurate Data ................. 43

2.2.1 Cavallo .............................................................................................. 44
    2.2.2 Barbara ............................................................................................. 44
    2.2.3 Wang, et.al. ...................................................................................... 45

2.3 Models of data error / truth ..................................................................... 47

2.3.1 Wong: object retrieval as statistical hypothesis testing ................. 48
    2.3.2 Statistics / numerical analysis Excerpts ........................................... 48

2.4 Distinguishing our work .......................................................................... 50

2.4.1 Attribute and Class level errors ....................................................... 50
    2.4.2 Uncertainty vs. Error ....................................................................... 51
    2.4.3 A lossless propagation model .......................................................... 52
    2.4.4 Methodology .................................................................................... 53

Chapter 3 Data Quality / Data Error: Foundations for Modeling ...................... 54

3.1 Philosophical Foundations ...................................................................... 54

3.2 An Abstract Error Model .......................................................................... 56

3.3 Syntax Error (ill-formed data) vs. Semantic Error (untruths) ................. 58

3.4 Data Collection Method and Data Sources ............................................. 60

3.5 A Process View of Data Quality ............................................................... 63

3.5.1 An Ideal Information System .......................................................... 64
    3.5.2 Measurement and Perceived Reality .............................................. 68
    3.5.3 Symbolic Language .......................................................................... 71
    3.5.4 Temporal behavior ........................................................................... 72
    3.5.5 Specification of Data ........................................................................ 73
    3.5.6 Data Production -> Data Quality .................................................... 73

3.6 Chapter Conclusion ................................................................................. 77

Chapter 4 Logical Error Representation ................................................................ 79

4.1 Some preliminary assumptions ............................................................... 79

4.2 Error representation formalism ............................................................... 81

4.3 Assumptions behind our model ............................................................... 85

4.4 Two primitive operations: Difference and Correction..............................87

4.4.1 The difference operator $\Theta$ : measuring data error..........................89

4.4.2 The correction operator $\oplus$: adjusting data to error..........................89

4.5 Properties: Representation Completeness and Minimality.....................91

Chapter 5 Logical Error Propagation Calculus........................................................93

5.1 Why not just correct the data?..................................................................93

5.2 Error preserving: a property definition & proof method........................96

5.3 The Selection ($\sigma$) Calculus......................................................................97

5.4 "Meaning propagation" in a relational database - a framework............101

5.5 The Cartesian Product ($\times$) Calculus.........................................................102

5.6 The Equi-join ($\eta$) Calculus........................................................................108

5.7 The Projection ($\pi$) Calculus......................................................................116

5.8 Summary of the model............................................................................127

Chapter 6 Two Probability Models of Error and its Propagation......................129

6.1 Induced Probability Model: Lifting of the Logical Model.........................131

6.2 Functional Probability Model of Error.......................................................139

6.3 Probability Models - Conclusion................................................................157

Chapter 7 Alumni Database: an Integrated Probability Model Example..........158

7.1 Alumni database: summary of errors.......................................................159

7.2 Probability representations of Alumni error types..................................163

7.3 Propagation of "functional" error..............................................................172

7.4 Functional error propagation calculus conclusion...................................190

Chapter 8 Error Measurement and Error Knowledge Acquisition....................191

8.1 Error in the University Alumni DB: an Interview...................................192

8.2 Error Knowledge Acquisition....................................................................197

8.3 Socio-economic Data Co. and Data Screening Co. ...................................... 199

8.4 Error Evidence and Measurement: a Framework .................................... 201

8.5 Chapter Conclusion ........................................................................ 204

Chapter 9 Logical Model Implementation / Probability Model Simulation . 206

9.1 Logical Model Implementation and Example ........................................... 207

9.2 Probability Model Simulation and Example ............................................ 218

9.2.1 Induced Model - iterations of the logical model .......................... 220
    9.2.2 Functional model - analytic expressions ..................................... 221

Chapter 10 Conclusion and Future Work ..................................................... 229

10.1 Summary of thesis ......................................................................... 229

10.2 Future work .................................................................................. 232

10.2.1 Methodology and Measurement ............................................... 232
    10.2.2 Fuzzy, Incomplete, Inaccurate Measures of Error ...................... 234
    10.2.3 End-user Utility and Data Quality Mediation ............................ 235
    10.2.4 Further issues ......................................................................... 236

10.3 Thesis Conclusion .......................................................................... 237

Appendix A (summary of mathematical notation) ........................................ 239

Appendix B (mathematical proofs) ............................................................. 240

References ................................................................................................ 259

Chapter 1
Introduction and Overview

*"The government amasses statistics, they add them, raise them to the nth power, and prepare wonderful diagrams. But you must never forget that every one of those figures comes in the first instance from the village watchman, who just puts down what he damn pleases."*     *J. Stamp, 1938 as quoted in* [23]

Bad data leads to bad decisions. Non-trivial error levels have been observed, however, in a variety of applications including accounts receivable, inventory, financial, military personnel, and criminal justice [30, 36, 46]. Increases in data warehousing, data distribution, data mining, and on-line data analysis suggests that error should be properly managed. Two situations in particular call for error assessment. The first concerns new users of data who least understand its imperfections, for they are subject to confusion and poor decision making due to error. The second concerns query environments (e.g., ad-hoc or complex analytics) where error in persistent data may be known, but where error propagation is complex - so that error in individual query outputs would not be known.

U.S. government agencies such as the Census Bureau, Internal Revenue Service, and Energy Information Agency use econometric methods for modeling under-count and other biases in survey results [1, 7, 31, 37]. As shown in Table 1.1 below, statisticians have developed formal and accepted models of error and its propagation, while no quantitative error model is defined for the database area. Contrasting their data and operations helps to explain why error is dissimilar for the two disciplines.

|  | Data | Operators | Error |
|---|---|---|---|
| Statistics | quantitative aggregate | regression ⇒ non-deterministic | variance models, confidence intervals ⇒ rich models of error and its propagation |
| Database | object relationships instance-level detail | logical, set-based ⇒ deterministic | "accuracy, completeness" ⇒ no accepted model of error or its propagation |

Table 1.1: Views of error across the statistics and database disciplines

A key difference between database and statistics view of error relates to the different data types and operations. A statistician may ask how measurement error in a set of attribute values affected a regression result, while this thesis concerns how error affects database query result. Regressions and database queries have a different semantics. A statistical regression results in a scalar value, whose error (uncertainty) is modeled via a variance term or confidence interval. Error in a scalar value can be represented by a probability distribution over the real numbers. In contrast, the probabilistic error representation of our error model will be a probability distribution over a difference between two database tables - one being true and the other being the given and possibly errored data set. A regression is a single operator whose error propagation behavior has been analyzed [11]. A propagation model for error propagation through database queries has not been well developed.

Two primary components to error management strategies are error *reduction* and error *measurement*. Error reduction involves improving data - either through clean-up of existing data, or through tighter controls on the data collection process so that future data will be cleaner. Error measurement, the focus here, involves assessment and documentation of error so that users can be aware of error in data they use - and so that administrators can better understand the impact of error.

Unfortunately, error reduction is often unfeasible or unnecessary. First, it presumes the control or resources necessary to improve the data. While not unlikely for locally administered data, it is inconsistent with norms for data sharing networks (e.g., the internet) where data are independently managed, of varying quality, and often unfamiliar. In general, not all data-generating organizations require, or have access to better or error-free data. Second, not all application contexts require error-free data. Error reduction is not cost-free and an optimal state in data processing will involve some degree of error.

We focus in this thesis on error measurement and propagation. Three primitive types of error will be accounted for: inaccuracy of an attribute value, incompleteness of a class, and mismembership in a class, as per the illustration in Chapter 4, Figure 4.1.

1.1 Applicability of This Effort

We define in this thesis a model and methodology by which <u>knowledge about data error</u> may become an available and shared resource - as a value-added addendum to data. Such functionality is increasingly important with the growth of data sharing networks in which the context of data collection is increasingly decoupled from data's context of use. Data sources have varying degrees and kinds of error, and data receivers have varying sensitivities to error - across time, over queries, and over individual decision contexts [60].

This objective is relevant where either:

- queries are new or complex, so that the impact of input on output error is unclear - thus the error propagation calculus, or where
- there exist users who are less aware than others (e.g., administrators) about error present in the data, thus the error representation - enabling communication of knowledge about data error.

Two factors help to explain why error measurement is a particularly important issue in data sharing environments. First, for "local data" (e.g., previously applied or locally generated), users already have personal familiarity with kinds and levels of error. When data are collected and used within a single organization, there is often a common purpose around the data - error levels will be acceptable for the intended application. Local users are also more likely to be familiar with error that does exist so their behaviors (e.g., decision making) will incorporate this - i.e., error will be accounted for. Data are tailored to particular application objectives.

This is useful also within a single application context, when data are eventually used for non-traditional purposes (e.g., as input to a new or complex query). It may be unobvious even to a local expert how a particular form of error propagates through a complex suite of queries with its aggregations and partitions. It is when applying new perspectives and through a naive view of the data that problems will arise.

Figure 1.1 below summarizes how the error representation and error propagation components of the research relate.

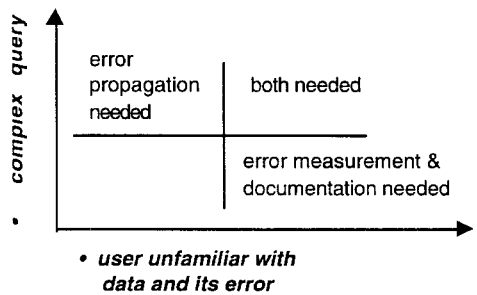

Figure 1.1 : Applicability of the representation and propagation models

On the vertical axis is level of complexity in the query. On the horizontal axis is the level of user familiarity with the persistent data and its error. In the lower left quadrant, the query is simple, e.g., the null query *select * from table*, and the user is familiar with error in the data. There is no need for error measurement or propagation here. In the upper left, the user is familiar with error in the data, but the query is sufficiently new or complex to make it unclear how input error is affects output error. While there may be no need for (additional) error measurement here, error propagation would be useful. In the lower right, the query is simple, but the user is unfamiliar with error in the first place. There is need only for documenting error here (e.g., via measurement), but error propagation is not an issue given the query simplicity. In the upper right, both measurement and propagation are needed.

1.2 Examples: Error in Practice

In the following seven sub-sections we provide examples and experiences which illustrate how error arises in practice and how several organizational deal with it. These should provide valuable intuitions about how we may want to conceptualize, formalize, and measure data error. Each of the scenarios is based on the data sets, database systems, and data vendors we have looked at during field work.

1.2.1 Example 1: error logging at Socio-economic Data Co.

In our research, we have worked with one of the world's largest socio-economic historical data providers. Over one hundred employees in this organization manage the production and quality of data collected from several hundred upstream sources. Screening incoming data for errors is a standard, though somewhat ad hoc, part of their procedures. Still, of several thousand text entries in a data quality log, most are due to error in data, such as "Taiwan GDP is wrong". The company sees management of data error as critical to continued success.

*What can be done if an error is suspected?* Sometimes a customer suggests a replacement datum based on a second data source or on other external "evidence" which may enable a datum's substitution. Where data are confirmed as incorrect, new data may be substituted. The problem is that such a substitution requires a judgment that the substitute data is somehow "better than" the original. Such judgments are often beyond the purview of a given data administrator, who may not be a domain expert and may need time to further investigate, or who may wish ultimately to keep and query over both data - the original data and the customer's suggested correction. In this regard, error corresponds to discrepancies among sources.

In this organization, textual entries in a customer service log are used to document experience with suspicious or incorrect data. These text entries, however, are informal (e.g., not mathematically processable) and are not quantitative (e.g., do not suggest a possible correction term). A representation of data error which is linked to the data dictionary and which propagates through query operations would be useful in this organization, so that the importance of error could be better known. This would allow an understanding - e.g., a quantitative mathematical model - of error to be accrued over time, by individual analysts, and without modifying source data.

Using our logical error representation - when an analyst encounters an error, he or she may record its occurrence without changing the original source data. Administrators and analysts could formally record information about error (e.g., updates or alternative interpretations of error and data) in an external "differential file" as per our error representation. Documentation of known errors may indicate patterns of error, and thus where other errors are likely to be.

This approach enables maintenance of multiple conflicting accounts of (or versions of data about) the same domain. In a network of data providers and value-added mediation services, different analysts could maintain their own data as qualifications of, or alternatives to, existing sources. Related services such as error correction, inter-database comparison, and data auditing are also suggested.

1.2.2 Example 2 : error as discrepancies across sources

Worldscope and Disclosure are two sources of overlapping (e.g., partially redundant) corporate financial data. As a means of increasing (or decreasing) trust in individual data, a Worldscope user might like to analyze discrepancies between the two sources - comparing multiple sources is a way of "triangulating in on" the truth, i.e., a way of building (or reducing) confidence in database answers. A differential file indicating discrepancies between two competing sources can be automatically populated (by a difference operator in Chapter 4 on the logical model) and maintained to document which errors exist in Worldscope, assuming Disclosure as a reference. The error propagation calculus would then compute error in the output - determining whether the input discrepancy makes a difference (e.g., results in how many errors) in the context of a given query output.

1.2.3 Example 3: Error as updates

Consider another application of such a differential file. Often, source databases are replicated in subscriber databases. For example, a real time database of manufacturing production runs may be uploaded monthly to refresh a decision support environment. This approach to propagating updates is inefficient whenever the uploaded database is large relative to the number of interim changes. And the time of upload may conflict with users of the data who are involved in transactions with the data, e.g., an analysis lasting several days such that the data should not change.

Upon receipt of a set of updates (e.g., discrepancies between old data and new), data warehouse administrators need not perform the updates immediately. Perhaps only after performing an off-line integrity analysis, and after existing long transactions are completed, would updates be incorporated. In the interim, warehouse users may optionally query the two data sources as if the updates had been applied to the persistent data. In some cases, administrators may sometimes wish not to change persistent data at all, effectively maintaining separate "versions" of data, e.g., the originally published data and the interim adjustments. Legal and accounting reasons may suggest not tampering with source data, and instead maintaining a record of differentials over time. In other cases, database media may be read-only (e.g., CD ROM), or users may not be authorized to change stored data.

1.2.4 Example 4: Error as multiple meanings

We must remind ourselves not to over-simplify the concept of data error. Even for a single data set, users may have different interpretations of error. For example, we recently purchased a CD ROM containing corporate financial information on a particular class of companies. We found "missing data": Net Sales figures were not listed for 25 out of 86 life insurance companies (and had been translated to the number zero by a commercial data load program). The data vendor explained on the phone that, for privately owned life insurance companies, this item may in fact be unavailable[1]. Given that this is the case, we might retract our assertion that these data are "missing", and instead factor in this unavailability as part of the data's definition.

An insurance industry analyst may have more specific and immediate objectives however. Such lack of data may necessarily be interpreted as an error, as the output from the following simple query would be incorrect: *select sum Net-sales from Table where Industry = Life Insurance*. Every company has a Net Sales figure, regardless of its availability to a particular data vendor. We see from this example that data error is relative to data meaning - a relationship we will formalize in Chapter 3.

Another example of this issue is as follows. We have worked with the administrators of the Alumni database in a large university. Sometimes, alumni call up the Alumni administrator and ask to have their "Year" changed so that mailings for alumni events will include the alumnus in a year other than the official year of (undergraduate) graduation. Unusual circumstances sometimes delay a student's graduation, but for social purposes the student wants to be associated with one class year though the graduation year is not that year. Neither is a better interpretation - it depends ultimately on the concept desired (the meaning) and thus the application of the data.

1.2.5 Example 5: Probabilistic error: untimeliness and lies

We often understand error not as corrections to particular facts (i.e., logically), but only as probabilities or sometimes only fuzzy intuitions. In practice, instance-level facts about error can often only be estimated with uncertainty. For example,

---

[1] She was not sure off-hand whether or not that was the case for the particular companies I was inquiring about.

we may be able to state probabilistically how often an individual changes address, but we can not state with certainty who has moved or where they have moved as a data set ages.

A DBA for the Alumni database we have worked with believes that several hundred records in his data incorrectly list the alumnus as Deceased. He suspects that this is due both to mis-keying of ID's in data entry, and to falsification by alumni (to prevent solicitations!). In this case, error can only be modeled as probabilities of error for various subsets of the population.

1.2.6 Example 6: Probabilistic error and the IRS audit

In July of 1995, the U.S. Internal Revenue Service (IRS) announced plans for a compliance audit, at a cost of $ 550 Million. The goal is not to catch individual tax cheats, but to understand how well individuals fill out their tax forms in general. Upon completion of this activity, there will exist both the original tax data in one hand and knowledge about its error in the other.

The IRS will have generated both corrections to individual tax returns (relating to the logical model), as well as statistical estimates of error in the large (relating to the probability model). The technology proposed herein will allow these two different sources and types of information to be integrated for propagation or adjustment of error at query time.

1.2.7 Example 7: Error knowledge and the data warehouse

We have worked with the person responsible for the design of a school-wide Data Warehouse for a major university. He states that the communication of organizational knowledge about data error is important - possibly critical - to his project. Data in his warehouse come from "anonymous" sources, so potential users know little about data reliability. He fears that users will run analyses without understanding data error. Then, as errors are discovered, the warehouse project overall may lose credibility in a possibly well publicized blunder.

These seven examples have shown how data error may be assessed and why knowledge about error might be maintained by an organization, over time, and to be propagated through queries. The value of data sharing networks will be greatly reduced without a means of rating and certifying data, or of otherwise communicating about error from those who know (e.g., data owners and administrators) to those who do not. The more general issue of maintaining multiple logical interpretations over a given schema is addressed. A key questions arises: *What representations are appropriate for data error?* End-users and data experts should like to know: which queries over which data deliver an answer that is sufficient for my application. This thesis will allow an understanding of error to be maintained by an organization - the associated knowledge to be stored and processed in software.

1.3 Examples of the Representation and Propagation Model

Now we consider some simple examples of our error representation and propagation calculus. The example domain we focused on throughout this thesis has been the Alumni database of a university, maintaining demographic information on graduates of the school.

Example 1.3.1 (error in tabular data): Table 1.2 below illustrates the multifaceted nature of data error. The table represents a particular class (i.e., type or category) of university alumni who live in the United States. It lists their Name, Home State, Degree, Major, Year of Graduation, and their five-year donation total. This is a sample view (e.g., not real names or amounts) of a 100,000-record university administration database we have worked with in our research.

| Alumni (Major U.S. active alumni) | | | | | | |
|---|---|---|---|---|---|---|
| Record # | Alum-name | Home state | Degree | Major | Year of grad | 5-year-donation |
| 1 | Mae Ray | RI | BS | Law | | 800,000 |
| 2 | Lisa Jordan | RI | MS | CS | 1982 | 500,000 |
| 3 | Tom Jones | ME | MS | | 1988 | 420,233 |
| 4 | Jon Wales | CT | BS | Eng'g | 1953 | 600,000 |
| 5 | Frank Ames | NY | PhD | Biology | 1986 | 820,000 |
| 6 | | VT | MS | Business | | 243,000 |

Table 1.2 : Example table with errors - Alumni relation

Our error representation will encompass three types of error, described for this table example below:

- *inaccurate attribute value:* (record #2): Lisa Jordan's donation amount is 400,000 not 500,000. Included in this category is the *null attribute value* (records #1&3): These are values which are unknown to the database (includes syntax error). Mae Ray's Year-of-grad is 1991. Tom Jones' major was CS.

- *class incompleteness*: A tuple for the alumnus John Junto is incomplete, i.e., missing. (Perhaps the "corrupted" record #6 was his.) He is an alumnus that satisfies this table's class definition, but is not listed here.

- *class mismembership:* (record #4&6): Jon Wales is a mismember - he is no longer active. Record #6 is a mismember as it represents a spurious object - null or corrupted keys are modeled as mismembers.

These forms of error are likely to be found in any database where data collection and processing can not be tightly controlled, or where error is not a major concern. Although there are four forms of error listed above, we will maintain only three error types. This is because inaccurate and null attribute values are treated identically by the mathematics. They are therefore collapsed into the single concept of inaccuracy. These will be formalized in Section 4 and comprise the operands of the error propagation calculus. While these three error types appear fundamental, we do not consider them final - future work may extend or refine this set. We consider the model extensible.

As an intuition into error propagation, consider the following two examples.

Example 1.3.2 (selection error propagation): The following query on Table 1.2 results in the Alumni-donation table below it.

*select Alum-name, 5-year-donation   from Alumni*
*where Degree = 'MS'*

| Alumni-donation | |
|---|---|
| Alum-name | 5-year-donation |
| Lisa Jordan | 500,000 |
| Tom Jones | 420,233 |
|  | 243,000 |

Three errors from the input are propagated to the output. First is the inaccurate figure 500,000. Second is the blank-key mismember. Third is the incomplete (missing) alumnus John Junto whose degree is also 'MS'. Though Tom Jones was selected, the null value for Tom Jones' Major goes away because Major was not in the projection list.

Had a different select condition been *where 5-year-donation > 450,000*, then Jon Wales would have been a result mismember (due to his mismembership in the source relation). Lisa Jordan, an inaccurate input tuple would become a mismember, because in fact her donations were less than 450,000.

◇

Both the predicate and the selection list play a role in defining the meaning of error propagation.

Example 1.3.3 (projection error propagation): The projection *Select Major From Alumni* (Table 1) results in the table below.

*Select Major   From Alumni*

| Major | (incomplete: Psych) |
|---|---|
| Law | |
| CS | |
| Eng'g | |
| Biology | |
| Business | (mismember: Business) |

This is the set of majors among active US alumni - the class of alumni represented by the input relation. Notice that there are no attributes (only keys) in Major. In Major, there is no concept of accuracy to speak of, only mismembership and incompleteness. This is because there are no attribute values. Business, which occurred as an attribute value of a mismember in Alumni, is a mismember in Major since it was not the correct Major for any active U.S. alumnus. Psychology, the major of incomplete alumnus John Junto, is incomplete. (It would not have been if it were the listed value, even incorrectly so, for any other tuple in Alumni). ◇

The operators we will consider are selection, cartesian product, join, projection, and count and sum aggregations. This covers the space of conjunctive queries, a powerful subset of the relational query model and SQL [2].

1.4 Goals, Benefits, Desiderata

1.4.1 Goals

The ultimate objective of this research is for database applications and data sharing networks to embody an error measurement and quality certification strategy. This requires an information systems infrastructure for documenting data error. The characterization of error we derive should be practical in that it is measurable across applications, yet rich enough to describe error for various *user error sensitivities* applied to the data. To this end, this thesis develops theory, technology, and methodology for representation, measurement, and propagation of error in structured data.

1.4.2 Benefits

The model contained herein entails three distinct application benefits:

- it allows data administrators (DBA's) to explicate, record, and disseminate their knowledge of data error - this is important to managing both product and process quality,

- it provides users (e.g., dynamically and automatically) with indicators of output data reliability - users can assess the appropriateness of individual data for each decision context, and

- it informs data administrators as to which quality improvements will yield the best return for users[1] - resources for data quality improvement [5] can then be more effectively applied.

---

[1] and for users - which input data (errors) are important relative to their particular application sensitivities.

Our approach has direct application to the common practice of data management due to its quantitative nature, lack of assumptions about error distributions, and applied focus. Our model appears implementable with little or no intrusion required on existing (e.g., legacy) applications and database systems. Existing data and query algorithms are in fact the starting point. Among other possibilities, this work suggests that error assessment may be institutionalized for persistent data, allowing error to be computed and documented by the calculus for each data set subsequently retrieved from the database, analogous to the confidence interval of a statistical estimate. Measuring error upstream and propagating errors down has good scale economies in that it amortizes the cost of error measurement over the various users and possibly ad hoc queries run.

Research contributions are discussed in Section 2.4 - where we distinguish ours from previous research.

1.4.3 Desiderata: Success Criteria

We see three main aspects to success of this thesis:

- Does the model teach us something new and fundamental regarding information systems and data management.

- Is there a practical application where these technologies can be put to use to tell data administrators, analysts, and users something of practical value.

- Does this work serve to integrate and clarify concepts found in various literatures: database (e.g., integrity constraints, semantics of nulls, probabilistic databases, uncertainty in databases), decision sciences (e.g., decision making under uncertainty), and economics (e.g., value of information).

The model should be as assumption-free as possible with regard to the levels, combinations, and forms of error describable by the model. The technology should apply in a wide variety of application domains. The system should facilitate expert as well as novice descriptions of error. The technology should ideally integrate with existing data repositories and data handling methods.

1.5 Measurement and Cause of Error

Measurement is an issue of methodology and methodology is ultimately domain-specific [17]. This thesis is not intended to develop a theory of error measurement. But because our model depends on probability distributions of error as input - a natural question is: *Where doe one get such distributions?*

Probability distributions of error may correspond to - e.g., result from - beliefs, statistics, theory, etc. concerning both direct and indirect evidence of error such as "degree of integrity constraint violation", "timeliness", "consistency", "source credibility", or "collection method reliability". Random sampling and truth-testing of data can incorporate well known statistical techniques for estimating probability distributions. In some cases, obtaining knowledge about error is not a difficult process, but merely a matter of "writing down" what is already known. A key then is to develop a language for error which does not over-commit the uncertain expert to quantities, yet which allows for such quantities when they are available.

Error may result from various failure mechanisms in data collection including distortions in modeling and measuring the world, bugs in data processing, mixed data types, unmaintained data, etc. Statisticians [7] and market researchers [25, 26] have techniques for estimating error in surveys. These include administrative record matching (comparing data to reference sources of related information) and post-enumeration surveys (more rigorous follow-up surveys on a portion of the population).

We will never ask whether or not an estimate of error is correct. This is a matter of method and consensus and is largely external to our model. As long as a data user knows the source and method by which a given error estimate was derived, she can make her own decision as to whether it is credible. The current method is focused on representing and communicating knowledge about error - and not on deriving error measures in the first place. We do discuss the beginnings of error measurement methodology in Chapter 8, however.

<u>What is Error?</u> Error, according to our model, is not simply a matter of "making mistakes" in data processing. As illustrated by the examples and discussion earlier in this chapter, we recognize error in any of the following, among others:
- updates to old data,
- fixes to known untruths in data,
- heterogeneous definitions,
- discrepancies among two "redundant" data sources, and
- differences between opinions, forecasting, or simulation models.

The salient aspect in each of these is that there are two or more possible yet conflicting accounts, i.e., logical interpretations (assertions as to the state) [9] of the "same" world (e.g., database schema) and in the same context [13]. Given logical interpretations $r$ and $d$ of the world, where $r$ is a *reference source* for a data set $d$, a complete description of error in $d$ constitutes the full set of corrections to $d$ as implied by $r$. We are modeling error in this sense as a "difference" between two known data sets. This is analogous to treating scalar error as a difference between two numbers [4]. The description of any errors may be stated deterministically (in our logical model) if it is known to that extent, or probabilistically (in our probability model) if not.

1.6 Overview of Technique

A formal *error representation* will encode statements about data error. These may be corrections to individual data items (the logical error representation) or probability distributions about error in aggregate (the probability error representation). An instance of an error representation is an *error measure*. Given an error measure on a query's input(s), an *error propagation calculus* (EPC) computes an error measure for the query's output. Calculus execution is induced by query operations. No change to underlying data or systems is required or assumed. This research defines a set of Data Quality functions, shown below in Figure 1.2, in the data warehouse setting as an example.

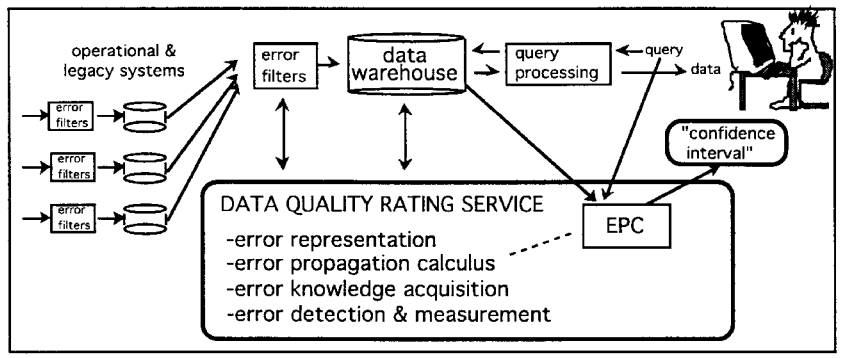

Figure 1.2 : A data quality subsystem in an on line analysis setting

Data is migrated from upstream systems and put into the data warehouse. Error measurement results in error measures populating the error representation. This error measure is then propagated through the error propagation calculus for each query submitted against the database.

In practice, previously obtained measures on persistent data[1] would be used to calculate an error measure for each data set retrieved from the database by query. A DBA or other agents would be responsible for producing input error measures prior to query submission (or in response to query execution where error measures are sufficiently automatic). The system would take as input an error measure on the persistent data. The technology has application to all data, whether in a stand-alone decision support database, a data warehouse, or shared in a multi-database network.

The concept of error propagation is illustrated below.

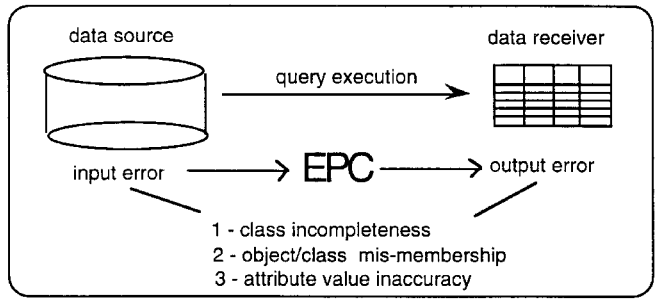

Figure 1.3: Error types and Error Propagation calculus (EPC)

The three error types we will consider are listed: attribute value inaccuracy (or nulls), incompleteness of a class, and mismembership in a class.

1.7 Summary of Properties and Theorems

The theorems in this thesis focus on proving various mathematical properties of the model. The properties considered are: *completeness* of a representation, *correctness* of a calculus expression, *closure* of the set of error types, and *minimality* of the set of error types. Completeness and correctness are proven

---

[1] "Atomic" data which are stored and maintained over time.

formally in proofs of theorems, while closure and minimality are argued as consequences of the others. As described above, a set of three *error types* is considered: attribute value *inaccuracy* (and nulls), class *incompleteness*, and class *mismembership*. This set being closed under query and calculus operations.

'Closed' means that a table, derived by query from a table with these errors, will itself have only this class of errors. The same types of errors (and meanings) will apply both to query inputs and outputs.

'Complete' means that all combinations and permutations of error types and distributions of error can be uniquely encoded in the error representation. An *error state*-space constitutes the finest grain, mutually exclusive, and collectively exhaustive set of possible error states of a database table. A mapping is defined from the set of all possible tables having error to the set of their error-free counterparts.

'Minimal' means that, if any of these error types were removed, then under the query operations considered, the system could not be complete and correct if only a (proper) subset of the error types were included in the model. The other error types would be induced by query operations even if one could fully characterize error in raw data.

'Correctness' asserts that error propagation calculus operators are correct - using a commutativity-based criteria developed in Chapter 5 (Figure 5.1).

Proofs of calculus correctness and a summary of notation are in Appendices A and B.

1.8 Thesis organization

The core of this thesis is in two models of error. Both include an error representation and an error propagation calculus. The *Logical Error Model* defines a semantics, while the *Probabilistic Error Model* provides a quantitative interpretation. The logical model represents and propagates error as corrections to individual facts, and is deterministic, e.g., a correction to a number is a number (a difference, a percentage deviation, etc.). The probability model, on the other hand, represents and propagates error as probabilistic *error distributions*, i.e., a correction to a number is a probability distribution of numbers. The probabilistic model subsumes the logical model, as logical statements about error are merely probabilistic statements with probability equal to one. The probability model consists of two variants:

- the induced probability model, resulting from the lifting of the logical model into the probability domain, and
- the functional probability model whose representation and calculus consists of closed form analytic formulae for error distributions and their propagation.

After reviewing the literature in Chapter 2, we discuss some foundational issues in Chapter 3. Chapter 4 concerns the logical error representation, and *correction* and *difference* operators (and their properties) are discussed. Chapter 5 contains the logical error propagation calculus for each of the operators we will consider. Examples are used to illustrate error propagation mechanisms. In Chapter 6 we present the probability model of error [35]. This chapter includes an integrated example of probabilistic error propagation, based on the results of the application example and error knowledge acquisition exercise of Chapters 7 and 8. In Chapter 9 we describe a software implementation of the logical error model and a simulation of the probability model. In Chapter 10, we conclude and consider future research directions. The overall thesis effort is broken out below - by topic, percentage of effort, and relevant chapters.

| Topic | Approximate percentage of effort | Chapters |
|---|---|---|
| Foundations / Philosophy | 15 % | 3 |
| Logical model | 40 % | 3, 4, 5, 9, Appendix B (proofs) |
| Probability model | 30 % | 6, 7, 9 |
| Field work / implementation<br><br>- error knowledge acquisition<br>- logical model implementation / probability model simulation | <br><br>5 %<br>10 % | <br><br>7,8<br>9 |

Chapter 2
Literature Review; Distinguishing Features of Our Model

Management of error in data is not a new research concept, e.g., consider research on integrity constraints, querying incomplete data, and probabilistic database. Error is also analyzed within particular application domains such as biases in accounting reports [30] and under-count in census data [7]. These approaches are focused not on error in general, however, but on particular forms of error detection and inferencing about error or uncertainty in particular model parameters. Madnick, Siegel, and Wang have identified attribute modeling of data and data quality management as important aspects of data management [40, 41, 42, 54, 56, 60, 64] These works concern both tagging of data with context characteristics (i.e., with indicators of the process history of the data) and the modeling of end-user semantic and data quality requirements. We summarize Wang's work further below.

In this chapter we review works which admit and query over multiple possible logical interpretations [9] of a table. This means that, over a given set of predicates, multiple sets of statements may possibly be true. This is a common feature of database works involving terminology such as "uncertainty, ambiguity, fuzzy, probabilistic, and possibilistic". We focus our review on the database literature concerning incomplete and uncertain information. It can be divided into possibilistic (e.g., multiple logical models) and probabilistic approaches (e.g., fuzzy likelihoods and probabilities), which are covered in the following two sub-sections respectively. The common thread throughout all of this research is that a given database can represent multiple feasible true states of the world - due to null values, inaccurate values, or other uncertainties. The common objective in all research we review is the development of uncertainty models and intelligent query algorithms given uncertainty.

Databases are historically designed for storing and processing deterministic data, i.e., facts about a "completely knowable" world such as a company with its departments, employees, and salaries. Truth and meaning are both unambiguous in this model of data processing. Accordingly, the model of computation underlying databases has been to assume that data contain *only* true facts and *all* true facts about the world, and that these truths are properly encoded into the database (i.e., having correct syntax as well as semantics).

A database with nulls may be interpreted as denoting multiple possible models of reality. If a query processing algorithm handles nulls properly, it will derive "all true facts and only true facts" - i.e., it will propagate multiple possible models in its query execution. Nulls are but one source of uncertainty. Inaccurate attribute values and missing records are other sources of uncertainty.

Consider the following database table,

| Social security # | Salary | Profession |
|---|---|---|
| John | 23,400 | Engineer |
| Judith | 25,300 | Designer |
| Janice | 26,333 | @ | where @ denotes a null value (e.g., "value applicable but at present unknown").

In a traditional database, the query "select Name where Profession = Engineer" will return only *Engineer(John)* as true, even though *Engineer(Janice)* may also be true. A semantics is assumed by the query processing algorithm which is that a statement which is not known to be true is false. Syntactically therefore, @ $\neq c$ for all constants $c$. This is of course untrue as the "real" value for a given @ must be equal to some c. Analogously, in join operations, it is assumed that @ $\neq$ @, which is also untrue in general. Call this concept of a database a *deterministic*

*database*. It is deterministic in the sense that one and only one *model* of the world is assumed to be representable by a relation so that nulls are in effect ignored.

This is the concept of query processing that is implemented in all commercial databases today, and is provably incorrect [29]. More correctly, a Null value should be admitted as "one of multiple" possible values. Under this interpretation, query processing in the presence of nulls requires analysis of a disjunction of possible worlds, one of which may in fact be true. If a query processing algorithm handles nulls properly, it will derive "all true facts and only true facts" - i.e., it will propagate multiple possible models in its query execution. Nulls are but one source of uncertainty.

Uncertainty has two common representations - possibilistic and probabilistic. Possibilistic representations involve (logical) disjunction over possible states of the world. In the example above it is known that Janice is POSSIBLY an engineer, but no concept was suggested as to the PROBABILITY of this fact. Various evidence may suggest it more or less likely that she is an engineer. This would be represented as a quantitative probability, and not merely as a possibility.

The terms 'accuracy' and 'completeness' frequently are referenced as aspects of data quality. Indeed, they would seem to encompass all possible types of error: data can be either present and incorrect (i.e., it may be "inaccurate"), or "the data" may not be present at all (i.e., it may be "incomplete"). While perhaps comprehensive, this interpretation of error is abstract, for example it does not distinguish between class-object and object-attribute forms of error as we will in our error representation. Furthermore, 'accuracy' has different connotations for categorical versus quantitative data. And 'incomplete' might be a characteristic of a database, table, column, record, or cell. A more detailed and integrated model of error seems desirable.

In a large number of works on data quality, researchers view a database as a collection (stream) of data records in which error is either present or is absent in any given record [3, 6, 46, 47, 49, 66]. In these works, error is defined as a binary measure, which applies at the record level of analysis. The error measure for a table, i.e. a collection of records, could then only be a percentage of tuples in error. Below is a list of example points which highlight shortcomings in this approach. These illustrate the sometimes unintuitive modeling of error in the literature.

The two tables below contain example data, based on a university alumni database application. Table 2.1 contains a listing of Alumni who do fundraising for a school, including their Name, State of residence, and Year of graduation. Table 2.2 contains Name and State in common with Table 2.1, and lists also the Population of the state.

| Fundraising-alumni | | |
|---|---|---|
| Name | State | Year |
| Pete Wilson | Mass. | 1969 |
| Jennie Wales | Rhode Island | 1990 |
| Frank Ames | New York | 1974 |

Table 2.1: Example data: university alumni

| Fundraising-alumni2 | | |
|---|---|---|
| Name | State | Population |
| Pete Wilson | Mass. | 5,998,000 |
| Jennie Wales | Rhode Island | 1,005,000 |
| Frank Ames | New York | 18,119,000 |

Table 2.2: Non-normalized table.

- (1) Misleading measures Suppose that Table 2.1 had two incorrect State values (column 2) and zero incorrect Years (column 3). With the record as the unit of error analysis, this table would be 33% correct since two out of three records have an error. Applications interested only in Year, however, would find these error measures misleading because all Year values are correct.

- (2) Meaning ambiguity A different notion of error may be defined for attribute-values (e.g., Population) than for object-identifiers (e.g., Name). We will, for example, define "accuracy" of an attribute value and "completeness" of a set of objects. Error characterization should relate to specific aspects of meaning. The State column above serves as both - an attribute value of another object and an object itself having its own attribute. So a description of error even in a single database "column" may have several facets.

- (3) Ambiguous incompletes It is not always clear what "incomplete" data is. The relationship between incompleteness and missing attribute values is not explicit. Incompleteness is ignored entirely in some cases because missing records do not "exist" to be incomplete.

- (4) No degrees of error There is no degree of error at the value-level. A numeric value (Population) should have degree of error rather than simply presence or absence of error.

- (5) Ambiguous Inconsistency Some researchers describe data 'inconsistency' as a form of error, without raising the issue of which (if not both) of two inconsistent data are actually in error.

- (6) No syntax error Untrue statements are not differentiated from syntactically invalid data - another important form of data error.

- (7) Not of a practical measurement orientation For much of the error-related research, the result is primarily a theoretical view of a particular form of error. A general proposal for error definition and measurement has not been found in our literature review.

While appropriate for the (sometimes purely mathematical) analyses developed, these various notions of data error are seen to be inadequate and semantically ambiguous.

2.1 Logical and Possibilistic Approaches to Incomplete Data

Various extended algebras and semantic analyses of null values in relational data models have been proposed. The goal is that queries over incomplete data will have meaningful truth-functional behavior (e.g., they will behave sensibly in the presence of nulls). An extended algebra is one which operates over an extended relational data structure, i.e., one which encodes meta-knowledge about the truth status of various facts in the database. An important construct in the origin of this line of research is the *maybe* tuple. These are tuples whose truth status is not known definitively (e.g., it should or should not be present in the relation). For example, that "Janice is an Engineer" in the table above would be a maybe tuple above since that statement is only a possibility. By summarizing these and related works, we can better understand and differentiate our own.

2.1.1 Codd - nulls: 3-valued logic and maybe tuples

Codd identified and anticipated null values as a research area in his early work [19]. He discusses ideas for extending relational algebras for querying over relations having nulls in [20]. Codd defined the *null substitution principle* - a value is a *null*, denoted as @, if 1) each occurrence of @ can be replaced by a constant to yield a *true* expression, and if 2) each occurrence of @ can be replaced by a different constant to yield a *false* expression. For his *undifferentiated* null, no constant within the domain is more likely than any other .

A three-valued logic and truth table (True, False, Unknown) are adopted for extracting data from relations containing nulls. Codd proposed both *true* and *maybe* versions of relational operators based on this logic. For example, where nulls occur in the join attribute, a *maybe theta-join* operator will generate those tuples which can not be excluded from an output relation - i.e., those that are not known to be false. While maybe tuples are generated from relational expressions over nulls, there is no proposal of how to subsequently query over tuples in a "maybe result". (Codd himself describes this work as preliminary.) Various criticisms have been levied against this work on semantic grounds. For example, nulls are treated as maybe for comparison purposes, but identical for purposes of duplicate elimination [12]. We will relate our work to those on querying over nulls after several such works have been discussed.

2.1.2 Biskup - a model theoretic algebra over nulls

Biskup [12] provides a foundation for logical and set theoretic treatment of extended algebras over null values. Again, nulls are substituted with values from the domain. Each tuple, regardless of whether it contains nulls, has a two-valued STATUS flag, indicating its truth status as either *definite* (i.e., definitely true) or *maybe*. Given a relation with nulls and maybe tuples, multiple possible models (e.g., states of the world) are identified as possibly true.

Biskup defines *internal tuples* and *internal relations* as possibly containing null values, while *model tuples* and *model relations* do not. An internal relation $R$ is said to *represent* a model relation $S$ iff (1) there exists a relation $M$ such that $Rd \subset M \subset R$ where $Rd$ is the set of definite tuples in $R$ and (2) for every tuple in $M$ there exists a set of substitutions such that the set of the tuple completions (tuples with constants substituted in for nulls) of $M$ equals $S$. This formalization defines a completeness and minimality condition by which an internal relation represents a model relation.

The *information content* of an internal relation $R$ is the set of all model relations which $R$ represents, e.g., the set of all possible worlds. Biskup defines a *redundant* tuple as one which does not change the information content of an internal relation. Biskup proposes relational algebra extensions analogous to Codd's, but uses representation, information content, and redundancy for proving completeness and correctness properties of the system, and is able to provide a closed and more comprehensive query system which Codd had not attempted.

2.1.3 Imielinski & Lipski - meaningful query over nulls

Imielinski & Lipski [29] define a mathematical model analogous to Biskup's in its possible-models approach to nulls. Rather than focus on defining an extended algebra, however, Imielinski defines precise conditions which any extension of the relational algebra over nulls should satisfy to be meaningful. Correctness conditions are identified that must be satisfied for various relational operations. These are a form of soundness and completeness, i.e., so that no incorrect conclusions can be drawn and that all valid conclusions are in fact derivable. (Conclusions of course are not limited to the traditional ground literals but include disjunctions.)

A table with nulls as described by Codd [20] is called a Codd-multitable. Imielinski evaluates the behavior of standard relational query evaluation algorithms over Codd multitables. It is shown that project-select queries over Codd multitables evaluate correctly. However, project-select-union expressions and project-join expressions in general do not. It is shown that, while performing relational operations over nulls in general introduces corruption of information, a subset of query operations may be available in which this corruption does not affect the information content of query answers.

2.1.4 Imielinski

Imielinski's offers *V tables* as a refinement of the existing null values models. In a V-table, it may be encoded that two different occurrences of a null are known to be equal. For example, it may not be known who is the teacher for the course on Monday and who for Wednesday, but it may be known that it is the same teacher. A surprising result of this analysis is that arbitrary conjunctive queries can be performed over such a representation scheme correctly. Oddly, project-select queries, which were correct for Codd multitables are not for V-tables.

2.1.5 Reiter - logical approach to query over nulls

Reiter removes himself from the immediate syntax and structure of the relational data model, and studies nulls in a purely logical and proof theoretic framework [53]. In a predicate logic formalism he specifies an extended algorithm for query evaluation which is sound and sometimes complete (i.e., complete in certain cases). It covers the relational algebra excluding difference. Reiter suggests that the main point of this paper may not be the query evaluation algorithm itself, but the use of a formal logical and proof theoretic approach to developing it. This model relies heavily on his proof theoretic formulation of the relational database[52].

2.1.6 How our model relates to research on null values

The model of error we will develop concerns a difference between a given relation and a true relation. We are modeling error as a set of discrepancies. Although, under the semantics of this null value research, a tuple (or table) is clearly discrepant from its corresponding true form -- <u>which</u> tuple (table) is true is not part of the model. The semantics assumed is that the corresponding true value of a null may be any value from the attribute's domain. So if a person's age is missing, then we may assume the person to be any age between say 0 and 120, assigning (in this particular line of research) no more likelihood / probability to one value than any other.

Given the occurrence of a null - this stream of research does not seek to assert any (subsets of the set of possible) logical models as more or less likely than any other. Thus, it fails as a basis for measuring error because when we measure error we begin to restrict the set of possible / probable models. Our model defines error with respect to both a true table and the given table. In addition, our model of error will go beyond attribute level concepts of error. Missing or mismember tuples will be incorporated and not only missing or inaccurate attribute values.

2.1.7 Motro - qualifying (subsets of) query answers

Motro[1] [47] defines new kinds of constraints called *completeness* and *validity* constraints. These specify those subsets of a database that are known to be complete and valid (e.g., resulting from hypothetical perfect supervision by a human). For example, the completeness constraint "all flights from Chicago to London" would guarantee that all such flights are represented in the database. The validity constraint "all non-stop flights" would indicate that tuples concerning non-stop flights are fully correct, i.e., that such tuples, when present, are also correct. A view on the database is shown to be complete and/or valid if it is also a view of these integrity constraints. For example, the view "non stop flights from Chicago to London" is guaranteed to be both complete and valid. The database is thus qualifying its answers by the scope of its knowledge as defined by the integrity

---

[1] We explain Motro's model in more detail as it is similar in spirit to ours.

constraints over source relations. A model for propagating these integrity constraints via meta-relations is offered.

For each query answer, the system determines (1) whether the answer is valid (the answer is ensured to be correct), or only *partially valid* (specified portions are ensured to be correct); and (2) whether the answer is complete (the information is ensured to include all corresponding real world occurrences) or only *partially complete* (specified portions are ensured to include all corresponding real world occurrences). The database is thus qualifying its answers by the scope of its knowledge, as defined by the integrity constraints over the source relations.

The concepts of validity and completeness in this model are coarse-grained, however and are not intended to support a quantitative measurement system. First, the premise that subsets of the database will be known to be fully complete and others fully valid is not realistic. This is not the way error comes to be in organizational databases. Second, and related to the first, his model implies a binary measure of integrity - either data are perfect or they are not. Practical error measures will require a quantitative scheme for characterizing degrees of error and not simply presence or lack of error. Lastly, completeness and validity are defined at the level of the tuple so there is no way of describing that one attribute in a tuple may be accurate while another is wrong.

2.1.8 Grant - interval-based approach to query over nulls

Grant [27] uses the notion of *partial values* to represent information that is partially known (for example, it may be known that a person's age is between 30 and 40). He proposes an extended algebra which data values are not atomic (e.g., nondecomposable) elements, but are subsets of the attribute domain. He restricts consideration to numeric intervals as represented by end points. In [80] Grant extends consideration to incomplete character strings. As in Codd, Grant extends relational algebra to have both true and maybe operations. Tables are modeled as sets of sets representing intervals. Because key domains are not distinguished, nulls are implicitly allowed in key domains as well.

2.1.9 DeMichiel - query over mismatched domains

DeMichael [22] develops an extended algebra for querying over databases having *domain mismatch* (i.e., domain heterogeneities). One database may describe a restaurant as having CHINESE food, while another indicates the specific region in China (CANTONESE, MANDARIN, SZECHWAN, HUNAN). The problems that arise in querying across such databases are similar to those involving null values. The approach taken by DeMichiel is also similar.

A *partial value*, stored as a virtual attribute, is a set of values of which exactly one must be correct. The partial value for CHINESE would be {CANTONESE, MANDARIN, SZECHWAN, HUNAN} - a "virtual" domain defined for the purposes of operations across relations. Partial values are not allowed to occur in key columns.

Source relations have only TRUE tuples, possibly containing partial values. Operations over such tuples yield both TRUE and MAYBE tuples. Operations over MAYBE tuples in turn can again YIELD both TRUE and MAYBE tuples. Using expressions similar to tuple relational calculus, the standard relational operations of union, projection, selection, and natural join are developed. The best query answers would have no partial values and no maybe qualifiers. Whereas Biskup maintains partial values at the domain level, partial values are maintained at the "cell" level in this model. DeMichael's operators are asserted to be *faithful* to the corresponding standard operators[1], where faithful is a possible models correctness criteria defined in Maier [43].

2.1.10 Summary of logical/ possibilistic approaches

The work we have considered thus far use predicate logic, three-valued logics, and possible models approaches to modeling null values. We are interested in the models above primarily for the following two reasons. First, they are concerned with the truth-functional behavior of query evaluation algorithms in the presence of imperfect data. Second, they each extend the relational model. We relate ourselves to these below.

2.2 Probabilistic Approaches to Incomplete and Inaccurate Data

Our primary criticism of MAYBE tuples and disjunctive models of uncertainty, is that they offer only a three valued or disjunctive truth model. For example, the statement "the value of t *may be* x" contains less information than the statement "the value of *t* is *x with probability* .3". Probability offers a more practical basis for quantitative measurement of error and uncertainty. Next we discuss key works adopting a probabilistic approach to database uncertainty. The main distinction of these works from ours is that these works assume that "raw data" are probabilistic. In other words these systems allow users to input and query over probability statements, but they do not offer a means for characterizing error in a deterministic database, i.e., one where a correct data set defines a single state of the world as true (and probabilistic concepts do not exist in that world).

---

[1] With some exceptions, for example the projection fails under elimination of the key.

2.2.1 Cavallo

Cavallo & Pittarelli [18] propose a model for representing probabilistic data in a database. A traditional relation is a mapping from tuples to {0, 1}, i.e., it is a characteristic function representing absolute truth or falsity of a tuple. A corresponding probabilistic database maps tuples into [0,1] - each tuple has a probability $0 \leq p \leq 1$ associated with it. An example relation would thus be the one below.

| A | B | C | p |
|---|---|---|---|
| 0 | 0 | 0 | 0.0 |
| 0 | 0 | 1 | 0.3 |
| 0 | 1 | 0 | 0.15 |
| 0 | 1 | 1 | 0.15 |
| 1 | 0 | 0 | 0.2 |
| 1 | 0 | 1 | 0.1 |
| 1 | 1 | 0 | 0.05 |
| 1 | 1 | 1 | 0.05 |

Projection and join operations are defined by the authors. The projection on AB and BC yields

| A | B | p |
|---|---|---|
| 0 | 0 | 0.3 |
| 0 | 1 | 0.3 |
| 1 | 0 | 0.3 |
| 1 | 1 | 0.1 |

| B | C | p |
|---|---|---|
| 0 | 0 | 0.2 |
| 0 | 1 | 0.4 |
| 1 | 0 | 0.2 |
| 1 | 1 | 0.2 |

The marginal probability distribution of the resulting attributes is computed as part of the projection result. A similarly intuitive join operation is defined.

2.2.2 Barbara

Barbara, et. al. [8] describe a model of probabilistic data in which attribute values correspond to discrete probability distributions. For example, students applying to a PhD program may be assigned a likelihood of selecting a major area among {Artificial Intelligence, Systems, Databases} as in the table below.

| Student | Major | p |
|---------|-------|----|
| Jones | AI | .3 |
| Jones | CS | .5 |
| Jones | * | .2 |

The * represents "unallocated" or missing probabilities, i.e., uncertainty about the probability distribution itself. If .2 of the probability is unassigned, then it is assumed to be distributed over all ranges in the domain, including those ranges already specified. The model encompasses several key concepts found in existing work on null values. In particular, an undifferentiated null can be thought of as a uniform probability distribution over the domain.

Probabilistic analogs to the relational operators of select, project, and join are defined, and their correctness is studied. Keys are deterministic in this model, however, meaning that "each tuple represents a known real entity". Non-key attributes are the only ones that may be stochastic. As a result, class-level error is not incorporated into the model.

In summary, the possibilistic literature considers extensions for query over nulls and disjunctions, the probabilistic literature considers query over probabilistic interpretations of data.

2.2.3 Wang, et.al.

Wang has developed a significant body of work relating to both technical and managerial aspects of data quality management [62]. In his work on source tagging [64], he describes an algorithmic technique for indicating which database relations served as both initial and intermediate sources of information in a database query. This analysis is extended with attribute-level tagging [61] and data quality requirements modeling [60] of values in the database. His work includes a philosophical analysis of data quality definition [63]. All of these are important motivation for our work, suggesting the importance of tagging data with its attributes and measuring data quality. None of these works, however, constructs a mathematical model of data error constituting an error measurement scheme.

Reddy and Wang [51] do build such a model. We summarize and compare ours here. The authors develop a data quality algebra for estimating the accuracy of a derived database relation. Their model is analogous to ours in that a probability model of error in data is propagated through queries. While the spirit is similar, the implementation is quite different, as we summarize below.

Accuracy is defined as a characteristic of a relation. The accuracy of a relation a single scalar number - indicating the probability that a random tuple in the database table is inaccurate. Inaccurate means either that one or more attributes is wrong or that the tuple is mismember. Error is not individuated across columns, however - e.g., one could not indicate that the Gender column tends to be accurate while the Income column tends to be inaccurate. Error is also not assessed as to degree - the concept of wrong would be binary - even for numbers. Error is assumed to be uniformly distributed both across tuples within the relation and across attributes within tuple. Although a model of error is offered, there is no model of truth to be derived from it. Knowing that a tuple is in error in this model does not begin to indicate its true value. Finally, incompleteness of data is not considered, so an empty relation is defined as fully accurate - e.g., as having perfect quality. With this relatively unrefined model of error - downstream accuracy is computed by the algebra. No proof method for the calculations is offered - only boundary conditions are analyzed.

Our model is similar in developing a formalism for error and propagating it.

We depart from this effort in several key regards:

- error can be individually specified for columns, tuples, and groups of tuples.

- minimal assumptions about error distributions.

- error within an attribute value is a probability distribution on a scale (as opposed to the binary zero-one "wrongness" concept).

- embodiment of an explicit model of truth - a quality measure constitutes a probabilistic adjustment to ("debias") the data.

- formal properties of both the logical and probabilistic models are analyzed and proven, including closure, minimality, and completeness of the representation and correctness of both logical and probabilistic calculus expressions.

- development and application of a complementary methodology for error measurement.

- experimentation with implementation of software and stochastic simulation.

2.3 Models of data error / truth

In none of the models discussed thus far is there an explicit model of error as a correction to derive truth. Assuming that error means some kind of a difference or discrepancy between a true relation and a false (errant) relation, none of the works identifies or models such a difference. Both uncertainty and nulls exist in these models with no basis for describing "more or less" error - which is of course necessary for a quantitative error measurement scheme - our eventual goal. The remainder of this literature review considers works having such a model of error. This reflects a fundamental difference in objectives - theirs to find truth, and ours to measure data error.

2.3.1 Wong: object retrieval as statistical hypothesis testing

Wong [68] considers the problem of retrieving from a database some set of objects when the retrieval (selection) criteria are over possibly inaccurate attribute values. He models this problem as one of statistical inference and establishes upper and lower bounds on the set of retrieved objects. This is an extension of Lipski's possibilistic interpretation [38] into the statistical domain. Using prior information about population parameters and data distortion patterns, he formulates retrieval as a hypothesis testing problem. Wong does not consider other query operations, and he does not model the propagation of error distributions in general, but focuses on reducing two particular forms of uncertainty. His focus is not on a more general semantic analysis of error, its measurement, and its propagation.

2.3.2 Statistics / numerical analysis Excerpts

Our work and statistics/numerical analysis share a concern with error and its propagation through mathematical operations. We briefly contrast our work with this work, and then summarize what these literatures may tell us about modeling error in databases.

There are two key differences between these efforts and ours. First, statistical data has a different semantics than database data (e.g., a focus on operators which derive numeric counts and population means is one manifestation of this). Databases store large collections of independent facts to be used for whatever analysis or record keeping. Statistics and numerical analysis have a particular model of error which does not explicitly acknowledge this. More fundamental than this, however - statistical and database operations are different - for example, regressions and correlations are not the same as database selections and joins.

Statistical models of error propagation do not consider predicates and domains as they are transformed through logical and set theoretic operations.

Biemer and Stokes [11] summarize the literature on the modeling of measurement error in questionnaires/surveys and its effects on statistical estimates. Two basic approaches are described.

In the first approach (the *sampling perspective*), error is described as resulting from two distinct stages of sampling. A survey response to one questionnaire item for an individual $p$ (a representative of a population $P$) is called a *response value* and is modeled as $y = \mu + \omega$ where $\mu$ is the true value and $\omega$ is the random error variable. The error value of a datum (e.g., its correction term) is a random variable from a hypothetical distribution of possible error values. Thus, error in total results from two stages of random sampling: the sampling of the individual from a population and the sampling of the error value given that individual.

This model is consistent with the modeling of measurement error in econometrics as discussed in [31]. Over or under-counts of various segments of the population are well understood to cause bias in aggregate statistics [7]. This "two-level sampling" model of error is consistent with my two-level semantic error structure: the class-level and attribute-levels.

The second approach describes the variance-covariance structure of the population as a whole. The goal is to understand the relationship among multiple responses and errors among a set of individuals, as a means of explaining inter-correlations and for detection of outliers.

Biemer distinguishes between Platonic and non-Platonic measurements or scores. A platonic score is one for which the concept of a true value is plausible such as physical measurements and personal demographics. Psychological states or attitudes are examples of scores that have no well-defined true value.

The literature on numerical analysis considers error in scalars and their impact on various computational and mathematical operators, e.g.,[4]. Sources of error are external, but may include limitations in modeling a physical reality, rounding error, and observation error. Error is modeled simply as the difference between true and approximate values. Atkinson discusses error propagation through summations, multiplications, floating point arithmetic in a computer, and through systems of linear equations and matrix manipulations.

2.4 Distinguishing our work

The works we have discussed provide important insights into the modeling of uncertainty and error in databases. We have focused on database research using disjunctive logic or probability for representation of uncertainty and error in data. We also summarized how econometric and numerical analysis models relate. The model developed in this thesis is distinguished in several important respects, summarized in the following three sub-sections.

2.4.1 Attribute and Class level errors

This is the first and only database error model to incorporate both attribute level error (inaccuracy) and class level error (incompleteness and mismembership) into a provably closed, complete, and correct mathematical framework for error propagation through database queries. Such a bi-level model is consistent with the modeling of error in questionnaires and surveys [11].

We treat a tuple not as a flat relationship among concepts (e.g., Person, Company, Salary) as in [22, 47] and others, but as denoting objects (Person) within classes (the set of employed people) and their attributes (Company, Salary). Without making this distinction and modeling both constructs simultaneously, basic aspects of error (and meaning) propagation can not be adhered to, particularly in modeling as aggregations. Our bi-level model (class-attribute) is consistent with the modeling of error in questionnaires and surveys [11].

2.4.2 Uncertainty vs. Error

An important feature of our model is the concept of an optimal (e.g., true) database table, with error defined as various forms of deviation from it. Uncertainty data models consider non-determinism but not error. Error and uncertainty can be seen as orthogonal in this regard. Let us distinguish among:

(1) "the complete truth" about error in data (which may be known deterministically and correctly only in certain cases), (2) uncertainty about error in data (e.g., error estimates), and (3) use of a database to represent uncertainty (e.g., possibilities or probability distributions over the set of possible states of the world).

As for this thesis, we are squarely concerned with 1 (the logical model) and 2 (the probability model). The database uncertainty literature tends to work in 3, with mention of 2. 1 and 2 are required for measures of error. 3 alone defines no measure of data error.

Whereas uncertainty models acknowledge non-determinism, they do not model error and therefore can not assign quantitative measures of error, i.e., as a "degree" of discrepancy between true and false worlds. Our focus is on logical and quantitative modeling of error, and not on extending the database to represent non-determinism. Error and uncertainty are orthogonal in this sense. We may have probabilities but no error, e.g., $P(coin\ toss = HEAD) = .5$ is a "true" statement. Or we may have error but no probabilities if we know error with certainty (e.g., Joe earns $40K not $30K as listed in the database). Uncertainty about error is typical, however, and this is the focus of our probabilistic error model. To the best of our knowledge, neither such model - the logical error model or the probabilistic error model - is closely approximated in any previous work.

2.4.3 A lossless propagation model

Within our model is a closed semantic framework specifying the "transformations" of data meaning and data truth through queries. Our model weaves the meaning of data and the "meaning of error" into a lossless and closed propagation calculus. Computation of error in outputs is concomitant to the transformation of meaning in this model, interleaving the two into a single formalism.

In particular, the calculus maintains a full account of meaning (classes, objects, attributes), error (class- and attribute-level), and their transformation and interaction for each query operation. For example, error is computed specifically for composite object identifiers (e.g., in the cartesian product output), and class level errors in keys (e.g., in a non-key-including projection) - error conversion tracks meaning conversion. Without this, basic aspects of error (and meaning) propagation, such as closure and correctness, can not be adhered to.

A useful aspect of our calculus is that it is strictly external to the data model it pertains to - our model "sits on top of" modern databases. It makes no assumptions or requirements about change to underlying data structures or database systems. Existing data and query algorithms are in fact the starting point. We are not seeking to extend the semantics of the underlying data structure or query algorithms as in [8, 18], or to make query processing algorithms more robust to the existence of error as in [68]. Whatever stupidities may result from a naive SQL operation on a corrupted data set - that remains constant - and we propagate error relative to this. This theory is intended to qualify data in real database systems and applications, making this an important aspect of the approach. Our approach therefore has foreseeable application to the common practice of data management.

2.4.4 Methodology

It is not our objective to define and validate a methodology for error measurement. Part of showing the viability of this model, however, involved error measurement in the field - through interviews with data administrators and various other pieces of information giving us clues as to error distributions. We have developed a conceptual framework for forms of error measurement in database environments. We have thus tied our formal mathematical constructs to the real world of data processing and surveys through a case example of error measurement (relevant chapters: 1, 6, 7, 8, and 9).

In summary then, previous research provides an excellent point of departure for our work. A numerical analysis definition of error as a scalar, combined with database research on uncertainty, defined for us a model of error in database data. Our model appears to integrate constructs and functionality described in previous models.

Chapter 3
Data Quality / Data Error: Foundations for Modeling

Concepts such as "integrity", "uncertainty", and "quality" have been used in a range of database and related research on information management. Other terms include: indefinite, maybe, disjunctive, partial, probabilistic, fuzzy, and possibilistic information. Some of these were discussed in Chapter 2. As a means of avoiding ambiguity, in this chapter we explicate our basic assumptions about data error and in so doing develop a process model of data quality. This involves *data collection*, *encoding*, and *interpretation*. This process model of quality provides basic insights - about process vs. product conceptualizations of error - which lead to the formal model of error representation and propagation described in Chapters 4 and 5. This chapter concerns philosophical foundations relating the concepts of data error, data meaning, and data collection (e.g., data source). (Additional modeling assumptions are discussed in Chapter 4 Section 4.1.2.)

3.1 Philosophical Foundations

Our work is informed by readings of Mario Bunge's Treatise, an integrated mathematical philosophy spanning seven volumes including [13, 14, 15, 16, 17] and spanning semantics, ontology, and epistemology. These have been a source of insight leading to some the assumptions and philosophical underpinnings of our model. The three relevant philosophical sub-disciplines are summarized below. Insights for our purpose of data error modeling are discussed below that.

- semantics: concerning symbols vis-a-vis their referents in a formal model of meaning and truth (relating syntactic structures - symbols, predicates, sentences, etc. - to a semantic system of meaning and truth)

- ontology: concerning the structure and basic nature of the world and our perception of it (e.g., defining notions of class, class hierarchies, things, attributes, aggregations, reference frame, etc.)

- epistemology: concerning measurement of the world, i.e., concerning methodology and the determination in practice of which statements in the world are true or false. (We will not adopt any of Bunge's concepts of approximate truth, although these may be useful in future work.) These concepts may also be folded into a model of error sensitivity and decision making around data acceptance.

Semantics provides a framework for conceptualizing the relationship between meaning and truth. (We will fix the user's context before defining data error, making data error relative). Ontology defines things (entities), their properties and attributes, their relationships, and their aggregation/classification (statements about which data may make in error). Epistemology involves assessment and representation of truth, falsity, and uncertainty (we must explicate our assumptions both about the initial measurement of the world which leads to data and the ex post measurement of error vis-a-vis the state of the world).

Key insights we adopt from Bunge[1] are as follows, with the implications for our model described after each.

- "Truth depends on meaning, but not conversely: one and the same statement may be applied now one truth value, now another, without any change in meaning" [14]. This statement suggests that we should fix a notion of meaning or context, before we attempt to characterize error. Differences in (desired and actual) meaning result in error.

---

[1] not necessarily originating with Bunge, but summarized by Bunge

- "The truth of a statement can only be determined relative to a truth testing procedure". [14] This suggests that error measurement is something we can only think about given a truth testing procedure, design of which is not within our research scope.

- "We assign truth conditions to propositions rather than to their linguistic expression" [13]. This suggests that we should separate the concept of data error as a syntactic issue (unreadable data) from data error as a semantic issue (untrue statements the data signify).

- "The meaning of a sentence is in a sense identical with the way we determine its truth and falsehood" [13]. This *operationist* philosophical stance[1] will help us to relate the meaning of a statement to the method or process by which that statement was arrived at. This has particular implications when data comes from multiple sources. Each source constitutes a separate means (e.g., reference frame) for deriving the data. Taking this line of thinking to its logical conclusion - <u>no two sources can ever provide information of the same meaning</u>. The implications for definition of meaning and truth will be considered in Section 3.4 below.

3.2 An Abstract Error Model

We conceptualize data error in a way which is analogous to the following intuitive concept of error in numerical analysis [4]:

$$\text{error value} = \text{true value} - \text{approximate value}$$

where the *error value* and the addition (e.g., correction) operation provide a mapping between the *approximate value* and the *true value*. Where numerical

---

[1] which Bunge describes but does not adopt altogether.

analysis defines error as a scalar, we will define error as relating to a database table rather than to a number. We define a table's error relative to a true state of the world (vis-a-vis that table's column names and domains). This is shown in Figure 3.1 below.

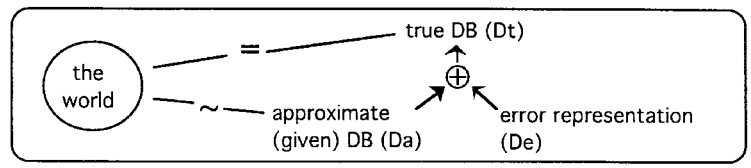

Figure 3.1: Data error: Dt = Da ⊕ De

Let true data ($D_t$) be that unique, error-free, and possibly unknown data instance that correctly represents the true state of the world. The data in the database ($D_a$) is an approximation of that true world. Data error ($D_e$) documents the "difference" or discrepancies between $D_a$ and $D_t$. Analogous to numerical analysis, we define an error representation $D_e$ and a *correction* operator ⊕ that will map from <$D_a, D_e$> to $D_t$. Figure 3.2 below illustrates these concepts in greater detail and includes the concept of a relation difference ⊖, so that $D_e = D_t \ominus D_a$ and $D_t = D_a \oplus D_e$. Heretofore, we will use the word World (W) rather than the word Truth ($D_t$) as in Figure 3.1.

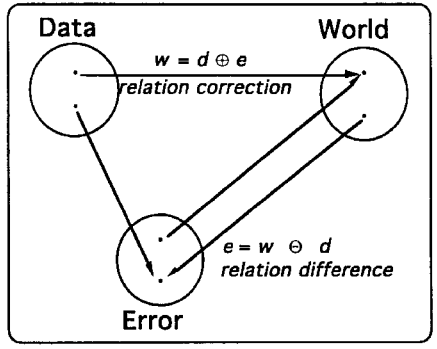

Figure 3.2: Data-World-Error triangle: difference and correction operations

The abstract specification of error described above is consistent with the numerical analysis notion of error: an error term is a difference between the (true) world and data, and the error term constitutes a correction mapping from the data back to the real world. The abstract model of error will be given a more concrete form (i.e., consisting of inaccuracy, incompleteness, and mismembership) in the next Chapter on the logical error model. We do not include it here as, fundamentally, someone may suggest yet another set of error types which also fit into this more abstract specification. For example, Motro's completeness and validity [47] might be cast under this model as well. In the remains of this chapter, we present the process model of data which leads to an explication of ideas relating data error and data quality.

3.3 Syntax Error (ill-formed data) vs. Semantic Error (untruths)

Consistent with Bunge, we treat data as symbols which are interpreted to derive statements. We distinguish data from statements in that only data have syntax, while only statements concern a semantic concept of truth. Syntax concerns the physical form of the symbols that are data. Semantics concerns the statements implied by the data given an interpretation map from data to statements. Two corresponding forms of error are illustrated below.

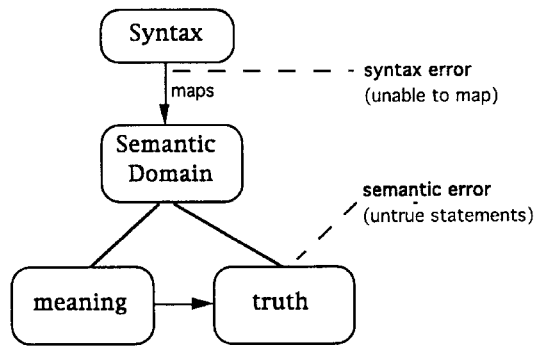

Figure 3.3   Semantic error: true and untrue statements

A syntax specification defines what are correct representations for data symbols given an interpretation map. Data having syntax error can not be read, for example, '[July IV, @#$]'. Such data are therefore not mappable to a statement and have no relevance to the semantic concept of truth. We are concerned with syntax at the data cell level, i.e., strings, sub-strings, and letters within a cell. Forms of syntax error include invalid string length, missing delimiters, and invalid characters. There may of course be multiple valid syntax for a given data type.

Consistent with Bunge's semantics, we assert that truth in data is relative to data meaning (e.g., the database schema). Consider testing semantic error, i.e., truth in a symbol, say "JUL-69". Such testing would require one to know about the data meaning, i.e., the syntax by which this string is converted to a construct: (1) does the symbol represent a thing or an attribute value, (2) if it is an attribute value - for what attribute, and what thing is being referred to, (3) what units and scale are used, and (4) how are we to parse the syntax. Only given meaning of data can one assess its truth.

Because syntax may be trivially detected or be convertible across systems - consistency within any syntax scheme may be more important than conformity to any particular one. Our model will focus on semantic error, considering the effect of syntax error only as it impacts truth and falsity of statements.

3.4 Data Collection Method and Data Sources

In some cases, the "same data" can be generated independently by two different *collection methods*, e.g., two ways to measure 'lifetime-contribution' of an alumnus. The two resulting values may not agree. Then, two data values having the same apparent meaning ("lifetime-contribution" of X), would be both correct and conflicting - a seeming paradox. To avoid this, we recognize that assumptions about how we collect (e.g., generate, replicate, measure, calculate, judge) a datum are actually embedded in the concept of that datum. This follows from the philosophical stance called operationism discussed earlier in Section 3.1.

On this basis, we adopt the operationist stance and extend the concept of the attribute's meaning from 'lifetime-contribution' to 'lifetime-contribution as obtained by collection method Y'. To the meaning of a datum we append its collection method. This represents an extension from the traditional schematic view of data meaning (e.g., entity-attribute-relationship) to include the procedure used to obtain the data in the first place. As a result, these "conflicting yet correct" statements will not actually conflict.[1] We define data collection to include raw empirical observation, as well as subsequent propagation and processing by human

---

[1] It is also consistent with the nominalist stance in which intrinsic properties of things can not be known, e.g., the true speed of a comet, but only construed via perceptual or scientific means.

or computer. The various collection methods constituting a datum's derivation are important as indicators or evidence of its goodness or trustworthiness.

Sometimes a single data collection method is not self-consistent, i.e., results vary each time the method is applied. This is true of census methodologies for population count. Given constant population, two executions of the same census methodology will likely result in two unequal population values. Are either or both of the data therefore incorrect? Under one philosophical interpretation, such data are inaccurate since they are only estimates [14]. However, most people would not want to characterize all population data as being in error on this basis. Generally, a population figure is considered accurate if either: (1) it is consistent with a published data collection result (e.g., the 1990 U.S. Census Bureau report) or (2) it results from data collection performed in conformance with a specification for that collection method.

As an example of these concepts, we have been working with a commercial data service that provides socio-economic data. As depicted in Figure 3.4 below, a government source (A) performs a census method, the result of which is passed to the data service (B) who, in turn, sells the data to the end consumer (C). A data supply chain is formed by the data flow from A to B to C. Each link in the data supply chain is a instance of data collection. A's collection method is a census methodology. B's collection method consists of copying and distributing data collected from A, etc.

Though concerned about error levels, B does not scrutinize (e.g., verify) government data because there are no means for doing so. Data are taken largely "at face value" - B seeing itself as a pass-through service and claiming its output to be error-free as long as it is consistent with inputs provided by A (i.e., as long as B performs its collection method correctly, independent of whether the data reflects the true population count). C, however, may not be satisfied with the output of A as the final reference point for truth, changing the interpretation of truth in B output. C may wish to look further up the supply chain - to question A's data and see if it does, in fact, reflect the true population.

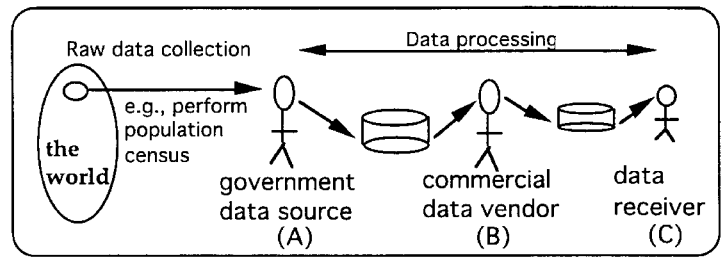

Figure 3.4: Data collection and data processing

We define a derived datum's collection method as the concatenation of the data collection methods along its supply chain. This provides an explicit frame of reference from which to assert the occurrence of an error. As data propagates through a data supply chain, "error guarantees" may be nullified, passed through, or introduced by data handling agents. A data service may wish to guarantee clean copies of the data - cleaning up, verifying, and guaranteeing data - or "take it as it is" may be its policy.

In answering "what is an error?", we have firstly concluded that data error depends on data meaning. We distinguished syntax from semantics for error modeling purposes. Second, we have extended the concept of meaning to include the collection method. Links in the data supply chain are instances of data collection, together constituting the data production history of a datum.

3.5 A Process View of Data Quality

We posit that the term data quality, though used in a variety of research and practitioner contexts, has been inadequately conceptualized and defined. In this extended section, we develop a process oriented view of data production and data quality. It leads us to several interesting insights about data quality, including the relationship of data quality to issues of interpretability, i.e., concerning the fit of a user's interpretation map (decoding of symbol to constructs) [13] with the "true" data meaning, as well as to issues of timeliness of data and time as a reference frame concept. Both of these - interpretability and timeliness - will be subsumed by error as indicators of error in subsequent chapters, and as in [61]. An old data value from an untrustworthy source may in fact be correct.

In the past, researchers have tended to take a product-oriented view of data quality. Though important, this view is insufficient for three reasons. First, data quality defects in general, are difficult to detect by simple inspection of the data product. Second, definitions of data quality dimensions and defects, while useful intuitively, tend to be ambiguous and interdependent. Third, in line with a cornerstone of TQM philosophy, emphasis should be placed on process management to improve product quality.

The objective of this section is to characterize the concept of data quality from a process perspective. A formal process model of an information system (IS) is developed which offers precise process constructs for characterizing data quality. With these constructs, we rigorously define the key dimensions of data quality. The analysis also provides a framework for examining the causes of data quality problems. Finally, facilitated by the exactness of the model, an analysis is presented of the interdependencies among the various data quality dimensions.

This section develops a theoretically grounded process model of an information system and conceptualization of data quality. More specifically, the objectives are: (1) to develop a set of formal process constructs which constitute a model of an IS as a data delivery vehicle, (2) the identification and analysis of orthogonal components of process non-conformance, and (3) the use of these constructs as a means of defining "dimensions" of data quality.

3.5.1 An Ideal Information System

Wand and Weber postulated generally that "information systems are built to provide information that otherwise would have required the effort of observing or predicting some reality with which we are concerned. From this point of view, an information system is a representation of some perceived reality. It is a human-created representation of a real world system as perceived by someone." [59].

We adopt this postulate by stating the following premise.

Premise 1: An IS is a means of providing a mapping from aspects of the world into a symbolic representation of those aspects via some human perception.

We posit that <u>data product defects are due to data production process defects</u>. As per the quality literature in general, we operationalize quality as conformance to user requirements. We thus operationalize data quality as conformance of the data production process to user requirements. In this respect, data quality is a binary condition [48]. We do not aim here to characterize <u>levels</u> of data quality. Either the process conforms (has quality) or does not conform (does not have quality) with respect to user requirements. This leads to the next premise:

Premise 2: Data quality is conformance of the data production process to a <u>single</u> user requirement.

Figure 3.5 below illustrates our model. We see from the figure that a *data originator* observes the world on behalf of a *data user*. This observation (perception) is the *measurement* of the world of interest (Arrow A), and results in a *perceived reality* as construed by the originator. Next, this perception is *encoded* (data entry) into the IS via some data input device (Arrow B). We assume

Premise 3: The originator records states of the world as opposed to changes in states.

For example, the originator would record inventory levels as opposed to changes in inventory. This encoding results in the symbolic representation of the originator's perception as data. Lastly, the user *decodes* (interprets) the symbols (Arrow C).

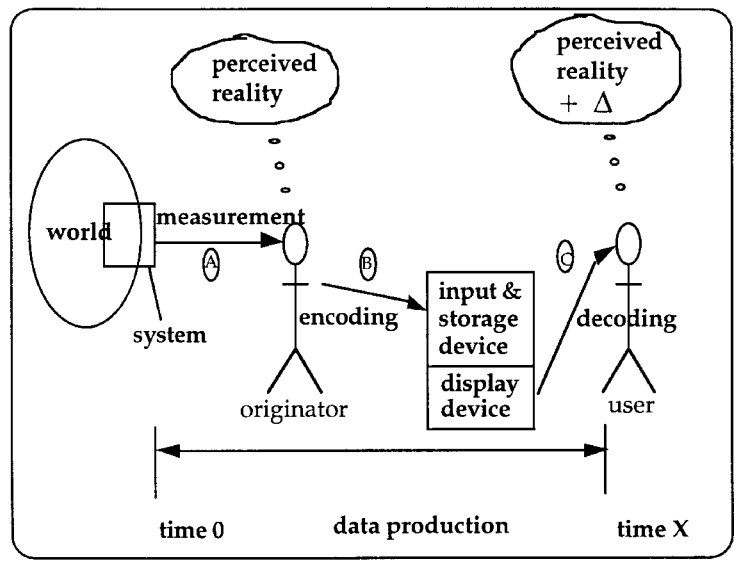

Figure 3.5: A Process model of an information system

We proceed to formalize our notion of an ideal IS by first stating some ontological principles. The world is made up of *things*. The characteristics of things of the world are construed via *attributes* which are defined and ascribed to the things by the observer. We measure the attributes of things with respect to *reference frames*. A reference frame may include elements such as the time of measurement and the condition of the observer, e.g., the observer's velocity when measuring the speed of another object. The reference frame, in general, would provide information about any variable factors believed to affect the outcome value of the measurement.

We are interested in a set of r things in the world $\{x_i \mid i = 1,...,r\}$. For each thing $x_i$ we are interested in a set of q attributes $\{a_k \mid k=1,2,...,q\}$. For each attribute there may be one or more reference frames from which to measure it. The reference frames chosen up to time t1 is a set $\{m_j \mid j=1,2,...,n\}$.

Each triple $$\omega_{ijk}=<x_i, m_j, a_k>$$

is an aspect of the world that is of interest and has an associated value $v_{ijk}$. This value is obtained via some form of measurement. Knowledge of $v_{ijk}$ and its associated triple $<x_i, m_j, a_k>$ constitutes a unit component of the data originator's perceived reality. A more formal discussion of the concept of perceived reality is given in Section 3.1.

For a thing $x_i$ and reference frame $m_j$, let $$A_{ij}=\{<x_i, m_j, a_k> \mid k=1,2...q\}$$

and $$H_i = \bigcup_{j=1}^{n} A_{ij}$$

where Hi is the *history* of the thing $x_i$ over all the reference frames of interest. Then $$R = \bigcup_{i=1}^{r} H_i$$

is the set of triples that are of interest as of time $t_1$. Then R is the set of aspects of the world of interest with reference frames up to time $t_1$ The knowledge of R, as perceived by the data originator, is then encoded into a symbolic form. This may be a relational table for example. In this case, each cell corresponds to a triple $\omega_{ijk}$ and each data element within the cell represents a value $v_{ijk}$. Each cell and its data element constitutes an *atomic well-formed formula* (wff). These wff's are then interpreted by the end-user via a decoding function (Arrow C). The encoding function, decoding function and wff's form part of a *symbolic language* which will be formally presented in the next section.

The data production process can therefore be represented by the binary relation g from the set R to the set D, where D is the set of atomic wff's delivered as output to a data consumer as of time $t_2$, where $t_2 \geq t_1$. Recall that we are interested in reference frames up to $t_1$.

Specifically, g expresses the actual production process - how aspects of the world are mapped to wff. The temporal aspects of the production process are inherent in the specification of R and D, as they are defined for specific times $t_1$ and $t_2$.

Definition: Data quality is defined as the conformance of g to user requirements.

We refer to g as $g_p$ when g conforms to user requirements. Each triple in R must be uniquely represented as data in D. This leads to the proposition:

Proposition: For quality data, $g_p$ must be a bijective function (one-to-one and onto) that maps aspects of things to the appropriate wff's for the user's symbolic language.

Formally, $$g_p: R \rightarrow D$$

The precise form of $g_p$ must be determined by user requirements because various symbolic representations (e.g. relational or hierarchical) may satisfy the above requirement.

In the last section we represented the production of data as the relation g, a high level abstraction. In this section we delve into greater engineering detail - specifying the production process in terms of its specific steps.

Our treatment of an IS is similar in methodology and spirit to Wand and Weber in the sense that it is an IS modeling formalism based on Bunge. However, where Wand and Weber focus on the design and analysis of systems, we focus on <u>data production itself</u>, including measurement, encoding, and decoding of data between the data originator and the data user.

In the following sub-sections we decompose the production process g.

3.5.2 Measurement and Perceived Reality

Each triple $\omega_{ijk} \in R$ is assigned a value $v_{ijk} \in V$ the data originator via a function:

$$\chi: R \rightarrow V$$

This is analogous to the *state function* proposed by Bunge [15]. However, Bunge's state function iterates over a domain which is a set of reference frames for an attribute of a particular thing. The function $\chi$ on the other hand, iterates over R, which is preferable for the current presentation.

The data originator's knowledge of $\omega_{ijk}$ consists not only of the value $v_{ijk}$ but also the associated attribute $a_k$ of the thing $x_i$ as perceived via a reference frame $m_j$. More appropriately, we define the *measurement* function (Arrow A in Figure 3.5) as:

$$F: R \rightarrow S$$

where S is a set of *atomic statements* which represents the originator's knowledge of R. For example, we may be interested in the attribute "temperature" in the city of "Rome" which is the particular thing of interest. The temperature in Rome is to be measured by an alcohol thermometer daily. Thus, the date becomes the reference frame and the mode of measurement, the thermometer, is represented by the function F. Let the value of the temperature on a particular day t be 28°F. Then $$F \text{ (Rome, t, temperature)} = s$$

where s is the atomic statement "The temperature in Rome on day t as measured by an alcohol thermometer is 28°F".

We note also that different measurement procedures are appropriate for different attributes. The particular form of the measurement represented by F depends on the particular attribute in the argument of F. In the temperature example, F represents measurement via a thermometer. If "weight" were the attribute of interest, then a F would represent a weighing machine.

At this point, the difference between an attribute and a reference frame needs to be highlighted. What is included as part of attribute and what is included in a reference frame? This distinction depends on what is fixed and what is variable across instances of measurement. If, for example, we are interested the "temperature at 8:00am on Valentine's Day 1993" at various locations within Italy. Then the attribute is "temperature at 8:00am on Valentine's Day 1993" with M corresponding to the set of various locations.

If on the other hand, we may be interested in the "temperature in Rome" at various times, then "temperature in Rome" corresponds to the attribute while M corresponds to the set of various times. In the first case, the date and time are fixed for the domain of interest (and therefore incorporated as part of the attribute definition) while locations vary (and therefore incorporated as reference frames). In the second, the location is fixed while the times of measurement vary. Note that S is the set of statements that forms the originator's knowledge or perceived reality.

We provide below a more detailed example to be used for the remainder of this section.

Example:

We use a frozen-foods company's inventory system as the domain of interest. The things of interest will be n cold-storage warehouses $x_i$, $1 \le i \le n$, owned by this company. A given warehouse will have 3 attributes of interest: "Warehouse id", "number of frozen dinners at beginning of day" as measured by procedure $p_1$ and "temperature at beginning of day" as measured by procedure $p_2$ which we call ID ($a_1$), QTY ($a_2$) and TEMP ($a_3$) respectively. QTY is equal to the number of dinners physically on the shelves. The reference frame is the date t on which the measurements are taken. The values $v_1$ (3-digit string), $v_2$ (in units of one) and $v_3$ (in °F) correspond to ID, QTY and TEMP respectively for day t. The corresponding statements are given by $$F(x_i, a_1, t) = s_1$$
$$F(x_i, a_2, t) = s_2$$
$$F(x_i, a_3, t) = s_3$$

where $s_1=$ "the ID of warehouse i is $v_1$ at the beginning of the day t"

$s_2=$ "the QTY of frozen dinners in warehouse i at the beginning of day t as measured by procedure $p_1$ is $v_2$" and $s_3=$ "TEMP in warehouse i at the beginning of day t as measured by procedure $p_2$ is $v_3$"

In summary, thus far we have defined things with their attributes and reference frames which are instantiated via measurement into atomic statements. In the next section we develop a formalism for the encoding of statements into data, and the interpretation of the data by the user.

3.5.3 Symbolic Language

The knowledge of the data originator is encoded as wffs of a *symbolic language* defined by Bunge [13]. We introduce the *encoding function* E which is a component of a symbolic language. E represents the mapping used by the originator to map statements in S to corresponding wffs in D.

$$E: S \rightarrow D$$

The *decoding* function $E^{-1}$ (Arrow C in Figure 3.5) is used by the user to interpret wff back to the statements they signify.

We note that an atomic wff not only contains data that represents the value $v_{ijk}$, but also additional information about the reference frame and attribute definitions, as well as how they were attained. In modern databases, this extra information (e.g., besides the data elements and their column names) is referred to as *metadata* [45]. Metadata may include both information regarding the intrinsic meaning of the data [21, 57], as well as indicators of the quality of the data value as an electronic artifact [60, 64]. Often, when the term "data quality" is used, it is not clear whether it refers to the quality of data elements alone, or whether it refers to the contents and quality of this additional information as well. Each of these may have some type of quality associated with them. Thus the possible need for qualification of metadata as well. This recursiveness is a universal problem in metadata modeling [57, 60]. We assume only one level of metadata.

We can now more completely characterize g as a composite function. It consists of the measurement function F and the encoding function E. This is reflected in Figure 3.6 below.

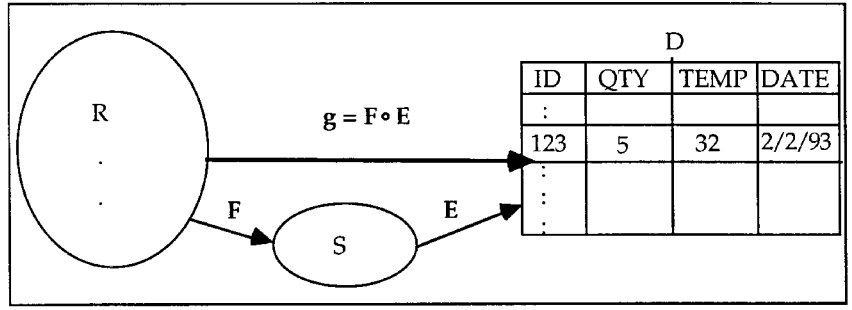

Figure 3.6: Formalized data production process

3.5.4 Temporal behavior

The data production process consists of three relevant events with respect to time. First, a measurement is done at time $t_d$ [1]. The data may then be entered into the IS at time $t_e > t_d$. At time $t_f > t_e$, the data is displayed to the user. These three time points allow us to characterize various temporal aspects of data. For example, $t_f - t_d$ constitutes the age of <u>observed</u> data., whereas $t_e - t_d$ represents the timeliness of the <u>instantiated</u> data at the time of its instantiation.

---

[1] We assume that the time of measurement is the time at which the object is in the measured state. For a counter-example, consider the observation of a star with a telescope. The star may no longer exist due to the travel delay of the light. Thus measurement of its past states may be occuring in the present.

3.5.5 Specification of Data

We now define the concept of a data requirement specification in terms of our model constructs. A specification declares the data production and decoding process desired by the user. It is a reference against which perfect data quality can be defined.

Definition : A SPECIFICATION for data consists of the following:

(1) the set of <u>things</u> of interest, (2) the set of <u>attributes</u> of interest for things of interest, (3) the set of <u>reference frames</u> to capture variable aspects of measurement affecting the outcome value, (4) the <u>measurement</u> procedure, (5) the <u>language</u> L to be used (see Section 3.2), (6) maximum allowable <u>instantiation delays</u> in delivering data to the display ($DI_{max}$).

(1), (2) and (3) define R.

In the following section we use the IS model to analyze and define several fundamental dimensions of data quality.

3.5.6 Data Production -> Data Quality

We have shown that data quality depends on the quality of the data production process embodied in g, the mapping from R to D. We decomposed g into its various process components. In this section we look at how the data production process fails in terms of non-conformance to user requirements. We define the specific components of non-conformance by which data quality is lost.

In Table 3.1 below, each item describes a component of non-conformance of the process constructs.

| Process Construct | Description of non-conformance |
|---|---|
| *Thing* | Inability or failure to capture data about the correct set of things of interest. |
| *Attribute* | One attribute may be confused with another. For example a person's age may be confused with their birth date. |
| *Reference Frame* | Measurement of temperature may be done at the wrong time. |
| *Measurement* | Measurement may be carried out incorrectly. |
| *Encoding* | Data may be entered in the wrong format, such as right justified instead of left justified, or simply a typographical error. |
| *Decoding* | The user may be unable to map wff's to the appropriate mental constructs. For example, the user may not understand a particular coding scheme. |
| *Temporal behavior* | The delay in instantiating the data (DI) exceeds the maximum allowable by the user. |

Table 3.1: Process constructs and non-conformance

These process constructs and their (non)conformance form the basis for our characterization of data quality dimensions and defects in the next section.

To illustrate the use of the concepts developed thus far in section 3.5, we now offer some possible definitions of (e.g., dimensions of) data quality - using our process constructs. These error definitions are not identical to those in Chapter 4, but rather illustrate the application of philosophical constructs to data quality definition. Data quality is defined in terms of imperfections in the data production process, relative to a specification for its desired behavior. If the data collection specification is adhered to by the actual production process, then the user correctly perceives the true state of the world of interest and data will be of perfect quality.

We will use the 'a' subscript for actual data production, and 'p' for that which conforms to user requirements. For example, if $g_a$ is the actual mapping function (i.e., as performed by the actual data production process) then $g_p$ ('p' for 'perfect) would be the ideal mapping function - the one that conforms with user requirements and the data production specification. Let P be a production specification that conforms to user requirements and A be the specification of the actual production process.

- Accuracy

Common use of the term data accuracy refers implicitly to data elements only, e.g. [46]. As the concept of data, for our purposes, includes both the instantiated data element and its metadata. Accuracy is a point concept which requires each wff to properly correspond to the triple $\omega$ it signifies (e.g., if there are two dinners, 'two' is observed and the symbol '2' is entered). It characterizes the relation from a single aspect of the world to a single wff.

$$g_p(\omega) = g_a(\omega) \text{ for all } \omega \in R.$$

In terms of the process constructs, a wff is *accurate* if, and only if $$E_p(F_p(x_i, m_j, a_k)) = E_a(F_a(x_i, m_j, a_k))$$

i.e. the aggregate result of measurement and encoding is according to P. Note that this condition accounts for the case where measurement errors and encoding errors offset each other.

- Completeness

Completeness can be defined as a set-based concept that requires that all $\omega \in R_p$ are measured and mapped onto the co-domain:

$$\text{co-domain}(g_p) = \text{co-domain}(g_a).$$

In terms of process constructs, a data set $D_a$ is *complete* if, and only if $$R_p = R_a, \text{ and}$$

$$E_p(F_p(\omega)) = E_a(F_a(\omega)) \text{ for all } \omega \in R_p$$

This means that all the aspects of the world of interest are measured and encoded accurately.

For example, $R_p$ is violated if P specifies all company warehouses as things of interest and A specifies only warehouses in California or if P specifies the attributes QTY and TEMP and A specifies only QTY - these are incompleteness problems - one in things (extensions) and one in attributes (e.g., schema completeness).

- Timeliness

Timeliness concerns the time delay between measurement and the instantiation or reading of wff's. It should perhaps be at or below some maximum specified.

$$t_e - t_d \leq DI_{max} \text{ for each } \omega \in R_a$$

($t_e$ and $t_d$ were defined in Section 3.5.4 and $DI_{max}$ in specification item 6 in Section 3.5.5.)

- Interpretability

In general, interpretability requires that the user map wff back to the statements they signify as per P. This requires that the user be able to interpret the data element as well as various aspects of metadata. For example, the data element itself must be interpreted so that the symbol '3' means the number three. The definition of the attribute must also be known or interpreted, (e.g., QTY means the number of frozen dinners).

Thus, for data to be interpretable with respect to the user:

for $d_i \in D_a$, $d_i$ is a wff, and $$E_p^{-1}(d_i) = E_a^{-1}(d_i) \text{ for } d_i \in D_a$$

To be specific, we distinguish $D_p$ from $D_a$. Da is the actual data set, for which some elements may not be well formed. This necessitates the first of the two requirements.

The key to interpretability is, given a wff, whether accurate or not, it can be properly interpreted by a user of the language.

We posit that such dimensions are the stuff of data quality, and allow us to think about (in a formal way) characterizing what data of perfect quality would be. We have defined quality relative to a known user specification.

3.6 Chapter Conclusion

A model of data and information system has been presented in which data process quality was treated as a surrogate or indicator of data product quality. Error is defined as a form of difference between the state of the world implied by the database and the true state of the world. The model contains an explicit and orthogonal set of process constructs. Using the model we are able to formally discuss concepts of data quality definitions: accuracy, completeness, timeliness, and interpretability.

We have seen that data quality is not a simple concept. The notion that there exists some minimal and orthogonal set of data quality dimensions is brought into question. A well-defined model of the world and an information system are required for detailed analysis. Efforts in the past which appeal to intuitive definitions of data, measurement, and the information system may be limited in their applicability to solving problems related to the development of information systems that deliver quality data.

More rigorous definitions of data, schema information, user understanding of data, generation of data, and time are necessary to define rigorously the components of data quality. Even the relatively simple source-receiver model of an IS developed here requires a thorough analysis as to its implications for data quality. It is clear from this effort that operationalizing data quality requires a strong model of the process by which the data is created and solid definitions for components and stages of data creation. Data quality characteristics can be traced to characteristics of the information system delivery vehicle that creates it. The constructs are domain and data model independent.

Our definition of data error will derive from the concepts of data quality discussed here. Because our goal is to measure data quality (e.g., data error), then we need some objective and ideally singular concept of error which will incorporate many of the concepts of process losses we have discussed. We will reduce all aspects of data imperfection to one of error. Notions of timeliness and interpretability will be incorporated into a single concept of error. Issues of timeliness and interpretability will be normalized relative to the user's assumed or desired reference frame - when data are old or misinterpreted - an error results. We begin description of the logical error representation next in Chapter 4.

Chapter 4
Logical Error Representation

*"Given one clock you always know what time it is. Given two, you are always in doubt" - Higgins Law*

Terms such as accuracy, completeness, integrity, and consistency are often used in informal or ambiguous ways. They apply differently to a data set than to a single datum and must be operationalized differently for categorical and numeric data. A more precise formulation of error is required - one which can be propagated and with desired properties such as those discussed in Chapter 1 Section 1.7.

In the previous chapter we outlined an abstract model of error. We discussed the concepts of 'world, data, error, difference, and correction' - but we did not define them in any mathematical detail - we merely hypothesized their existence. In this chapter we define our error representation. Part of the logical error representation includes the two associated operators described abstractly in Figure 3.2 of Chapter 3: the correction operator $\oplus$ and the difference operator $\ominus$.

4.1 Some preliminary assumptions

We assume that error (e.g., truth) is defined relative to a single *context*. By context we mean a set of assumptions about what aspects of the world are interesting and how/when they are to be measured (e.g., by whom at what time and with what instruments). This includes the domains and predicates of a logical world-view as well as the reference frame described in Chapter 3. Based on this assumption, one and only one data instance is error-free relative to the triple: <*a given state of the world, a users (preferred) frame of reference, a syntax for encoding constructs in data symbols*>. We assume that the database is capable of representing all relevant states of the world (i.e., we adopt the appropriate scheme assumption of [12] such that domains are adequate).

We first require a concept of the world from which data deviate[1]. The *world* is initially a flat collection of undifferentiated property-bearing objects. Humans construe properties as *attributes* [15]. A *class* is a category in which a particular object either *is* or *is not* a member. An *object* is any thing or concept[2] that may be denoted by a constant, e.g., Frank Ames or the number 820000. An object can be either classified, e.g., Wealthy (Frank Ames), Big-number (820000), or it can be assigned an attribute[3] value, e.g., Donation (Frank Ames, 820000), Digits-in-number (820000, 6). Therefore, the same symbol may be an attribute in one table and an object in another, while referring to the same concept. In our model, attribute and class concepts are totally convertible during query processing.

In summary, the *state* of the world concerns objects, their attribute values, and their binary membership status in a set of classes. In this thesis, queries are interpreted as transforming and deriving various combinations of objects, attributes, and classes in a logical framework. We will use the mathematics of functional dependencies as a formalism for defining keys in pre- and post- query relations [58]. As in [65] and others, a functional dependency indicates a single-valued object-attribute relationship, with the key (object) determining the attribute. An "attribute of an attribute" (e.g., Codd's indirect attribute [20] is also considered an attribute, as in [20, 65]. So, for example, "Mother-of-Father" implies "Paternal-Grandmother".

---

[1]Some of these ideas are repeated from Chapters 1 and 3 with which they are intertwined.

[2]We have no reason to distinguish between physical objects (the person Frank) and conceptual objects (the number 820000). The definition of an object is a philosophical issue, so we take an operational approach here. As Frank and 820000 illustrate - in various contexts, either may be considered as an attribute or as an object (e.g., including: Frank is an attribute of Joe in Father-of (Joe, Frank)).

[3]e.g., a relationship among objects in which one object is primary.

4.2 Error representation formalism

*Data* are modeled as a collection of statements. *Attribute statements* and *class statements* are shown by example below in Table 4.1. An attribute statement associates a value with some attribute of some object. A class statement assigns an object to a category - it has only a single argument (a name of an object) and states that the denoted object is a member of the class named by the predicate. The extent of a class (i.e., the set of its members) is represented by the set of class statements under the same class predicate.

| Attribute statement | Donations (Frank Ames, 820000) |
|---|---|
| Class statement | Wealthy (Frank Ames) |

Table 4.1: Attribute and class statements

For any data set to be relevant to our model of error, all of its contents must be reducible to statements of one of these two forms. The following semantic concepts are inherent in this framework, and this is a broad set: {class, object, object identifier, attribute, and attribute value}. We define error types relative to these primitive aspects of meaning, as illustrated below in Figure 4.1

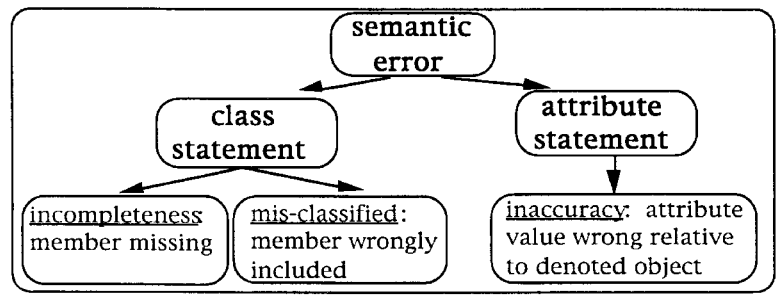

Figure 4.1: Fundamental construction of error

In a class, we are concerned with incompleteness and mismembership. The set of symbols denoting members of the class should be complete (denote all class members) and have no mismembers (denote none other than class members). Attribute errors correspond to untrue (inaccurate) attribute values and missing (null) attribute values. These three error types will be shown capable of denoting the *difference* between any given relation and any corresponding true relation (Theorem 4.1).

Our conceptual model is based on the semantics we have described thus far. Our representation and calculus will be operationalized for the relational data model, due to its widely understood operations and formal mathematics. Given our basis in logic and semantics, this should allow portability to other data models as well. We interpret a database relation as a class, with key and attribute columns as usual. We assume all initial inputs to the calculus to be in 3NF. [1]

(Important notation is summarized in Appendix A.)

Definition 4.1 (error-free relational table): As usual, a relation $r$ on scheme $R$ is a subset of the cartesian product of $R$'s domains. Every table represents a class. Key values represent objects in the class, and attribute columns contain their attribute values. A class is a set of objects which have been grouped together based on either explicit criteria (e.g., having the same attribute values) or implicit criteria (e.g., a priori or externally specified). Key values may span multiple columns and would then represent composite objects, i.e., an object which is a relationship. A composite object may have an attribute of its own, such as Grade (Student × Class), which is not an attribute of either of the component objects Student or Class individually.

A tuple $r_1$ is an element of $r$ such that $r_1.R_1$ denotes the sub-tuple of $r_1$ on the column(s) in $R_1 \subseteq R$. $R$'s class is represented by the name $R$. Non-key columns are attributes of objects denoted by the key. Key values are assumed

---

[1] an attribute column is functionally determined by "the key, the whole key, and nothing but the key"

to be unique. Let $R_k \subseteq R$ be $R$'s key columns, and let $R_a \subset R$ be $R$'s attribute columns.

◊

Definition 4.2 (error definition): $\oplus r$ represents the correct relation instance, or true state of the world, in the context of scheme $R$. (We define $\oplus$ formally later in section 4.4.) $r_1.R_k$ is the key value of $r_1$. The table containing the true set of objects in $R$'s class is written as $\oplus r.R_k$. Let $E_i$ be the set of objects *incomplete* from $r$, so $E_i = \oplus r.R_k - r.R_k$. Let $E_m$ be the set of objects *mismember* in $r$, so $E_m = r.R_k - \oplus r.R_k$. (- represents set difference here.)

We say that an attribute value $r_1.R_{a1}$ (where $R_{a1} \in R_a$) of the object in $r_1.R_k$ is *inaccurate* if $r_1.R_{a1} \neq \oplus r_1.R_{a1}$. A null value (' ' in a cell) or syntax error in an attribute value means "value not known" and applies here as well, i.e., ' ' $\neq c$ for any constant $c$. ◊

◊

Definition 4.3 (error representation): If $r$ is a table on scheme $R$, then $r_{em}$, $r_{ea}$, and $r_{ei}$ are its *error tables*. These tables have the same scheme as $r$ and contain *error tuples*. The *error triple* $r_e = <r_{em}, r_{ea}, r_{ei}>$ constitutes the *error representation*. This representation contains corrections to $r$. These are defined by the set of untrue (or missing) statements in $r$ relative to the set of statements that are true about the world. We say that $r$ exists in an *error state*, denoted by $r_e$.

A sample error triple for the error Example 1.3.1 in chapter 1 is in Example 4.1 below. Key values in $r_{em}.R_k$ and $r_{ei}.R_k$ indicate mismember tuples and incomplete objects in $r$ respectively. Let $r_1$ be a tuple having inaccurate attribute values. Then there will be a tuple $r_2 \in r_{ea}$, corresponding to $r_1$, such that $r_1.R_k = r_2.R_k$. $r_2$ will contain attribute values (i.e., not be '-') only on attributes where $r_1$ is inaccurate (tuples 1-3 below). All attribute values in $r_{ei}$ are by definition present and accurate (tuple 6 below). We are not concerned with the true attribute value of mismember objects, even when they do apply (tuple 4 below).

We write $r_c$ to denote the set of tuples in a relation $r$ which are fully Correct - neither mismember nor containing any inaccuracies. Formally, $$r_c = \{ r_1 \mid \exists r_1 \in r, \neg \exists r_2 \in (r_{ea} \cup r_{em}), r_1.R_k = r_2.R_k \}$$

We write $r_m$ to denote the set of tuples in $r$ which are Members (i.e., not mismembers). These are either in $r_c$ or have inaccuracies. Formally, $$r_m = \{ r_1 \mid \exists r_1 \in r, ((r_1 \in r_c) \vee (\exists r_2 \in r_{ea}, r_1.R_k = r_2.R_k)) \}$$

A null or syntax error in a key is modeled as a mismember because the tuple/object is spurious or not properly identified.

In general, our model assumes homogeneous types. Therefore a tuple would be defined as a mismember if an attribute "does not apply".

⋄

Example 4.1: The error triple for the alumni relation from Example 1.3.1 in Chapter 1 is given below, based on the sample errors discussed there. This set of errors will be used throughout Chapters 4, 5, and 6.

| $r_{em}$ (alumni mismembers) | | | | | | |
|---|---|---|---|---|---|---|
| Record # in r | Name | Home state | Degree | Major | Year of grad | 5-year-donation |
| 4 | Jon Wales | | | | | |
| 6 | ' ' | | | | | |

| $r_{ea}$ (alumni inaccurates) | | | | | | |
|---|---|---|---|---|---|---|
| 1 | Mae Ray | - | - | - | 1991 | - |
| 2 | Lisa Jordan | - | - | - | - | 400,000 |
| 3 | Tom Jones | - | - | CS | - | - |

| $r_{ei}$ (alumni incompletes) | | | | | | |
|---|---|---|---|---|---|---|
| | John Junto | VT | MS | Psych | 1984 | 243,000 |

Tables 4.2 a-c: Sample error triple for Example 1.3.1: $<r_{em}, r_{ea}, r_{ei}>$

◇

The logical error representation is thus an exact account of the error in $r$ relative to a state of the world. Each possible error state for a relation corresponds to a unique combination of (jointly occurring) errors in the relation. Every error must be corrected, including null values. Tuples not indicated to be incorrect by the representation, are therefore correct (i.e., accurate and member).

To summarize the representation, some of its characteristics are listed here. A tuple present in a relation $r$ is either: (1) a fully correct tuple $\in r_c$ (i.e., is not a mismember and contains no inaccuracies), (2) a mismember tuple whose key would then be found in $r_{em}$, or (3) an inaccurate tuple (not a mismember, but containing inaccuracies) whose key value would be in $r_{ea}$. Tuples that are not listed in the database relation, but should be (i.e., would be if the relation were fully correct), are in the incomplete error table $r_{ei}$.

This completes the definition of our error representation. We have chosen the relational model to steer our theory towards application. However, given our semantic construction of error, the concepts apply outside the relational model as well. The model makes no assumptions or requirements about change to the underlying database data structure or query algorithm. In the next section 4.3, we consider some of our modeling assumptions in more detail.

4.3 Assumptions behind our model

Various assumptions underlie any data model. Ours are discussed here. These complement other assumptions and basic ideas discussed in Chapter 3. We structure the discussion based on the three assumptions Reiter describes as implicit in the relational data model: *domain closure, closed world,* and *unique name* [52]. These help us to explicate some of the more subtle aspects of our model. They are relevant here because violation of any of these assumptions would constitute an error in our model.

Domain closure concerns the relationship between symbols in the database and objects in the world. It asserts that the set of symbols (i.e., constants in database domains) denotes all and only existing objects in the world. In other words, an onto mapping exists from the set of all symbols to the set of all objects. In our model, only the true relation (e.g., $\oplus r$) is assumed to maintain domain closure. We do not make this assumption concerning the errored data itself. Violation of domain closure constitutes a syntax error, and would be accounted for in our model by inaccuracy or mismembership error tuples.

The closed world assumption states that those tuples not present in a database relation are false. In other words, if a tuple is true in the real world, then that tuple is by definition also present in the data. In our model, only a true relation is assumed to be closed world. We obviously do not make this assumption concerning the errored data. Violation of the closed world assumption is accounted for in our model via inaccuracy or incompleteness error tuples.

The unique name assumption implies that no two symbols can denote the same object, and correspondingly that no single symbol may denote two objects. This implies that the mapping between symbols and their corresponding objects is one-to-one (and onto as per domain closure). We again do not make this assumption. One of two synonyms (e.g., IBM and I.B.M) must be a syntax error. We treat such mis-spellings as well as non-sensical symbols (e.g., "!@dd"), the same as we treat blanks. All are assumed to denote no known value or object - to be spurious. As discussed previously, when this occurs in an attribute value, we may assume it to represent "the set of possible values", as per the interpretation of nulls in [29] and elsewhere. When this occurs in a key column, we define it as a mismember.

As discussed in the introduction we assume as input to this model a full and correct statement on the meaning of data [13, 15], e.g., on the database schema definition. A data set is assumed to have a single correct (e.g., true) form, and this is relative a given users semantics. Truth, however, is relative to one's beliefs about how the world should be observed or measured [17], i.e., one's preferred *methodology*.

For example: which methodology should we use to measure "room temperature", should we use a thermometer or a thermocouple? This constitutes one's *frame of reference* [13]. So truth and meaning are fundamentally tied to methodology[1]. Methodology [17] will not be considered here, however, as our focus is on the ontology and semantics of error, and not the epistemological issues of determining truth or measuring error in practice. A question may arise: *what does a reference frame have to do with data processing?* For data processing purposes, the reference frame may concern all people, activities, machines, software, etc. which produce the data element.

In general then, error may be thought of as a difference between two ways or instances of measuring "the same thing". We model error as an account of the discrepancies between one *source* (e.g., reference frame) and another. Discrepancy between sources is simply the *difference* $\Theta$ between two data base relations on the same scheme.

4.4 Two primitive operations: Difference and Correction

In this section we define formally two concepts (i.e., operators) which have been largely informal up to now - the difference and correction operations. Both

---

[1] The *operationism* school among philosophers takes this to an extreme, and considers the meaning of a statement to be the means by which it was obtained, in which case meaning and measurement methodology are synonymous.

take as inputs two relations on the same scheme. The difference operation takes a possibly errored data set and a correct data set and constructs an error term (i.e., an instance of the logical error representation). The Correction operation takes a possibly errored data set and the error term and maps this back to the corresponding error-free table. These operations are illustrated in the two Figures 4.2 and 4.3 below.

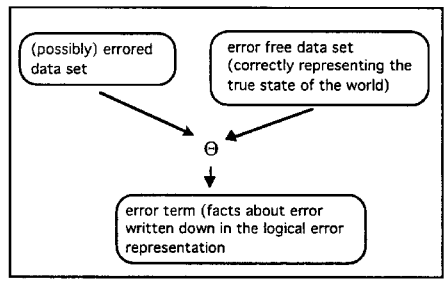

Figure 4.2: The difference operation

The difference operation is analogous to a concept of data error measurement. In order to assess error, we require the data and (some notion of) the state of the world. Error is a difference.

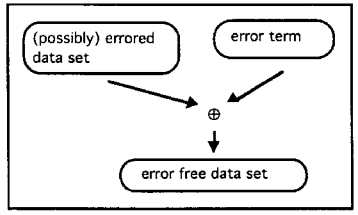

Figure 4.3: The correction operation

The correction operation is analogous to a concept of data error adjustment [23, 32], Given a data set and given (some measure of) its error, we can derive the true state of the world.

4.4.1 The difference operator $\Theta$ : measuring data error

This operator has two components. A *tuple difference* $\Theta$ $(t_1, t_2)$ for a tuple $t_1 \in r$ (possibly) containing inaccuracies, $t_2$ contains corrections to errored attributes in $t_1$. Let $t_3 = t_1 \Theta t_2$. $t_3$ takes the following values. $t_3.K = t_2.K = t_1.K$. For attributes $a_1$ where $t_1.a_1 = t_2.a_1$, then $t_3.a_1$ is written as '-' (e.g., a "null value" in $r_{ea}$). For attributes $a_1$ where $t_1.a_1 \neq t_2.a_1$, then $t_3.a_1 = t_2.a_1$ (i.e., indicating the true value).

Example 4.2: (tuple difference)

| | |
|---|---|
| $t_1$ (tuple having inaccuracies) | <Mae Ray, RI, ScD, Law, ' ', 800,000> |
| $t_2$ (true tuple) | <Mae Ray, RI, BS, Law, 1991, 800,000> |
| $t_3$ (error tuple) = $t_1 \Theta t_2$ | <Mae Ray, '-', BS, '-', 1991, '-'> |

◊

Then the relation difference between $r$ and $r_b$ is the triple $<r_{ea}, r_{ei}, r_{em}>$. Where $$r_{ea} = \{ t_3 \mid t_1 \in r \wedge t_2 \in r_b \wedge t_1.K = t_2.K \wedge t_3 = \Theta_t(t_1, t_2) \}$$

$$r_{em} = \{ t_3 \mid t_1 \in r \wedge \neg \exists t_2 \in r_b \wedge t_1.K = t_2.K, t_3.K = t_1.K \}$$

$$r_{ei} = \{ t_3 \mid \neg \exists t_1 \in r \wedge \exists t_2 \in r_b \wedge t_1.K = t_2.K, t_3 = t_2 \}$$

If $r$ has no errors then $r_{ei}, r_{em}$, and $r_{ea}$ are empty.

4.4.2 The correction operator $\oplus$: adjusting data to error

This operator again has two components: a tuple correction $\oplus_t(r_1, r_e)$ for a tuple $r_1 \in r$, and a relation correction $\oplus_r(r, r_e)$. For simplified notation, we sometimes write "$\oplus r$" or "$\oplus r_1$". An inaccurate tuple is corrected by replacing inaccurate and null attribute values with accurate values. A relation is corrected by eliminating mismember tuples, correcting inaccurate tuples, and inserting incomplete tuples.

$$\oplus r = r_{ei} \cup \{\oplus r_1 \mid \exists r_1 \in r \land r_1.R_k \notin r_{em}.R_k\}$$

If $r$ has no errors then $r_{ei}, r_{em},$ and $r_{ea}$ are empty and $\oplus r = r$. A tuple $r_1$ is corrected by replacing all inaccurate values with accurate values.

Example 4.3: (tuple correction)

| | |
|---|---|
| $t_1 \in r$ | <Mae Ray, RI, ScD, Law, ' ', 800,000> |
| $t_2 \in r_{ea}, r_{ea} \in r_e$ | <Mae Ray, '-', BS, '-', 1991, '-'> |
| $\oplus t1$ | <Mae Ray, RI, BS, Law, 1991, 800,000> |

◊

$$\oplus t_1 = \{ x \mid \exists t_2 \in r_{ea}, t_1.R_k = t_2.R_k, \forall i \in \{1, ..., n\}, \text{if } t_2.R_{ai} = $$
$$\text{'-' then } x.R_{ai} = t_1.R_{ai}, \text{else } x.R_{ai} = t_2.R_{ai}\}$$

where $x$ is a tuple variable on $R$.

This completes the description of the logical representation. Whereas data quality is sometimes discussed vaguely as "accuracy and completeness", we have formalized error using a correction mapping over a finest-grain discrete space. This will become the sample space[1] of the probabilistic error representation. In our model, error takes two forms: class-level (incompleteness and mismembership) and attribute-level (inaccuracy and nulls). This is consistent with the literature on statistical methodology, in which measurement error is considered at the population level and the individual level (sampling and non-sampling error) [11].

---

[1] mutually exclusive, collectively exhaustive, and finest-grain enumeration of events of interest [28]

In [34], we show (and prove correctness for) a logical error propagation calculus which propagates this representation through select, project, cartesian product, natural join, and aggregations - in a closed and lossless fashion. This covers the space of conjunctive queries [2], the basis for SQL. We continue with the probabilistic model next.

4.5 Properties: Representation Completeness and Minimality

We now show a simple yet important completeness property of our error triple and correction operator. Let $D$ (for Data) be the set of possible instances of a relation $r$ on scheme $R$, including errors. Let $W$ (for World) be the set of instances of $r$ representing a possible state of the world (e.g., no nulls, syntax errors, spurious objects, etc.). $E$ is the space of possible error triples under the associated relation scheme. The following theorem states that our error representation is *complete* in that it can map any relation in D to any relation in W. This means that it can characterize any and all discrepancies between any $<d, w>$ pair via the equation $w = \oplus d$.

Theorem 4.1 (logical representation completeness) The correction operator $\oplus_r$ and error triple define an onto mapping from $D$ to $W$ (i.e., can map any $d \in D$ to any $w \in W$) such that $W = \oplus_r(D, E)$.

Proof: An object functionally determines its true attribute values. The true relation is therefore functionally determined by the true set of objects in its class. By definition, an error triple defines which objects are truly in a class and which are present but do not belong. It also defines the true attribute values for all relevant key values ($r_{ea}.R_k \cup r_{ei}$). Assuming sufficient domains, an error triple can thus map any $d \in D$ to any $w \in W$. ◊

Closure of our set of three error types under calculus operations is implied by the completeness property in the following sense. Based on Theorem 4.1, this error representation can characterize all discrepancies between any relation and its corresponding true relation. Therefore, it can characterize the difference between any query output and its corresponding true relation. The error propagation calculus will be proven to correctly compute output error triples, therefore this set of error types is closed.

Although we will not prove it formally (and it is perhaps the least interesting of the properties) - this set of error types is also minimal. Removal of any the error types will result in an incorrect system - inaccuracy alone will lead to incompleteness and mismembership and incompleteness and so on.

While "data quality" is sometimes discussed intuitively in terms of dimensions such as accuracy, completeness, and consistency, we have formalized error - using concepts from semantics and ontology - over a finest grain discrete space. A correction mapping relates errored data to the true state of the world. Error has two forms: class-level (incompleteness and mismembership) and attribute-level (inaccuracy and nulls). In the following section we develop the error propagation calculus. Database relations, their error triples, and the query being performed are operands to a logical and set-based machinery.

Chapter 5
Logical Error Propagation Calculus

An error triple is a scheme for recording corrections to error in a database. But even for an expert who is aware of error in query inputs, it may not be obvious how various errors interact to affect error in query results. Error propagation through queries is non trivial. Query aggregations and partitions amplify some errors while diminishing others. And query outputs, not inputs, are the concern of a data user.

In this chapter we give formal treatment to development of a logical error propagation calculus, proving correctness of each calculus expression developed. Project, Select, Cartesian product, Natural join, and the aggregations Count and Sum will be considered. This covers the space of *conjunctive* relational database operators [58].

5.1 Why not just correct the data?

As discussed previously, the goal of the logical error propagation calculus is simply to propagate an instance of the logical representation. And the logical representation is again a notion of difference between two relations on the same scheme. A question which often arises is : "why not just 'correct' the data?" In other words, why would we be interested in propagating a differential file - and not simply correct the input data and be done with it - eliminating the need for an error propagation calculus ? The general answer, as previously discussed, is that propagation of a differential file is a useful analytic tool to help assess the significance of error in the context of a given query output.

Administrators may have gone to extra effort to identify discrepancies between a given data set and its reference source for just the purpose of finding out how errors impact users. We may not have the same information on future data sets, so the goal is really to model error and not simply to correct the data. (Of course we will also be applying the logical model as a basis for the probability model - which does not assume that such a correction exists.)

More generally, however, in the remainder of this sub-section, we discuss why we may not want to correct the data - in the context of the various interpretations of error. When interested in good data and not error, whether to correct data before of after the query is performed may be a simple matter of figuring out which is more efficient (e.g., is it faster to take path 1 or 2 in the commutative diagram of Figure 5.1 in Section 5.2 below).

1) No control over the data - ownership and media issues. In some cases, we may not be able to update the source information. It may be a data set owned by another organization, or it may be stored on a non-write media such as CD ROM. The logical error representation allows us to store known discrepancies in a small external file without having to replicate the entire data set elsewhere and correct it there.

2) Patterns of known errors indicate aggregate (e.g., undetected) error and focuses data quality cleanup. Whether or not we propagate a differential file, maintaining a list of previously detected errors will provide hints as to where other errors lie. For example, if I know that some people were caught lying about their deceased status, I may then be aware that others will have done the same thing. Simply correcting data will not allow patterns of previously detected errors to be tracked. This may serve as a basis for data quality cleanup.

3) Error as (interim) updates. Error may not be untruths, but it may be a question of "data version" and concerning interim updates. When updates are made available to a data warehouse, the DBA may not wish to immediately update the persistent data - instead waiting until the incoming data has been screened for error. The DBA may also need to wait until all users are completed with possibly long (e.g., days) transactions against the data warehouse. In the mean time, other users' queries may optionally incorporate these interim updates, or understand their relevance in outputs.

4) Error as inter-database discrepancies. In some cases, it's not error per se, but discrepancies between two sources that are of interest. Two databases on the same scheme may contradict one another - with no a priori assumption about which is "true". (Recall the Worldscope and Disclosure example of Chapter 1). The real question may be "where do they disagree?", and "does their disagreement appear in the context of a given query?".

5) Error due to different interpretations of what correct means. Finally, the examples of Section 1.3 concern multiple different interpretations of what correct means. I may define 'year-of-graduation' as one thing and you may define it as another. Rather than simply replicate the entire data set - the external representation allows us to maintain individual accounts and to have them incorporated as desired.

6) Value of correcting data. Fixing errors in data costs time and money. We should determine the value of getting corrected data. Knowing how much less or more error will occur in <u>output</u> data - with or without a given source of corrections - helps us to determine exactly how much value is created. If there is no error in output data with or without corrections, then correction is unnecessary.

5.2 Error preserving: a property definition & proof method

Before discussing individual operators, we describe first the correctness criterion for an EPC operation. This leads to a commutativity-based proof method for showing individual calculus operations to be correct. It is illustrated in Figure 5.1 below for a unary query operation. We give our correctness property the name "error preserving", which means that no information about error is lost by the calculus.

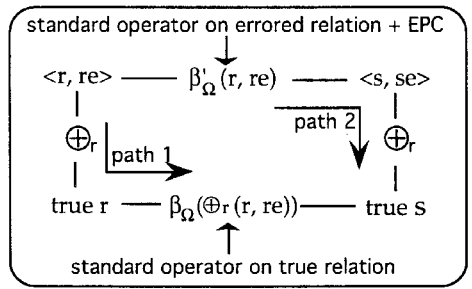

Figure 5.1: Commutative diagram and proof method for EPC

Let $\beta$ be a relational operator and let $\beta_\Omega$ be the operator with its parameter $\Omega$ specified (e.g., the selection condition or projection list). Let $r$ be the input, and let $s$ be the standard operator output, so $s = \beta_\Omega(r)$. EPC operators are parameterized by $\beta$ as $EPC_\beta$, so for example $EPC_\sigma$ is the EPC expression for selection. Let $r_e$ and $s_e$ be the error triples for $r$ and $s$ respectively. Let $\beta'_\Omega$ be the operator extended with $EPC_\beta$, so that $\beta'_\Omega(r, r_e) = <s, s_e>$. The calculus requires as input the following three items as EPC input: the query parameter $\Omega$, the input data $r$, and the input error triple $r_e$:

$$EPC_\beta (\Omega, r, r_e) = s_e.$$

Our correctness criterion is that $\beta_\Omega(\oplus r) = \oplus_r (s, s_e)$. This is equivalent to stating that the diagram above in Figure 5.1 must commute. This means that the same *true* s relation will result whether the calculus operates first and then s is corrected by $s_e$ (path 2), or if r is first corrected by $r_e$ and then a standard selection is applied (path 1). This provides our general proof method for EPC expressions. The calculus for an operator is correct or error preserving iff $$\beta_\Omega (\oplus_r (r, r_e)) = \oplus_r (\beta'_\Omega(r, r_e))$$

For each query and corresponding EPC operation, assertion and proof of error preservation is done in two theorems. The first theorem asserts that the same set of keys results in $\oplus s$ from path 1 and path 2. Then, using the set of key values defined in the first theorem, a second theorem shows that, for a given a key value in $\oplus s$, the same attribute values result from path 1 and path 2. Given that a table is determined by its keys and attribute values (e.g., Theorem 4), then the tables by path 1 and 2 are identical and Figure 5.1 commutes. We begin with selection.

5.3 The Selection ($\sigma$) Calculus

A selection condition on a relation is a logical formula $f$ [58]. *Comparisons* include $\theta \in \{=, <, >, \geq, \leq\}$ and may occur in one of two ways: (1) between a value in a tuple and a constant (or regular expression) and (2) between different values within a tuple. Functional dependencies do not change due to a selection[1], so the key remains the same from input to output.

Let $r$ and $s$ be selection input and output on relation schema $R$ and $S$ with keys $R_k$ and $S_k$ respectively. Let $r_e$ be the error triple $<r_{em}, r_{ea}, r_{ei}>$ for $r$. If a tuple $r_1 \in r$ satisfies (is true under) the selection criteria $f$, we write $f(r_1)$, else $\neg f(r_1)$. The calculus must derive $s_e$, the error triple $<s_{em}, s_{ea}, s_{ei}>$ for $s$. Each calculus equation uses a logical and set-based formalism to describe a dependency structure of error

---

[1]except for a special case of equi-join, for which we develop a separate EPC operation in Section 5.5 between input and output - i.e., to describe how error propagates from input to output. For example, if a mismember tuple in $r$ gets selected into $s$, it will necessarily be a mismember in $s$. This is because only a subset of tuples can possibly satisfy a selection condition, so a mismember of $r$ must be a mismember of s.

inaccuracies in the select result:

$$s_{ea} = \{ r_2 \mid \exists r_1 \in r, \exists r_2 \in r_{ea}, r_1.R_k = r_2.R_k, f(r_1) \wedge f(\oplus r_1) \} \quad (1a)$$

Calculus expression 1a above ('1a' label to the right) identifies the set of tuples that are inaccurate in $s$. An inaccurate tuple in $s$ is also by definition inaccurate in $r$, and it must have been selected. "$\exists r_1 \in r$" means there exists a tuple $r_1$ in $r$. "$r_1.R_k = r_2.R_k$" matches $r_1$ in $r$ with a tuple $r_2$ in $r_{ea}$ on the key columns $R_k$. So $r_1$ is inaccurate and $r_2$ contains attribute value corrections to $r_1$. "$f(r_1)$" indicates that $r_1$ was selected by $f$. "$f(\oplus r_1)$" indicates that $r_1$ *should have been* selected, i.e., if the attribute values in $r_1$ had been corrected before applying $f$, the tuple would still have been selected. This ensures that the inaccuracy in $r_1$ did not result in an s mismember due to a false selection of $r_1$. This condition will be accounted for in 2b below and similarly for s incompletes in 3b below.

> Example 5.1 (selection propagation -> inaccuracies)[1]: The following selection over the Alumni table (Example 1.3.1), with $r_e$ as the Alumni error triple (Example 4.1), would result in Lisa Jordan as an inaccurate tuple in $s$:
>
> *select * from Alumni where Donations > 300,000*
>
> Her actual donation was 400,000 while it was listed as 500,000 in the database. She is not a mismember in $s$ as her donations are in fact greater than 300,000.
> ◊

---

[1] Some of the short examples below are repeated from Chapter 1 for convenience.

mismembership in the select result:

$$s_{em} = \{ r_2 \mid \exists r_1 \in r, \exists r_2 \in r_{em}, r_1.R_k = r_2.R_k, f(r_1) \} \quad \cup \quad \text{(2a)}$$

$$\{ r_2 \mid \exists r_1 \in r, \exists r_2 \in r_{ea}, r_1.R_k = r_2.R_k, f(r_1) \wedge \neg f(\oplus r_1) \} \quad \text{(2b)}$$

Two distinct cases result in mismembers in $s$ (thus the union of two disjoint sets): in 2a a mismember of $r$ is selected by $f$, so the mismember remains (again, no mismember of $r$ can be a member of $s$). In 2b an inaccurate tuple $r_1 \in r$ is selected but only due to its inaccuracy and *should not have been*, i.e., it is not a true member of $s$: $r_1.R_k \notin \oplus s.S_k$.

Example 5.2 (selection propagation -> mismembers): The following selection over the Alumni table would result in two mismembers in $s$: Jenifer Wales (by 2a) and Lisa Jordan (by 2b):

*select \* from Alumni where Donations > 450,000* ◊ incompleteness in the select result:

$$s_{ei} = \{ r_1 \mid \exists r_1 \in r_{ei}, f(r_1) \} \quad \cup \quad \text{(3a)}$$

$$\{ x \mid \exists r_1 \in r, \exists r_2 \in r_{ea}, r_1.R_k = r_2.R_k, \neg f(r_1) \wedge f(\oplus r_1), x = \oplus r_1 \} \quad \text{(3b)}$$

Two conditions cause incompleteness in $s$: in 3a an incomplete from $r$ would have been selected had the tuple been present. In 3b an inaccuracy in $r$ causes the select condition to fail where it would have succeeded otherwise.

Example 5.3 (selection propagation -> incompletes): The following selection over the Alumni table would result in two incompletes for $s$: John Junto (by 3a) and Lisa Jordan (by 3b):

*select \* from Alumni where Donations < 450,000* ◊

This completes the definition of the select calculus. It is the simplest of the four EPC operators we will consider. Its calculation of an output error triple corresponds to our intuitive notions of what error propagation means in a selection. Inaccuracies, incompleteness, and mismembership in $r$ may be propagated to $s$, depending on: (1) the particular tuples present in and missing from $r$, (2) their listed and their true attribute values, and (3) the formula $f$.

To prove correctness of these calculus expressions (1a, 2a, 2b, 3a, and 3c) we use the commutativity method of Figure 5.1 in Section 5.1 above. Formally, the select calculus $EPC_\sigma$ operates as follows:

$$EPC_\sigma(f, r, r_e) = s_e$$

where $EPC_\sigma$ is the EPC for the selection operator.

Let $\sigma'_f$ be the standard selection operator extended with $EPC_\sigma$ so that:

$$\sigma'_f(<r, r_e>) = <\sigma_f(r), s_e>$$

For $EPC_\sigma$ to be error preserving (i.e., correct) implies that $$\sigma_f(\oplus_r(r, r_e)) = \oplus_r(\sigma'_f(r, r_e)),$$

i.e., that the diagram of Figure 5.1 commutes for selection. The following two Theorems 5.1 and 5.2 together state that $EPC_\sigma$ is error preserving.

Theorem 5.1 (selection keys): $(\sigma_f(\oplus_r(r, r_e))).R_k = (\oplus_r(\sigma'_f(<r, r_e>))).R_k$

Proof: see Appendix B. ◊

We must now show that the attribute values for any given object (among those defined by Theorem 5.1) is the same regardless of the path taken. Let $\oplus s_{p1}$ and $\oplus s_{p2}$ be the two $\oplus s$ tables - as derived by path 1 and path 2 respectively of Figure 5.1.

We have already shown that $\oplus s_{p1}.S_k = \oplus s_{p2}.S_k$. By Theorem 4.1, if we can show that the attribute values assigned to $\oplus s_{p1}$ and $\oplus s_{p2}$ are equal, then the proof of error preservation is complete.

Theorem 5.2 (selection attributes): Given any pair of tuples $s_1 \in \oplus s_{p1}$ and $s_2 \in \oplus s_{p2}$ derived by $EPC_\sigma$ (i.e., paired in that $s_1.S_k = s_2.S_k$), then $s_1.A = s_2.A$ for any $A \in R$.

Proof: see Appendix B. ◊

Theorem 5.1 states that the same set of key values results in $\oplus s_{p1}$ and $\oplus s_{p2}$. Theorem 5.2 states that, given a key value in $\oplus s$, the same set of attribute values results. Given that a table is functionally determined by its set of key values and their corresponding attributes, then we can conclude that $EPC_\sigma$ is error-preserving. This completes the definition of $EPC_\sigma$ and its proof of correctness. Before continuing with the next operator, the cartesian product in Section 5.5, we consider a more general aspect of our model below.

5.4 "Meaning propagation" in a relational database - a framework

In this sub-section we highlight a framework which is hidden (e.g., only implicit) in this thesis. Applied in this thesis as an intermediate step to the error calculus, we consider this framework a secondary result in itself. We call it a "meaning propagation calculus" for the relational data model. It is a foundation for the error propagation calculus and perhaps for other applications of relational data model as well.

In order to define a closed propagation of meaning - because we define error relative to meaning - we first require a closed propagation of meaning constructs. The meaning of all output relations, derivable by query, must be specified as a basis for error computation. In particular, it must be computable: what is the output class (which objects belong) and which columns comprise the key (what are the output functional dependencies).

The relational data model, however, has an ambiguous semantics in that the relationship between "table-row-column" and "class-object-attribute" are unspecified. Litwin discussed the assertion of the same facts with different data structures [39]. We assert the key of a table to be the object identifier, with all other columns as attributes. The concept of a key always remains the same: that minimal set of columns in a table which functionally determines all columns in that table. Every table is defined as a class with a single correct and actual set of objects represented. Our model defines how classes, keys, and attributes are created, transformed, and destroyed during query processing.

This is done using functional dependencies as part of a scheme definition. When these are propagated, objects (keys) are defined and error can be unambiguously defined for all derived relations. Clearly, a selection operation does not change functional dependencies. But input key columns may become output attribute columns in an equi-join, and vice versa in projection. (Propagation of functional dependencies are described here as lemmas when it is unobvious.) This framework is used to model error, and may be useful in other settings for knowledge-based operations over relational data and operators. It links the syntactic specification of the relational model with their semantic correlates. We continue now with presentation of the remaining EPC operations.

5.5 The Cartesian Product (×) Calculus

The cartesian product $s = q \times r$ results in a relation $s$ consisting of all pairs of tuples across $q$ and $r$. We adopt the usual interpretation of ×:

$$s = \{ x \mid \exists q_1 \in q, \exists r_1 \in r, x.Q = q_1, x.R = r_1 \}$$

In the result a composite object (e.g., composite key or relationship) is represented by $Q_k \cup R_k$. For example, Student × Course (Example 5.4 below) yields a set of Student-Course composite objects[1]. The commutative diagram for × is shown below in Figure 5.2.

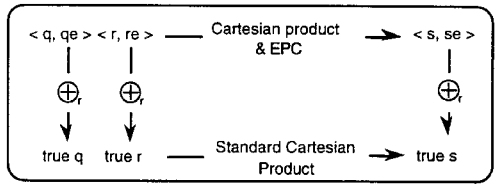

Figure 5.2: Commutative diagram for cartesian product

Let the relations input to × be $q$ and $r$ on schema $Q$ and $R$ having keys $Q_k$ and $R_k$ and attributes $Q_a = Q - Q_k$ and $R_a = R - R_k$ respectively. Let $s$ be the output relation on $S$, so $S = Q \cup R$ and has key $S_k$. $S_k = Q_k \cup R_k$ by Lemma 5.1 below.

Lemma 5.1 (cartesian product key behavior): For the standard × operator, functional dependencies in the two respective input relations are retained as partial key dependencies [58] in the result.

Proof: the trivial proof is omitted. ◊ mismembership in the cartesian product result:

$$s_{em} = \{ x \mid \exists s_1 \in s, s_1.Q_k \in q_{em}.Q_k \lor s_1.R_k \in r_{em}.R_k, x.S_k = s_1.S_k \} \quad (4a)$$

The 4a calculus states that a composite Student-Course object of $s$ is a mismember in $s$ iff either component object (Student or Course) was a mismember

---

[1] only some of which are "true" - depending on the relationship eventually applied, e.g., student-takes-class in their respective ($q$ or $r$) source relation. (We will give the example for $\times$ error propagation after each of the three calculus expressions in 4a - 6c is presented.)

incompleteness in the cartesian product result:

$$s_{ei} = \{ x \mid \exists q_1 \in q_{ei}, \exists r_1 \in r_{ei}, x.Q = q_1, x.R = r_1 \} \quad \cup \quad (5a)$$

$$\{ x \mid \exists q_1 \in q_{ei}, \exists r_1 \in (r_c \cup r_{ea}), x.Q = q_1, x.R = \oplus r_1 \} \quad \cup \quad (5b)$$

$$\{ x \mid \exists r_1 \in r_{ei}, \exists q_1 \in (q_c \cup q_{ea}), x.R = r_1, x.Q = \oplus q_1 \} \quad (5c)$$

For a composite object to be missing from $s$, one (or both) of its component objects must have been missing between $q$ and/or $r$. 5a covers the case where both are missing, and 5b and 5c cover the case for missing from $q$ and $r$ only respectively, and the correction operator is applied because tuples in $s_{ei}$ must be accurate by definition.

inaccuracies in the cartesian product result:

$$s_{ea} = \{ x \mid \exists q_1 \in q_{ea}, \exists r_1 \in r_{ea}, x.Q = q_1, x.R = r_1 \} \quad \cup \quad (6a)$$

$$\{ x \mid \exists s_1 \in s, \neg \exists s_2 \in s_{em}, \exists q_1 \in q_{ea}, \neg \exists r_1 \in r_{ea}, s_1.S_k = s_2.S_k, s_1.Q_k = \quad (6b)$$
$$q_1.Q_k, s_1.R_k = r_1.R_k, x.Q = q_1, x.R_k = r_1.R_k, x.R_a = <\text{'-'}>.R_a \} \cup$$

$$\{ x \mid \exists s_1 \in s, \neg \exists s_2 \in s_{em}, \neg \exists q_1 \in q_{ea}, \exists r_1 \in r_{ea}, s_1.S_k = s_2.S_k, s_1.Q_k = \quad (6c)$$
$$q_1.Q_k, s_1.R_k = r_1.R_k, x.R = r_1, x.Q_k = q_1.Q_k, x.Q_a = <\text{'-'}>.Q_a \}$$

$<\text{'-'}>.X$ is a "filler" tuple on a scheme $X$. It "fills in" uninstantiated values in $s_{ea}$ in the 6b and 6c expressions. For example, if $X = \{\text{Name, Phone, Gender}\}$, then $<\text{'-'}>.X = <\text{'-'}, \text{'-'}, \text{'-'}>$.

A tuple in the result of a cartesian product is inaccurate when its key value is not a mismember and at least one of the two tuples that it derives from were inaccurate in their respective source relations $q$ and $r$. 6a covers both of the tuples being inaccurate, 6b covers the $q$ tuple being inaccurate and the $r$ tuple accurate, and 6c covers the reverse.

We have completed presentation of $EPC_x$. The following example illustrates these semantics and aspects of $EPC_x$.

Example 5.4: Consider the following two relations and their error triples as $EPC_x$ inputs. The input relation Course describes which Department offers each Course. The input relation Department describes which School each Department is in. Functional dependencies are indicated below the column names. All relations have their error triples below them. Course has an inaccuracy: CS101 is offered by the CS Dept not the English Dept (see $C_{ea}$ below). Department has a mismember: Prof. Jones is not a Dept (see $D_{em}$ below). Department also has incompleteness: it is missing the Psych Dept (see $D_{ei}$ below).

| Course (C) | |
|---|---|
| Course | Dept |
| | Course → Dept |
| CS101 | English Dept |
| CS201 | CS Dept |

| Department (D) | |
|---|---|
| Dept | School |
| | Dept → School |
| English Dept | Humanities |
| CS Dept | Science |
| Prof. Jones | Science |

| $C_{em}$ | |
|---|---|
| | |

| $D_{em}$ | |
|---|---|
| Prof. Jones | |

| $C_{ea}$ | |
|---|---|
| CS101 | CS Dept |

| $D_{ea}$ | |
|---|---|
| | |

| $C_{ei}$ | |
|---|---|
| | |

| $D_{ei}$ | |
|---|---|
| Psych Dept | Humanities |

The result of the standard × operation is shown below and is called $CD$. <Course, $D$.Dept> is a composite key in $CD$ (as it is the minimal set of columns which functionally determines all others and this the definition of a key). For all operations we consider, the output key turns out to be uniquely defined.

| Course × Department (CD) | | | |
|---|---|---|---|
| Course | C.Dept | D.Dept | School |
| | Course → C.Dept | | D.Dept → School |
| CS101 | English Dept | English Dept | Humanities |
| CS101 | English Dept | CS Dept | Science |
| CS101 | English Dept | Prof. Jones | Science |
| CS201 | CS Dept | English Dept | Humanities |
| CS201 | CS Dept | CS Dept | Science |
| CS201 | CS Dept | Prof. Jones | Science |

We consider below the derivation of the output error triple: $<CD_{em}, CD_{ea}, CD_{ei}>$ as defined by $EPC_x$.

$CD_{em}$: A composite $CD$ object (i.e., a Course-Dept pair) is a mismember if, in either input relation Dept or School, the component object in $C$ or $D$ is a mismember. $CDem$ below indicates that both tuples in $CD$ with Prof. Jones as a $D$.Dept are $CD$ mismembers since Prof. Jones is a mismember in Department.

| $CD_{em}$ | | | |
|---|---|---|---|
| CS101 | | Prof. Jones | |
| CS201 | | Prof. Jones | |

$CD_{ea}$: A tuple on $CD$ is inaccurate if it is not a mismember, and either the Course tuple and/or the Department tuple, from its respective input relations, is inaccurate. $CD_{ea}$ below indicates that the CS Dept and not the English Dept is the correct attribute value for object CS101.

| $CD_{ea}$ | | | |
|---|---|---|---|
| CS101 | CS Dept | English Dept | - |
| CS101 | CS Dept | CS Dept | - |

$CD_{ei}$ : The Psych department is missing from input relation $D$.Dept. So for both member Courses in $C$ (i.e., CS101 and CS102) there should have been a tuple in $CD$ having the Psych department as $D.Dept$. All attribute values in incompleteness error tuples are present and accurate.

| $CD_{ei}$ | | | |
|---|---|---|---|
| CS101 | CS Dept | Psych Dept | Humanities |
| CS201 | CS Dept | Psych Dept | Humanities |

◇

Formally, $EPC_\times$ is error preserving as follows. Let $s = q \times r$. Let $EPC_\times$ be the calculus to compute $s_e$ from $q_e$ and $r_e$ for $\times$, so that $$EPC_\times (<q, q_e>, <r, r_e>) = s_e$$

$EPC_\times$ takes in two of <relation, error triple> - one for $q$ and one for $r$ - and returns an error triple $s_e$. Let $\times'$ be the standard $\times$ operation extended with $EPC_\times$ so that:

$$\times' (<q, q_e>, <r, r_e>) = <q \times r, s_e>$$

Then for $EPC_\times$ to be error preserving implies that $$\times (\oplus_r (q, q_e), \oplus_r (r, r_e)) = \oplus_r (\times' (<q, q_e>, <r, r_e>))$$

i.e., that Figure 5.2 commutes.

The following two theorems 5.3 and 5.4 together will show that $EPC_\times$ is error preserving.

Theorem 5.3 (cartesian product keys):
$$(\times (\oplus_r (q, q_e), \oplus_r (r, r_e))).S_k = \oplus_r (\times' (<q, q_e>, <r, r_e>)).S_k$$

Proof: see Appendix B. ◇

Theorem 5.4 (cartesian product attributes): For any $s_1 \in \oplus s_{p1}$ and $s_2 \in \oplus s_{p2}$ derived by $EPC_\times$, such that $s_1.S_k = s_2.S_k$, then $s_1.A = s_2.A$ for any $A \in S$.

Proof: see Appendix B. ◊

Theorem 5.3 states that the same set of key values results in $\oplus s_{p1}$ and $\oplus s_{p2}$. Theorem 5.4 states that, given a key value, the same set of attribute values result. Then we conclude that $EPC_x$ is error preserving.

5.6 The Equi-join ($\eta$) Calculus

A join is simply a selection over a cartesian product. Thus the join EPC may appear at first to be already defined - as the composition of $EPC_\sigma$ and $EPC_x$. But the selection operation, as we defined it, did not involve changes in functional dependencies. A column which was a key (attribute) in the selection input was a key (attribute) in the selection output. The same was true for the cartesian product. There is one form of equi-join, however, which results in a transitive dependency, requiring a separate EPC.

Transitive dependencies occur in an equi-join whenever an attribute in one relation is equated with a key in a second, and the key in the second has one or more attributes. For notation purposes we call this special case of equi-join a $\eta$-*join*. In this section we define $EPC_\eta$, the calculus for $\eta$-join.

The following equi-join (from Example 5.5 below) is an example: $\sigma_{C.Dept\ =\ D.Dept}$ (Course $\times$ Department). We assume that such transitive dependencies are created intentionally by the query originator - to instantiate the indirect attribute (as discussed in the cartesian product example) School of a Course. The following example illustrates these semantics and shows why the $EPC_x$ and $EPC_\sigma$ would not operate properly for this case.

Example 5.5: Consider the following equi-join, using the Course and Department tables of Example 5.4. The data which results is shown below in Course2. The equi-select, on the (intermediate) cartesian product in the join, results in the transitive dependency $Course \to Dept \to School$.

$$\sigma_{C.Dept = D.Dept} \text{ (Course} \times \text{Department)}$$

| Course2 | Dept | School |
|---------|------|--------|
| CS101 | English Dept | Humanities |
| CS201 | CS Dept | Science |

Course2: the η-join of Course and Department

There are two alternative interpretations for the output key: (1) Define inaccuracy in School relative to Dept, and leave Dept as part of the key in the result, as it was in Department, or (2) Define inaccuracy in School relative to Course.

Alternative 2 is the one we adopt. It maintains a minimal key, and it provides strictly additional information than alternative 1. The functional dependencies we care about are shown by Example below in Course2. The inaccuracy error table[1] is in Course2$_{ea}$ below Course2.

| Course2: | $\sigma_{C.Dept = D.Dept}$ (Course × Department) | |
|---|---|---|
| Course | Dept | School |
| | Course → Dept | Course → School |
| CS101 | English Dept | Humanities |
| CS201 | CS Dept | Science |

Course2: the η-join of Course and Department

| Course2$_{ea}$ | | |
|---|---|---|
| Course | C.Dept | School |
| CS101 | CS Dept | Science |

Course2$_{ea}$: inaccuracy error table for Course2 as computed by EPCη

---

[1] as the EPCη calculus would compute it

We always define error with respect to the root of the dependency tree (i.e., the key in a 3NF relation). Whereas before the join, accuracy of a School was defined relative to Dept, it is now relative to Course instead. Although Humanities is accurate relative to the English department in the relation Department, it is inaccurate relative to Course CS101 in Course2, and is thus defined to be inaccurate in Course2.

By comparison, the inaccuracy error tuple resulting from $EPC_\times$ and $EPC_\sigma$ would be:

| Course2$_{ea}$ | | |
|---|---|---|
| Course | C.Dept | School |
| CS101 | CS Dept | '-' |

Course2$_{ea}$: inaccuracy error table for Course2 as computed by $EPC_\times$ and $EPC_\sigma$

◊

We adopt an inner join interpretation in that an object $q.Q_k$ is removed if its join attribute value is not found in $r.R_k$, i.e., the inner equi-join operation we assume is the usual one:

$$s = \{ x \mid \exists q_1 \in q, \exists r_1 \in r, q_1.Q_{a1} = r.R_k, x.Q = q_1, x.R = r_1 \}$$

where $Q_{a1}$ is the join attribute.

Other important forms of natural join include equi-join on a common key, equi-join on common attributes, or joins using comparators other than '='. These do not create transitive dependencies, however, and are therefore covered under composition of $EPC_\sigma$ and $EPC_\times$.

Let $s = \eta\ (q, r)$, for input relations q and r on schema $Q$ and $R$ with keys $Q_k$ and $R_k$ and attributes $Q_a$ and $R_a$. We will not concern ourselves with attributes in $Q$ other than the join attribute, because error propagation in these is trivial and would unnecessarily complicate the calculus. We assume therefore a canonical $Q$ in which $Q_a = Q_{a1}$. Let $Q_{a1}$ and $R_k$ be the columns over which the equi-constraint $Q_{a1} = R_k$ will be applied to the cartesian product result $q \times r$. Thus, $s = \sigma_{q.Q_{a1} = r.R_k} (q \times r)$. Figure 5.3 below shows key and attribute relationships as they relate among columns in pre-query and post-query relations.

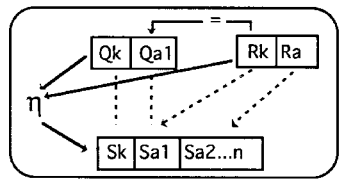

Figure 5.3: Relating pre- and post-query columns to meaning for η-join

The solid arrows show the query operations and the dotted arrows show the "movement" of columns among keys and attributes. For example, $S_k = Q_k$ (and $s.S_k$ contains values drawn from $q.Q_k$). $Q_{a1}$ and $R_k$ are equated in the join and thus collapse into a single column $S_{a1}$. $S_{a2...n}$ correspond to $R_a$. In Example 5.5 above, $Q_k = S_k$ = Course, $Q_{a1} = R_k = S_{a1}$ = Dept, and $R_a = S_{a2}$ = School. Prior to the join, $q.Q_k \rightarrow q.Q_{a1}$ and $r.R_k \rightarrow r.R_a$. After applying the equi-constraint, $S_k \rightarrow Sa1 \rightarrow Sa2...n$. As discussed in Example 5.5 will define the accuracy of values in $s.R_a$ relative to objects in $Q_k$ after the join where it was defined relative to objects in $R_k$ before it.

We now define some terminology to simplify subsequent discussion of error propagation in a η-join. A *match* is said to occur between two tuples $q_1 \in q$ and $r_1 \in r$ when the equivalence condition of the join is satisfied $q_1.Q_{a1} = r_1.R_k$. For example, tuples <CS101, English> $\in q$ and <English, Humanities> $\in r$ match, but <CS101, CS> and <English, Humanities> do not. A tuple $q_1$ is also said to *match a relation r* if there is any tuple $r_2 \in r$ such that $q_1$ matches $r_2$. A tuple $q_1$ is said to *match a tuple (a relation) in truth* when $q_1$ matches a tuple $r_1$ (a relation $r$) in truth, i.e., when $\oplus q_1.Q_{a1} = r_1.R_k$ ($\oplus q_1.Q_{a1} \in \oplus r.R_k$) respectively. If it were not the case that $\oplus q_1.Q_{a1} \in$ $\oplus r.R_k$, then $q.Q_k$ would be by definition a mismember in $s.S_k$ if present. The following example applies these terms.

Example 5.6: $<EC101, CS> \in q$ matches the relation $r$ if $r$ contains $<CS,$ Humanities$>$. Let Economics be the true Department for course EC101. Then $<EC101, CS>$ matches $r$ in truth as long as the <u>true</u> department for EC101, Economics, were in $\oplus r.R_k$. If this was not true, then there would be no match in truth, and EC101 would be a mismember if it appeared in s. ◊

We now define $EPC_\eta$. The calculus itself is copied exactly from the corresponding partition table in Appendix B. There we describe in more detail how the calculus is derived. The table there defines a partition on $r$ (and is used there as part of the proof for error preservation in $EPC_\eta$). Next to the expression identifiers (e.g., 7a, 7b, 7c below is an item number (i3, i7, i8) indicating the corresponding partition element.

inaccuracies in the η-join result:

| | |
|---|---|
| $sea = \{ x \mid \exists q_1 \in q_m, q_1.Q_{a1} = \oplus q_1.Q_{a1}, \exists r_1 \in r_m, q_1.Q_{a1} = r_1.R_k,$ $r_1.R_a \neq \oplus r_1.R_a, \exists r_2 \in r_{ea}, r_1.R_k = r_2.R_k, x.S_k = q_1.Q_k, x.R_a =$ $r_2.R_a, x.Q_{a1} = \text{'-'} \} \quad \cup$ | (7a)/i3 |
| $\{ x \mid \exists q_1 \in q_m, \exists q_2 \in q_{ea}, q_1.Q_k = q_2.Q_k, q_1.Q_{a1} \neq \oplus q_1.Q_{a1}, \exists r_1 \in$ $r, q_1.Q_{a1} = r_1.R_k, \exists r_2 \in \oplus r, \oplus q_1.Q_{a1} = r_2.R_k, r_1.R_a = r_2.R_a,$ $x.S_k = q_1.Q_k, x.Q_{a1} = q_2.Q_{a1}, x.R_a = <\text{'-'}>.R_a \} \quad \cup$ | (7b)/i7 |
| $\{ x \mid \exists q_1 \in q_m, \exists q_2 \in q_{ea}, q_1.Q_k = q_2.Q_k, q_1.Q_{a1} \neq \oplus q_1.Q_{a1}, \exists r_1 \in$ $r, q_1.Q_{a1} = r_1.R_k, \exists r_2 \in \oplus r, \oplus q_1.Q_{a1} = r_2.R_k, r_1.R_a \neq r_2.R_a,$ $x.S_k = q_1.Q_k, x.R_a = r_2.R_a * \}$ | (7c)/i8 |
| * on attr's differing on $r_1$ and $r_2$ and '-' otherwise | |

Under calculus expression 7a, a member tuple $q_1 \in q$, which is accurate on $Q_{a1}$, matches a member tuple $r1 \in r$ which is inaccurate on $R_a$ relative to $R_k$. Attributes in $R_a$ that are inaccurate relative to $R_k$ are, for this case, also inaccurate relative to $Q_k$, because other aspects of the join were correct.

Example 5.7 (expression 7a): The $\eta$-join of <CS101, CS Dept> and <CS Dept, Humanities> results in an inaccuracy as per expression 7a. <CS101, CS Dept> matches in truth, but the school of Humanities is inaccurate relative to both CS Dept and CS101. ◊

Under calculus expression 7b, a tuple $q_1 \in q$, is inaccurate on $Q_{a1}$. It matches a tuple $r_1 \in r$ which is a member of $r$, and which may or may not have $R_a$ values which are inaccurate relative to $R_k$ - it is irrelevant[1]. In either case, its $R_a$ values are accurate relative to $S_k$. $q_1$ must match $r$ in truth, else this case would be a mismember. The next example demonstrates this.

Example 5.8 (expression 7b): Assuming no class-level errors, consider the query $\eta$ ({<CS101, English Dept>}, {<English Dept, Science>}

Both facts are untrue, but together they indicate correctly that CS101 is offered by the School of Science. The resulting tuple is still inaccurate because the Dept of CS101 is not the English Dept. ◊

Under calculus expression 7c, a tuple $q_1 \in q$ is inaccurate on $Q_{a1}$ relative to $Q_k$. There exists an $r_1 \in r$ in which $r_1.R_a$ may or may not contain inaccuracies relative to $R_k$. $r_1.R_a$ is inaccurate relative to $q_1.Q_k$. Inaccuracies in $q_1$ lead to the s inaccuracy.
Example (expression 7c): Assume CS101 $\in \oplus q.Q_k$. The following query results in an s inaccuracy under 7c:

---

[1] the spurious join may have mapped $q_1$ to another tuple in $r$ with correct $R_a$ values relative to $q_1.Q_k$ $\eta$ ({<CS101, English Dept>}, {<English Dept, Engineering>})

We see from these examples that spurious or "random" pairings of attributes and keys can occur when join linkages are in error. The calculus must account fully for such phenomena for $EPC_\eta$ to be error preserving.

mismembership in the $\eta$-join result:

$$s_{em} = \{ x \mid \exists q_1 \in q_m, q_1.Q_{a1} = \oplus q_1.Q_{a1}, q_1.Q_{a1} \in r.R_k, q_1.Q_{a1} \notin \oplus r.R_k, x.S_k = q_1.Q_k \}$$ (8a)/i4

$$\{ x \mid \exists q_1 \in q_m, q_1.Q_{a1} \neq \oplus q_1.Q_{a1}, q_1.Q_{a1} \in r.R_k, \oplus q_1.Q_{a1} \notin \oplus r.R_k, x.S_k = q_1.Q_k \}$$ (8b)/i9

$$\{ x \mid \exists q_1 \in q_e m, q_1.Q_{a1} \in r.R_k, x.S_k = q_1.Q_k \}$$ (8c)/i11

Three distinct cases result in mismembers in $s$. Under 8a, an accurate $Q_{a1}$ value matches a mismember of $r$ - and therefore the match is spurious, i.e., $q_1$ does not match $r$ in truth (i.e., whether or not $\oplus q_1.Q_{a1} \in \oplus r.R_k$). Example: $\eta$ ({<CS101, CS Dept>}, {<CS Dept, Science>}) yields CS101 as an $s$ mismember if CS Dept were an $r$ mismember. Under 8b, an inaccurate $q_1.Q_{a1}$ matches with $r$ but there is no match in truth. Example: $\eta$ ({<CS101, English Dept>}, {<English Dept, Humanities>}) yields CS101 as an s mismember if CS Dept (the true CS101 Dept value) is not in $\oplus r.R_k$ (and regardless of whether the English Dept is a member of $r$). Under 8c, a mismember of q matches $r$. Clearly, a mismember of $q$ is a mismember of $s$ under any circumstances for $\eta$-join since, by the definition of an equi-join, $\oplus s.S_k \subseteq \oplus q.Q_k$. Example: Assume that course number CS995 is a mismember of $q$. Then $\eta$ ({<CS995, CS Dept>}, {<CS Dept, Science>}) yields CS995 as an $s$ mismember - regardless of whether CS Dept is accurate for CS995 and regardless of whether CS Dept is a member of $r$.

incompleteness in the η-join result:

$$s_{ei} = \{ x \mid \exists q_1 \in q_m, q_1.Q_{a1} = \oplus q_1.Q_{a1}, q_1.Q_{a1} \notin r.R_k, \exists r_1 \in r_{ei}, q_1.Q_{a1} = r1.R_k, \qquad (9a)/i5$$
$$x.S_k = q_1.Q_k, x.R_a = r1.R_a \} \cup$$

$$\{ x \mid \exists q_1 \in q_m, q_1.Q_{a1} \neq \oplus q_1.Q_{a1}, q_1.Q_{a1} \notin r.R_k, \exists r_1 \in \oplus r, \oplus q_1.Q_{a1} = r1.R_k, \qquad (9b)/i10$$
$$x.Q = \oplus q_1, x.R_a = r1.R_a \} \cup$$

$$\{ x \mid \exists q_1 \in q_{ei}, \exists r_1 \in \oplus r.R_k, q_1.Q_{a1} = r1.R_k, x.Q = q_1, x.R_a = r1.R_a \} \qquad (9c)/i12$$

Three distinct cases result in s incompletes. Under 9a, an accurate $q_1.Q_{a1}$ attribute value fails to find a match in $r$ because of an $r$ incompleteness. Under 9b, an inaccurate $q_1.Q_{a1}$ attribute fails to find a match in $r$, but it should have if it were accurate (i.e., $q_1$ matches $r$ in truth). Under 9c, an incompleteness in $q$ causes an incompleteness in s, but only if the incomplete tuple matches $\oplus r$. The propagation concepts which were illustrated in the examples for selection mismembership are similar to those relevant for selection incompleteness.

We have defined $EPC_\eta$. Appendix B is more detailed in its description of calculus derivation, relating each calculus expression and sub-expression to the columns and rows of the tuple partition presented there. We state the $EPC_\eta$ theorems next.

With $q$ and $r$ as η-join inputs, $s = \eta_\omega(q,r)$ where $\omega$ is the parameter specifying the join equi-constraint. $EPC_\eta$ operates as follows:

$$EPC_\eta (\omega, q, q_e, r, r_e) = s_e$$

Let $\eta_\omega$ be the standard η-join with parameter $\omega$, and let $\eta'_\omega$ be the standard η-join extended with $EPC_\eta$ so that $$\eta'_\omega (<q, q_e>, <r, r_e>) = <\eta_\omega(q,r), s_e>$$

Then, for the $\eta$-join calculus to be error preserving implies that $$\eta_\omega (\oplus_r (q, q_e), \oplus_r(r, r_e)) = \oplus_r (\eta_\omega (q, r), s_e)$$

i.e., that the diagram of Figure 5.1 commutes for $\eta$-join and $EPC_\eta$. The following two theorems together imply that $EPC_\eta$ is error preserving.

Theorem 5.5 ($\eta$-join keys):

$$(\eta_\omega (\oplus_r (q, q_e), \oplus_r(r, r_e))).S_k = (\oplus_r (\eta_\omega (q, r), s_e)).S_k$$

Proof: see Appendix B. ◊

Theorem 5.6 ($\eta$-join attributes): For any $s_1 \in \oplus s_{p1}$ and $s_2 \in \oplus s_{p2}$ derived by $EPC_\eta$, such that $s_1.S_k = s_2.S_k$, then $s_1.A = s_2.A$ for any $A \in S$.

Proof: see Appendix B. ◊

5.7 The Projection ($\pi$) Calculus

In a projection, a subset of the columns in a relation is removed and duplicate rows are then eliminated [19]. In order to consider error propagation under our model, this specification requires an interpretation in classes, objects, attributes, and their transformations from query input to output. As stated earlier, initial calculus inputs are assumed to be 3NF. Therefore, projection inputs are also 3NF. This is because, under standard query optimization heuristics, joins are done after projections [43, 58]. This reduces the complexity of the projection calculus, while sacrificing little or no generality.

Let $S$ be the projection list so $s = \pi_S(r)$. We will consider two cases. In the first (and more trivial) case, the entire key of $R$ is in the projection list $S$. In the second case, one or more of $R$'s key columns is not included in the projection list.

Example 5.9 (projection cases 1 and 2): Consider the relation scheme of Table 5.1 below. Student-Course is a composite primary key. The two attributes indicate the student's Grade received in the course, and the student's Rating of (i.e., satisfaction level with) the course.

| Student-Course | | | |
|---|---|---|---|
| Student | Course | Grade | Rating |
| | | Student-course→ Grade | Student-course→ Rating |

Table 5.1: Student-Course relation

Case 1 ($R_k \subseteq S$): Example: $s = \pi_{\text{Student, Course, Grade}}(r)$. Clearly, removing only attributes in a projection does not cause any "collapse" of keys. The same class and set of objects are represented in the output as in the input. The key in $S$ is the same as the key in $R$, i.e., Student-Course. Attribute values in $s$.Grade retain their accuracy status from $r$.Grade.

Case 2: ($S \subset R_k$): Example: $s = \pi_{\text{Course, Rating}}(r)$. Rating is not functionally determined by Course. Thus, since all attributes in $S$ must be determined by the key of $S$, Rating becomes part of the composite key in $S$. Course alone can not be a key in $S$ since it does not determine Rating. In general, $S = S_k$ for case 2 projection (this will be proven as Lemma 5.2).

◇

5.7.1 Projection case 1: $R_k \subset S$

In case 1, the entire key of $R$ is in the projection list, or $R_k \subset S$. Clearly, when this is true, $S_k = R_k$. The key columns, cardinality, and attribute-object relationships do no change from $r$ to $s$, so the error triple for $s$ is simply the projection of the error triple for $r$ as shown.

error triple for the case 1 projection result:

| | |
|---|---|
| $s_{ei} = \pi_S(r_{ei})$ | (10a) |
| $s_{em} = \pi_S(r_{em})$ | (10b) |
| $s_{ea} = \pi_S(r_{ea}) - \{ x \mid \exists r_1 \in r, \exists r_2 \in r_{ea}, r_1.R_k = r_2.R_k, r_2.S_a = <'-'>.S_a, x = r_1.S \}$ | (10c) |

10a and 10b indicate that incompleteness and mismembership propagate unchanged - removing attribute columns from a relation will not change these. 10c indicates that inaccuracies in $r_1 \in r$ propagate to become inaccuracies in $s$, but only as long as $r_1$ has inaccuracies on $S$ (i.e., has inaccuracies not only on columns that are removed by the projection). A simple example of when an inaccuracy does <u>not</u> propagate through a case 1 projection is as follows.

Example 5.10 (non-propagation of inaccuracy in project case 1): Let $R = \{Name, Salary, Age\}$. An inaccuracy in an Age value would not be propagated if $S = \{Name, Salary\}$. ◊

Let $_1EPC_\pi$ be the projection calculus for projection case 1. Formally, $_1EPC_\pi$ operates as follows.

$$_1EPC_\pi (s, <r, r_e>) = s_e$$

Let $_1\pi'$ be the standard projection operation extended with $_1EPC_\pi$ so that:

$$_1\pi'_S (<r, r_e>) = <\pi_S(r), s_e>$$

Then for $_1EPC_\pi$ to be error preserving implies that $$\pi_S (\oplus_r (r, r_e)) = \oplus_r (_1\pi'_S(<r, r_e>))$$

i.e., that $_1EPC_\pi$ is correct, or that the diagram of Figure 5.1 commutes for the $_1EPC_\pi$ calculus.

Theorem 5.7 (project case 1 keys):

$$(\pi_S (\oplus_r (r, r_e))).S_k = (\oplus_r (_1\pi'_S(<r, r_e>))).S_k$$

Proof: see Appendix B. ◊

Theorem 5.8 (project case 1 attributes): For $_1EPC_\pi$, any $s_1 \in \oplus s_{p1}$ and $s_2 \in \oplus s_{p2}$ such that $s_1.S_k = s_2.S_k$, then $s_1.A = s_2.A$ for any $A \in S$.

Proof: see Appendix B. ◊

5.7.2 Projection case 2: $R_k \not\subset S$

In case 2, $S$ contains only a proper subset of $R_k$, i.e., $R_k \not\subset S$. In this case, all of the input attributes in $S \cap R_a$ will become elements of the output key $S_k$. We state this and prove it formally in Lemma 5.2 below.

Lemma 5.2 (project case 2 key behavior): For a query $s = \pi_S(r)$, if $R_k \not\subset S$ then $S = S_k$ Proof: The definition of a key is that it is a minimal set of columns which determines the entire relation. In an input scheme $R$ having key column(s) $R_k$ and attribute column(s) $R_a$, by the definition of 3NF, attributes in $R_a$ are functionally determined by no proper subset of $R_k$. Therefore, no column in $R_a$ can be determined by $S \cap R_k$ if $R_k \not\subset S$. In order that $S_k$ determine $S \cap R_a$ (the definition of a key), then every element of $S \cap R_a$ must be an element of $S_k$, and therefore $S = S_k$. ◊

Table 5.2 below shows the partition of $S$ into two components, $S_{k1}$ and $S_{k2}$ where $S_{k1} = S_k \cap R_k$ and $S_{k2} = S \cap R_a$. Across the top of the table is the partition on $R$ and $S$, with the darkened rectangles indicating whether the associated columns in $R$ and $S$ are key or attribute. Below that are three comments on each partition: (1) a description of the partition meaning, (2) how error is computed for it, and (3) an

119 example for the sample query $\pi_{\text{Course, Rating}}(r)$ over $R = \{$Student, Course, Grade, Rating$\}$ from Example 5.9.

| R: | $R_k$ | | $R_a$ ($R_k \to R_a$) | |
|---|---|---|---|---|
| S: | $S_{k1}$ | | $S_{k2}$ | |
| Description: | key column in both $R$ and $S$ | key in $R$ not in projection | attribute in $R$ become key in $S$ | attribute in $R$ not in projection |
| Error computation: | class-level error info is propagated | NA | inaccuracy info is converted to class level error info | NA |
| Example: | Course | Student | Rating | Grade |

Table 5.2: Relationship among columns in case 2 projection

We maintain the $S_{k1}$ vs. $S_{k2}$ distinction because the input error information on the two is different. We have mis-classification information on $S_{k1}$ (i.e., on keys in $R$) and inaccuracy information on $S_{k1}$ (i.e., on attributes in $R$). Calculus expressions over the two will therefore be different. Because $S = S_k$, there is no accuracy information to consider in $S$, i.e., $S_a = \{\}$, and therefore no $s_{ea}$ calculation is needed. We begin with mismembership.

The two calculus expressions below indicate that $s_{em}$ tuples come from two disjoint parts of $r$ - from mismembers in $r$ (8a1) and from inaccuracies in $r$ (8a2). Expression 8a1 uses information on mismembership in $r.R_k$ to identify mismembers in $s$. 8a2 uses information about inaccuracies in $r.R_a$ to do the same.

mismembership in the case 2 projection result:

$$\{ s_1 \mid \exists s_1 \in s, \forall r_1 \in r, s_1.S = r_1.S, \tag{8a}$$

$$((\exists r_2 \in r_{em}, r_1.R_k = r_2.R_k, r_1.S \notin (r_c.S \cup r_{ei}.S \cup \{\oplus r_r.S \mid \exists r_r \in r_{ea} \})) \tag{$8a_1$}$$

$$\vee$$

$$(\exists r_3 \in r_{ea}, r_1.R_k = r_3.R_k, r_3.S_k \neq <\text{'-'}>.S_k, r_1.S \notin (r_c.S \cup r_{ei}.S \cup \{\oplus r_r.S \mid \exists r_r \in r_{ea} \})) \} \tag{$8a_2$}$$

In a case 2 projection, there will generally be a collapse of tuples, i.e., $|s| \leq |r|$. Thus, for a single tuple $s_1 \in s$, there may be several "parent" tuples in $r$ - i.e., tuples in $r$ having the same value on $S$. We say that there is a *correspondence* between this set of tuples in $r$ and the tuple $s_1$. Formally, if $r_{s1} \subset r$ corresponds to $s_1 \in s$ then $r_{s1} = \{ r_1 \in r \mid r_1.S = s_1.S \}$.

Calculus expression 8a has two sub-expressions, together stating that a tuple $s_1 \in s$ is a mismember iff all of its corresponding tuples in $r$ are either mismember ($8a_1$) or inaccurate ($8a_2$) and their value on S does not belong in s, i.e., it is not in $\oplus r.S$ (as usual $\oplus r.S = (r_c.S \cup r_{ei}.S \cup \{\oplus r_r.S \mid \exists r_r \in r_{ea} \})$).

Example 5.11 (expression 8a1 illustration): Consider Table 5.3 below. It shows the true and stored relations for both $r$ and $s$ as well as the error tables (as calculated by 8a) for each. The scheme of $R$ is AB as a composite key and the scheme of $S$ is B. The relations $r_{ea}$ ($s_{ea}$), $r_{em}$ ($s_{em}$), and $r_{ei}$ ($s_{ei}$) indicate the inaccurate, mismember, and incomplete tuples of $r$ ($s$) respectively.

| R | A | B | S | B |
|---|---|---|---|---|
| true r: | a1 | b1 | true s: | b1 |
| | a1 | b3 | | b3 |
| r: | a1 | b1 | s: | b1 |
| | a1 | b2 | | b2 |
| | a2 | b2 | | b3 |
| | ' ' | b1 | | |
| | a2 | b3 | | |
| $r_{ea}$: | | | $s_{ea}$: | |
| $r_{em}$: | a1 | b2 | $s_{em}$: | b2 |
| | a2 | b2 | | |
| | ' ' | b1 | $s_{ei}$: | |
| | a2 | b3 | | |
| $r_{ei}$: | a1 | b3 | | |

Table 5.3 for expression 8a: $r$ mismember results in $s$ mismember

Two main mechanisms to note in 8a1 are as follows. First, note that the presence of b1 in the <' ', b1> mismember tuple of $r_{em}$ does not make b1 a mismember of $s$, because not all tuples in $r$ with the value b1 on B are mismember (or inaccurate), i.e., <a1, b1> is not. In contrast, all tuples with the value b2 on B are mismembers in $r$ and thus b2 is a mismember of $s$. Second, note that although all occurrences of b3 are mismembers in $r$ (like b2), b3 is not a mismember in $s$ because it was part of the incomplete tuple in $r_{ei}$ <a1, b3> and thus belonged in $r$ in the first place.

◇

In 8a2, $r$ inaccuracies causes $s$ mismembers. For any tuple $r_1 \in r$ where $r_1.S_{k1}$ $\in r_{ea}.S_{k1}$ (and therefore whose $r_1.S_{k1}$ value alone would not cause a mismember in $s$), if the inaccuracies in the $r_1.S_{k2}$ columns cause $s_1$ to denote an object that is found in no tuple $r_3$ in $\oplus r.S$, then $s_1$ will be a mismember of $s$. As in 8a2, this form of error propagation is only sensitive to inaccuracies in $R.S_{k2}$ columns and not to inaccuracies in columns of $R_a$ that are projected out, i.e., i.e., $(R_a - S_{k2})$.

Example 5.12 (expression 8a2 illustration): Consider Table 5.4 below. Note that there are inaccuracies and incompletes in $r$, but there are mismembers in $s$ - as per expression 8a2. Several mismembership propagation mechanisms can be seen here. First, the handling of the null value in <a3, b2, ' '> in $r$ is identical to the handling of the c5 inaccuracy in <a1, b1, c5> in $r$. Both are inaccurate attribute values which cause mismembers in $S$ (<b2, ' '> and <b1, c5>). Second, note that, although <a2, b2, c4> is inaccurate on C, it does not cause a mismember because <b2, c4> is a correct value in the tuple missing from $r$, <a4, b2, c4>. ◇

| R | A | B | C | S | B | C |
|---|---|---|---|---|---|---|
|   |   |   | A→C |   |   |   |
| true r: | a1 | b1 | c1 | true s: | b1 | c1 |
|   | a2 | b2 | c2 |   | b2 | c2 |
|   | a3 | b2 | c3 |   | b2 | c3 |
|   | a4 | b2 | c4 |   | b2 | c4 |
| r: | a1 | b1 | c5 | s: | b1 | c5 |
|   | a2 | b2 | c4 |   | b2 | c4 |
|   | a3 | b2 | ' ' |   | b2 | ' ' |
| $r_{ea}$: | a1 | b1 | c1 | $s_{ea}$: |   |   |
|   | a2 | b2 | c2 |   |   |   |
|   | a3 | b2 | c3 | $s_{em}$: | b1 | c5 |
|   |   |   |   |   | b2 | ' ' |
| $r_{em}$: |   |   |   | $s_{ei}$: | b1 | c1 |
| $r_{ei}$: | a4 | b2 | c4 |   | b2 | c2 |
|   |   |   |   |   | b2 | c3 |

Table 5.4 for expression 8b: $r$ inaccuracy results in $s$ mismember

◇

We have completed the calculus for case 2 projection mismembers. We now consider the calculus to derive $s_{ei}$. Analogous to expressions 8a1 and 8a2 for mismembership, $s_{ei}$ is the union of two sets as shown below. First, an object incomplete from $r$ may cause an object to the be incomplete from $s$ (9a). Second, inaccuracies in $r.S_{k2}$ may cause objects not to be present in $s$ which should have been (9b).

incompleteness in the case 2 projection result:

$$s_{ei} = \{ x \mid \exists r_1 \in r_{ei}, r_1.S \notin r.S, x = r_1.S \} \cup \quad (9a)$$

$$\{ x \mid \exists r_1 \in r, \exists r_2 \in r_{ea}, r_1.R_k = r_2.R_k, \oplus r_1.S \notin r.S, x = \oplus r_1.S \} \quad (9b)$$

In 9a, an $r$ incomplete causes an s incomplete. Wherever there exists a tuple $r_1 \in r_{ei}$ whose value on $S$ is not present elsewhere in $r$, then an incomplete tuple results for s.

Example 5.13: (9a illustration) In Table 5.5 below <a2, b2> and <a3, b2> are missing from $r$ and there exists no tuple in $r$ with $r.B = b2$, so a <b2> incompleteness results in $s$. For the tuple <a4, b4> missing from $r$, b4 is not an incomplete in $s$ because a tuple does exist in $r$ with b4 as the B value (even though, in this case, b4 is part of an $r$ mismember).

|  | R | A | B |  | S | B |
|--|--|--|--|--|--|--|
| true $r$: | | a1 | b1 | true $s$: | | b1 |
| | | a2 | b2 | | | b2 |
| | | a3 | b2 | | | b4 |
| | | a4 | b4 | | | |
| $r$: | | a1 | b1 | $s$: | | b1 |
| | | a5 | b4 | | | b4 |
| $r_{ea}$: | | | | $s_{ea}$: | | |
| $r_{em}$: | | a5 | b4 | $s_{em}$: | | |
| $r_{ei}$: | | a2 | b2 | $s_{ei}$: | | b2 |
| | | a3 | b2 | | | |
| | | a4 | b4 | | | |

Table 5.5 for expression 9a: $r$ incomplete results in $s$ incomplete ◊

In 9b, an $r$ inaccuracy causes an $s$ incomplete. A tuple $r_1 \in r$ which is inaccurate on $r.S_{k2}$ results in an incomplete $s.S_k$ object if $\oplus r_1.S$ does not appear elsewhere in $r$.

Example 5.14: (9b illustration) In Table 5.6 below, the inaccuracy in <a1, b1, c2> results in <b1, c1> as an incomplete in the result because no <b1, c1> tuple exists elsewhere in $r$.

| R | A | B | C | S | B | C |
|--|--|--|--|--|--|--|
| | | | A→C | | | |
| true $r$: | a1 | b1 | c1 | true $s$: | b1 | c1 |
| | a2 | b1 | c2 | | b1 | c2 |
| $r$: | a1 | b1 | c2 | $s$: | b1 | c2 |
| | a2 | b1 | c2 | | | |
| $r_{ea}$: | a1 | b1 | c1 | $s_{ea}$: | | |
| $r_{em}$: | | | | $s_{em}$: | | |
| $r_{ei}$: | | | | $s_{ei}$: | b1 | c1 |

Table 5.6 for expression 9b: $r$ inaccuracy results in $s$ incomplete

◊

The following two theorems state that the EPC for projection case 2 $_2\text{EPC}_\pi$ is error preserving.

Theorem 5.9 (project case 2 keys): $\pi_S (\oplus_r (r, r_e)) = \oplus_r (_2\pi'_S (<r, r_e>))$

Proof: see Appendix B. ◊

We have shown $\text{EPC}_\pi$ to be error preserving for the two projection cases. This completes the presentation of the EPC for basic relational operators.

5.8 The Aggregation Calculus

An aggregate function such as COUNT, SUM, or MAX, takes a set of tuples as an argument and produces a single simple value (usually a number) as a result [33]. Example: (again using the Alumni table from Example 1.3.1)

>     select (SUM) Donations
>     from   Alumni
>     where  Degree = MS
>     group by State This query first partitions the input tuples on the group by columns and then it outputs, for each partition separately, the aggregate over the appropriate column. For this example, there will be a separate partition and sum computed for each State appearing in Alumni. State becomes the key.

Due to the deterministic nature of our model, the error propagation calculus for aggregations is a direct calculation (and thus will not be proven). Given a relation $s$ with error triple $s_e$ and a numeric attribute column $A$ then the true sum over column A is:

$$\sum_{x \in s_c.A} x \quad + \quad \sum_{y \in s_{ea}.A} y \quad + \quad \sum_{z \in s_{ei}.A} z$$

where cells containing nulls count as zeros, as in most SQL implementations. COUNT is analogous. The true COUNT of tuples in a relation (e.g., one of the partitions) $s$ is:

$$|s_c| + |s_{ea}| + |s_{ei}| = |s| - |s_{em}|$$

MAX and MIN aggregations would be direct as well, i.e., MAX($s.A$) = MAX (MAX($s_c.A$), MAX($s_{ei}.A$), MAX($s_{ea}.A$)).

5.9 Summary of the model

We have developed and proven correctness of the logical error propagation calculus for six relational database operators:

| OPERATOR | DESCRIPTION |
|---|---|
| selection | retrieve records filtering on attribute value. |
| cartesian product | all pairs of records across two tables. |
| projection | project on a subset of columns, collapse duplicates. |
| join | concatenate tuples across tables - link based on common key or attribute values. |
| count | count of tuples in a table. |
| sum | of values in a numeric column. |

For each <relational operator, error type> pair, a separate calculus expression was defined, i.e., one for each of inaccuracy, incompleteness and mismembership and for each of the operations above.

We have described an original approach to propagating error using a discrete space mathematical representation. The error state of an output relation is computed by the error propagation calculus as a function of input error. The calculus was defined for the relational operators: selection, cartesian product, join, projection, and aggregations such as COUNT, SUM, and MAX. The calculus embodies a framework describing how meaning and error propagate jointly in queries. A commutativity-based proof method was used to show that operators are correct. We illustrated aspects of the representation and calculus by example.

Interesting aspects of error propagation are made more understandable by this analysis. For example, it can be shown that for a $\eta$-join, the size of the database domains (and value distributions) will make it more or less likely for errors to "cancel each other out" in the transitive dependency across the join. The calculus is strictly external to the underlying data model it pertains to. This theory is intended to qualify and eventually certify data in live (e.g., legacy) databases. Database administrators will have a means for recording and analyzing discrepancies in, and corrections to, data. Original data can be maintained, optionally incorporating adjustments to data at query time. Our approach provides a more incremental and multi-agent perspective to data collection and analysis.

The calculus and its outputs are important to both users and to DBA's because, while DBA's may have knowledge about input error, users are concerned with output error. Because the calculus expressions "explain the reasoning" behind error propagation, DBA's can better understand how particular causes of error are impacting users.

Chapter 6
Two Probability Models of Error and its Propagation

An important and limiting characteristic of the logical model is that it assumes deterministic knowledge of error: if error is understood, then the true state of the world, is known. Inaccuracy in a number would be denoted by a single number (e.g., the true value, numeric difference, or percentage deviation) as in numerical analysis [4].

In practice, achieving such perfect state of knowledge is often difficult. More typically, we have only a general understanding about error patterns and mechanisms, involving uncertainty about causes or evidence of error. Quantitative measures of error can then only be estimated by actuarial method, subjective judgment, etc. A DBA may have a sense of how, when filling out a questionnaire, people misrepresent their personal demographics (e.g., their smoking habits). Uncertainty exists as to the true logical measure of error - we do not know who in particular is lying.

Where the logical model represents and propagates error as a single error state, the operands of the probability model are a conditional probability distribution over events within the logical error state space. Incompleteness might be represented as a distribution over the number of missing tuples, as well as a distribution over the true values of these missing tuples.

In this chapter we develop two probability models of error. The first is the *induced probability model* of error. This is the probabilistic representation and calculus which result from *lifting* the logical model (Chapters 4 and 5) into the probability domain. The motivation for the second model, called the *functional probability model* of error is in two shortcomings of the induced model which make it impractical for certain applications. One shortcoming relates to computational efficiency. The other relates to lack of "expressiveness" (e.g., human readability) in the error representation. We discuss these later before introducing the functional model.

Where the induced probability model operand is a probability measure over the entire error state space, the functional calculus operates on a partitioned set of event spaces. Certain event spaces are disjoint or independent. For example, the space of incomplete alumni will be treated as independent of the space of mismember tuples. These spaces are not distinguished in the induced model.

This chapter results in several key assertions:

(1) Within the logical model alone, and given Proposition 6.1 below, we have a full definition of the induced probability model - including a probabilistic error representation and error propagation calculus.

(2) The induced probability model accepts any and all possible distributions of error as inputs. For example, there is no inherent requirement that any probability distribution be uniform, normal, or independent.

(3) The induced probability representation is *complete*, in the sense that any probability distribution on the set of possible error states uniquely defines a probability distribution on the set of possible states of the world.

(4) The induced probability model is a strict generalization of the logical model. Both probability models are able to incorporate logical statements about error for events in the event space (i.e., probability = 1.0 is a valid probability for any error statement).

(5) The probability distributions output by the induced probability model are *correct* in that the probability distribution distribution on the output $s$ in the commutative diagram of Figure 5.1 is the same regardless of which path is taken.

(6) The functional model is a way of shaping the induced model towards practical application.

In the next chapter, we provide an integrated example, showing how several errors are represented as conditional probabilities, and how they propagate through selection, projection, count, and sum.

6.1 Induced Probability Model: Lifting of the Logical Model

The induced probability model includes a probabilistic error representation and propagation calculus. These are defined by the lifting of the sets and mappings of the logical model into the probability domain. The basic idea behind the lifting is as follows. While the logical error state space and mappings are defined at the level of individual error states (i.e., the logical error representation asserts a single error state as having probability = 1), the probability model allows for uncertainty about the error state. The relationship between the logical and induced probabilistic representations is illustrated below in Figure 6.1.

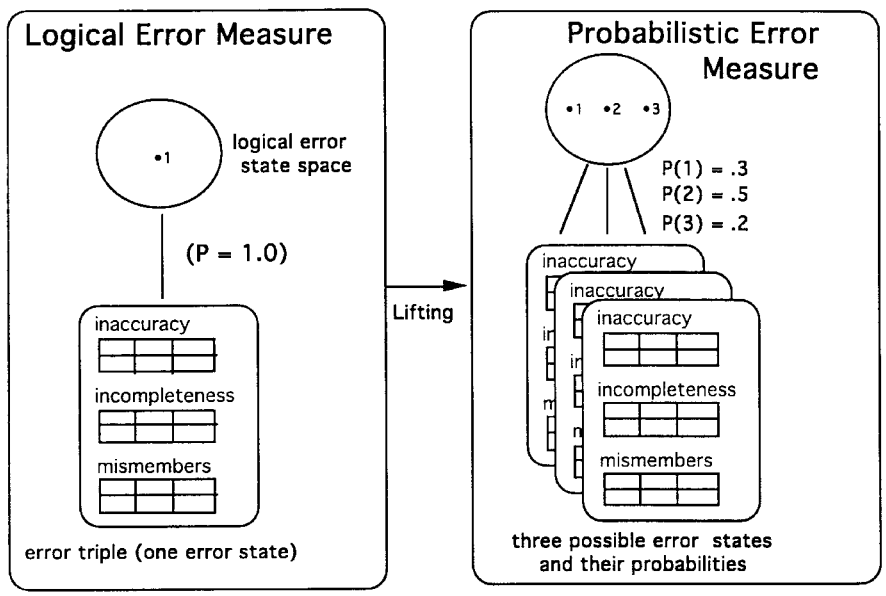

Figure 6.1: Lifting the logical model to the induced model

Probabilistically, an error measure in the logical model consists of a point mass of probability on a single error state, i.e., on a single logical account of discrepancy between data and truth (left hand side of figure 6.1 above). In the probability model, an *error measure* is a probability distribution over a set of (i.e., one or more) logical error states. In two regards, the logical error model serves as a basis for the two probabilistic error models. First, the error types of the logical representation define the sample and event spaces for probability assignment. Second, the input-output "error dependency structure" of the logical error propagation calculus indicates which aspects of error propagation the probabilistic calculus must model to maintain a closed mathematical system.

The functional model, unlike the induced probability model, can represent and propagate conditional probability distributions of error. The relationship among the Logical, Induced, and Functional models of error representation and propagation are shown below.

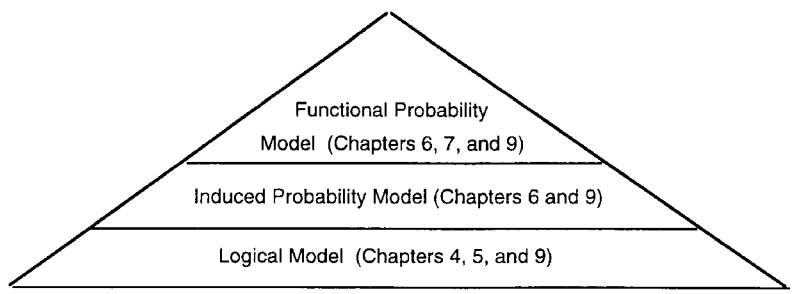

Figure 6.2: Logic and Probability models: layers built on those below

The induced model builds from the logical model (by lifting it into the probabilistic domain). The functional model relies on the semantics and correctness criteria defined by the induced model, but computes with functions.

6.1.1 Induced Probability Space Formalism

A *sample space* is a finest grain, mutually exclusive, and collectively exhaustive set of events of interest [28]. The sample space ultimately of interest to a database user is the set $W$ of possible states of the world[1]. The set of possible states of $W$ is bound by *context* [13] - a set of predicates, domains, and statements. Call the probability distribution over the set of states of the world $P_W(W)$. The *experiment* [28] in our probability model is the determination of an error state given a data set. A probability distribution of error will therefore define a probability distribution on $W$ (shown formally below in Theorem 6.1). In this regard, given data and

---

[1] The concept of a 'state of the world' is defined by elements in the database schema, e.g., names of the table define classes and names of columns define attributes of objects.

probabilistic knowledge of its error, we have probabilistic knowledge about the world itself (akin to premise 1 Chapter 3).

Assume that we are given a database $d \in D$ which asserts a single state of the world $w_1$ as true, i.e., which asserts that $P_W(w_1) = 1$.[1] As data quality analysts, we should always question the validity of this claim, suspecting that there may be undetected error in the data. The sample space over which the induced probability representation is defined is as usual the error state space $E = D \times W)$. We design distributions of error over $E$ (rather than over $W$) because the DBA, in explicating error knowledge, inputs knowledge not about the world but about error in the data.

6.1.2 Lifting Formalism

The following simple proposition is sufficient to define the lifting of the logical model into the probability domain:

Proposition 6.1 (mapping from point space to Probability space) A map $f$ from a set $A$ onto a set $B$ defines a map from the set of probability distributions on $A$ into the set of probability distributions on $B$.

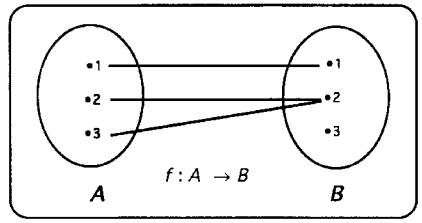

Figure 6.3: Proposition 6.1 graphic

Proof: Let $b$ be any point in, or subset of, $B$. Let $A_1$ be the subset of $A$ which is the pre-image in A of $b$ under $f$. The probability of the event $b$ is equal to

---

[1] This requires that there be no nulls or syntax errors in the data set as these correspond to no particular interpretation of W. In its basic form, our model requires all values (to "apply" and) to be filled in.

the probability of $A_1$. Since the probability of all $b \in B$ are fully defined based on $f$ and the probability distribution over $A$, then $f$ induces a mapping from the set $P_A$ into the set $P_B$, where $P_A$ is the set of possible distributions on $A$ and $P_B$ is the set of probability distributions on $B$.

◊

Proposition 6.1 concerns two spaces ($A$ and $B$) and a mapping between them ($f$). The logical model consists also of spaces and mappings. Proposition 6.1, as applied to the sets and mappings of the logical model, will lead to the probability representation and calculus of the induced probability model. The spaces of the logical model are: $D$, $W$, and $E$. The mappings of the logical model are:

- the correction mapping from $<D, E>$ to $W$,
- the difference mapping from $<D, W>$ to $E$, and
- the mapping(s) which are the EPC - from pre- to post-query relations.

The induced probability representation results from lifting the correction and difference mappings with Proposition 6.1. The induced probability calculus is results from lifting the logical error propagation calculus by the proposition. These are discussed below.

6.1.3 Induced Probability Model Representation

In Proposition 6.1, let $<D, E>$ play the role of $A$, let $W$ play the role of $B$, and let the logical model's relation correction mapping (Section 4.4) play the role of $f$. This defines a mapping from the set of all probability distributions on $<D, E>$ into the set of all probability distributions on $W$. This mapping is the induced model's *probabilistic error correction* operator. Its input operand is a probability distribution on $<D, E>$, its output is a probability distribution on $W$. (In practice we will be given a $d \in D$ as the table being characterized for error.) The induced error representation and error calculus are implemented by the simulation described in Chapter 9.

Now we consider the same formulation for the difference operation. Again, as per Proposition 6.1, let <D, W> play the role of A, let E play the role of B, and let the logical difference (Section 4.4) play the role of $f$. The induced mapping is the induced model's *probabilistic relation difference* operator. This defines a probabilistic difference between a probability distribution over the set of states of the world and over the set of states of data. This defines a probability distribution on E - the error term of the probability model.

We present below the probabilistic analog to the logical Theorem 4.1. It states that, given a table $d$, and given a probability distribution over E, then a unique probability distribution on W is specified. Therefore, a table and ant associated error distribution provide a unique and unambiguous probability distribution on the true state of the world.

Theorem 6.1 (induced probabilistic representation completeness) A table $d$, and any probability distribution on E together define a probability distribution on W.
Proof: this is a special case of Proposition 6.1, with the correction mapping as $f$, <D, E> as A, and W as B. See its proof. ◊

6.1.4 Induced Probability Model Calculus

The function of the probabilistic error propagation calculus is to propagate probability distributions of error through arbitrary user queries against the database. By proposition 6.1 and the logical error propagation calculus, we have such a set of mappings - from the set of possible input probability distributions of error into the set of output probability distributions of error.

In Proposition 6.1, let $A$ correspond to $E_a$ and $B$ correspond to $E_b$, where $E_a$ and $E_b$ are the error state spaces for the pre-query and post-query tables respectively. Let $f$ refer to a given EPC calculus mapping. By Proposition 6.1, this constitutes the corresponding EPC mapping in the induced probability model. The notion of correctness in a probabilistic calculus operator derives from concept of correctness in the logical calculus. And because we have proven correctness of the logical operations, then the correctness of the induced probability model is implied.

Definition 6.1 (induced probability model calculus correctness): A probabilistic calculus is correct if, in the commutative diagram of Figure 5.1, the probability distribution on $W$ (World) in the context of the post-query scheme (lower right hand corner of the commutative diagram) is the same regardless of whether path 1 or 2 is taken.

Theorem 6.2 (induced probability calculus correctness): The induced probability calculus is correct.

Proof: Using the formalism of Proposition 6.1, let $A$ be the set of pre-query error triples (the upper left hand corner of Figure 5.1), and let $B$ be the set of corrected post-query relations (lower right hand corner). We will consider whether path 1 and path 2 lead to the same output probability distribution. We know by Theorems 5.1 - 5.9 (logical model correctness) that the mappings of path 1 and path 2 are identical. Therefore, by Proposition 6.1, the induced probability calculus computes the same probability for each point in (output) $W$. Specifically $P_W(w_1)$ equals the probability of the pre-image in A of w, and these are equivalent, by the logical model correctness theorems, whether considering path 1 or path 2.

The induced probability model is all we need to propagate distributions of error. It succeeds therefore as a probabilistic representation and calculus. Two of its shortcomings are discussed below, which may limit the applicability of the induced probability calculus. We will then consider development of the functional probability model as an alternative.

6.1.5 Limits of Induced / Need for Functional Model

There are two key problems with the induced model as a model of probabilistic error representation and propagation. First, it defines a model of computation which is inefficient, e.g., slow and large. Second, it does not provide a convenient form for expression of error by DBA's - for making statements about error. We discuss these two in more detail below.

First, the induced probability model of error really equates to "running the logical model" over and over - once for each point in the error state space. Unfortunately, the error space may be very large - thousands, perhaps millions, of iterations of the logical model - one for each point in the input error state space - would be required to fully determine the output error distribution corresponding to an input error distribution.

The second shortcoming of the induced model is that it does not suggest any particular "language of error" which is useful and intuitive to humans. The model is a point space and a probability individually enumerated for each point in the space. This representation does not help us to reason about any "causal" links in the data/error - such as "aging of data causes incompleteness " - the conditional form for probabilities of error is not specified. In practice, a DBA would not say: *"The probability of error state 1 is x, the probability of error state 2 is y, ..."* 300 million times. Rather the DBA will want to make probabilistic (i.e., conditional) statements about error vis-a-vis evidence of error. The DBA may rather tell us: *"people tend to under-report their incomes when the true income is really high and over-report their incomes when their true income is really low"*. These may then be massaged into conditional distributions, either by subjective judgment or statistical measure. Although the same information is contained in the induced representation - it is less organized for human interaction with it.

6.2 Functional Probability Model of Error

The functional probability model should help us to overcome the two above-mentioned limitations of the induced probability model. The functional probability model will be started but not completed in this thesis. We instead provide a general strategy, framework, and example functional model operators. The next chapter works on these ideas by example. Their implementation is described for select, count, and sum in the simulation, Section 9.2.

6.2.1 Functional Probability Representation

Practically speaking, we believe that a probabilistic representation of error should be able to provide the following kinds of information:

- the probability that a given (e.g., random) tuple is mismember,
- the probability that a given tuple is inaccurate and that its true value is $x$ (a tuple variable),
- the probability that a given or random class member is incomplete, and
- the probability that a class member has value $x$ given that it is incomplete.

Such information - when structured in the proper mathematical framework - will allow us to understand and propagate a variety of biases in the data. Our probabilistic error representation framework covers these and these lead naturally to a calculus for relational queries including aggregate queries such as count and sum.

Consider the following example in the Alumni domain as an introduction to a more intuitive and useful conditional probability construction of error. Recall the Alumni schema repeated below

| Alumni | | | |
|---|---|---|---|
| Alum-name | Region | Employment Category | Income |

Table 6.1 : Example table with errors - Alumni relation

If the DBA believes for whatever reason that people under-report or over-report their income as a function of region (Europe, Texas, etc.) and employment category (CEO, manager, etc.), then we would write an error distribution which is of the form:

P ( Income-error = $x$ | Region = y $\wedge$ Employment-cat = z) = $p$ (Statement 6.1)

This probabilistic expression formalizes the English sentence: "error in income depends on the person's employment category and region". We can think of Region and Employment-category loosely as "causes" of error. This statement reflects knowledge about causes and amounts of error obtained by whatever means we may come to believe this.

Conditional statements about error may concern any and all error types. Statement 6.1 above concerns income inaccuracy. Mismembers might be represented as follows: (1) "the probability that a randomly chosen tuple in the table is a mismember is .1", and (2) "the distribution of values in a tuple given it is a mismember is $P_X(x)$" where $x \in X$ is a tuple variable on the table's scheme. Notice that these are of the form: P (mismember) and P( $X = x$ | mismember). In any probability model, given the marginal distribution P($a$) and the conditional distribution P( $b$ | $a$ ), we can deduce the full joint probability distribution p ( $a \wedge b$ ) [28]. Our goal in modeling error via conditional probability statements will be to maintain a full joint probability distribution on the error state space. When this can not be attained in practice, then there are limits in the facets of the output error distributions that can be known. Incompleteness of error distributions is an area for further research.

The functional probability representation, unlike the induced representation, can use such conditional descriptions of error. We may condition error upon

*evidence* of error contained in the table - examples and details of which will be discussed in Chapter 8 on error measurement and error knowledge acquisition. Roughly, evidence of error is any information which leads us to believe that error may exist in a particular subset of the data, including:

- evidence of (likelihood of) change in the world while data remain static, e.g., young people tend to move more often than older people, so we condition inaccuracy in region based on Age.

- evidence of (likelihood of) cheating on a tax return, e.g., self-employed tradesmen may cheat more easily than government employees,

- evidence of (likelihood of) data entry error (in a given tuple) based on unusual data syntax.

One key difference between the induced and functional models is that the functional model can describe and reason with more aggregated error *events*. An *event space* is a mutually exclusive and collectively exhaustive covering of the sample space, but need not necessarily be finest-grain [28]. The sample space was the error state space of chapter 4. Each functional calculus expression will compute an output event probability from input event probabilities. To do this we must be clear about the event spaces we are dealing with for each error type.

Figure 6.4 below shows event spaces of interest. These will tell indicate alternative ways of structuring functional statements about error.

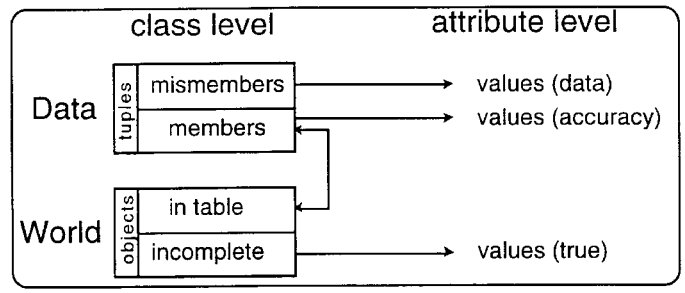

Figure 6.4: event spaces for the functional probability model

As per Figure 6.4, we note that data and world are distinct - data may potentially be in any state, regardless of the true state of the world. Data consist of tuples with their inaccurate (and possibly null) attribute values. The World consists of a class of objects with their true (but not necessarily recorded) attribute values. Tuples may be either member or mismember. Objects in the world may be either denoted in the table or not. When the data contain one or more true members, then there is an overlap between the set of key values in the table and the set of names of objects in the world. The two-headed arrow indicates this 1-1 correspondence. The sets of key values of missing objects and of tuples present in the data are disjoint. Therefore, inaccurate, incomplete, and mismember are defined as three disjoint spaces. Because aggregations operate over attributes of objects within a class, we must have an event space for attribute level errors (inaccuracy) as well. The single-headed arrows indicate that, in addition to consideration for class level errors (left hand side of graphic), attribute values must be modeled as a portion of the event space.

Let $t$ be a random tuple in a relation $r$. Let $o$ be a random object in the world which is in fact in $r$'s class. Let $x$ and $y$ be tuple variables on $r$'s scheme. Then the following statements describe alternative ways of structuring knowledge about data error for each error type. As per our standard definitions, let member (*t*) be the event that the tuple t is in fact a member of the table's class. Let mismember (*t*) be the event that the tuple t is in fact not a member of the table's class. Let incomplete (*o*) be the event that the object *o* is in fact a member of the table's class, but is not listed in the table.

| error type | item | functional representation expression |
|---|---|---|
| inaccuracy | 1 | $P(\oplus t = y \mid member(t) \wedge t = x)$ |
| | 1' | $P(member(t) \wedge t = x)$ |
| | or | |
| | 2 | $P(t = y \mid member(t) \wedge \oplus t = x)$ |
| | 2' | $P(member(t) \wedge \oplus t = x)$ |
| | | |
| incompleteness | 3 | $P(incomplete(o) \mid o = x)$ |
| | 3' | $P(o = x)$ |
| | or | |
| | 4 | $P(o = x \mid incomplete(o))$ |
| | 4' | $P(incomplete(o))$ |
| | | |
| mismembership | 5 | $P(mismember(t) \mid t = x)$ |
| | 5' | $P(t = x)$ |
| | or | |
| | 6 | $P(t = x \mid mismember(t))$ |
| | 6' | $P(mismember(t))$ |

Table 6.3: conditional expressions of event space probabilities

For encoding knowledge about the error type inaccuracy, we may either like to structure the information based on the two expressions of item 1 and 1' or on 2 and 2' above - and so forth for incompleteness and mismembership.

The two alternatives within each error type are alternative ways of maintaining a full joint probability distribution on the error state space. Notice again that within each item (number) above, the two expressions take the form: P($a \mid b$) and P($b$) yielding P ($a \wedge b$).

Such a formulations allows us to maintain a full joint probability distribution on the error state space. This structure depends on several underlying assumptions, described below.

Consider incompleteness, say, of an alumnus from the Alumni database. And consider expressions 3 and 3' above. Item 3' asks: "what percentage of the overall Alumni population would you estimate is missing from the database?". Item 3 asks: "does incompleteness depend on other attributes?". For example, are people living outside the U.S. more likely to be incomplete than those living in the U.S.? This is a way of asking in general: are the demographics of incomplete individuals any different from the demographics of individuals who are listed? If they are the same, then for certain queries (e.g., an average) we might consider the available tuples as perfect surrogates for those not. A structured "error walk through" is begun in Chapter 8 on Error Knowledge Acquisition.

6.2.2 Assumptions Behind the Functional Representation

Two simplifying assumptions are implicitly being adopted for the probability model, based on the notion of a representation we describe. First, the three spaces over which inaccurates, mismembers, and incompletes are defined - are probabilistically independent. Incompleteness in a table should tell us nothing (conditionally) about the table's degree of inaccuracy. For example, the DBA could never make a statement of the following form: "people are more likely to provide inaccurate phone numbers if there are people missing from the database" or "if an incompleteness occurs, then it is more likely that a mismembership would occur". We do not view these as common characterizations of error. This assumption does not represent a fundamental restriction of the model, but it is an assumption of the model as described here. This model is a first, to which other extensions may be added.

A second assumption is that errors across tuples and across tables are independent. For example, the DBA could never make the statement: "Joe tends to under- or over-report his income depending on whether or not Pete under- or over-reports his" or "inaccuracy in Table 1 tends to be low whenever Table 2 has low inaccuracy". Such assumptions result from a more fundamental underlying assumption that each act of data collection (e.g., instantiation of a database tuple or an attempt to find and document an individual) is independent of others. Data/tuples are collected independently. The values and errors which we generate in one instance of data/tuple collection will not affect the values and errors generated in another.

This does not mean, however, that all data are collected by the same method. In the sense of metadata modeling more generally [57], we may like to attach to each tuple a concept called "data collection method", which indicates which tuples were generated by one data collection method (time, person, sensor, etc.) and which by another.

In general, we consider our model extensible however, so these assumptions may be dropped as part of future work.

6.2.3 Functional Probability Representation Examples

Four conditional error representation examples below illustrate in more detail the use of conditional probability expressions.

Example 6.1 (conditional inaccuracy representation) The Income_table below represents taxpayers with an identifier ($SSN$), declared income ($I$), and employment category ($EC$).

| Income_table | | |
|---|---|---|
| SSN | Income (I) | Employment Category (EC) |
| 142-06-4480 | 46,514 | self-employed |
| 113-22-4231 | 21,245 | retired |
| 775-95-4573 | 29,223 | corporate |
| ... | ... | ... |

Let $\varepsilon$ be the inaccuracy in an income figure (i.e., the reported value minus true value). We consider three cases (below). In (i), $\varepsilon$ is unconditional: income under-reporting is independent of other attributes. In (ii) $\varepsilon$ is conditioned on $I$ - under-reporting varies with income. In (iii) $\varepsilon$ is conditioned on $I$ and $EC$ - the self-employed under-report more so than do retirees or corporate employees.

(i) $\varepsilon$ independent of $I$ & $EC$: $\quad P(\varepsilon = e)$ (ii) $\varepsilon$ depends on $I$: $\quad P(\varepsilon = e \mid \oplus I = i)$ (iii) $\varepsilon$ depends on $I$ and $EC$: $\quad P(\varepsilon = e \mid \oplus I = i \wedge \oplus EC = ec)$ This example shows conditional distributions representing inaccuracy. The expressions correspond to item 2 in Table 6.3. Example 6.2 below illustrates the use of conditional error distributions for representing mismembership.

Example 6.2 (conditional mismembership representation) Consider a Student data set (table). Assume the table not been updated in one year. Even then, some of the tuples may have been older than others. Then the probability of a tuple being a mismember (e.g., the student in reality having graduated after the data refresh) will be conditional upon the Year the student entered the school and on the current Degree (PhD, MS, BS) being pursued: P (mismember(t) | Degree((t) = x), corresponding to item 5 in Table 6.3. ◊

In the next two examples, we illustrate the use of conditionals for representing incompleteness. But we will add another level of detail. The two examples concern incompleteness in the same table, but the structure of the conditionals and marginals is different in the two. The two options correspond to items 3/3' (example 6.3) and 4/4' (example 6.4) in Table 6.3. These two alternatives may be thought of as resulting from different ways of "measuring" incompleteness - one might correspond to a random sampling technique, while another may correspond to theorizing about error mechanisms - how/why/when error gets introduced.

Example 6.3 (form 1 conditional incompleteness representation) In the U.S. census, there is concern about accuracy in counts of the number of people living within a particular congressional district. This is because funding allocations from federal to local districts levels is based on population counts. Undercount of minority populations has been a particular concern historically [7, 32]. Because federal programs target differentially by individual demographics, it is important to know not only that an individual is missing (e.g., how many are missing in a given district), but other aspects of their race, age, income, etc. must also be estimated for the purpose of error modeling.

One methodology used by survey organizations is to randomly sample and record missing population members after the initial survey, sometimes called post-enumeration [7, 10, 26, 69]. In the case of the census, this includes visiting homes (i.e., addresses in town roles) to which survey forms were sent, but from which no response was received. Much greater resources are put into the post-enumeration households than the initial set of households. In post-enumeration, the probabilities for incompleteness may be structured as follows. Let $o$ be a random member of the population. Let $x$ be a tuple variable on the relevant database schema. Based on post-enumeration, we may generate the following two probability distributions:

(1) *The Marginal Distribution* $P$ ( Incomplete ($o$) ) : Given post-enumeration results, what is the probability that a true member of the population is missing from the original data?

(2) *The Conditional Distribution* $P$ ( $o = x$ | Incomplete ($o$) ) : Given that a person $o$ (a true member of the population) is missing, what is the likelihood that this person is : {male, female}, {black, white, asian, hispanic}, {legal resident, illegal alien}, etc. So we may ask for the "probability that $o = x$ given that $o$ is incomplete".

Given P( Incomplete ($o$) ) and given P( $o = x$ | Incomplete ($o$) ), we have the full joint probability distribution P ( Incomplete ($o$) and $o = x$ ) on the true population vis-a-vis the incompleteness error type.

◊

The example below shows the alternative formulations for the incompleteness probability measure using items 4 and 4'.

Example 6.4 (form 2 conditional incompleteness representation) If we did not have resources to do a post-enumeration survey, then we may have relied on probabilistic judgment by census experts - based on their experience with past data, intuition about people, etc. The focus of expert reasoning about incompleteness may be focused on the likelihood that a given population member is incomplete given his or her demographic profile. For example, the expert may believe that the likelihood of a legally employed female being included in the census is .9 while the illegally employed may tend to refute all efforts to log their existence in computer databases. The probability structure for such case is as follows:

(3) *The Marginal Distribution* P ( $o = x$ ).

(4) *The Conditional Distribution* P ( Incomplete ($o$) | $o = x$ )

Comparing expressions (3) and (4) to (1) and (2) we see that the full joint probability distribution over the incomepletes is defined by both.

◊

In the last four examples we saw how probability distributions of error may be defined over each of the three error types (class incompleteness, class mismembership, and attribute value inaccuracy). We saw in the last two examples (6.3 and 6.4) that the model of error may be structured differently depending on how we arrive at knowledge about error. As long as the information allows us to maintain a full joint probability distribution, then our probability model is fully satisfied. When only portions of this information is available, then we are limited in what we can say about output error across all queries.

When more than one error measure exists, then they may be combined into a single measure only to the extent that they are not mutually inconsistent. As an example of combining error measures - corrections for California Alumni tuples may be easily concatenated with the corresponding information for Ohio Alumni. As an example of when error measures can not be combined - one measure asserting that a table contains only mismembers is incomatible with another saying that the table contains inaccuracies.

6.2.4 Functional Probability Calculus

The induced probability error propagation calculus iterates over points in the logical space. It is not able to reason at the more abstract level of functions and conditional probability distributions. For example, imagine that a statistical methodology has determined that the error term on income for Alumni is some (discretized) normal distribution ( call it P (income-error) ). If a selection predicate asks for all individuals with income greater than some amount - how will this input normal distribution of error become a distribution on inaccuracy, incompleteness, and mismembership in the output. It turns out, as we will see in the next chapter, that a sum of binomial random variables perfectly models the number of incompletes and mismembers in the output. Such a functional view of error representation and propagation is not within the scope of the induced probability calculus.

Consider further as evidence of the limitations of the induced model the results of the projection : *Select Name, Employment-category, Income from Alumni.* It eliminates Region, a conditioning column in Statement 6.1 on Table 6.1.

| Alumni' | | |
|---|---|---|
| Alum-name | Employment Category | Income |

Table 6.2 : Projection loses discriminating conditional information

Then the direct result of Statement 6.1, i.e., the implication of Statement 6.1 in the context of Alumni' Table 6.2 would be :

P ( Income-error = $x$ | Employment-category = $z$)   (Statement 6.2)

as derived from the earlier Statement 6.1 (repeated here for convenience):

P ( Income-error = $x$ | Region = $y$ ∧ Employment-cat = $z$) = $p$  (Statement 6.1)

Propagating knowledge from Statement 6.1 to Statement 6.2 is a straightforward application of probability theory. Because we lose Region as discriminating information, the marginal must be computed within each Employment-category. As per Statement 6.2, "the amount of income-error depends only on the Region a person lives in" - the influence of Region has been folded in to the correlation between Region and Employment-category, and thus accounted for. The induced probability does not know how to compute over conditional functions in this way.

The functional probability calculus will take in conditional and marginal probability distributions of error on the input relation. These ideas are developed in an integrated example in the following Chapter 7 and in a simulation model in Chapter 9. Below is the beginnings of a functional calculus modeling propagation of conditional probability statements of error in the selection and projection operations.

6.2.4.1 Probabilistic Select Calculus

As with all functional model operators, the functional calculus operation for selection is defined over events and the input-output error dependency structure of the corresponding logical calculus operation. The form of the calculus will depend on the form of the input probability statements (e.g., which of the alternative expression forms from Table 6.3 will the input expressions be in).

Let tables $r$ and $s$ be input to and output from a selection respectively. The scheme of both is $R$, with $r_e$ and $s_e$ as error triples. $s_e$ must be computed by the calculus. Let $K \subseteq R$ be the key of $R$. As an example of the probabilistic events we may consider, let $s_1$ be a random tuple drawn from the output table $s$. Let $s_1.K \in s_{em}.K$ be the event that $s_1.K$ is a mismember of $s$. Then $P(s_1.K \in s_{em}.K)$ is the probability of this event. A conditional distribution such as $P(s_1.K \in s_{em}.K \mid s_1 = x)$ allows us to do assign a higher likelihood or degree of error to some subsets of the data(world) than to others (where $x$ is a tuple variable on $R$). We start with select mismembership.

mismembership in the select result:

| | |
|---|---|
| $P(s_1.K \in s_{em}.K \mid s_1 = x) = P(s_1.K \in r_{em}.K \mid s_1 = x)$ | (2a) |
| $+ P(s_1.K \in r_{ea}.K \wedge f(s_1) \wedge \neg f(\oplus s_1) \mid s_1 = x)$ | (2b) |

As per the logical calculus expressions 2a and 2b in Section 5.3, the error propagation calculus expressions 2a and 2b above state that two exclusive events among input tuples can result in an $s$ mismember. 2a covers the event that $s_1.K$ was a mismember in $r$, in which case (by definition of a selection) it is also a mismember in $s$. Assume now that the input table and errors are those of Example 1.3.1. Example of 2a: *Select * from Alumni where State = "CT"* yields Jon Wales as a mismember of $s$ as he was a mismember of $r$. 2b describes the other way a tuple may be a mismember in $s$ - when an inaccuracy in $r$ causes a tuple to be wrongly selected into $s$. Example of 2b: *Select * from Alumni where Donations > 450,000* yields Lisa Jordan as a mismember in $s$. Her actual donation was 400,000 while it was listed as

151

500,000 in the database. Although her database tuple satisfies f, her corrected tuple does not.

The probability of an output mismembership is a function of the probabilities of the these two types of input error events. The probability that a random output tuple $s_1 \in s$ is a mismember (given $s_1 = x$) is the probability that, for the tuple $s1 \in r$, and given $f(s_1)$, then what is the conditional probability - in $r$ - that $s_1$ is either a mismember of $r$ or $s_1$ is inaccurate resulting in false selection by $f$. And, because of the conditionals, a probabilistic "filtering" of error is going on. The selectivity of $f$ over conditioning variables may lead to different proportions of tuples in each error category.

The select calculus expression for inaccuracy is covered next. Whereas mismembership concerns objects and classes, inaccuracy concerns an attribute value vis-a-vis an object. As in mismembership, we adopt a conditional interpretation of inaccuracy. $y$ below is another tuple variable on R.

inaccuracy in the select result:

$$P(s_1.K \in s_{ea}.K \wedge \oplus s_1 = y \mid s_1 = x) = P(s_1.K \in r_{ea}.K \wedge \oplus s_1 = y, f(\oplus s_1) \mid s_1 = x) \quad (1a)$$

This equation describes the single event in the input event space that results in an inaccuracy in the output. This is the case where an inaccurate tuple $s_1$ of $r$ satisfies $f$, and the satisfaction is not spurious, i.e., it would have occurred even if the inaccuracy were corrected. This corresponds to item 1a in the logical error calculus. $f(\oplus s_1)$ ensures that $s_1.K \notin s_{em}.K$. Select inaccuracy example of 1a: *Select \* from Alumni where donation > 300,000* results in Lisa Jordan as an inaccurate tuple in $s$. She is not a mismember of $s$ as her donations are in fact greater than 300,000.

To conclude the functional selection calculus we consider incompleteness. Let $o$ be a random tuple from $\oplus s$. Let $t$ be the corresponding inaccurate tuple[1] in $r$ such that $t.K = o.K$. The reasoning behind calculus expression 3a-b below is analogous to that of the mismembership expression 3a-b in the logical error calculus. $P_s$ and $P_r$ represent probabilities on $s$ and $r$ respectively.

incompleteness in the select result:

$$P(o.K \in s_{ei}.K \mid o = x) = P(o.K \in r_{ei}.K \wedge f(o) \mid o = x) \tag{3a}$$
$$+ P(o.K \in r_{ea}.K \wedge f(o) \wedge \neg f(t) \mid o = x) \tag{3b}$$
$$P_s(o = x) = P_r(o = x \mid f(o)) \tag{3c}$$

We have defined a probabilistic calculus for propagation of a conditional error structure through selection. Our ample space and conditioning structure for each error type was described. The left hand side (LHS) of expression 2a corresponded to item 5 in Table 6.3, the LHS of 1a corresponds to item 1, the LHS of 3a corresponds to item 3, and The LHS of 3c corresponds to item 3'. Alternative forms for input probability distributions (e.g., items 4/4' or 6/6') would require different calculus expressions than those we have presented.

6.2.4.2 Probabilistic Project Calculus

Refer to example 1.3.3. There, Major was an attribute column in context of Alumni, but "became" an object in the Major table due to the projection. A propagation calculus must account for such semantic transformations and convert across error measures from one interpretation of data to another. Let $r$ and $s$ be input and output respectively for a projection: $s = \pi_S(r)$. Probabilistic project

---

[1] if its existed, i.e., if object $o$ was not incomplete propagation depends on the relationship between the projection list $S$ and the key $K$ of the input scheme $R$. If $S$ includes the entire key of $R$, then the key of $S$ and $R$ are the same, and the incompleteness and mismembership of $s$ and $r$ are the same. If the key is removed, then a new key arises (as in Major above) and error must be computed accordingly.

Another factor in the projection is the relationship between $S$ and the set of columns that are conditioning in the error representation. If conditioning columns are removed, then a new marginal distribution of error must be computed for on remaining columns in order to maintain error information. Example 3.4 below describes the calculus for projection incompleteness when the conditioning columns are kept and the key is removed.

Example 6.6 (project incomplete - conditioning columns kept, key removed)
The query and resulting table of Example 6.5 illustrate this case. Let $R_k$ be the key of $R$. Because $S$ is disjoint from $R_k$, there is a key change so that $S_k = S$.[1]
Define $o$ as in 3a-c above. We will compute incompleteness as $P(o.K \in s_{ei} \mid o.K = x)$. $P(o.K \in s_{ei} \mid o.K = x) = P(x \in s_{ei}) = P(x \in \oplus r.S \land x \notin r.S)$.

$P(x \in \oplus r.S \land x \notin r.S) =$ *(a)* 0 for $x \in r.S$, and *(b)* for $x \notin r.S$: $P(x \in r_{ei}.S \lor x \in \{\oplus t \mid \oplus t \in r_{ea}.K\}) = 1 - P(x \notin r_{ei}.s \land x \notin \{\oplus t \mid t \in r_{ea}.K\})$. ◊

This error propagation calculus expression indicates that object $o.S_k$ will be incomplete from $s$ if either incompleteness or inaccuracy in $r$ masked the fact that a member of $r$ in fact had $S$ value $o.S_k$. We give a fuller treatment and example of this in Section 7.3.3.

---

[1] We assume no transitive dependencies in $R$ as projection input is 3NF under standard optimization heuristics [58].

6.2.4.3 Probabilistic Aggregation : Count

A count operation reflects how many tuples are in a given table. In our error model, the true count is a derived random variable. Let $x$ be the number of tuples actually present in a table. Let $y$ be the number of incomplete objects, and let $z$ be the number of mismember tuples. Then by simple observation the true count is equal to $$x + y - z.$$

The data tells us $x$. So as long as the probabilistic error term gives a distribution on the number of incompletes ($y$) and mismembers ($z$), then the true count is fully (probabilistically) defined. Example: If the alumni DBA tells me:

*300 people are incorrectly listed as deceased* then the query *select name from alumni where Deceased = 'no'* would result in a table of exactly 300 missing. The DBA might have said instead:

*the likelihood of any individual reporting him or herself as dead is 1 in 1,000*

Then, given that there are nearly 70,000 alive and 30,000 dead tuples, a simple binomial model of lying about death can determine the distribution of numbers of incompletes in the result. Such a binomial model will be more fully developed in the next Chapter in an integrated error example.

6.2.4.4 Probabilistic Aggregation : Sum

The true sum is again a derived random variable, though it is a bit more complex than for count. Let $T$ be a table having a numeric attribute column A1 and having $n$ tuples. Let the aggregation be over $A_1$. Let $$\sum_{i=1,\ldots,n} a_1$$

be the sum over $A_1$, counting blanks as zeros.

First we consider adjustment to $\Sigma a_1$ regarding incompletes. Let $P_y(y)$ be the probability that the number of incomplete objects is $y$. Then, to adjust $\Sigma a_1$ for incompleteness in $T$, we add $z$, where $z$ is the random sum of a random variable. The random sum is over the random number ($|T_{ei}|$) of incomplete objects. The random variable is the value $t_1.A_1$ for a missing tuple $t_1$. A similar discussion applies to mismembers, but the random sum of random variables is subtracted. Let $m$ be that mismember adjustment, Then by simple observation the true sum random variable is equal to $$\Sigma a_1 + z - m.$$

This is done by example in Section 7.3.2. The count and sum calculi we have described here compute the same output distributions as the induced model would. The semantics are clearer from this discussion, however, because we explicitly acknowledge the conditional structure of error and the formulation of error as random sums of random variables, allowing for (increasingly) closed-form solutions. Propagating such sums functionally (e.g., without the inefficiencies of simulations or use of the induced model) will depend on the particular underlying distributions involved. We will model income inaccuracy as a normal distribution in the example of Chapter 7 and the simulation of Chapter 9.

6.2.5 Functional Calculus Conclusion

The functional error propagation calculus is a set of operators which take in a probability distribution over one event space, and output another probability distributions over another event space. Our detailed modeling of event spaces leads us to a closed form calculus. A functional error propagation calculus will usually be faster than its induced counterpart, so implementation of a functional calculus should avoid computation at the level of the induced point-space model - though this option is always available when closed form solutions are not available, for example when input distributions are not normal, random, or uniform. We have described the beginnings of such a calculus.

6.3 Probability Models - Conclusion

We have defined two probability models of error - the induced model and the functional models. The induced model results from the lifting of the logical model into the probability domain via Proposition 6.1. The functional model manipulates conditional probability distributions explicitly and leads, where possible, to closed form analytic formulas as a probability calculus.

Many uncertainty models embody assumptions about the "shape" of uncertainty (e.g., uniformity, independence, and normality [8, 18, 68]). These may or may not be valid in a given setting. The current model makes no assumptions about distributions, but only specifies what probabilities are relevant. Propagation of confidence and other intervals is a related area of research, i.e., when full distributions are not known, but interval estimates are available. An integrated example in Chapter 7 and a simulation in Chapter 9 will apply and further develop these operations.

Chapter 7

Alumni Database: an Integrated Probability Model Example

In this chapter we develop error distributions and analyze by example the propagation of probabilistic error measures through queries - further developing the functional error propagation calculus. The example will involve Alumni data and the database operations select, project, count, and sum. The input error types will be: inaccuracy, nulls, and incompleteness. Output (induced) error types are: inaccuracy, incompleteness, and mismembership. Though our analysis involves specific error types, distributions, and queries - it should illustrate for the more general case how we apply the logical model in a functional model framework. Aspects of this example are modeled in a simulation, described in Chapter 9.

We first present ten statements about sources of error in the Alumni database, as told to us by an Alumni database administrator (DBA). We then take three of these (for simplicity), explicate them as exact probability distributions of error, and propagate these through a set of queries, the most complicated of which is the aggregation:

*select sum (Income)*
*from Alumni*
*group by Region* or "give me the total amount of income earned by alumni in each region of the world".

The goal of the chapter is to illustrate:

(a) that statements made by an untrained (in error modeling) database administrator can be reasonably obtained and transformed into precise error distributions, and (b) that these distributions can be propagated by a calculus, in an application of the logical error representation and error propagation calculus we developed in Chapters 4 and 5.

7.1 Alumni database: summary of errors

We have drawn insights about the occurrence of error from various application and research domains, including:

- U.S. agencies such as the IRS, Census, and Energy Information agencies,
- a university alumni database system,
- a university property administration database system,
- several commercial financial data sources, and
- research in econometrics, marketing, and general surveying.

We studied the Alumni database in greatest detail and will use it here. Its users include the Fundraising Office - responsible for generating and maintaining alumni funding, as well as for coordinating Alumni activities. More generally, departments from around the University both use and contribute to this data set - contributing to its idiosyncrasies. Previously in an ADABAS Mainframe database, the data will soon (mid-1996) be going on line in a Sybase UNIX Client-Server database configuration. Suddenly, Fundraising personnel will be able to submit ad hoc queries against Alumni data - analyzing gift-giving habits in new ways as the data is newly unlocked. An analyst might then think to herself:

"I wonder how total Alumni income in a Region corresponds to Alumni donations in that Region. (e.g., I bet we bring in a more gifts, as a percentage of income, in Regions with a local Alumni chapter) This leads to a query of the form: "What is the total amount, within each Region, of alumni income?" (Query #3 below)

She should (but may not) further think to herself:

"I wonder if the data can support this query. I haven't run this query before. How will error in this data set impact the result? In short, What is the quality of the answer? Can I trust it?"

To learn about the alumni database we interviewed the alumni database administrator. The DBA's knowledge comes from years of experience entering and re-entering data and from a general understanding of how the data is collected and processed. We also spoke with several users of the data, to understand the kinds of queries run and how the data is used.

The interviewing effort we undertook to "measure" error is less expensive (and presumably less accurate) than measurement efforts such as the IRS's $550 million audit [1]. Many variations of error measurement are possible. Error measurement will be discussed in Chapter 8. Here we "concoct" a set of error probabilities ourselves - based on statements made by the DBA and on our own intuitions about the world.

We conceptualized the alumni database and its associated data collection as a process occurring over time, illustrated below in Figure 7.1.

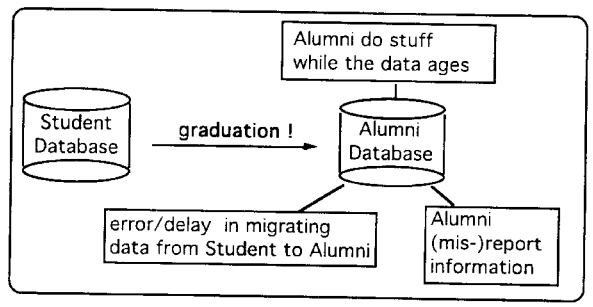

Figure 7.1: Alumni database - process and causes of error

We classify for this database three main "causes" of error: aging of data, mis-representation of truth, and processing delay/error .

- aging of data involves alumni changing their state (i.e., changing attribute values) while the database remains static,

- mis-representation of truth (e.g., alumni lying about their death as one example) - results from people intentionally "gaming" the system, and

- processing error concerns mistakes or delay in the data collection process (e.g., mis-keying of data).

Error probabilities due to these causes, will be cast in terms of the three error types inaccuracy, incompleteness, and mismembership. First we summarize ten explanations for error in the Alumni database environment, as described to us by the DBA. A subset of these will be later cast as formal probability distributions.

| |
|---|
| (1) People relocating (inaccuracy) : people tend to move every few years, with younger people moving more frequently than elderly. (And elderly sometimes have two homes - so that the field "home address" does not always mean "current-mailing-address"). |
| (2) Recent graduates (incomplete) : when graduation occurs, data is shipped from the university Student database to the Alumni organization for import into alumni. This process takes 5 to 8 weeks. During this time, recently graduated students are missing from Alumni. |
| (3) Income values missing (null) : only one out of four alumni provide an income figure. |
| (4) Duplicate entries (mismembers) : due to uncertainty about names (instances of individuals) being the same, sometimes second records are added for the same alumnus (this would be modeled as a mismember). |
| (5) Class-of change (inaccuracy) : Sometimes a student graduates late relative to their peers while in school (e.g., by a year due to extenuating circumstances). In order to be on the right mailing list for class-of 19xx social engagements, he or she may "switch to a previous Class-of". The solution in some cases was to change the value of the Class-of field. While correct in one context of application of the data, this is clearly incorrect in another. |
| (6) Income reporting (inaccuracy) : (among those who do report their income) wealthier alumni sometimes tend to under-report their income so as not to feel so obligated to contribute. A smaller amount of over-reporting occurs among lower income individuals - to appear wealthier. Higher variance in income exists for people who are self-employed |
| (7) Spurious deceased (inaccuracy) : people feign their own death (by mail) to stop getting mailings from the university alumni organization. |
| (8) Email addresses bad (inaccuracy) : as of the last mass e-mailing, eighty emails were bounced back as having invalid addresses. These are inaccurate. |
| (9) Mis-keyed ID's (inaccuracy) : When data entry is done by ID (e.g., pulling up a record by ID), if the ID is mis-typed, then random information can be put into someone else's record. |
| (10) "Switching" Class-of and Degree ((machine detectable) inaccuracy ) : database users decided (many years ago) to be clever with the data. Because alumni tend to gravitate towards their undergraduate institution, database users wanted to distinguish alumni who got their bachelors from this school vs. who got it from another school. The Degree variable only showed the "most recently attained university degree". To make it clear which Alumni got their undergraduate degree at this particular university, they would "switch" the year and degree variables, as illustrated in Table 7.2 below. The swapping of attributes indicates that Marc Pomper also has BS from the school, while Leah Baigell does not. Although this "violation of the schema" happens to be machine detectable - it is formally an inaccuracy in the data. |

Table 7.1: Errors described by the Alumni DBA

| Name | Degree | Class-of |
|---|---|---|
| Leah Baigell | MS | 1984 |
| Marc Pomper | 1983 | MS |

Table 7.2: Two sample records from Alumni table

These ten items reflect the DBA's knowledge about error - resulting from years of experience with alumni data. Descriptions of error (even if informal or somewhat inaccurate) may be of great value to a new or potential data user unfamiliar with the data and therefore unable to assess its usability for a given application. Even for an experienced user, when submitting a new query, we often know little about how input error impacts error on outputs. Below we transform three of these informal statements about error into formal probability distributions of error.

7.2 Probability representations of Alumni error types

The ten descriptions of error above used a "fuzzy" language for describing amounts and tendencies of error. Phrases were admitted such as "is more likely to" and "some degree of". Only in a restricted sense can such vague statements about error be propagated by our probability model. This is a subject of future research. In this section we construct formal probability descriptions of three errors:

- inaccuracy in the Region attribute (item 1 from Table 7.1),
- incompleteness in input Alumni (item 2 from Table 7.1, and
- nulls in income values (item 3 from Table 7.1).

We will apply these selectively in each of three queries in the following Section 7.3. We assume all tuples in the database to be one year old.

> Remark: We will make various assumptions and guesses about probability distributions of how often alumni move, where they move to, and how much they earn. These are of course subject to question. Our objective is not to demonstrate the correctness of any error measurement method. We work in the spirit that *any information about error is better than no information about error.* Even heuristics and subjective approximations should be valuable as "hints" about the true error state. More rigorous error measurements are not excluded from complementing or substituting for the analysis we provide.

7.2.1 Error Item #1: Region inaccuracy

This error source corresponds to Item 1 in Table 7.1, concerning the fact that people often move without notifying Alumni administration - the data does not (instantaneously) reflect change in the world. We will assume that information on Region is accurate as of the time reported by an alumnus. The only acknowledged source of Region inaccuracy will be aging of data, i.e., people changing region without corresponding database update.

There are 99 Regions in the Alumni database, with each region corresponding to a geographic segment of the world. Examples of some of the region values from the database are given below.

| Region-code | Region name |
|---|---|
| 1 | MAINE |
| 14 | NY-SCHENECTADY |
| 15 | NY-SYRACUSE |
| 16 | NY-ROCHESTER |
| 17 | NY-BUFFALO |
| 20 | NY-NEW YORK CITY |
| 21 | NY-LONG ISLAND |
| 22 | NY-WESTCSTER-FAIRFLD |
| 23 | NEW JERSEY |
| 24 | PA-PHILADELPHIA |
| 25 | PA-EASTERN |
| 26 | DELAWARE |

| 28 | DISTRICT OF COLUMBIA |
| --- | --- |
| 31 | CAROLINAS |
| 33 | ALABAMA |
| 34 | FL-JAXSONVL-ORLANDO |
| 35 | FL-ST PETERSBURG |
| 36 | FL-MIAMI |
| 86 | CENTRAL AMERICA |
| 87 | WEST INDIES |
| 90 | SOUTH AMERICA |
| 93 | EUROPE |
| 94 | AFRICA |
| 96 | ASIA |

Table 7.3: Sample Region codes from the 99 existing in the Alumni database

Notice that Regions may range from entire continents (e.g., "Africa") to a single U.S. City (e.g., "St. Petersberg, FL"). We assume that the regions define a mutually exclusive and collectively exhaustive division of the Earth's regions. We will define a probability distribution of *true-Region* (i.e., current Region) as a function of *listed-Region* (i.e., the Region in the data). We will require the answer (probabilistically) to two questions: (1) How often do Alumni change Regions? and (2) Where do they move to? These are discussed next.

How often do people change Regions? We partition the alumni population on the Class-of and Region attributes, because we believe that the probability of someone changing Regions in a given year is a function of that person's age and the person's current Region. Older people move less, and people in the U.S. move more (e.g., because of the finer granularity of Regions in the U.S.) Assume that people in their 20's, 30's and 40's move most. Assume that age of an alumnus at their year of graduation (e.g., Class-of) is 24[1], making Class-of 1962 the cutoff between younger and older alumni. Assume the following Region change frequencies, e.g., as determined by historical move patterns.

---

[1] Which could itself be a probability distribution, but we do not model it as such for simplicity.

| Region<br>Year (surrogate for age) | US | non-US |
|---|---|---|
| > 1962 (age < 50) | .06 | .02 |
| <= 1962 (age >= 50 ) | .02 | .01 |

<-- probability that an alumnus in this category will move regions in a given year Table 7.4: Region change frequency This table indicates, for example, that the probability that a random U.S. Alumni who is less than 50 years old would change Regions in a given year is .06. (A related statistical study: the U.S. Census bureau recently stated that, ending March, 1994, people changed addresses at a rate of approximately 17 % on average - down 3 % from twenty years earlier.)

Where do people move to? Assuming that alumni tend to move towards the most populated areas, we model the probability of a given location as being the one moved to based on its percentage of the total population size for all regions combined. So, for example, if Europe had 20% of university alumni, then the probability of an alumnus moving to Europe is .2 [1], given that the alumnus has moved Regions.

In summary, the frequency of move is a function of listed-Region (i.e., U.S. vs. non U.S.), and the distribution of Region moved to is a function of the size of the moved-to region as a percentage of total alumni-population. These are diagrammed below.

---

[1] i.e., an alumnus can "move" regions back to his or her own region.

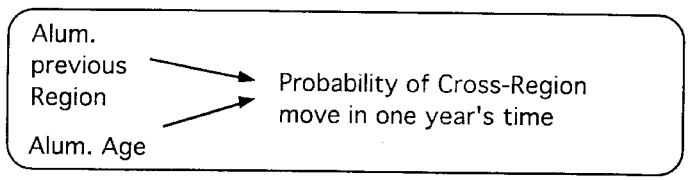

Age and region conditionally determine move frequency

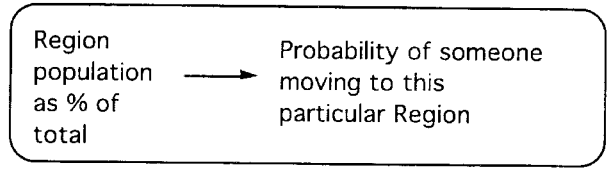

Region population conditionally determines frequency of moves going there

Input tuples are therefore partitioned[1] on these *conditioning attributes* (e.g., as per Table 7.4 above). Each partition element corresponds to a single configuration of values[2] in the conditioning variables. The importance of this fact is that, within each partition element, the same probability distribution of true Region exists for each tuple. The formulation for total number of incomplete or mismember alumni in a result can then be cast as a sum of random variables.

Let $p_m$ be the probability distribution of true-Region (i.e., today's true Region) for tuples in a partition element. Let #-$alum_x$ be a the number of alumni in a region $x$. Then, for example, $$p_m \text{(Illinois)} = \#alum_{\text{Illinois}} / \#alum_{\text{US}}$$

---

[1] a mutually exclusive and collectively exhaustive set covering

[2] as aggregated to the level of resolution in the conditioning attributes, e.g., age is one of 100 or so values, while we look only at over 50 and under 50 - 2 partition values.

Let $r_i$ be a region number $i$ (for regions $i = 1, ..., 99$). Let $o$ be the alumnus (in the world and identified by the name in $t_1$, where $t_1$ is a tuple in the database. Let $R$, $C$, and $TA$ stand for Region, Class-of, and Tuple-age respectively.

Then the general expression for Region inaccuracy is:

$$P( o.R = r_i \mid t_1.R, t_1.Y, t_1.TA )$$

which reads: "the probability that alumnus $o$ now lives in region $r_i$ is a function of: (1) $o$'s listed-region (the value $t_1.R$), (2) $o$'s Class-of (the value $t_1.C$), and (3) the time since $o$ last updated his database record. Each configuration of $C$ and $TA$ has a different probability of having moved across regions, and the value of $R$ will determine the probability distribution of the move-to Region.

This completes the characterization of Region inaccuracy (and timeliness indirectly). Next we consider incompleteness of Alumni in the input table.

7.2.2 Error Item #2: Alumni Incompleteness on Input

Here we model error as a probability distribution of the number of input incompletes and their Region and Class-of values. During the 5-8 week time window described there the Alumni database is incomplete. The most recent years' graduates (i.e., 1996 graduates) have not yet been transferred into the Alumni database from the Student database. For the same reason that the U.S.

The cause of input incompletes was the delay in updating Alumni data - Item 2 in Table 7.1. For the same reason that census organization visits households which did not return a Census form [32], we must say something about counts and attributes of missing alumni. And to know the total income of a region we must of course know which Regions incomplete alumni live in. Three issues of importance therefore, regarding these missing alumni, are:

- how many of these incomplete alumni are there?
- what regions do they live in?
- what are their Employment-category?

How much do incomplete Alumni make? Where do they live? We assume that these incomplete alumni have the same probability distribution on Age, Region, and Employment-category as did last year's graduates. In other words, we assume that the most recent graduates move after graduation in a pattern identical to the previous years' graduates. So if 2% of the graduating population became Engineers in Illinois last year, then we assume the same for this year. Let $p_{re}(x, y)$ be the probability that Region = $x$ and Employment-category = $y$ for these incomplete alumni.

We will condition an alumnus' Income distribution on his or her Class-of and Employment-category (CEO, secretary, etc.) attributes. We assume that older people make more money and that, other things being equal, an executive makes more than an analyst. The probabilistic dependency is illustrated below.

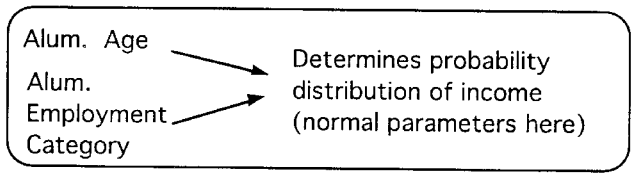

Figure: Determinants of Income distribution for an alumnus

These are given more detail below in Section 7.2.3.

We must also know how many of these missing Alumni there are. It was readily available by a phone call to the registrars office that 2,839 students graduated this past year. But not all of these are first time graduates - some are getting second degrees from the university. The Registrars Office estimated that 94% were first time University graduates. So the number of incompletes is exactly 2,839 * .94. Given 130,000 alumni records, we then have the conditional and the marginal for incompleteness:

P ( Random alumni incomplete) = 2,839 * .94 / 130,000

P ( Region = $x$ ∧ Employment-category = $y$ | Incomplete ) = $p_{re}$ $(x, y)$

This completes the characterization of Alumni incompleteness. Next we consider null values on the Income attribute.

7.2.3 Error Item #3: Income null values

This error corresponds to error item 3 in Table 7.1. More than three quarters of the alumni Income values are null (missing values). Most university alumni choose not to divulge this information or have never returned questionnaires. For us, the situation is even worse. For reasons of privacy, we could not get any income data. All listed-Income values in our copy of the Alumni data are *null*. As a solution to this total lack of income data, we will work with probability distributions of income, having not a single listed income value. This will illustrate the propagation of probabilistically imputed random variables [32] as surrogates for missing data. Income nulls will then contribute (probabilistically) to undercount in the total income of a region.

The conditioning attributes of Income are Class-of and Employment-category. Again, we are assuming that the older the alumnus and the higher the alumnus' rank, the greater the income. We model an alumnus' Income within a category as Normal ($\mu$, $\sigma^2$), where the mean and standard deviation are a function of alumnus age and employment code:

$\mu = (\text{Age}^1 + 20) * \text{Employment-code} * \$1,000 \text{ and } \sigma = \mu/2$  (Equation 7.1)

Sample employment categories from the Alumni database are listed below in Table 7.5. An Employment-code is an aggregation of these to either:

- Administrative (value = 1)
- Analyst/Engineer (value = 2),
- Managerial (value = 3), or
- Executive (value = 4).

The mapping from Employment-category to Employment-code is assumed. Examples are listed in Table 7.5 below.

| Position name | Employment-category | Employment-code |
|---|---|---|
| Architect | 00121 | 2 |
| Chairman | 00301 | 4 |
| Chief Exec Officer | 00302 | 4 |
| President | 00303 | 4 |
| Vice President | 00304 | 4 |
| Dir/Head of Dept | 00305 | 3 |
| General Manager | 00306 | 4 |
| Manager | 00307 | 3 |
| Comptroller | 00309 | 3 |
| Treasurer | 00310 | 2 |
| Accountant | 00311 | 2 |
| Bookkeeper | 00312 | 1 |
| Analyst | 00314 | 2 |
| Secretary | 00315 | 1 |

Table 7.5: Alumni employment categories

We have defined a probability distribution for each of the three error items 1, 2, and 3 in Table 7.1. We could add various other modeling assumptions, but these

---

[1] Age = 1996 - 1962 - 24 would unnecessarily complicate the example. Rather, the important point is that the various heuristics we have developed for error define a probability distribution over world (W), given the data (D). These are propagated next in Section 7.3.

7.3 Propagation of "functional" error

In this section we discuss three queries, involving four relational operations over three forms of input error - calculating three output error types: inaccuracy, incompleteness, and mismembership. The three input errors are inaccuracy, nulls, and incompleteness. The first two queries will build up to the more complex Query #3:

> QUERY #3: select sum (Income)
> from Alumni
> group by Region

Its objective is to answer: *how much do living alumni earn in each region?* Our objective will be to quantify error in the total income statistic derived from the raw data. The graphic of this query is Figure 7.2 below.

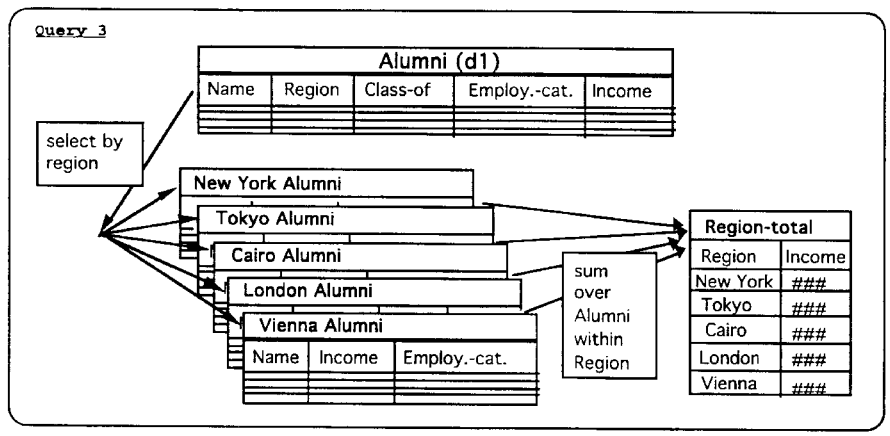

Figure 7.2: Graphic of Query #3, sum income by region

This query uses selection, projection, count, and sum in the following sense:

| selection | Partition of Alumni by Region, Employment category, & Class-of |
|---|---|
| count | Counts of Alumni within a Region (e.g., to account for incompletes) |
| sum | Adding income across Alumni within Region. |
| projection | Region the attribute becomes a key (object) in the result |

We begin by analyzing error propagation in Query #1 - a first step towards Query #3.

> QUERY #1: select count (Name)
> from Alumni
> where Region = 'Illinois'

This gives the number of alumni in Illinois and is illustrated in figure 7.3 above.

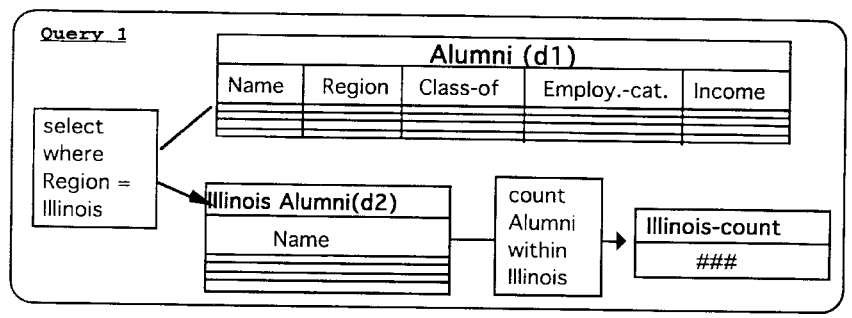

Figure 7.3: Graphic of Query #1, determining Alumni count in Illinois

With the modification of "count (Name)" to "sum (Income)" Query #1 becomes Query #2:

> QUERY #2: select sum (Income)
> from Alumni
> where Region = 'Illinois'

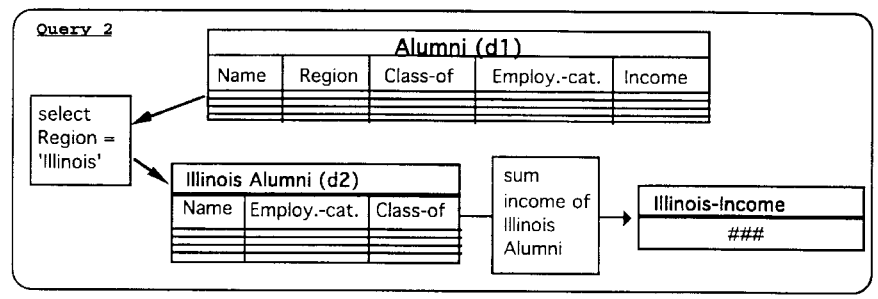

Figure 7.4: Graphic of Query #2: Sum income in Illinois

Extending Query #2 with "group-by Region" (and removal of "Region = Illinois"), this becomes Query #3 given previously. We begin with Query #1.

7.3.1 Query #1: Select/count, input error item 1

> select count (Name)
> from Alumni
> where Region = 'Illinois'

Input error: Region inaccuracy, Item 1 Table 7.1

Output error:  Count inaccuracy
              intermediate (d2) incompleteness

This query tells us the number of alumni living in Illinois. As discussed in Section 5.8 on the logical calculus, a count query may be implemented as first a selection for tuples satisfying the selection predicate (e.g., "where Region = 'Illinois' ") - and the count result is the total number of such tuples (Figure 7.5). The only assumed error for Query #1 will be error item 1 in Table 7.1 - Region inaccuracy due to database aging. The flow of error in this query, with its single input error, is shown below in Figure 7.5. This diagram corresponds to the graphic of Query #1 itself in Figure 7.3 above.

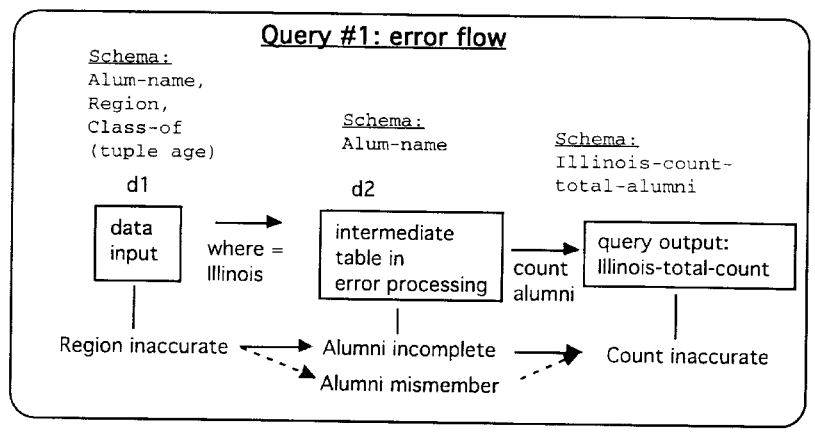

Figure 7.5: Query #1 Error flow, Region inaccurate -> Illinois-count inaccurate

We will compute probabilities and analyze error propagation only along darkened arrows. For dashed arrows, there is error propagation, but we will not analyze these aspects here. (Refer to the logical calculus for an understanding of the structure of the arrows - i.e., which input errors cause which output errors.)

Region inaccuracy leads to Alumni incompleteness and mismembership in the intermediate table $d_2$, where $d_2$ is the output of *Select Name from $d_1$ where Region = 'Illinois'*. If we select on an inaccurate attribute, incompleteness and mismembership occurs. Inaccuracy does not exist in $d_2$ as its schema has only a key and no attribute columns (a count only requires a key column). Each tuple incomplete from $d_2$ contributes +1 to undercount, and each mismember in $d_2$ contributes +1 to overcount. We will develop the probability calculus for incompleteness and conclude that mismembership is analogous.

We know from the logical calculus that an incomplete tuple in the output of a selection results from one of two possible input events (Section 5.2 Expressions 3a and 3b). First is when an incomplete from input Table $d_1$ would have satisfied the predicate (i.e., the query's where-clause) had his or her corresponding tuple been present. Second, an inaccurate Region in table $d_1$ may wrongly list an alumnus as not living in Illinois when in fact he does. We say: "the number of output incompletes equals the number of input incompletes which would have been selected had they been present, plus the number of inaccurates which would have been selected had they been corrected". We assume only the inaccuracy condition for this query.

To the number which is output from applying Query #1 to the corrupted Alumni database, we must add the number of incompletes and subtract the number of mismembers in $d_2$. Let $|d2_{ei}|$ and $|d2_{em}|$ be random variables corresponding respectively to the count of incompletes and the count of mismembers. The expression:

$$|d2| + |d2_{ei}| - |d2_{em}|$$

then represents the true (i.e., error-adjusted) resulting output count for Query #1.

We now compute the probability distributions for $|d2_{ei}|$. $|d2_{ei}|$ equals for this case the number of tuples in $d_1$ which are not selected into $d_2$ but would have been had they been accurate. The reasoning by which an incomplete results in $d_2$ is in Figure 7.6 below. This is a decision-tree format and shows the sequence of operations to determine which tuples are incomplete from a selection output, i.e., those that result in the lower right hand corner of the diagram.

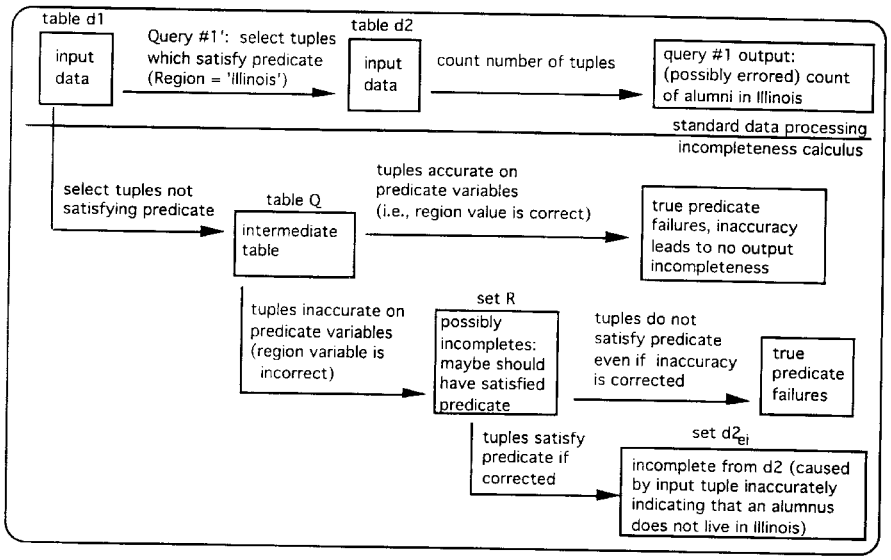

Figure 7.6: Derivation of incomplete /undercount in Query #1 output

Let $\varepsilon$ be the random variable representing $|d2_{ei}|$. $\varepsilon$ represents the probability distribution of the number of incompletes. It is defined based on: (a) Query #1, (b) the probabilistic description of input Region inaccuracy, and (c) the given data set $d_1$. We will conclude in this section in that $\varepsilon$ is a sum of independent binomial random variables.

Let $Q$ be the set of tuples rejected by Query #1, i.e., Table $Q$ in Figure 7.6 above. These are the tuples output from the following query applied to the input data $d_1$:

$Q$ = Select Name from Alumni where Region not-equal 'Illinois'

Then the likelihood that a given alumnus in Table $Q$ is actually incomplete from $d_2$ is the same as the probability that the tuple would have been selected into $d_2$ had it been corrected. Let $t_1$ be a random tuple in $Q$. Let incomplete($t_1$) be the event that $t_1$ is incomplete from d2. Let $f$ be the selection predicate ("= Illinois" in this case). Let $f(\oplus t_1)$ be the event that the corrected $t_1$ satisfies the selection predicate. $\neg f(t_1) \wedge f(\oplus t_1)$ $\rightarrow$ incomplete($t_1$) as per the logical calculus.

If there are $n$ tuples in a partition element $i$ (Table 7.4), and each tuple has a probability distribution $p_{ri}$ for true-Region, then the likelihood is given that any tuple $t_1$ has true Region value $\oplus t_1$.Region = 'Illinois'. Call this probability $\omega_i$. Then the total number of incompletes coming from partition element $i$ (i.e., one element from the partition in Table 7.4) is binomial ($n_i, \omega_i$). The same argument holds for the other three partitions but with different $n_i$ and $\omega_i$. $\varepsilon$ is then, for this case, the sum of four binomials - each binomial being associated with a different element of the partition. In general, where $Q$ has $l$ partition elements ($l = 4$ in Table 7.4) :

$$\varepsilon = \sum_{i=1,...,l} Binomial\ (n_i, \omega_i) \qquad \underline{(Equation\ 7.2)}$$

The following SQL query would generate all $n_i$ :

*select count (Name)*
*from Alumni*
*where Region not-equal 'Illinois'*
*group by Region, Class-of*

To compute the $\omega_i$ for partition element $i$, this is the sum of the values which $p_{ri}$ takes over the space of all predicate attribute value combinations which satisfy the predicate. In this example it is simply the value of $p_{ri}$ at Illinois. If the predicate had been 'Where Region = Illinois or Iowa', then this value would be the value of $p_{ri}$ at Illinois plus the value of $p_{ri}$ at Iowa. In general, $n_i$ and $\omega_i$ depend on the predicate applied in the query. Our analysis is for the restriction *where Region = 'Illinois'*.

In this example we have considered how aging of a database table affects Region inaccuracy, which in turn impacts output counts due to incompleteness in the intermediate table $d_2$. We developed a probability distribution of true-region as a function of three variables: Region, Class-of, and tuple age. We assumed a single input error - inaccuracy in Region due to tuple aging.

MISMEMBERSHIP

We summarize here how the calculation of mismembership in this query relates to calculation of incompleteness just discussed. A mismember in the output of a selection - also according to the logical calculus - results again from one of two input events. First is when a mismember tuple satisfies the predicate. Second, an inaccurate Region may wrongly list an alumnus as living in Illinois when in fact s/he does not (Section 5.2 Expressions 2a and 2b). We say: "the number of output mismembers equals the number of input mismembers which get selected plus the number of inaccurates which were selected but would not have been had they been corrected".

The calculus for mismembership will be analogous to the calculation of incompleteness. It also involves the sum of binomials, but the differences in the calculation for mismembership are as follows:

- the set of tuples which may possibly be mismembers (i.e., the population over which the binomial will be defined) is the subset of tuples in d1 which satisfy the predicate, i.e., table d2 in Figure 7.6, (and in contrast to incompleteness where the set of tuples which might be incomplete were those which failed the predicate).

- the Region value in tuples satisfying the predicate will always be Illinois (i.e., U.S.-based) - so there is no contribution to mismembership by tuples in the two quadrants of partition Table 7.4 having non-US regions. (This occurs whenever the selection predicate eliminates one or more partition elements. There will be therefore only two sets of binomials (rather than four) necessary to enter into the computation, and not four as in the calculation for incompleteness above.

- the region of summation for deriving $\omega_i$ will be "where Region equal to Illinois", as opposed to being over where Region not equal to Illinois for the incompleteness computation.

Before continuing with other queries, we conclude discussion of Query #1 - reflecting on what we have learned. The number of overcounts and undercounts from Query #1 turns out to be a sum of $l$ binomials, where $l$ equals the number of combinations of conditioning variables on predicate attributes. The parameters for the binomials are determined based on the numbers of tuples in the input table which satisfy the predicate, and based on their inaccuracy distribution.

7.3.2 Query #2: Select /sum, error items 1, 2, and 3

*select sum (income)*
*from Alumni*
*where region = 'Illinois'*

Input errors: Region inaccuracy, Item 1 Table 7.1
Alumni incompletes, Item 2
Income nulls, Item 3

Output error: Intermediate (d2) incompleteness

Intermediate (d2) nulls distribution
Output sum inaccuracy

Whereas Query #1 counted the number of alumni in Illinois, Query #2 will sum their income values. In addition, we introduce two more errors on the input: Alumni incompletes and Null Income values (items 2 and 3 in Table 7.1). So now there are three input errors. The error flow is illustrated below in Figure 7.7. We continue with the naming scheme: having $d_1$ as an input table and $d_2$ as the intermediate.

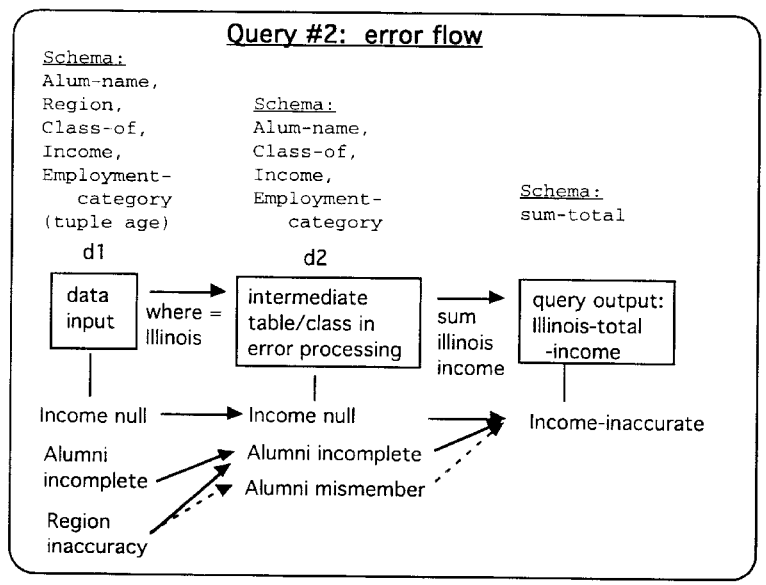

Figure 7.7: Query #2 Error flow. Nulls, incompletes, inaccuracies affect sum

In this case, the intermediate table $d_2$ has a concept of inaccuracy (i.e., as compared with $d_2$ in Query #1) because the Income attribute still exists to be summed over.

Notice that, again, only Region inaccuracy leads to incompletes and mismembers, because the selection predicate only involves Region. Income nulls in $d_1$ leads only to Income nulls in $d_2$ and has no effect on class-level error. All of these three $d_2$ errors lead to inaccuracy in the total alumni income in the output sum.

As discussed in Section 5.8, the logical error propagation calculus for summation does a selection for tuples satisfying the predicate, sums over the appropriate numeric attribute (Income in this case), and then adjusts for incompletes, mismembers, and inaccuracies. In a probabilistic calculus we compute each of these as random variables impacting the summation result. The total income of incomplete (mismember) tuples must be known - probabilistically speaking - so that these can be added (subtracted) from the output sum. Tuples incomplete from the query output will lead to too small a sum, and mismember tuples in the output will normally cause too large a sum. In this case, listed-Income values are all null and nulls count as zeros in a sum.[1]

Let $d_2$ be the table output from inputting the input table $d_1$ into the query:

select Name, Income, Class-of, Employment-category
    From   Alumni
    Where Region = 'Illinois'

INACCURACY IN TOTAL INCOME FOR A REGION

As this query is based on Query #1, we will use the results of our Query #1 analysis as input to our analysis of Query #2. We saw in Query #1 that the number of mismembers and incompletes in $d_2$ was a sum of binomials. The two attributes

---

[1] commercial databases sum nulls as a zero which conditionally affected Region error (i.e., which predicted the true region value) in Query #1 were Region and Class-of.

We focus here on income error due to $d_2$ incompleteness as this demonstrates the mathematics appropriate to members and mismembers as well. Let φ be a random variable representing the total income of alumni who are incomplete from $d_2$. In other words, φ is the total amount of income made by people who are falsely not listed in $d_1$ as being from Illinois. Then the true-Income total for Illinois alumni must include φ. We can describe the probability distribution of true-Income for each incomplete alumnus and sum these. Given a distribution of the number of incompletes, and given the income amounts of those incompletes, this defines a distribution of the total income of incomplete alumni.

Based on our partition of incomplete alumni on conditioning variables, the total amount of missing income within a partition will be a binomial sum of independent normals. Within each partition is a binomial number of incompletes. Then φ is a sum of binomial sums of normal random variables - a specific case of random sums of random variables [24]. In particular, for $l$ partitions, $$\varphi = \sum_{i=1,\ldots,l} \sum_{j=1,\ldots,B_i} \text{Normal}(\mu_i, \sigma_i^2) \quad \underline{(Equation\ 7.3)}$$

$\mu_i$ and $\sigma_i$ were defined in Equation 7.1 in Section 7.2.3. $B_i$ is the Binomial $(\omega_i, p_i)$ random variable.

Whereas in Query #1, we modeled age as a binary variable (i.e., under vs. over 50 years old as an indicator of move frequency), we will now use age at a greater degree of granularity - to the decade level for conditioning the income attribute. Assume ages 24 through 104 in the database (converting eight different age groups). There are four employment codes. There are two region categories visa-vis move frequency. Then the number of partitions on conditioning variables is of size 8 * 4 * 2 = 64. These are shown below in Table 7.6.

| 1 | 2 | 3 | 4 | 5 | 6 |
|---|---|---|---|---|---|
| Partition element | Employ-category | Region | Decade ending | Underlying Income Probability Distribution | Number of Terms in Sum |
| 1 | Admin | US | 1996 | Normal $f_1$(Admin, 1996) | Binom $f_2$(US, 1996) |
| 2 | A/E | US | 1996 | Normal $f_1$(A/E, 1996) | Binom $f_2$(US, 1996) |
| 3 | Mgr | US | 1996 | Normal $f_1$(Mgr, 1996) | Binom $f_2$(US, 1996) |
| 4 | Exec | US | 1996 | Normal $f_1$(Exec, 1996) | Binom $f_2$(US, 1996) |
| 5 | Admin | non-US | 1996 | Normal $f_1$(Admin, 1996) | Binom $f_2$(non-US, 1996) |
| 6 | A/E | non-US | 1996 | Normal $f_1$(A/E, 1996) | Binom $f_2$(non-US, 1996) |
| 7 | Mgr | non-US | 1996 | Normal $f_1$(Mgr, 1996) | Binom $f_2$(non-US, 1996) |
| 8 | Exec | non-US | 1996 | Normal $f_1$(Exec, 1996) | Binom $f_2$(non-US, 1996) |
| ... | ... | | ... | ... | ... |
| | Admin | US | 1926 | Normal $f_1$(Admin, 1926) | Binom $f_2$(US, 1926) |
| 58 | A/E | US | 1926 | Normal $f_1$(A/E, 1926) | Binom $f_2$(US, 1926) |
| 59 | Mgr | US | 1926 | Normal $f_1$(Mgr, 1926) | Binom $f_2$(US, 1926) |
| 60 | Exec | US | 1926 | Normal $f_1$(Exec, 1926) | Binom $f_2$(US, 1926) |
| 61 | Admin | non-US | 1926 | Normal $f_1$(Admin, 1926) | Binom $f_2$(non-US, 1926) |
| 62 | A/E | non-US | 1926 | Normal $f_1$(A/E, 1926) | Binom $f_2$(non-US, 1926) |
| 63 | Mgr | non-US | 1926 | Normal $f_1$(Mgr, 1926) | Binom $f_2$(non-US, 1926) |
| 64 | Exec | non-US | 1926 | Normal $f_1$(Exec, 1926) | Binom $f_2$(non-US, 1926) |

Table 7.6: a partition by conditioning variables for sum inaccuracy

This table defines a partition on alumni, analogous to Table 7.4 for Query #1, but this partition is finer grained in Class-of and it includes Employment-code. Columns 2, 3, and 4 show the conditioning variables which determine the normal and binomial distribution parameters in columns 5 and 6. Column 5 shows that the normal parameters $\mu$ and $\sigma$ are a function of columns 1 and 3. $f_1$ determines $\mu$ and $\sigma$ according to Equation 7.1. Similarly, column 6 shows that the binomial parameters $n$ and $p$ are a function of columns 2 and 3 as per Section 7.2.1.

The total income of alumni incomplete from $d_2$ is therefore a sum of 64 binomial sums[1] of normal random variables[2]. Each row i of Table 7.6 corresponds (vis-a-vis φ) to a binomial (number of incomplete alumni - these alumni having independent identically distributed (i.i.d.) normal as an income distribution.

In this example we demonstrated the ability of the model to propagate imputed variables, and to calculate probabilistically the total income over alumni whose income distribution parameters are conditioned on partitioning criteria for tuples in the data. Such information is not a direct result of the induced probability model because the induced model has no notion of summing along various dimensions or of using additive properties of random variables. We have therefore developed the beginnings of the functional model, including considerations for:

- partitioning along conditional variables,
- a binomial number of terms summed within each partition, and
- (e.g., normal) random variables as the terms being summed.

<u>Computational Complexity</u> We see from this formulation that the total-income of incompletes in $d_2$, due to Region inaccuracies in $d_1$, can be constructed as a sum of random sums of known probability distributions. Whereas the induced model had an order complexity which was linear in the product of all domain sizes (e.g., exponential), this model appears more effective as a basis for computation. Depending on the queries, the underlying probability distributions assumed, and the specific confidence intervals of interest - the computational complexity may be very low or independent of database size in the functional model.

---

[1] This could be reduced actually to the number of unique combinations of $\mu$, $\sigma$, $n$ and $p$.
[2] We used normal in this example for income distributions. We could have assumed various other distributions such as chi-squared as well, only the additive properties of random variables would be more difficult.

Introducing Alumni Incompletes to Query #2

We now extend Query #2 analysis to include input Alumni incompleteness (error item 2) on $d_1$. We know from the logical calculus that the only possible causes for incompleteness in a selection output are input inaccuracy and input incompleteness. This source of error was not included in the calculation of $\varepsilon$.

The number of incompletes vis-a-vis a given Region - and due to $d_1$ incompletes - is the number of those incompletes which have that Region (i.e., which satisfy the selection predicate). We provided the joint distribution of new graduates' Regions and Employment categories in Section 7.2.3. We add this to $\varepsilon$ to get the total number of incompletes $c$:

$$b = 2839 * .94 * P_r \text{ (Illinois)}$$

$$c = b + \varepsilon$$

$c$ is the total number of incompletes resulting from these two upstream error types. The two different sources of $d_2$ incompleteness are now Region inaccuracy and Alumni incompleteness. Different probability distributions of income will exist within each group.

Now that we know $b$, we need to model the probability distribution of the income of the alumni in $b$. Given the two distributions: (1) P(Income | Region ^ Employment-code) and (2) P(Region ^ Employment-code), then we have the full joint distribution on all three of these variables.

7.3.3 Query #3: Group-by/sum-projection

In queries #1 and #2 we propagated input inaccuracy, nulls, and incompleteness to determine their effect on output undercount and sum inaccuracy.

In this third and final query we extend the analysis of Query #2 with a group-by statement. Query #3 will be then:

>    select sum (Income)
>    from Alumni
>    group by Region

>    Input errors:  Region inaccuracy, Item 1 Table 7.1
>                   Alumni incompletes, Item 2
>                   Income nulls, Item 3

>    Output error:  Region mismembers
>                   Total income inaccuracy A diagram for this query was given in Figure 7.2. The error flows are illustrated below in Figure 7.8. Again, we will analyze the solid arrows only. Because we have already analyzed incompleteness and inaccuracy in the output, we need consider only Region mismembership.

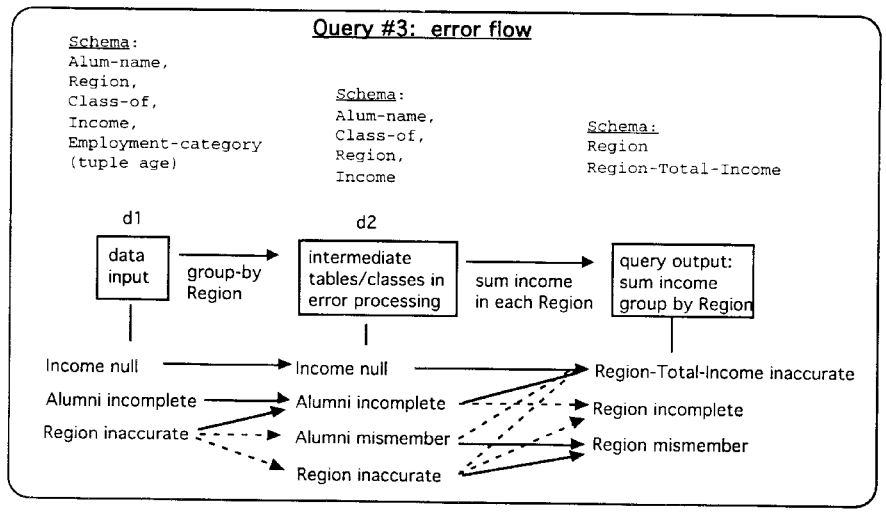

Figure 7.8: Query #3 Error flow, 3 errors yield output inaccuracy

The importance of the group-by statement is that we generate as an output class the set of Regions. So we must consider class-level errors (i.e., mismembership and incompleteness) in Region. We will assume that the user does not want Regions which have zero alumni. We now show the computation for mismembership in the set of Regions output by Query #3.

The calculation of this mismembership is part of the error propagation through a non-key-including projection - it transforms the concept of Region from being an attribute in the input to being a key / object in the output (see logical model Section 5.7.2 for more detail). A Region in the output of Query #3 would be mismember if, for example, the only alumni living in that Region had moved out, and no alumnus had moved in. The probability of the event that a given region $x$ is a mismember in the output is the probability of the intersection of three overlapping events on the input:

(1) for all tuples in $d_2$ with Region value = $x$, either the Region is inaccurate or (these are exclusive) the tuple is a mismember in d2,
(2) no inaccurate Region value which is not equal to $x$ in $d_2$ would equal $x$ if corrected, and
(3) no incomplete alumnus lives in Region $x$.

Call these probabilities $p_1, p_2$, and $p_3$. By Assumption 7.1 above - involving independence of error across tuples - these are independent events and can be multiplied to find the probability of their intersection. The final probability that Region $x$ is mismember therefore will be:

$$p_1 * p_2 * p_3$$

p1 calculation

Let $R$ stand for the Region attribute in the table schema. Let $C$ stand for the Class-of attribute in the table schema. Let $d2_{em}$ be the table containing mismembers in $d_2$. Let $t_i$ be a random tuple from $d_2$ such that $t_i.R = x$. Then, if there are $n$ such tuples:

$$p_1 = \prod_{i=1,...,n} [\, P\,(\oplus t_i.R \neq x \wedge t_i \notin d2_{em} \mid t_i.R = x \wedge t_i.C) + P\,(t_i \in d2_{em} \mid t_i.R = x \wedge t_i.C)\,]$$

The distribution in the first term of this sum is known based on the probabilistic description of Alumni moves across Regions and over time. The distribution of the second term is known based on the conditional likelihood of mismembership given a tuple's value in $d_2$, defined in Section 7.2.1.

p2 calculation

This is a product over all tuples in $d_2$ which are not mismember and whose $x$ value is not region. It must be the case that none of these alumni are truly in Region $x$. Let $t_i$ be a tuple in $d_2$ such that $t_i.R \neq x$. Then, if there are n such tuples:

$$p_2 = 1 - \prod_{i=1,...,n} P\,(\oplus t_i.R = x \wedge t_i \notin d2_{em} \mid t_i.R \neq x \wedge t_i.C)$$

p3 calculation

This is a product over tuples which are incomplete from $d_2$ - to determine the likelihood that one or more of these has Region = $x$. It must be the case that none of these Alumni are truly in Region $x$. We saw in the calculation for Query #1 how to compute the number of incompletes in $d_2$ and derived a random variable for that number. Let $P_I(j)$ be the probability that exactly $j$ tuples are incomplete.

$$p_3 = \sum_{i=1,...,j} [\, P_I(j) * \prod_{k=1,...,i} P\,(t_k.R = x \mid t_k.K \in d2_{ei}.K)\,]$$

This is a weighted sum over the set of possible number of incompletes that may occur. We are able to compute all of these probabilities because we have a full joint probability distribution on true-Region given listed-Region (and Class-of), and because we know the probability distribution of Regions and over number of incomplete tuples.

7.4 Functional error propagation calculus conclusion

We have given several examples of probabilistic error propagation, and considered how closed form analytic solutions may be used to define calculus expressions. Such a probabilistic calculus tells us something very fundamental:

How do specific error distributions on input trace through a query to become which specific error distributions on output?, and Which probability distributions for which input errors are necessary to compute which error bounds in outputs of which queries?

The answers to these questions are unobvious without the kinds of analysis presented here. An important result is the formulation of error as a sum of random sums of random variables - as a way of both conceptualizing error propagation and of implementing the error computation. These formulae have been confirmed through simulation as described in Section 9.2.

Chapter 8
Error Measurement and Error Knowledge Acquisition

We would like ultimately to structure some methodology for attaining knowledge about error in databases. The 500 million dollars proposed by the IRS [1] for an audit of U.S. taxpayers reminds us that, at some expense, it is possible even for complex and large scale data collection, to generate detailed statistical estimates.

In this chapter we describe and begin to generalize the process by which we learned about error in Alumni data during our field studies of data error. This is an abridgment of two years of occasional discussions and interviews with an Alumni DBA, totaling around 10-20 hours of discussion. Some of our own extended interpretation of error has been added to this as described in Chapter 7. We revisit, for comparison, the error logging technique of Socio-economic Data Co (Section 1.2.1). We then propose a framework as to what is data error evidence and measurement in the more general sense, classifying error assessment methods into three general categories.

Error measurement through expensive statistical studies will often be impractical. As an alternative, inexpensive statements about error as per the DBA[1] become relatively more important. A process of error knowledge acquisition would elicit from the DBA possibly subjective statements about error. Subjective estimates are a well known source of input probabilities. Via a structured walk-through, individual classes, objects, attributes and attribute values can be analyzed for patterns of error. The interview below is a paraphrasing, along these lines, of the interaction between the author of this thesis and an alumni administrator with many years of experience on the Alumni database.

---

[1] e.g., the DBA as a surrogate for a set of agents around the data who know the data.

Discrepancies between data sources concerns deterministic error measure and will populate the logical model. Non-deterministic error measures fit the probability model. We focus on probability measures of error here, as logical error measurement is more obvious and is subsumed by the probability model.

8.1 Error in the University Alumni DB: an Interview

We discussed the Alumni table, as housed in a Natural database on an IBM mainframe computer. We focused on the following fields: *email address, mailing address, family income, year of graduation, Student ID, alumnus_deceased (Y/N), and region*. These will help us do various demographic analyses of alumni and their gift-giving potential - key parameters for application success among some users of alumni data.

There were several causes and kinds of error involved. Refer to table 7.1 for a summary of the errors considered. In some cases, assigning probabilities to error came easily, e.g., based on a quick intuition or on previous data quality clean-up efforts. In other cases we had to brainstorm a bit - using parameters such as the number of data defects found over time and associated extrapolations. We discussed causes of error such as falsification by survey respondents, survey non-responses, data entry errors, (un)timeliness of information, meaning heterogeneities, and missing values.

The exercise should hopefully suggest that the acquisition of error knowledge from readily available individuals, and its transformation into a probabilistic form are both feasible and useful objectives. This is not intended as a complete study of methodology for characterization of error, but only as an example of the approach.

> Henry: So John (the DBA), let's discuss error in the alumni database table you gave to me a year ago. We'll think about the master table:

*Name, Year(19xx), Income($), Deceased (Y/N)*), and cover individual causes and types of error one at a time. The sequence of questions about error I ask will in part be determined by how you answer. For example, if you were to tell me there are zero incomplete alumni for this database, then obviously we don't need to discuss characteristics of such non-existent alumni.

John is learning the concepts of inaccuracy, incompleteness, and mismembership as we go. I assume initially that the database is "innocent until proven guilty" - i.e., that there are no errors unless I have been told so by the DBA (database administrator) that there are. So the a priori error distribution is a point mass ( $P(e_0) = 1$ ) where $e_0 \in E$ is the error state having no error tuples in either the mismembership, inaccuracy, or incompleteness error tables[1]. Throughout the interviewing process, we would like to maintain a full joint probability distribution on the error state space - as our model is not designed for second order uncertainties. This is necessary if we are to propagate error in closed fashion through arbitrary user queries. If not all information about error is available (i.e., if there are some errors which are known to exist, but whose probability distributions are not completely known), then some subset of queries will not be amenable for error propagation.

> Henry: Let's start by thinking about the set of alumni represented in the table. Would alumni ever be <u>incomplete</u> (missing) ?
>
> John: Almost never. We generate our set of alumni based on students who have graduated and they must be recorded as having graduated to complete a degree.

(I , as the "error knowledge engineer", believe now that there is little or no incompleteness in this table. Probabilistically, this asserts that - even if errors are

---

[1] This must be adjusted for data which violate integrity constraints such as non-null Class-of and age >= 0, I may not need the DBA to tell me that these are errors and instead would ask the DBA to "explain" these.

subsequently revealed - a zero probability will be associated with all error states having one or more incompleteness error tuples.)

> Henry: Oh - but we have to remember that we are modeling error in a one year old snapshot of the alumni data.
>
> John: Oh yeah, then there would be missing (incomplete) alumni as some students will have graduated, without this being reflected in a year old data set.
>
> Henry: Do you know how many graduated last year?
>
> John: We awarded 2,839 degrees last year[1], with some being double majors and some being second degrees at MIT, so would already be in the database. Historically, around 6% of those people are getting a second degree at MIT. Let's estimate the number of incomplete at 2,839 * .94.

(I now know that some alumni are incomplete, but I do not yet have a full probability distribution on E - e.g., I can't answer all facts about error propagation - until I know something *about* these missing alumni.)

> Henry: What can we say about the attribute values of those missing alumni? For example, would last year's alumni be a good representative in terms of population attributes?: Would it be reasonable to guess that this year's graduating class is similar (e.g., in terms of the Income & Deceased variables) to last year's class at this time?
>
> John: I would say so - student demographics and salary patterns don't tend to change much from year to year. Obviously a small percentage of students may have passed away in the year, but this should be negligible among recent graduates.
>
> Henry: Perhaps if there are any adjustments you want to make we can do that later. For example, if we know that this population, upon

---

[1] Information came from the Registrar's Office.

entering the school, came more from foreign countries than in the previous year's students, then we could attempt an adjustment.

(So now we can use the empirical distribution of attribute values among last year's graduates as parameters for the missing alumni, again maintaining a probability distribution on $E$. Now we move to the next error type, mismembership).

>Henry: Are there any <u>mismembers</u> in the data?
>John: Very few. Generally, population of the Alumni database with records is done pretty carefully ... and aging of alumni data would not introduce mismembers - once an alumnus always an alumnus. As I think about it, however, there may be some occurrence of duplicate records when an intended update can not find the source record - then an extra record for the same person gets created.

(So I confirm as "low" the probability for all error states having one or more mismember tuples in the mismembership error table - we did not attempt to reduce this to a probability - perhaps we could have come up with a reasonable estimate had we spent some time on it. (The representation and propagation of fuzzy quantifiers is an interesting area for further research )).

>Henry: Let's talk about <u>accuracy</u>. What about the <u>Income</u> variable?
>John: 3/4 of the family-income values are null (e.g., not filled in by the alumnus in the master questionnaire, or when the questionnaire was never responded to at all). Among those that are filled in, I suspect there are some which are biased high to mask a low income, and also biased low to mask a high income.

(Again, we do not attempt to reduce these to probabilities - they do not affect our error propagation example of Chapter 7.)

Henry: What about the missing income values? How might we classify different income levels - can any information in the tuple be used to infer an income amount?

John: Certainly people who have higher ranking titles and are older (e.g., but not yet retired) would have higher incomes.

Henry: What about the Deceased variable? I remember you saying that some people report themselves as dead so they won't get more mail?

John: Right, we guessed that around 300 such records were in the database. This was based on having detected 5 or so a year over my 20 years here - adjusting upward for the number I may not have seen.

Henry: So we have an inaccuracy in 300 "Deceased" Records.

(I now can say that the probability that a tuple should say 'Deceased = N' given that is says 'Deceased = Y' is 300 / 40,000 - there are approximately 40,000 deceased tuples. But I should check first if I can assume independence...)

Henry: Do you think that this Deceased inaccuracy would correlate to income?

John: Not really. Higher and lower income people seem equally likely to me to report themselves as dead.

This type of conversation illustrates the main point here: between the interviewer and the interviewee, a short, inexpensive, and reasonably intuitive discussion can be had leading to formal probability distributions - and it is not unreasonable to maintain a full probability measure on $E$ while doing so.

We acknowledge the difficulty of course in obtaining true probability distributions, but this is a general concern for all probability models.. Somewhere between the 500 million dollars spent by the IRS and the very few dollars spent in developing this thesis lies some happy medium for each organization, database, and application. (Of course, ultimately, all probabilities are merely inter-subjective - there is no general need to declare any one as correct - we merely admit their coexistence and work from there.)

These statements and distributions may be seen as hints to the user to be taken "with a grain of salt" - a way for the DBA to communicate with data users. On one hand, a typical DBA may <u>not be qualified</u> to formally assess error in a database (a statistician who knew this error model would of course be better). On the other hand, a knowledge acquisition tool would be useful to <u>elicit error knowledge</u> from "any available expert", e.g., the DBA. A sketch of such a system is given below.

8.2 Error Knowledge Acquisition

We have described a learning process during which an alumni DBA helped us to generate probability distributions of error through a semi-structured interviewing process. This suggests that a framework for error knowledge acquisition may be developed which applies to the general database setting, and for which a computer program may provide an interactive dialog with the user around issues of data quality.

We envision a system which, given a model of data meaning (classes, table names, field names, data types, relationships, etc.), can perform a structured question and answer dialog by interactively prompting the user for specific information - eventually collecting all information available. The system will guide the user through questions about various semantic and quality aspects of the data. As shown below in Figure 8.1, the knowledge acquisition process may be informed through an "error browsing" tool, providing interactive visualization of data and of integrity constraint violation - to incite the expert's thinking about error, and to help the expert decide on various tuple and object populations for random sampling when subjective probabilities are unavailable or uncertain. The illustration below shows the error knowledge acquisition tool, as informed by both the raw data and any data/error scanning tools which may help the DBA to model error in a robust way.

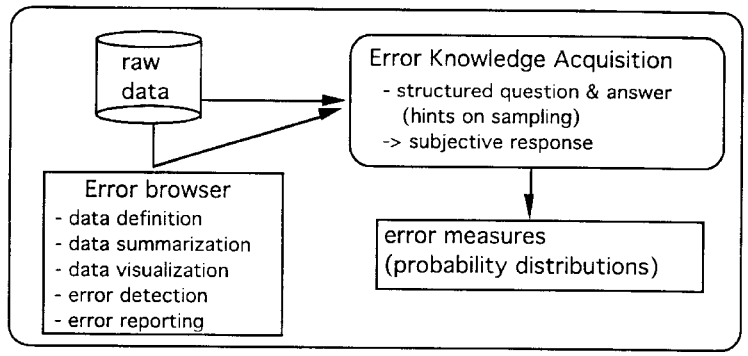

Figure 8.1: Error Browsing and Error Knowledge Acquisition

The system, as envisioned, will "walk through" each of the error types vis-a-vis the semantics of the particular application, much as was illustrated above in the Henry/John interview. The system should explain why it is asking for certain information, to suggest possible causes for different forms of error, to provide hints about estimating various probabilities, and to suggest what the impacts will be (on the calculus) if certain information about error is not provided. The person providing input to the system must be familiar with faults in the data or data collection process.

A series of sub-topics may help structure the interaction to both help the DBA recall error and model the error:

- Timeliness (aging of data)
- Null values
- Population coverage (completeness / mismembership)
- Response errors & inaccuracies (falsification, measurement uncertainty)
- Mixed definitions, representations, & object types

- Reliability of different data collection methods
- Reliability of different data sources
- Changes over time in data definition or data collection
- Rounding error
- Program bugs, data entry error (e.g., systematic vs idiosyncratic error)
- Detection: inter database instance and value comparisons,
- Use of integrity constraints as aids to error modeling The output will be probability distributions in the form of the probabilistic representation. The conditioning variables of the conditional distributions constitute "evidence" of error.

8.3 Socio-economic Data Co. and Data Screening Co.

An interview with an Alumni DBA relies on a single individual to characterize error. In Section 1.2.1 we discussed the fact that Socio-economic Data Co. used a log file to record customer complaints and customer assertions about data error. This constitutes a more distributed or "multi-agent" means of gaining information about data error. Customers of Socio-economic Data Co. are in a sense "field testers" of data, identifying logical fallacies in the data and sometimes providing corrections so as to repair the data. A text database logs Company-customer interactions. This is used as a means of tracking a customer call (miscellaneous notes about the data's investigation and repair are maintained in the log). A secondary database is also maintained which tracks causes of data error, e.g., what percentage of data error was caused by "bad tape loads". This is important for data quality control.

There are several issues to note regarding this text-based log file strategy. First, descriptions of error are not electronically associated with the data. As a result, error information can not be easily accessed. If the electronic association were made, then a user of data might be notified automatically when data values of interest have been disputed. Under the current model, specialized knowledge and access is required in order to make use of error information in the log file.

Second, the log file approach does not allow two different interpretations of data to be simultaneously maintained. It is impossible, for example, to associate two different values with the same concept. We are unable to say that IBM has both 306,132 AND 301,213 employees, depending on the desired interpretation. It may be useful in some instances to allow customers to "get it their way", e.g., the capability to have slightly customized data sets, as adjusted for individual preferences in definition or belief. Currently, data administrators at this company must concede one interpretation of truth or another.

Many log file entries assert that an error exits without offering a correction. A customer's claim that "the Belgium Index must be wrong" does not tell us what the corresponding true value is. Wrong data may not be easily corrected. In this case, the best we can hope for is some uncertainty representation of the error term or of the true value. Examples, indicators, and general knowledge about logical error provides a hint as to the probabilistic error measure. A log file approach of course defines no such uncertainty interpretation of error.

This notion of detecting errors, but not being able to correct them, is a general characteristic of integrity constraint checkers. Data Screening Co. sells a tool to detect logical fallacies in data such as violations of key uniqueness, presence of null and impossible values, violations of inclusion dependencies, etc. Such tools are useful as a first step in detecting presence of error. (Socio-economic Data Co. applies similar tools.) But knowledge of integrity constraint violation is inferior to knowledge of data corrections - the information objective in our model.

The advantage, however, of integrity constraints is that they may be applied automatically, requiring no external data sources (e.g., "sensors outside the computer") to perform cross-verification of data. And when "degree of integrity constraint violation" (e.g., percentage of tuples having null values) is indicative of the effectiveness of data quality controls, then such a measure is an important metric in itself - even when data corrections are not available.

8.4 Error Evidence and Measurement: a Framework

Error measurement is a procedure we go through to assess error levels in a data set. Error measures are probability distributions over error constructs - at both the individual level (e.g., single data value) and collection level (e.g., entire database) of data aggregation. With the references below as examples from the literature - we construct a three part framework to classify different forms of evidence about error and therefore different mechanisms for error measurement.

- Agmon proposes constraint checkers as a measurement tool [3].
- Bunge defines assessment of truth as the application of a truth testing procedure [14].
- Motro imagined a hypothetical perfect *reference data* set, against which to compare data in question [47]
- Ballou identifies timeliness as contributing to degradation of data [6]. Wang identifies source reliability as an important factor in data quality assessment [64].

Based on these examples we identify three distinct error measurement types: *internal, external,* and *process.* These are akin also to the coherence, correspondence, and model-theoretic concepts of truth identified in [14]. Each embodies a different approach to truth assessment and testing. Internal measures involve the testing of a single data source using integrity constraints as checkers. Data should be internally consistent. External measures involve comparing data against the real world (i.e., against some external and independent reference data source). External measurement requires an agreed upon reference source or truth testing procedure. Process measures are based on inference about the degree of error - based on the data's collection method. These three measurement types are depicted in Figure 8.2 below, and are described next. As shown, the net result of error measurement is error metadata.

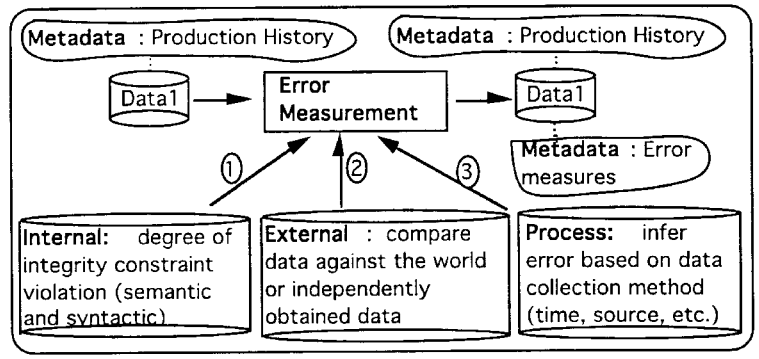

Figure 8.2: Three measurement types: internal, external, and process

Arrow #1 Internal:

Semantic integrity constraints delimit valid data values and relationships based on known laws about the world. Though typically used for error prevention and detection, 'degree of constraint violation' constitutes an inexpensively attainable error measure, e.g., 'percentage of attribute values out of range or percentage of records logically invalid'. Constraint-based measures provide a lower bound on the actual error level because data can be logically feasible yet still incorrect. The same technique applies to syntactic formatting constraints which are associated with data types.

Next we will divide external measures into two subtypes, splitting arrow #2 conceptually into 2a and 2b.

Arrow 2a External - inter-database

Data can be validated by comparing against other data. This approach applies whenever data are inter-related by known algorithms and the external data is "reasonably independent" or known to be factual. (Otherwise we might consider this an internal consistency measure of a distributed database.) Inter-database relationships across which comparison/verification can be performed might include redundancy (same information stored in two places), arithmetic (x+y=z), or logical (foreign keys). By comparing data with other databases, we can identify suspicious data or determine exact error levels relative to the second database as a reference. More sophisticated models may estimate using a stochastic model of the joint probability of error in the first and second databases.

Arrow 2b External - real world

This approach is similar in spirit to inter-database validation, but applies when the data can be verified empirically. Such verification might involve reweighing an object or making a phone call to verify a price. Sampling will be required for large databases where verification is labor intensive. Sampling may be required in "both directions" -to test mis-classification and inaccuracy we sample data and test against the world (or other data). To test completeness, we sample entities in the world and see if they are listed in the database. The distinction between 2a and 2b is somewhat vacuous of course because each truth testing procedure against the real world may be used to populate a reference data source, making arrow 2a like 2b.

Arrow 3 Process measures

A datum's production history includes how it was born (e.g., collected as raw data) and describes various aspects of its processing and derivation history [44].

Process-based measures involve assessing error based on the data collection method - how, when, by whom, with what, etc. - data was generated and processed. Below are three examples of user-specified process-based measures - regarding data age, source, and collection method respectively (three key ingredients of a data production history):

- (aging/timeliness) A 5 hour old stock quote has a wider range of possible values than one 2 seconds old.
- (source) Data from the Wall Street Journal is more accurate than from The Enquirer tabloid.
- (collection method) Data generated in a job interview may be more accurate than from a marketing survey.

8.5 Chapter Conclusion

Although we have offered various prescriptions for error measure, measurement is ultimately an issue of methodology and is inherently domain dependent [17] - measuring error in a stock price will be different from measuring error in a statistic on soil erosion. For the general case, the probabilistic EPC requires a probability measure on $E$. So the question of measurement boils down to whether or not an acceptable or reasonably correct error distribution can be obtained. It is well understood that a *true* probability distribution can not be obtained in a finite number of experiments. As in [8] and others, our model considers the estimated probability distribution to be the true distribution of error.

For the general case, we may require a full joint probability distribution on the error state space $E$. A first intuition is that getting such a probability distribution requires a large set of joint probabilities. But because error is simply a differential from the state of the world - a description of error may consist of just a few simple statements about cause and correlation in error. Above we paraphrased interviews with the database administrator (DBA) at the Alumni organization. At each step in the interview process, we describe how a probability distribution on E is maintained.

An important aspect of our model is that we do not make assumptions such as normality, uniformity, or independence in probabilities. To the extent that we can explicate (e.g., measure) complex joint probabilities, then this model can represent and propagate them (a consequence of the theorems and subject to the few assumptions we have made). We can say, however, that probability measures may be obtained both by actual measurement, e.g., via statistical estimation or theoretical modeling, or be specified via (simplifying) assumptions about measures (e.g., normality, uniformity, independence, etc.). Such measures and assumptions may be based in theory, intuition, historical patterns, what-if hypotheses, etc.

One might ask: Why do we model error rather than reason directly with evidence about the state of the world? We could just create a new, e.g., probabilistic, database given the new analyses performed. While this is a dual approach to ours, we model error because it is our objective to characterize goodness of databases, concerning cause and effect of error - and not to model uncertainty in the world itself. Given that the data already purports to tell us the true state of the world - modeling deficiencies in data collection may be easier than modeling the world itself.

And fortunately, we need not assert which $P_w$ - or error term - is the "true" one. Ultimately, separate error distributions may be offered by different error analysts, depending on the interpretation of error pursued, or depending on which error measurement techniques for error a given person trusts. Although we have cast this error knowledge acquisition process as eliciting subjective probabilities, there is also nothing preventing the use of formal statistical methods from being the source of these probabilities.

Chapter 9
Logical Model Implementation / Probability Model Simulation

In this chapter we summarize a software implementation of the logical model and describe a simulation of the probability model. The simulation compares plots output by the induced probability model with those of the functional model started in Chapter 7. The goals of the implementation and simulation are:

- to show that our formalism can be translated into a usable computing system - increasing overall credibility,

- to confirm formal properties of the model by implementing algorithms and proof methods in software - which are applied to all queries and data sets run through the calculus, and

- to compare empirical results (i.e., the simulation output) with analytical in comparing the logical and probability models.

The select, count, and sum functions have been implemented and tested using two application data sets. The logical model implementation operates over a 500 tuple commercial Financial database. The financial data fed to the logical model is corrupted with a single set of (fictional) data/errors - manually applied to demonstrate each of the three error types as input and their propagation through various queries. The probability model simulation operates on a 9,544 record Alumni database, the one discussed in Chapter 7. For the Alumni data, we construct error probabilistically - as a function of data staleness (e.g., untimeliness) defining a stochastic model of input inaccuracy a function of data set age and other conditioning variables. Output error will be of all three types in both models.

9.1 Logical Model Implementation and Example

The logical calculus was implemented for the selection, sum, and count operations. The software environment involves the following technologies/vendors: UNIX (SUN 4.3) / HTML / CGI / C / Lexx / Yacc / Perl / Oracle / Oracle's SQL Plus / Oraperl / Spreadsheet. It was built on the machine called "context.mit.edu". The implemented software is an exact analog of the following elements of the mathematical model:

- the logical representation and calculus,
- the logical proof method,
- the induced probability model, and
- the functional probability model.

The logical representation and calclus are implemented using relational database tables and SQL respectively. The probability models are implemented using 'C' language data structures and Microsoft Excel. The diagram of Figure 9.1 below illustrates the flow of information through the software of the logical model implementation - including the commutative proof method. After describing the model in general, we show an example of its execution.

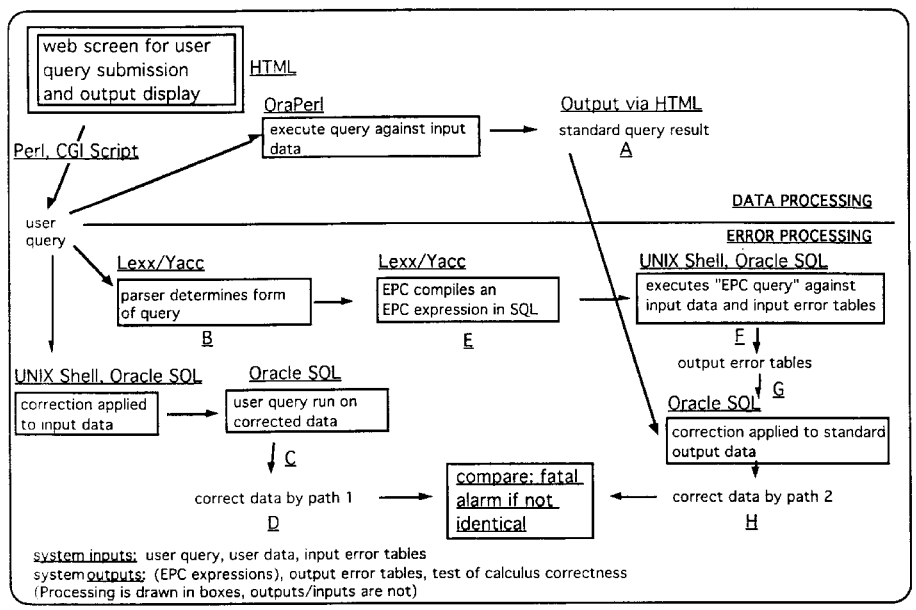

Figure 9.1: Logical implementation - EPC execution, and verification

This diagram is a restatement of the commutative proof method diagram of Figure 5.1. Path 1 includes Steps C and D, while Path 2 includes Steps A, B, E, F, G, and H. The path leading to A is the standard execution of the user query against the errored input data, resulting in the errored data set output. This is entirely in SQL (and implemented here using SQL Plus and Unix Shell). This path represents traditional data processing (over errored data), i.e., this is independent of our error model and, as such, it is drawn above the horizontal line in the Data Processing portion of the figure. Everything beneath the line represents error processing.

At B and E, a parser / compiler (written in LEX/YACC) determines the form and parameters of the query, and compiles the appropriate EPC (sub-)expression in the SQL, i.e., expressions 1a - 3b of Section 5.3 and the calculus expressions of Section 5.9. At F, this SQL query is submitted against the input data and error triple,

208 resulting in G, the output error triple. These are the EPC-computed corrections to the output table A. This is the final output of the logical calculus.

To test the correctness of our logical calculus and software implementation, we implemented the commutative proof method in software. This involved C and D to complete Path 1 of the commutative proof diagram and H to complete Path 2. C and D apply the user query to a corrected version of input data, resulting in the Path 1 version of correct output. H corrects the standard output data (A) as per the output error triples (G), defining the Path 2 version of correct output. These are compared by the software and if not identical, a fatal program abort is done. (Such an abort did not occur in tens of thousands of randomly generated simulation runs.) In summary then, this logical model software implementation accomplishes several tasks:

(1) performs the user query against the errored input data (2) compiles the user query into three induced SQL expressions - one for computation of each output error type. A relational table is created for each element of the output error triple.

(3) applies the three SQL/EPC expressions to the input error triple and input data to populate the three output error tables.

(4) error checking: corrects the input table and applies the user query to the corrected input; corrects the output data as per the output error triples; verifies that these two outputs are equivalent.

The user interface is in HTML/PERL using a CGI script. The user types a valid SQL query into a text area on a web browser screen. Hitting a SEND button on that screen invokes the calculus and proof method processing "under the covers". The calculus is separate from, and induced by, user processing - in accordance with our objective of non-intrusiveness. The underlying database system does not have to change to make our model applicable.

EXAMPLE APPLICATION: FINANCIAL DATA

Here we describe the use of the implemented logical model on a commercial financial data set. Errors were peppered into this data by applying our own manual corruptions. These were not present in the data as received from the source. Rather, they are for illustration. The data and error inputs are listed below.

```
Connected to:
ORACLE7 Server Release 7.0.15.4.0 - Production
With the procedural and distributed options
PL/SQL Release 2.0.17.1.0 - Production SQL> select * from disc where comp_name like 'A%';

COMP_NAME                      NUM_EMPLOYEES TOTAL_ASSETS NET_SALES
------------------------------ ------------- ------------ ---------
A O SMITH CORP                         10800       823099   1193870
A SCHULMAN INC                          1582       407865    685112
ABBOTT LABORATORIES                    49659      7688569   8407843
ACX TECHNOLOGIES INC                    4200       653999    641852
ADOLPH COORS CO                         6200      1350944   1946592
ADVANCED MICRO DEVICES INC             12060      1929231   1648280
AG PROCESSING INC                       2128       465796   1218614
AGWAY INC                               7900      1204764   1710577
AIR PRODUCTS & CHEMICALS INC           14075      4761500   3327700
ALBERTO CULVER CO                       8600       593046   1147990
...
```

Table 9.1: Sample data from the California Data Co. table

Below is a listing of the inaccuracies, incompleteness, and mismembers we manually introduced as errors in the data set. The corrupted, i.e., inaccurate, data values are listed in bold immediately below the accurate values in Disc_ea. The errors were previously introduced via SQL: update statements (to introduce inaccuracies), delete statements (to introduce incompletes), and insert statements (to introduce mismembers).

```
SQL> select * from disc_ea;

COMP_NAME                               NUM_EMPLOYEES  TOTAL_ASSETS   NET_SALES
--------------------------------------  -------------  ------------   ----------
INTERNATIONAL BUSINESS MACHINES CORP           302196      81113000    62716000
                                                          101000000

FORD MOTOR CO                                  322213     198938000   108521000
                                                           98938000

GENERAL ELECTRIC CO                            222000     251506000    59827000
                                                          251506731

GENERAL MOTORS CORP                            710800     188200900   133621900
                                                71100
```

Inaccuracies in input relation

```
SQL> select * from disc_ei;

COMP_NAME                               NUM_EMPLOYEES  TOTAL_ASSETS   NET_SALES
--------------------------------------  -------------  ------------   ----------
NORTHERN TELECOM LTD                            60293       9485000     8148000
AMERICAN EXPRESS CO                             64493     101132000    14173000
```

Incompletes from input relation

```
SQL> select * from disc_em;

COMP_NAME                               NUM_EMPLOYEES  TOTAL_ASSETS   NET_SALES
--------------------------------------  -------------  ------------   ----------
DAIMLER BENZ CORP                                      9.0926E+10  9.7737E+10
SEARS ROEBUCK and CO                           359000      90807800    50837500
CITICORP                                        81500     216574000    32196000
```

Mismembers in input relation

Below is the output from the SQL Plus program (Oracle's) as it operates on the above input. The parser-compiler output creates an associated script, resulting in an SQL Plus script, whose execution is shown as the SQL Plus program below. The user query for the example is:

*select comp_name, total_assets from disc where total_assets > '100000000'*

The user wishes to see which companies have assets greater than 100 billion and what is their asset amount. The listing below shows the output of the script as executed in the SQL Plus environment. The user query is shown on Line 11. Lexx and Yacc parse and transform input queries into error propagation calculus expressions in lines 16, 38, and 59 in the output listing respectively. The compiler results in separate SQL expressions for inaccuracy, incompleteness, and mismembership.

```
1.  Connected to:
2.  ORACLE7 Server Release 7.0.15.4.0 - Production

3.  SQL> >
4.  SQL> EPC - processing standard select-from-where query:
5.  SQL> >
6.  SQL> dropping 3 output error tables: inacc, incompl, mismem ...
7.  Table dropped.
8.  Table dropped.
9.  Table dropped.

10.       SQL> The user query was:

11.       select   total_assets,   comp_name from   disc   where
          total_assets  >  100,000,000;

12.       SQL> table        = [disc]
13.       SQL> key_attr     = [comp_name]
14.       SQL> attr_list    = [total_assets, comp_name]
15.       SQL> where_clause = [ total_assets     > '100000000' ]

16.       SQL>   INACCURACY
17.       SQL>   compiling  inaccuracy  EPC.

18.       SQL>   result:

19.       SQL> >  CREATE table error_table_inacc as
20.       SQL> >  SELECT total_assets, comp_name
```

```
21.    SQL> >   FROM disc_ea
22.    SQL> >   WHERE
23.    SQL> >   (    total_assets  > '100000000' )
24.    SQL> >   AND
25.    SQL> >    (comp_name  IN
26.    SQL> >     ( SELECT comp_name
27.    SQL> >  FROM disc
28.    SQL> >  WHERE ( total_assets  > '100000000' )
29.    SQL> >       )
30.    SQL> >    )
31.    SQL> >   AND
32.    SQL> >   (total_assets, comp_name)  NOT IN
33.    SQL> >      ( SELECT total_assets, comp_name
34.    SQL> >   FROM disc)
35.    SQL> >
36.    SQL>  executing  EPC  to  compute  output  inaccuracy 37.    Table created.

38.    SQL>   INCOMPLETENESS
39.    SQL>   compiling  incompleteness  EPC

40.    SQL>   result:

41.    SQL> > CREATE table error_table_incompl as
42.    SQL> > SELECT total_assets, comp_name
43.    SQL> >  FROM disc_ei
44.    SQL> >  WHERE ( total_assets  > '100000000' )
45.    SQL> > UNION
46.    SQL> >  SELECT total_assets, comp_name
47.    SQL> >   FROM disc_ea
48.    SQL> >   WHERE
49.    SQL> >   (    total_assets  > '100000000' )
50.    SQL> >   AND
51.    SQL> >   comp_name NOT IN
52.    SQL> >    (SELECT comp_name
53.    SQL> >      FROM disc
54.    SQL> >      WHERE (    total_assets  > '100000000' )
55.    SQL> >    )
56.    SQL> >

57.    SQL>  executing  EPC  to  compute  output  incompleteness

58.    Table created.

59.    SQL>   MISMEMBERSHIP
60.    SQL>   compiling  mismembership  EPC

61.    SQL>   result:
```

```
62.     SQL> > CREATE table error_table_mismem as
63.     SQL> > SELECT total_assets, comp_name
64.     SQL> >  FROM disc_em
65.     SQL> >  WHERE ( total_assets  > '100000000' )
66.     SQL> > UNION
67.     SQL> >   SELECT total_assets, comp_name
68.     SQL> >   FROM disc
69.     SQL> >   WHERE
70.     SQL> >   (       total_assets  > '100000000' )
71.     SQL> >   AND
72.     SQL> >    comp_name IN
73.     SQL> >    (SELECT comp_name
74.     SQL> >        FROM disc_ea
75.     SQL> >        WHERE NOT ( total_assets  > '100000000' )
76.     SQL> >   )
77.     SQL> >
78.     SQL> END OF EPC OUTPUT 79.     SQL> executing EPC to compute output mismembers 80.     Table created.
```

Sample of SQL compiler execution - the logical calculus implementation

These three derived SQL queries relate to the logical error propagation calculus formalism of Chapter 5 - line 19 for the inaccuracy EPC, line 41 for the incompleteness EPC, and line 62 for the mismembership EPC. When executed against the input data and error triple, the output error triple is computed: <output_ea, output_ei, output_em>. The contents of these three tables is given below.

```
81.     SQL> ************* OUTPUT  INACCURACIES  ******
82.     SQL> select  *  from  output_ea ;
83.     TOTAL_ASSETS COMP_NAME
84.     ------------ ------------------------------------
85.     251506000 GENERAL ELECTRIC CO 86.     SQL> *********** OUTPUT  INCOMPLETES  ****
87.     SQL> select  *  from  output_ei ;
88.     TOTAL_ASSETS COMP_NAME
89.     ------------ ------------------------------------
```

```
90.        101132000 AMERICAN EXPRESS CO
91.        198938000 FORD MOTOR CO

92.        SQL> ************* OUTPUT MISMEMBERS ******
93.        SQL> select * from output_em ;

94.        TOTAL_ASSETS COMP_NAME
95.        ------------ ------------------------------------
96.        101000000 INTERNATIONAL BUSINESS MACHINES CORP
97.        216574000 CITICORP
98.        9.0926E+10 DAIMLER BENZ CORP

99.        SQL> Disconnected from ORACLE7 Server Release 7.0.15.4.0 -
Production
```

Output error triple: <output_ea, output_ei, output_em>

We now discuss the intuition behind error propagation - individually for each input error tuple in the example, leading to this output error triple. There are three types of input error tuples, and each may result in a particular output error type. The first tuple (of the four) in disc_ea is for IBM (see also below). Recall that the user query was to retrieve total assets only for the set of companies having total assets greater than 100,000,000. The tuple in the database lists the assets as greater than 100,000,000 (i.e., 101000000) while in fact this is untrue (true value is 81113000). Therefore the tuple will be selected, but it should not have been, i.e., in truth IBM is not among the companies with assets greater than one hundred billion dollars. An input inaccuracy caused an output mismembership in this case. The table below summarizes the input output error relationship for the input tuples, beginning with IBM.

```
disc_ea
INTERNATIONAL BUSINESS MACHINES CORP         302196    81113000   62716000
                                                       101000000
```

IBM Summary: Input inaccuracy leads to output mismembership. The input tuple over-reports IBM's total assets, causing it to be selected when it should not have been.

```
disc_ea
FORD MOTOR CO                              322213   198938000  108521000
                                                     98938000
```

FORD Summary: Input inaccuracy leads to output incompleteness.
The input tuple under-reports Ford's total assets causing it not to be
selected when it should have been.

```
disc_ea
GENERAL ELECTRIC CO                        222000   251506000   59827000
                                                    251506731
```

GE Summary: Input inaccuracy leads to output inaccuracy. The input
tuple over-reports GE's total assets, but the over-reporting does not
cause total assets to "cross over" the constraint boundary, i.e., it is over
100,000,000 either way. No class level error occurs and the inaccuracy is
retained.

```
disc_ea
GENERAL MOTORS CORP                        710800   188200900  133621900
                                            71100
```

GM Summary: Input inaccuracy leads to no output error. The input
tuple over-reports GM's number of employees, but this attribute is not
in the selection list so no output inaccuracy results. Total assets is
accurate and is above 100,000,000.

```
disc_ei
NORTHERN TELECOM LTD                        60293    9485000    8148000
```

NT Summary: Input incompleteness leads to no output error. The
tuple is missing on the input, but because NT's total assets are below
100,000,000, the incompleteness is not propagated and no error results.

```
disc_ei
AMERICAN EXPRESS CO                         64493   101132000   14173000
```

AE Summary: Input incompleteness leads to output incompleteness.
The tuple is missing on the input, and because AE's total assets are
above 100,000,000, the incompleteness is propagated. AE should have
been in the output as well.

```
disc_em
DAIMLER BENZ CORP                                  9.0926E+10 9.7737E+10
CITICORP                                    81500   216574000   32196000
```

DB, CITICORP Summary: Input mismembers leads to output mismembers. The DB and CITICORP tuples are both mismember on the input, and because both tuples have total asset value greater than 100,000,000 - the tuples result as a mismembers in the output - mismembers are propagated as mismembers.

| disc_em | | | |
|---|---|---|---|
| SEARS ROEBUCK and CO | 359000 | 90807800 | 50837500 |

Sears Summary: Input mismember leads to no output error. The Sears tuple is mismember on the input, and because the tuple has total assets with value less than 100,000,000 - the tuple does not result in the output - so the mismember is not propagated.

We have described the intuition behind error propagation in each of the input error tuples. The reasoning is consistent with the three derived (i.e., compiled) SQL error propagation calculus expressions. The set of output errors (in bold above) is consistent with the output error triple computed by applying the SQL to the input data and error triple.

This concludes our description of the logical model implementation. In addition to being the basis for the probability model, this model has application in itself (Section 5.1). The efficient maintenance and comparison of multiple views and reference sources over a single logical domain is important in many database applications. This implementation is one example of how the logical model can be translated into practice. It demonstrates that the logical select, sum, and count calculi can be transformed and run efficiently in software. Three input error types were propagated through the implementation, via this and other queries, to become three output error types. The proof method checked the correctness of each operation. Execution speeds on this data set and for these errors was sub-second for each of the queries, for this data set with its 9,544 records.

9.2 Probability Model Simulation and Example

In Chapter 7 we provided analytic formulas as functional error propagation calculus expressions (Equations 7.2 and 7.3). These are calculus expressions in the sense that they define output error distributions as a function of input error distributions. A random variable was defined for each of the following three parameters[1]:

- number of incompletes in the set of Boston-area alumni (Equation 7.2),
- number of mismembers in the set of Boston-area alumni (Equation 7.2),
- inaccuracy in total income of Boston-area alumni (Equation 7.3).

The simulation described here generates output error distributions for these random variables, given a set of input error distributions. These outputs are generated by two independent methods - the induced probability model (iterations over the logical model) and the functional probability model (analytic expressions as a calculus). Chapter 6 described these models more fully. Similarity between outputs of the induced probability model and outputs of the functional probability model helps to confirm correctness of the latter. The former have already been proven via the logical calculus correctness theorems, their implementation in software, and the use of Proposition 6.1.

In computing the functional model outputs, we use the fact that means and variances sum for sums of random variables. We showed the derivation of the analytic solution and its parameters in Section 7.3. Given our assumption of normality in input income inaccuracy, then our model of total income inaccuracy is

---

[1] We switch the example Regions of interest from Illinois in chapter 7 to Boston for the simulation described here.

a fixed sum of binomial sums of normal random variables. This will be plotted using a second simulation, as the size of the probability space is very large.

The induced probability model executes as multiple iterations over the logical model - as implemented in software and described in Section 9.1 above. We apply a random input error function for each iteration of the simulation - setting true Region and true Income as specified in the input error distributions of Sections 7.2. We will be comparing induced model and functional model outputs by instantiating and comparing cumulative density functions on the output data - one plot comparison for each of the three error types.

In Figure 9.2 below, both means of deriving the output error distribution are illustrated. We are given three inputs to both models, the input data, the error measure, and the query. The induced model executes by the path involving arrows 5,6,7,8, 9, 10, and 11. The functional model executes by the path involving arrows 1,2,3, and 4. They are both a means of computing the cumulative density function of the true total income of Boston-area alumni. The two models should be equivalent if our functional model is correct. We should believe the induced model already given its basis in the logical model.

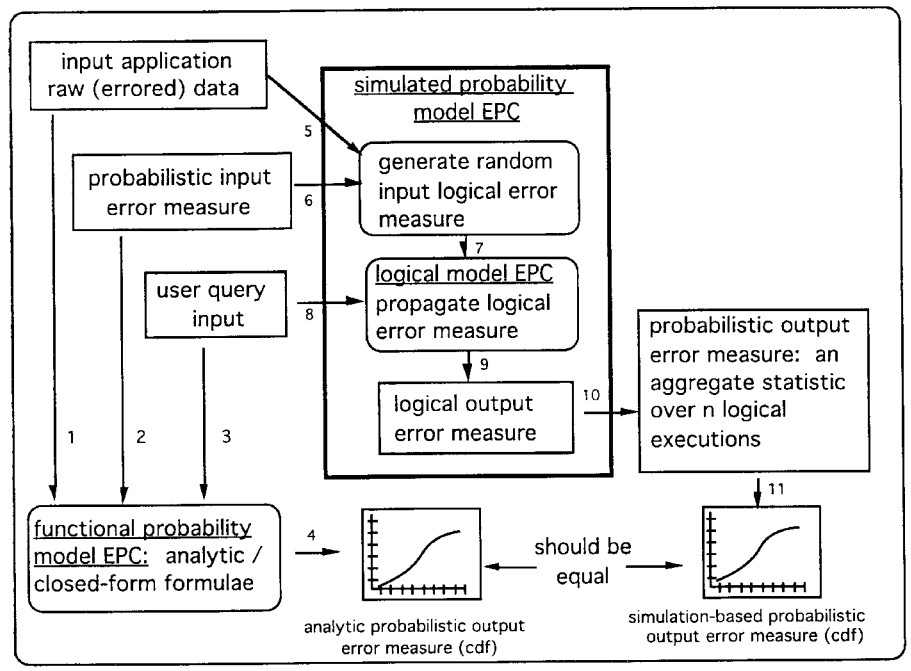

Figure 9.2: Induced vs Functional Model - simulation/comparison

The input to both models is the following:

- a 9,954 record errored table,
- the inaccuracy distribution on Region and Income,
- the user query (find Total-income of Boston-area alumni).

9.2.1 Induced Model - iterations of the logical model

We describe here the functioning of the induced model. The computational environment was UNIX/C to generate random numbers and Excel to plot the outputs (outputs passed from UNIX to Excel via a flat file export/import). The darkened box in Figure 9.2 above represents a single execution of the logical model. Running this box "n" times - using a randomly generated error term - constitutes the induced model. The induced path executes in UNIX using the logical implementation. The output of this is fed into EXCEL for making a cumulative histograms. We used only 100 iterations in this simulation because of memory limitations in the excel computations. Curves were smooth so this number seemed reasonable.

Within each iteration of the logical model, the following events occur. First, a random error state is generated based on the error distribution. This involves assigning a true Region to each alumnus and a true income to each Boston area alumnus. The output is one instance of the logical error representation, constituting corrections to the corrupted input data. Using the logical model software implementation, the input error triple is propagated to an output error triple based on the user query. This output is the logical output error measure resulting from Arrow 9 in Figure 9.2 above. This output error triple is stochastic and a cumulative density function of its outputs (i.e., total number of incompletes and mismembers as well as total Boston income) over 100 iterations constitutes the induced model's output distribution, for each of the three error types and as plotted below.

9.2.2 Functional model - analytic expressions

The functional model has been implemented in Excel as per the analytic calculations of Section 7.3.1 and 7.3.2 in Chapter 7. The analytic expressions for the number of incompletes and mismembers from Query #1 is Equation 7.2, and for inaccuracy in total income Equation 7.3.

Plotting Equation 7.2: # mismembers and incompletes

To compare incompleteness and mismembership plots between the induced and functional models. We create an output plot from Equation 7.2 - for the data set we are using - . We use the heuristic assumption that the cdf for a sum of binomials can be approximated by a normal cdf, due to the large numbers of tuples and relatively small probability or incompleteness among alumni and mismembership among tuples.

The right hand side of Equation 7.2 is a sum of $l$ binomial random variables. The parameters $n_i$ and $\omega_i$ of each binomial are known (as per the text description below Equation 7.2 in chapter 7). The graphs comparing the induced and functional model for incompleteness and mismsmbership are below. We then consider the corresponding plot for inaccuracy in total output.

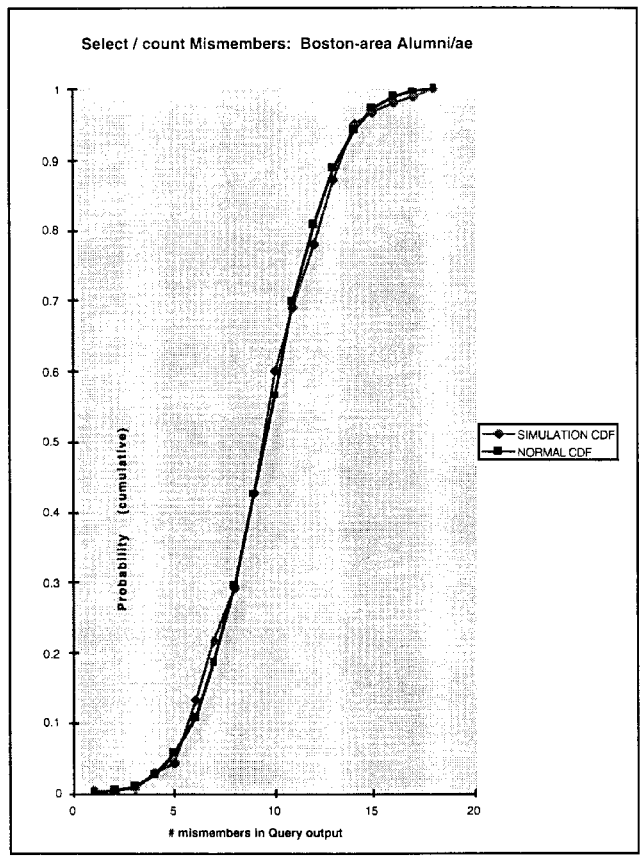
Figure 9.3: Induced vs Functional plots: # of mismember
The plot labeled SIMULATION is from the induced probability model simulation. The plot labeled NORMAL is a plot of the cumulative, treating the sum of binomials as a normal with mean and variance as summed over the individual binomials. Below is the corresponding plot for incompleteness.

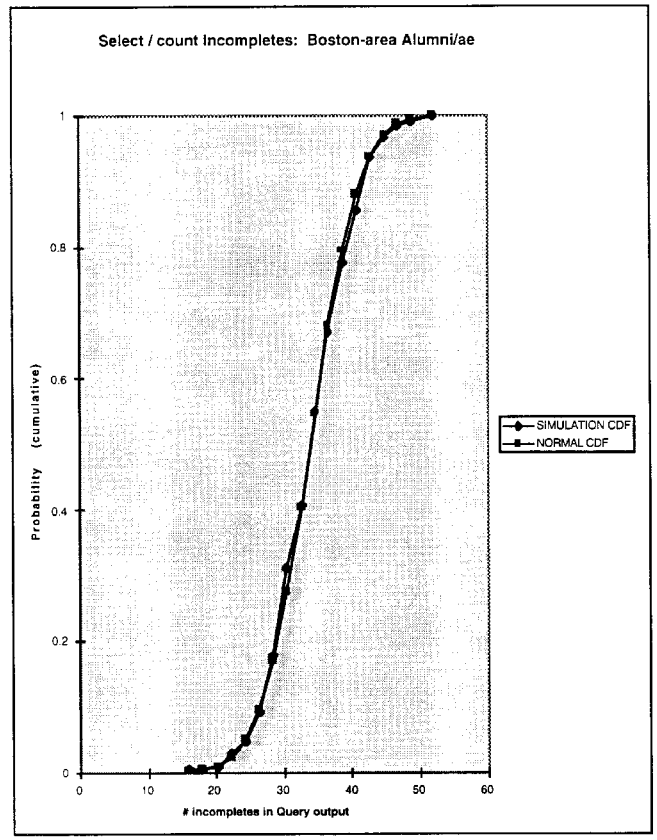
Figure 9.4: Induced vs Functional plots: # of incompletes
A visual comparison of these plots shows that they are nearly identical, confirming the appropriateness of the analytic expressions developed. This completes discussion of the simulation for incompleteness and mismembership. We conclude by considering the plots for inaccuracy.

Plotting Equation 7.3: Income Incompleteness

Because the sums in Equation 7.3 are over an extremely large space, its use for computation of a probability distribution would be of non-trivial complexity. Although it is closed form, the space for summations is large when the size and number of the partition spaces is large. A common approach to generate plots of complex analytic functions is the use of simulations. We used a second simulation (where the first was for the induced model) to generate a plot from this analytic expression. We then compare the simulation output for this analytic expression to the simulation output from the induced model as a means of verifying model equivalence.

Equation 7.3 is copied below. $\varphi$ is a random variable for total income of Boston-area alumni. $\varphi$ was derived as a sum of $l$ binomial sums of normal random variables - the definition of total income inaccuracy. For $l$ partitions on conditioning variables, the index $i$ below defines $B_i$, $\mu_i$, and $\sigma_i^2$.

$$\varphi = \sum_{i=1,...,l} \sum_{j=1,...,B_i} \text{Normal}(\mu_i, \sigma_i^2)$$

where $\mu_i$ and $\sigma_i$ were defined in Equation 7.1, Section 7.2.3.

We wish to plot the cdf for $\varphi$ so that we can compare with the induced model plot. $B_i$ is a Binomial ($\omega_i, p_i$) random variable. The distribution for $\varphi$ is well defined for a given vector of $l$ binomials $\beta = <B_1, ..., B_l>$. Each of the $l$ partition elements, indexed by i, contributes to $\varphi$ a fixed sum of $B_i$ independent identically distributed [28] normals each with mean $B_i * \mu_i$ and variance $B_i * \sigma_i^2$.

But the vector of binomials $\beta$ is itself a random variable. So the cdf for $\varphi$ is:

$$\text{cdf}(\varphi) = \text{cdf}(\varphi|\beta) * P(\beta) \qquad \underline{\text{Equation 9.1}}$$

We notice that this is simply the formula for the expected value of the cdf – a conditional cdf over all values of β. (We are treating cdf (φ) itself as a random variable.) Given that the space of possibilities for β is large, we will use a Monte Carlo method [28] to generate the functional cdf plot for comparison to the induced model output. Another way of writing this cdf is as the mean value of a normal cdf with mean $$\mu_E = \sum_{i=1,\ldots,l} B_i * \mu_i$$

and variance $$\sigma_E^2 = \sum_{i=1,\ldots,l} B_i * \sigma_i^2$$

The pseudocode for the algorithm used to generating the functional model cdf is as follows:

```
for (income = 1 to infinity)
{
    for (iteration_number = 1 to 100)
    {
        generate random binomial vector β = <B₁, ..., Bₗ>
        calculate value of Norm_cdf with μ_E, σ_E² at (income value)
    }
    plot (income) = Mean calculated value over the 100 cdf values
}
```

226

Under UNIX, we generated 100 vectors of binomial random variables[1] to serve as the β's. Plotting across income values, shown below. Both the induced model and the functional model plot is shown.

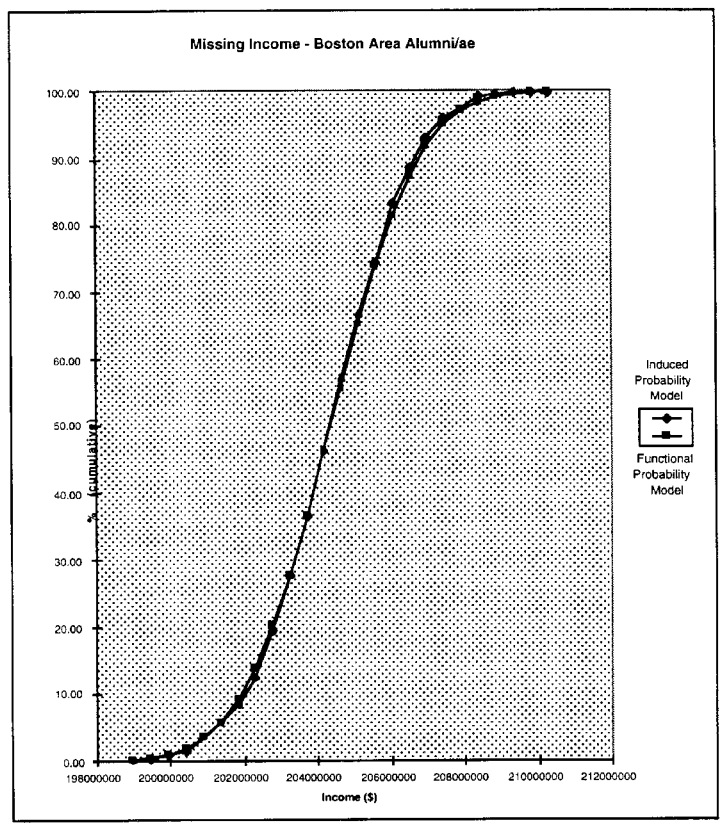

Figure 9.5: Induced vs Functional plots: total income

The simulation we have described in this chapter constitutes the implementation of the two probability models. The induced probability model

---

[1] Only 100 was used because the Excel spreadsheet used for averaging and plotting became memory-scarce with more records. Curves were still smooth.

executes as multiple iterations over the logical model - running in C and Unix shell. The logical probability model executes as analytic expressions in C and in a spreadsheet. The logical implementation included the commutative proof method. The induced model is built from the logical model, and the output of the functional calculus was shown by simulation to be the same as the induced model output. Therefore, we have a proof method tying all three together and for proving correctness of the functional model. Experiements on two sample data sets (financial and alumni) showed these ideas in an example application.

While we have not covered all of the of query operator-error type interactions, (e.g., there are other error types and error distributions possible). Our application is a concrete example, however, of adjustment to data based on knowledge of imperfections in its collection. Our method can hopefully be replicated for other operators.

Chapter 10
Conclusion and Future Work

In this chapter we summarize and reflect on our effort, offering ideas for further research and development.

10.1 Summary of thesis

In this thesis we have begun to tackle a critical and challenging aspect of data quality management: error measurement and propagation. We formulated an original model of the structure of error and modeled its propagation in databases proving various desirable properties. A methodology was developed and applied to measure error on live data. These ideas were demonstrated in a software implementation and simulation.

We began with a basic conceptual model, drawing insights from philosophy. The mathematics involved set theory, logic, probability, and relational database theory. Error is defined as a difference between two relations, based on a mathematically defined point space. The set of error types - incompleteness, mismembership, and inaccuracy (and nulls) - is closed under the calculus. If we characterize error vis-a-vis these three error types - then we are able to fully characterize all discrepanices between perfect data and bad. (We will qualify this statement below in discussions of future work, however.)

Three models were defined: the logical model, the induced probability model, and the functional probability model. An error state in the logical model is a point in the error state space. An error state in either probability model is a probability distribution over that state space. The error propagation calculus is a set of operators which correctly compute output error as a function of input error.

The logical model defines the spaces, mappings, and semantics of error and error propagation - including the concepts of data, error, and world. The logical model's mappings are correction, difference, and the error propagation calculus operations themselves. The logical model has been proven correct both mathematically (e.g., on paper in formal proofs) and via a software implementation of the logical calculus.

As error is often not known deterministically, concepts of "cause" and evidence of error are cast as conditional probability distributions. The probability model allows us to do this via a probabilistic interpretation of the logical sets and mappings. A probabilistic representation and calculus are defined for both the logical model and the induced probability models. A single Proposition 6.1 defines the induced probability model. The induced model results from the lifting of the logical model into the probability domain. The functional probability model involves closed form solutions to the induced model. It has been started but not completed here.

A methodology - for learning about data error from humans - has been applied to the Alumni database. Aspects of error uncovered by this process are cast as formal probability distributions. We do not distinguish objective from subjective measures. Implementations and simulations showed the translation of these ideas into software and demonstrated their computational tractability. For several queries and error types the software simulation compared the output of the functional model with the corresponding induced model output, strengthening our belief in the overall system.

A summary of key property-theorems in this thesis is below:

Theorem: Completeness of the Logical error representation An error representation is *complete* if it satisfies two conditions. First - given a database - it must define a *difference* mapping from all database-world $<d, w>$ pairs to a unique error state $e$, so that we may distinctly record our error measurements. Second, it must define a *correction* mapping from $<d, e>$ back to the original $w$, so that we may adjust for / correct errors. If completeness holds, then we will never encounter a database whose discrepancy vis-a-vis truth we can not uniquely describe.

Theorem: Completeness of the Probabilistic error representation A probabilistic error representation is *complete* if, given a probability distribution on $E$ then a probability distribution is defined on $<D, W>$, again given $d$. This is an analog of logical representation completeness. In other words, a probabilistic description of error defines a probability distribution on the state of the world. And such a distribution is perfect information - given our uncertainty about error.

Theorem: Correctness of the Logical error propagation calculus An error propagation calculus operator is *correct* if the same set of tuples results from paths 1 and 2 in the commutative diagram of Figure 5.1. Satisfying this property should lead to various desirable algebraic properties such as commutativity and associativity. Nine theorems and proofs were used to show EPC correctness in Appendix B.

Theorem: Correctness of the Probabilistic error propagation calculus: The probabilistic EPC results from the lifting of the logical calculus into the probability domain. Correctness of the induced probability model is defined by correctness of the logical model.

With this model, we can now make specific and provable statements about the structure of error and its propagation. Important questions may be answered about any data set - base or derived - in regards to correctness of various aggregations and partitions of that data. We began this for the income aggregation by region query in the example of Chapter 7.

Three key application-level benefits which derive from all of this are as follows.

1) DBA's and data owners can record their knowledge of error, 2) users are provided with an indicator of output data reliability, 3) DBA's can better know which quality improvements will yield the best return for users.

We have achieved each of these to a limited extent - at least relative to our expectations of a practical and useful Data Quality system. While aspects of the work may be implemented and applied today - further work remains to make some of these benefits more viable. This thesis suggests many issues for further research. We outline some of these next.

10.2 Future work

Benefit #1 above requires error measurement to be convenient and meaningful. We describe further work towards this measurement objective in Sections 10.2.1 and 10.2.2 below. Benefits #2 and #3 are realized when decisions about the data can be automated for the user such as "use the data - don't use data?" and for the DBA "which data quality controls should I use?". We describe further work towards error sensitivity analysis and data quality mediation in Section 10.2.3 below. General issues for model implementation and extension are considered in Section 10.2.4.

10.2.1 Methodology and Measurement

Our error representation describes <u>what kinds</u> of error measures are required, but <u>not how</u> to instantiate them. Our error calculus <u>relates</u> input error to output error - but it does <u>not derive</u> input error in the first place. We have only begun (in Chapters 6, 7, 8, and 9) to develop a model of data error measurement.

Although error measurement may be domain dependent (Chapter 8), there should be generalized solutions to make the administration of the error measurement process structured and easier. We envision a knowledge acquisition framework which will guide a data quality certifier (e.g., a data expert) through a question and answer dialog, eliciting assumptions about existence of error. An analogous system may ask data users about sensitivities to output (and therefore to input) error. Further development of such systems is required.

Depending on the nature of the query/analysis, this effort may take place at one of two times: prior to submission of any queries or as an "off line" extension of any given query - for example on day one a user submits a particular query, and by day two the DBA has qualified the answer on the user's behalf for that query. Technological and social mechanisms in general must be developed to embed these technologies in the existing information infrastructure. Data quality measurement is not intended to replace, but to monitor, the existing information system.

As we do not distinguish between subjective and objective measures, statistical or whatever other measures are also welcome. Maintaining and combining multiple perspectives of error remains an area for further study. For each domain of error measurement, a new reference frame arises in the tools used for measurement [15].

Automatically attainable measures are available when "the computer" can do things without human intervention. Integrity constraint violations and inter-database discrepancies are two examples of automatically attainable error measures. While they may be incomplete (as error measures) they may inform various aspects of error and error propagation. Various combinations of tools may support measurement such as computer-based integrity filters, statistical sampling methods, and intuitionistic inference about timeliness of data and source reliability. The integration of manual and automatic measures into a common framework is an area for further research.

10.2.2 Fuzzy, Incomplete, Inaccurate Measures of Error

We have focused on the modeling and propagation of error in situations where a full joint probability distribution of error (and therefore truth) is available. Our examples and field study showed that maintaining such a distribution is not an unreasonable proposition. Relaxing such conditions, however, is an interesting area for research and an important one for practice. This relates to error measurement method in that DBA's[1] may be unable or unwilling to state exact probabilities, or unable to state correct probabilities. Several issues are relevant to further development in this area. We discuss some of those here.

In many cases, we know there are errors, but we are not able to assign a (probabilistic) correction. For example, a negative Age is easily detected as an error, but the detection does not constitute a correction - i.e., a probability measure over the set of possible ages. But even if only limited aspects of input error are known, then certain aspects of output error can be determined, e.g., in regards to particular error types and queries. The calculus indicates for us which aspects of error in the output are dependent on which aspects of error in the input, and how subsets of both can be related.

We distinguish between the "error language" of the end-user and that of our probabilistic error representation. While we represent error as probabilities, users may prefer "soft" statements such as "the number of missing records is high". Given the subjective nature of data quality judgment, DBA's may talk about error as LOW, MEDIUM, and HIGH. These are not in the language of probability, however. Linguistic reasoning systems such as fuzzy sets are a means for manipulating quantities given only an "intuitive feel" for the numbers.

---

[1] or their software analogs such as computer-based error detection and measurement methods Perhaps the most desirable rating from a user standpoint is a "data fitness for use" rating. A "RED/unacceptable YELLOW/caution GREEN/ok" rating system is perhaps all that is required for error-related decision making (e.g., "don't use" vs. "investigate further" vs. "go ahead and use"). Unfortunately, what is high to you may not be high to me, so such prescription for action necessitate a common language and value system on error. Techniques for propagating confidence intervals and interval arithmetic are also useful techniques when information is limited. These may also save significantly on computational requirements. Interval models will be particularly useful when the decision to use or not use data occurs at a hard and known cross-over point. Our model tells us for interval propagation: *Which error bands on the input relate to which error bands on the output?*

In many cases the information provided about error will itself be wrong. We can not guarantee perfect error measures any better than we can guarantee perfect data. Second order uncertainties (i.e., uncertainty about which probability distribution is true) are necessary for adapting our model to this situation. This would involve a lifting of our current probability model into yet another probability space, in which probabilities of error probabilities are made explicit. Then we can talk about the "inaccuracy of the inaccuracy".

10.2.3 End-user Utility and Data Quality Mediation

We have been vague about end user error (dis)utility. As every decision theory model has a probability space and a utility space - we have focused exclusively on the probability space. While we may know the level of error, this does not mean that we know its eventual cost in some application setting. Development in this area is fundamental to facilitating error-based retrieval and filtering. We discuss some relevant issues below.

Error metrics correspond to an end-user value-function on error. Error metrics might include *absolute error, relative error*, and *percentage error* for an individual scalar, and *expected error, root mean square error*, or *percentage in error* for a set of scalars. While such metrics may be defined over our error representation, we are not proposing any particular set of error measures as correct or complete. Explication and exploitation of end user error sensitivities is an important follow on to this work.

Mediators are software components that address heterogeneities among federations of autonomous data and application systems [67]. Regarding error, data sources (e.g., data sets) are heterogeneous both in terms of the error level and in terms of the data collection method. Data receivers (e.g., application contexts) are heterogeneous in terms of queries run and error sensitivities. Error mediation should enable sharing of such information in both directions. The error mediator will dynamically assess and manage the fit between source and receiver.

Given error measurements and receiver sensitivities, alarms may be triggered when various irregularities or error threshold violations are detected. A mediator may also attempt to repair aspects of data error where possible (e.g., to supplement an incomplete database with a second source, correct syntax violations, make assumptions about key equivalence, etc.).

10.2.4 Further issues

Our experiments with the logical and probability calculi have given us some insights into execution speeds. The logical propagation calculus for selection, implemented in Oracle SQL and running on a SUN SPARC10, is under one second for our 9,544 tuple data set. We did not study projections or joins or other binary operations which may be more time consuming. Time complexity will depend on the particulars of each query and mathematical formulation used. Simulation was used to plot the behavior of the induced probability model against that of the functional (analytic) solution. Real time simulation may be an effective way of modeling error propagation where computational complexity is high.

Although our calculus can define output error distributions, it does not retain the cause-effect relationship between the input table and the output. A symbolic calculus may exist as an "explainer" of data error. It would relate input causes to output error, and not simply compute output error as the current system does.

Although our error representation is complete (Theorems 4.1 and 6.1), it is clear that this set of three error types may be extended, that other error types can be imagined. Examples of errors which may be cast as their own error type include outliers, integrity constraint violations, spelling errors. These can be defined as derivative from the current model or as separate. Ideally they will maintain the various completeness and correctness model vis-a-vis our existing representation and propagation models.

Finally, we have neither completed the calculus for difference and union operations, nor have we fully analyze several operations we did define, such as projection and join. Error propagation in these operations is fundamental as well.

10.3 Thesis Conclusion

Historically, personal familiarity with data allowed users to account - as best they could - for known patterns of error. Data users close to the data's point of collection or (original) context of use have the best chance of understanding error in the data and not "getting bit" by bad data. We believe that knowledge about data error should become a shared resource - a value-added addendum to both shared and local data. This approach may allow an understanding of error to be accrued over time, by individual analysts, and eventually with utility measures from each individual user's perspective. The value of data sharing networks will be greatly reduced without rating and certification capabilities. Value-added network services for correcting or adjusting data seem desirable based on these ideas.

At VLDB 1993, one invited talk and two panels raised data quality as an important research area [40, 50, 55]. Clearly error is fundamental to data quality. Although database answers are often wrong, there has been little done from a research standpoint to answer "by how much?" or "should I care?". Though documentation of data for semantic interoperability has focused on the meaning of data, a database with bad data may be worse than no database at all!

This research is useful as a theory in that it leads to methods and tools for data quality administration in which (1) administrators have a framework and quantitative representation in which to record information about error, (2) users get a better sense of data reliability and can evaluate the appropriateness of data for their application, and (3) the benefit to users of data quality improvement efforts can be known directly via the calculus, so that resources for data quality enhancement may be effectively applied.

In summary then, this work consists of a theory for characterizing data error and a notion of an information infrastructure which enables generation and sharing of knowledge about data error. We view this work only as a first step. We believe, however, that a point space formalism and uncertainty framework - with properties similar to our model's - should be provided by any model of data error. It is perhaps in this regard that our work can be called a foundation.

Appendix Chapter A: Summary of notation

| Symbol (assuming R and S as relation names) | Definition |
|---|---|
| $R$ | a relational scheme including functional dependencies |
| $r$ | a relation on R |
| $r_1, r_2, \ldots$ | tuples in r |
| $r_e$ | r's error triple |
| $r_{em}$ | the mismembership error table for r |
| $r_{ei}$ | the incompleteness error table for r |
| $r_{ea}$ | the inaccuracy error table for r |
| $r_c$ | the set of tuples in r which are neither mismember or inaccurate |
| $r_m$ | the set of tuples in r which are members, but may be inaccurate |
| $\oplus_t$ | tuple correction operator |
| $\oplus_r$ | relation correction operator |
| $\Theta$ | relation difference operator |
| '-' | an uninstantiated value in an inaccuracy error tuple. It means that the corresponding tuple in the relation is accurate for this column. |
| $<\text{'-'}>.R$ | a tuple consisting of '-' over scheme R, e.g., the tuple $<\text{'-','-','-'}>$ if $|R| = 3$ |
| $x$ | a tuple variable used for construction of sets in the EPC |
| $\oplus s_{p1}, \oplus s_{p2}$ | the true s relations as arrived at by path #1 (or #2) in the commutative diagrams |

Appendix Chapter B: Correctness proofs for the 4 operators

In this final appendix chapter we provide the proofs for the theorems of logical error propagation calculus correctness in Chapter 5. The proof strategy for all of these proofs is identical and we summarize it here. We use a commutative proof method based on Figure 5.1 in Chapter 5. For each query and corresponding EPC operation, assertion and proof of error preservation is done in two theorems. The first theorem asserts that the same set of keys results in $\oplus s$ from path 1 and path 2. Then, using the set of key values defined in the first theorem, a second theorem shows that, for a given a key value in $\oplus s$, the same attribute values result from path 1 and path 2. Given that a table is determined by its keys and attribute values, then the tables by path 1 and 2 are identical and Figure 5.1 commutes. Projection case 2 has only a key so no attribute theorem is necessary for this operation. The operations covered are:

>select (2 proofs),
>
>cartesian product (2 proofs),
>
>join (2 proofs),
>
>projection case 1 (2 proofs), and
>
>projection case 2 (1 proof).

We will distinguish the two legs within each path. For path 1 (path 2), call the first leg 1' (2') and the second leg 1" (2"), respectively. So, in Figure 5.1, $\ominus r$ is the result of leg 1', s and se are the result of 2', $\oplus s_{p1}$ is the result of leg 1", and $\oplus s_{p2}$ is the result of leg 2".

Proof (Theorem 5.1 select keys): We wish to prove that the set of key values set of key values in $\oplus s$ (Figure 5.1) is the same regardless which path is taken in the commutative diagram. We will partition the universe of key values (i.e., in $\{r.R_k \cup r_{ei}.R_k\}$) to do this, as defined by the ten partition elements (items 1-10) in Table 4 below. Column A contains the item number. Column B describes whether the key values are in r or $r_{ei}$. Column C states which of the four tuple types to which a a given partition belongs (among $r_c$, $r_{ea}$, $r_{em}$, or $r_{ei}$). Column D describes the partition logically (and then in English). Column E states whether the key values represented by each partition should be included in the result (i.e., would have been in the case that $r = \oplus r$. Column F states whether the object does get included in the result based on the standard selection operation over r. Finally, column G identifies the calculus expression in the paper that defines this partition and the kind of error that results from it in s. Note for example in item 4 that an 'n' in E and a 'y' in F results in an s mismember, and in item 5 that a 'y' in E and 'n' in F result in an s incomplete.

| A | B | C | D | E | F | G |
|---|---|---|---|---|---|---|
|   | key value presence in r | type | partition specification | in $\sigma_f(\oplus r)$ ? | in s? | calc form -ula |
| 1 | present in r | rc | $\{t.R_k \mid \exists t \in r_c, f(t)\}$<br>fully correct is (correctly) selected → no error | y | y | no error |
| 2 |   |   | $\{t.R_k \mid \exists t \in r_c, \neg f(t)\}$<br>fully correct is (correctly) not selected → no error | n | n | no error |
| 3 |   | $r_{ea}$ | $\{r_1.R_k \mid \exists r_1 \in r, \exists r_2 \in r_{ea}, r_1.R_k = r_2.R_k, f(r_1) \wedge f(\oplus_t(r_1, r_e))\}$<br>inaccurate is correctly selected → no error | y | y | 1a → $s_{ea}$ |
| 4 |   |   | $\{r_2.R_k \mid \exists r_1 \in r, \exists r_2 \in r_{ea}, r_1.R_k = r_2.R_k, f(r_1) \wedge \neg f(\oplus_t(r_1, r_e))\}$<br>inaccurate is incorrectly selected → mismember | n | y | 2b → $s_{em}$ |
| 5 |   |   | $\{r_1.R_k \mid \exists r_1 \in r, \exists r_2 \in r_{ea}, r_1.R_k = r_2.R_k, \neg f(r_1) \wedge f(\oplus_t(r_1, re))\}$<br>inaccurate is incorrectly not selected → incomplete | y | n | 3b → $s_{ei}$ |
| 6 |   |   | $\{r_1.R_k \mid \exists r_1 \in r, \exists r_2 \in r_{ea}, r_1.R_k = r_2.R_k, \neg f(r_1) \wedge \neg f(\oplus_t(r_1, re))\}$<br>inaccurate is correctly not selected - no error | n | n | no error |
| 7 |   | $r_{em}$ | $\{r_1.R_k \mid \exists r_1 \in r, \exists r_2 \in r_{em}, r_1.R_k = r_2.R_k, f(r_1)\}$<br>mismember is selected → mismember | n | y | 2a → $s_{em}$ |

| 8 | | | $\{r_1.R_k \mid \exists r_1 \in r, \exists r_2 \in r_{em}, r_1.R_k = r_2.R_k, \neg f(r_1)\}$<br>mismember is not selected → no error | n | n | no error |
|---|---|---|---|---|---|---|
| 9 | missing from r | $r_{ei}$ | $\{r_1.R_k \mid \exists r_1 \in r_{ei}, f(r_1)\}$<br>incomplete would have been selected → incomplet | y | n | 3a → $s_{ei}$ |
| 10 | | | $\{r_1.R_k \mid \exists r_1 \in r_{ei}, \neg f(r_1)\}$<br>incomplete would not have been selected - no error | n | n | no error |

Table A.1: Partition of $\{r.R_k \cup r_{ei}.R_k\}$ for select proof

That this is a partition of the key values in in $\{r_1.R_k \cup r_{ei}.R_k\}$ can be observed in the alternating logical positives and negatives from one item to the next. For example, item 7 specifies the error status of the tuple first and then specifies that the tuple is selected by f. Then item 8 - having the same error status as item 7 - specifies that the tuple is not selected by f. This forms a partition on the mismembers of r, and so forth for the incompletes, inaccurates, and fully correct tuples.

We now compare the objects resulting in true s based on the two different paths - with and without the calculus. We work without the calculus (path 1) first. The calculus path 2 should result in the same set of objects.

Path 1: without the select calculus true s = $\sigma_f$(true r) = $\sigma_f(\oplus_r(r, r_e))$ objects in true s = $\sigma_f(\oplus_r(r, r_e)).R_k$ = $\oplus_r(r, r_e).R_k - \{t.R_k \mid \exists t \in \oplus_r(r, r_e), \neg f(t)\}$ > Using $\oplus_r(r, r_e).R_k = r.R_k - r_{em}.R_k + r_{ei}.R_k$:

= $\{r.R_k - r_{em}.R_k + r_{ei}.R_k\} - \{t.R_k \mid \exists t \in \oplus_r(r, r_e), \neg f(t)\}$ > Call the sets in the set expression above l, m, n, and o, i.e., l = $r.R_k$, m = $r_{em}.R_k$, n = $r_{ei}.R_k$, and o = $\{t.R_k \mid \exists t \in \oplus_r(r), \neg f(t)\}$. (o is the set of objects removed from $\oplus_r(r, r_e).R_k$ by f.)

$= \{l - m\} + n - o$

Let items 1 through 10 stand for the sets of objects they correspond to in Table 5. so that the following set equivalences hold.

$l = r.R_k = \{1 \cup 2 \cup 3 \cup 4 \cup 5 \cup 6 \cup 7 \cup 8\}$ $m = r_{em}.R_k = \{7 \cup 8\}$ $n = r_{ei}.R_k = \{9 \cup 10\}$ $o = \{2 \cup 4 \cup 6 \cup 10\}$ $\{l - m\} + n = \{1 \cup 2 \cup 3 \cup 4 \cup 5 \cup 6 \cup 9 \cup 10\}$ $\{l - m\} + n - o = \{1 \cup 3 \cup 5 \cup 9\}$ So the objects in items 1, 3, 5, and 9 are seen to result in true s from path 1. Now we investigate path 2 which uses the calculus.

Path 2: with the select calculus

We will show that the same set of objects ($\{1 \cup 3 \cup 5 \cup 9\}$) also results in true s from path 2. The first step in path 2 is to derive (the possibly errored) s from r. Where $s.R_k = r.R_k - \{t.R_k \mid \exists t \in r, \neg f(t)\}$ > The set of objects in r is $\{1 \cup ... \cup 8\}$.
>
> The set of objects not selected from (i.e. $\{t.R_k \mid \exists t \in r, \neg f(t)\}$) is $\{2 \cup 5 \cup 6 \cup 8\}$ - corresponding to those tuples t in r where $\neg f(t)$.

$= \{1 \cup ... \cup 8\} - \{2 \cup 5 \cup 6 \cup 8\} = \{1 \cup 3 \cup 4 \cup 7\}$ > Note that the calculus propagates objects in 4 and 7 as s mismembers. The calculus propagates objects in 5 and 9 as s incompletes. The calculus propagates objects in 3 as s inaccurates The correction of $s.R_k$ by $s_e$ will involve subtracting $\{4 \cup 7\}$ (removing mismembers) and adding $\{5 \cup 9\}$ (inserting incompletes). Thus the objects resulting in $\oplus_r(s, s_e).R_k$ under path 2 are: $\{1 \cup 3 \cup 5 \cup 9\}$ which is the same as under the non-calculus path.

◊

Proof (Theorem 5.2 select attributes): We will show this individually for each of the keys in items 1,3,5, and 9 of Table A.1 above.

| A | C | D | | G |
|---|---|---|---|---|
| | type | partition specification | | calc formula |
| 1 | $r_c$ | $\{t \mid \exists t \in r_c, f(t)\}$ | | no error |
| | | fully correct is (correctly) selected → no error | | |
| | | Let t be any tuple in $r_c$. We will show that neither path 1 nor path 2 alter attribute values for t (i.e., the key-attribute value relationships for those keys remaining are unchanged), thus the attribute values are the same in ⊕s by either path. By definition, $rc.K \cap re.K = \{\}$ and thus in leg 1', the correction of r by re to derive ⊕r does not affect attribute values for any key elem-of rc.K. Leg 1" is a standard selection operation and obviously does not alter attribute values. Leg 2" consists of the correction of s by se. We know that $\{se.K \cap rc.K\} = \{\}$ (column G is a "no error" condition and thus no error tuples are propagated) so, as in leg 1', there are no attribute value changes. No changes in both paths implies that the attribute values are the same in both path results. | | |
| 3 | $r_{ea}$ | $\{r_1 \mid \exists r_1 \in r, \exists r_2 \in r_{ea}, r_1.R_k = r_2.R_k, f(r_1) \wedge f(\oplus_t(r_1, r_e))\}$ | | 1a → $s_{ea}$ |
| | | inaccurate is correctly selected → inaccurate | | |
| | | Let r1 be any tuple in r such that $f(r_1) \wedge f(\oplus_t(r_1, r_e))$. So by definition r1.K elem-of rea.K. Let r2 be r1's corresponding tuple in rea. Let r3 be r1's corrected tuple in ⊕r after leg 1'. (r3 is the correction of r1 by r2.) Leg 1" is a selection so it does not modify r3 in deriving $\oplus s_{p1}$. Now we consider path 2. By calculus expression 1a (above), in leg 2', for any such tuple r1 in r, the corresponding r2 in rea will become an s2 elem-of sea such that r2 = s2. Let s1 be r1's copy into in s by leg 2'. Then leg 2" involves correction of s1 by s2. Since r1 = s1, and r2 = s2, then the attributes are the same for both paths. | | |
| 5 | | $\{u \mid \exists r_1 \in r, \exists r_2 \in r_{ea}, r_1.R_k = r_2.R_k, \neg f(r_1) \wedge f(\oplus_t(r_1, r_e)), u = \oplus_t(r_1, r_e)\}$ | | 3b → $s_{ei}$ |
| | | inaccurate is incorrectly not selected → incomplete | | |

244

| | | | |
|---|---|---|---|
| | | Let r1 be any tuple in r such that $\neg f(r_1) \wedge f(\oplus_t(r_1, re))$. First we consider path 1. Let r2 be r1's corresponding tuple in rea. Let r3 in $\oplus r$ be r1's correction by r2. Leg 1" is a selection so it does not modify r3 in deriving $\oplus s_{p1}$. Now we consider path 2. By calculus expression 3b (above), in leg 2', any tuple r2 elem-of rea satisfying the above predicate becomes an s2 elem-of sea such that r2 = s2. Let s1 be the corresponding tuple in s by leg 2' so that r1 = s1. Then leg 2" involves correction of s1 by s2. Since r1 = s1, and r2 = s2, then the attributes are the same for both paths. | |
| 9 | $r_{ei}$ | $\{r_1 \mid \exists r_1 \in r_{ei}, f(r_1)\}$<br>incomplete would have been selected → incomplete | 3a →<br>$s_{ei}$ |
| | | Let r1 be any tuple in rei such that $f(r_1)$. Let r2 be r1's corresponding tuple in $\oplus r$. Let r3 $\in \oplus r$ result from insertion of r1 (i.e., r3 = r1). The selection of leg 1" does not remove r3 since $f(r1)$, thus r3 elem-of $\oplus sp1$. The calculus expression 3a propagates s1 elem-of sei, from r1. Then s1 elem-of $\oplus s$ by s1 means insertion of s1 in $\oplus sp2$. Since s1 = r3, then the attributes are the same for r1.k for both paths. | |

This completes the proof. ◊

Proof (Theorem 5.3 cartesian product keys) We wish to show that $\oplus$ s.K is the same regardless which path is taken in the × commutative diagram (Figure 5.1). The style of proof is similar to the proof for Theorem 5.1 concerning selection.

Table A.2 below shows as items 1-16 a partition of the universe of composite key values, i.e., of $\{r.R_k \cup r_{ei}.R_k\} \times \{q.R_k \cup q_{ei}.R_k\}$. Column A contains the item number. Columns B and D describe whether the (partial) key value is in q and r respectively. Columns C and E describe whether the key value is in true q and true r respectively. That this is a partition can be observed in the alternating positives and negatives from one item to the next in columns B through E, as described for the proof of Theorem 5.1. Columns F and G decribe whether the value results in s and true s respectively (these two columns are determined by the logical formula B $\wedge$ D, and C $\wedge$ E respectively). Column H describes which class error occurs in the result (among mismembership and incompleteness), if any. For example, row 2 in columns F and G indicate values which are in s but not in true s resulting in an s mismember. Column I describes the calculus equation which accounts for this error in s.

245

| A | B | C | D | E | F | G | H | I |
|---|---|---|---|---|---|---|---|---|
| item # | in q | in true q | in r | in true r | in s | in true s | error in s.K | calculus formula |
| 1 | y | y | y | y | y | y | none | no class error |
| 2 | y | y | y | n | y | n | mismember | 4a → sem |
| 3 | y | y | n | y | n | y | incomplete | 5c → sei |
| 4 | y | y | n | n | n | n | none | no class error |
| 5 | y | n | y | y | y | n | mismember | 4a → sem |
| 6 | y | n | y | n | y | n | mismember | 4a → sem |
| 7 | y | n | n | y | n | n | none | no class error |
| 8 | y | n | n | n | n | n | none | no class error |
| 9 | n | y | y | y | n | y | incomplete | 5b → sei |
| 10 | n | y | y | n | n | n | none | no class error |
| 11 | n | y | n | y | n | y | incomplete | 5a → sei |
| 12 | n | y | n | n | n | n | none | no class error |
| 13 | n | n | y | y | n | n | none | no class error |
| 14 | n | n | y | n | n | n | none | no class error |
| 15 | n | n | n | y | n | n | none | no class error |
| 16 | n | n | n | n | n | n | none | no class error |

Table A.2: Partition of {r.Rk ∪ rei.Rk} for × proof

We now compare the key values resulting from the two different paths - with and without the calculus. We do it without the calculus (path 1) first. Then, the calculus (path 2) should result in the same set of values.

Path 1: without the × calculus

> The following equations hold by definition.

$\oplus s.S_k = \oplus q.Q_k \times \oplus r.Q_k$ $\oplus q.Q_k = q - q_{em}.Q_k + q_{ei}.Q_k$ $\oplus r.R_k = r - r_{em}.R_k + r_{ei}.R_k$ > Where - and + represent set difference and union.

246

Let an item (1 through 16) in Table A.2 above stand for the set of key values on schema Q and R which it represents. For example, item 3 represents all composite key values drawn from $q_c \cup q_{ea}$ on Q and $r_{ei}$ on R. We will use the following simple observation in the proof: for any three sets A, B, C: if $B \subseteq C$, then $A \times B \subseteq A \times C$.

Application of the correction operation to q.K (i.e., to $1 \cup, ..., \cup 8$) results in $\oplus$q.K as $1 \cup, ..., \cup 4 \cup 9 \cup, ..., \cup 12$ by removing mismembers and adding incompletes. (Items 5-8 are mismembers, and items 9-12 are incompletes). By the same reasoning, $r = 1 \cup 2 \cup 5 \cup 6 \cup 9 \cup 10 \cup 13 \cup 14$ is corrected to $\oplus$q as $1 \cup 3 \cup 5 \cup 7 \cup 9 \cup 11 \cup 13 \cup 15$. The set of key values in $\oplus$s.K by path 1 is the intersection of these two listings of $\oplus$q and $\oplus$r. This set is: $1 \cup 3 \cup 9 \cup 11$. So the objects in items 1, 3, 5, and 9 are seen to result in true s from path 1. Now we investigate path 2 which uses the calculus and should deliver the same set.

Path 2: with the $\times$ calculus

We will show that the same set of objects ($1 \cup 3 \cup 9 \cup 11$) also results in $\oplus$s by path 2. The first step in path 2 is to derive the possibly errored s from q and r. This is the set $1 \cup 2 \cup 5 \cup 6$ as shown in column F. The calculus formulas result in the errors for s as listed in columns H and I. These will remove $2 \cup 5 \cup 6$, and insert $3 \cup 9 \cup 11$ from s. Thus, the objects resulting in $\oplus$s under path 2 are: $1 \cup 3 \cup 9 \cup 11$ which is the same as under the non-calculus path 1. ◊

Proof (Theorem 5.4 cartesian product attributes): We have already identified the key values in $\oplus$s derived by paths 1 and 2 of Figure 5.1 as corresponding to items 1, 3, 9, and 11 in Table A.2 above. The partitioning criteria for that table included only class level errors (as only the set of key values was of interest). In Table A.3 below, the tuples in $\oplus$s are further partitioned based on occurence of attribute corrections in $q_{ea}$ and $r_{ea}$. The item labels (i.e., 1,3,9,11) from Table A.2 are used here as well, with $1_a$, $1_b$, etc. further partitioning the tuples in $\oplus$s. Again, the proof method is based on the

247 commutative structure of Figure 5.1. We will take advantage of the symmetry of both the standard × and the EPCx operations, so that properties shown to be true for the 6a calculus will hold by symmetry for 6b as well.

| A | B | C | D | E | F | G | H | I |
|---|---|---|---|---|---|---|---|---|
| item # | in q | in true q | in r | in true r | in s | in true s | error in s.K | calc. formula |
| 1 | y | y | y | y | y | y | none | see subcases below |
| 1a | accurate | | accurate | | | | | no error |
| Let q1 elem-of q and r1 elem-of r be any pair of 1a tuples so that, by definition of the partition, both are accurate. By definition, for this case, there are no tuples in qe or re having values q1.K or r1.K respectively. Consider path 1. There are no corrections in leg 1' to either q1 or r1. In the × of leg 1", we know that no attribute changes are made. Thus, in ⊕sp1, the tuple s1 with key value <q1.K, r1.K> has tuple values s1.Q = q1 and s1.R = r1. Consider path 2. In leg 2', the standard × computes s and the calculus computes se. The × of leg 2' does not change attribute values in q1 and r1, so there exists a tuple s1 elem-of s with value s1.Q = q1 and s1.R = r1. As seen in columns H and I for this partition, no error tuple results in se having key value <q1.K, r1.K>, so that leg 2" results in ⊕sp2 having the tuple <q1, r1>, identical to ⊕sp1. ||||||||
| 1b | inaccurate | | inaccurate | | | | | 6a → sea |
| Let q1 and r1 be any pair of 1b tuples inaccurate in both q and r respectively. By definition of the partition, there are tuples qe1 and re1 in qea and rea having values q1.K and r1.K and containing corrections to q1 and r1 respectively. Consider path 1. After leg 1', there are tuples q2 = ⊕(q1, qe1) and r2 = ⊕(r1, re1) in ⊕q and ⊕r. In the × of leg 1", no attribute changes are made. Thus, there exists an s1 ∈ ⊕sp1 such that s1.Q = ⊕(q1, qe1) and s1.R = ⊕(r1, re1). Consider path 2. In leg 2', the standard × defines s and the calculus computes sea. Let s2 be the inaccurate tuple in s with values s2.Q = q1 and s2.R = r1. As seen in column H and I, calculus formula 6a results in an error tuple se1 ∈ sea with values se1.Q = qe1 and se1.R = re1. The correction to s2 yields the tuple s3 in ⊕sp2 such that s3.Q = ⊕(q2, qe1) and s3.R = ⊕(r2, re1). Since q1 = q2 and r1 = r2, then the tuples in ⊕sp1 and ⊕sp2 having key value <q1.K, r1.K> are equal in attribute values as well. ||||||||
| 1c | accurate | | inaccurate | | | | | 6b → sea |
| Let q1 and r1 be any pair of 1c tuples in q and r respectively. By definition of the partition, q1 is accurate and r1 is not. Consider path 1. By definition, there is no tuple in qe having value q1.K, and thus there is no correction in leg 1' to q1. Let re1 be the error tuple in rea corresponding to tuple r1 elem-of r. Then there exists a tuple r2 in ⊕r by leg 1' such that r2 = ⊕(r1,re1). The × of leg 1" involves no attribute changes to either q1 or r2 respectively. Thus the tuple in ⊕sp1 having key value <q1.K, r1.K> has values <q1, r2>. In leg 2', the standard × computes s and the calculus computes se. As indicated in columns H and I, calculus expression 6b places a tuple se1 into sea such that se1.Q = qe1By inspection, the calculus results in an error tuple in se for every r1.Rk. Therefore, leg 2" applies no changes to s1 in path 2. Then the tuples in ⊕sp1 and ⊕sp2 having key value <q1.K, r1.K> are equal in attribute values as well ||||||||
| 1d | inaccurate | | accurate | | | | | 6c → sea |
| This item holds by symmetry with 1c. ||||||||
| 3 | y | y | n | y | n | y | incomplete | 5c |

| Let q1 and r1 be any pair of tuples so that q1 elem-of {qc ∪ qea} and re1 elem-of rei, as this item 3 defines. Consider path 1. After leg 1', there exists a q2 elem-of ⊕q and r2 elem-of ⊕r sch that q2 = ⊕(q1, qe1) and r2 = re1. After leg 1'', there exists an s1 elem-of ⊕sp1 such that s1.Q = q2 and s1.R = r2. Consider path 2. After leg 2', s contains no tuple having Rk value r1.Rk. By calculus formula 5c, there will exist a tuple s1 elem-of sei such that s1.R = re1 and s1.Q = ⊕(q1, qe1). The correction of Leg 2'' inserts this tuple into ⊕sp2. Therefore ⊕sp1 and ⊕sp2 have the same tuple on key value <q1.Qk, r1.Rk>. ||||||||
|---|---|---|---|---|---|---|---|---|
| 9 | | n | y | y | y | n | y | incomplete | 5b |
| This item holds by symmetry with item 3. ||||||||
| 11 | | n | y | n | y | n | y | incomplete | 5a |
| Let qe1 and re1 be any pair of item 11 tuples in qei and rei respectively. Consider path 1. After leg 1', qe1 elem-of ⊕q and re1 elem-of ⊕r. Let s1 be the tuple that is their concatenation in the ⊕sp1 result of leg 1'' so that s1.Q = q1 and s1.R = r1. Consider path 2. After leg 2', s will contain no tuple with Qk value q1.Qk and Rk value r1.Rk. By calculus formula 5a, se contains the tuple s2 such that s2.Q = q1 and s2.R = r1. Leg 2'' inserts s2 into ⊕sp2. Therefore the tuples resulting for key value <q1.Qk, r1.Rk> in ⊕sp1 and ⊕sp2 are equal. ||||||||

Table A.3: Partition of {r.Rk ∪ rei.Rk} for select proof

This completes the select proof. ◊

Proofs for $EPC_\eta$

To prove error preservation of $EPC_\eta$, we will use two related partitions on $\eta$-join inputs, and these are in Tables A.4 and A.5 below. They are both partitions on $q.Q_k \cup q_{ei}.Q_k$, and both are based on a space of possible error combinations among tables q and r entring into a $\eta$-join. It makes explicit how the specication for each partition element relates to the calculus, because calculus sub-expressions are inside the column which they define. Table A.4 defines the construction of $EPC_\eta$. Table A.5 is based on slightly different criteria, and relates to execution of path 1 in the commutative diagram.

We begin with Table A.4. The first column contains identifying item numbers for each partition element. Certain of these will correspond to the $EPC_\eta$ calculus expressions 7a-c, 8a-c, and 9a-c. Column A is a partition of the objects in $q \cup q_{ei}$ based on their class-level error status. Column B describes, for each element of the partition in column A, whether or not the value on $Q_{a1}$ is accurate relative to the $Q_k$ object. Column C states whether a match is found in the data, e.g., whether $q.Q_{a1} \in r.R_k$. Column D states whether a match should have occurred, i.e., whether the object belongs in s (given the true $Q_{a1}$ value, given the equivalence relation being defined on $q.Q_{a1}$ and $r.R_k$, and given $\oplus r.R_k$), e.g., that $\oplus q.Q_{a1} \in \oplus s.R_k$. Column E describes whether r.Ra is accurate with resect to the $r.R_k$ object in the corresponding $r \cup r_{ei}$ tuple. Column F describes whether r.Ra is accurate as a transitive attribute, i.e., with resect to $q.Q_k$, the "grandparent" ($s.Q_k$) object in the transitive link. Column G states the resulting s error for each partition element and inludes the calculus outputs.

For example, if a tuple finds a match (yes in column C) and should not have (no in column D) as in item 4, then it is a mismember of s as indicated in column G. Item 1 models the case where both input tuples are error free on q and r. All other items relate to at least one error type in one of the inputs, and not all of these result in an output error. Error occurs only where column G does not read "none". For any given row in the table, cells may be marked as irrelevant or not defined for that case. An "n-def" means that the concept is not defined on this element of the partition. An "irrel" means that the concept is irrelevant to the outcome error tuples.

|   | A | B | C | D | E | F | G |
|---|---|---|---|---|---|---|---|
|   | Qk class-error | q.Qa1 attr. status | match in data | match in truth | direct attr. error | xitive error | final s error |
| 1 | member | acc | yes | yes | acc | acc | none |
| 2 | member | acc | yes | yes | inacc | acc | none |
| 3 | member $\exists q1 \in qm$ | acc $q1.Qa1 = \oplus q1.Qa1$ | yes $\exists r1 \in rm$, $q1.Qa1 = r1.Rk$ | yes (covered by column C) | inacc $r1.Ra \neq \oplus r1.Ra$, $\exists r2 \in rea$, $r2.Rk = r1.Rk$ | inacc | inacc $x.Sk = q1.Qk$, $x.Ra = r2.Ra$ |
| 4 | member $\exists q1 \in qm$ | acc $q1.Qa1 = \oplus q1.Qa1$ | yes $q1.Qa1 \in r.Rk$ | no $q1.Qa1 \notin \oplus r.Rk$ | irrel | n-def | mismem $x.Sk = q1.Qk$ $x.Ra = irrel$ |
| 5 | member $\exists q1 \in qm$ | acc $q1.Qa1 = \oplus q1.Qa1$ | no $q1.Qa1 \notin r.Rk$ | yes $\exists r1 \in rei$, $q1.Qa1 = r1.Rk$ | n-def | n-def | incomp $x.Sk = q1.Qk$, $x.Ra = r1.Ra$ |
| 6 | member | irrel | no | no | irrel | irrel | none |
| 7 | member | inacc | yes | yes | irrel | acc | none |

| | | ∃q2 ∈ qea, q1.Qk = q2.Qk, q1.Qa1 ≠ ⊕q1.Qa1 | ∃r1 ∈ r, q1.Qa1 = r1.Rk | ∃r2 ∈ ⊕r, ⊕q1.Qa1 = r2.Rk, | | r1.Ra ≠ r2.Ra | x.Sk = q1.Qk, x.Qa1 = r2.Qa1 x.Ra = <'-'>.Ra |
|---|---|---|---|---|---|---|---|
| 8 | member ∃q1 ∈ qm | inacc ∃q2 ∈ qea, q1.Qk = q2.Qk, q1.Qa1 ≠ ⊕q1.Qa1 | yes ∃r1 ∈ r, q1.Qa1 = r1.Rk | yes ∃r2 ∈ ⊕r, ⊕q1.Qa1 = r2.Rk | irrel | inacc r1.Ra ≠ r2.Ra | inacc x.Sk = q1.Qk, x.Qa1 = r2.Rk, x.Ra = r2.Ra * * where r1 ≠ r2 else = '-' |
| 9 | member ∃q1 ∈ qm | inacc q1.Qa1 ≠ ⊕q1.Qa1 | yes q1.Qa1 ∈ r.Rk | no ⊕q1.Qa1 ∉ ⊕r.Rk | irrel | irrel | mismem x.Sk = q1.Qk x.Ra = irrel |
| 10 | member ∃q1 ∈ qm | inacc q1.Qa1 ≠ ⊕q1.Qa1 | no q1.Qa1 ∉ r.Rk | yes ∃r1 ∈ ⊕r, ⊕q1.Qa1 = r1.Rk | n-def | n-def | incomp x.Q = ⊕q1, x.Ra = r1.Ra |
| 11 | mismem ∃q1 ∈ qem | n-def | yes q1.Qa1 ∈ r.Rk | irrel | n-def | n-def | mismem x.Sk = q1.Qk |
| 12 | incomp ∃q1 ∈ qei | n-def | n-def | yes ∃r1 ∈ ⊕r.Rk, q1.Qa1 = r1.Rk | n-def | n-def | incomp x.Q = q1, x.Ra = r1.Ra |

Table A.4: Partition on q.Qk ∪ Qei.Qk for construction of $EPC_\eta$

We now describe Table A.5. The first column contains identifying item numbers. Certain of these will result in ⊕s by path 1. Column A is a partition of the objects in q ∪ $q_{ei}$ based on their class-level error status.

Column B describes, for each element of the partition in column A, whether or not the value on $Q_{a1}$ is accurate relative to the $Q_k$ object.

Column C states whether a match is found in the data, e.g., whether $q.Q_{a1} \in r.R_k$.

Column D states whether the match (lack of a match) corresponded to a mismember (an incomplete) in r ($r_{ei}$) respectively.

Column E states whether a match should have occurred, i.e., whether the object belongs in s (given the true $Q_{a1}$ value, given the equivalence relation being defined on $q.Q_{a1}$ and $r.R_k$, and given $⊕r.R_k$), e.g., that $⊕q.Q_{a1} \in ⊕s.R_k$.

Column F describes whether the match is with a mismember or an incomplete in r ∪ $r_{ei}$.

Column G states whether, the element ultimately results in ⊕sp1 and is based on the following analysis.

|    | A      | B         | C          | D            | E           | F            | G   |
|----|--------|-----------|------------|--------------|-------------|--------------|-----|
| 1  | mem    | inacc qA1 | r match    | r mismem     | ⊕r match    | r inc        | yes |
| 2  |        |           |            |              |             | not r inc    | yes |
| 3  |        |           |            |              | no ⊕r match | r mismem     | no  |
| 4  |        |           |            |              |             | no r mismem  | no  |
| 5  |        |           |            | not r mismem | ⊕r match    | r inc        | yes |
| 6  |        |           |            |              |             | not r inc    | yes |
| 7  |        |           |            |              | no ⊕r match | r mismem     | no  |
| 8  |        |           |            |              |             | no r mismem  | no  |
| 9  |        |           | no r match | r inc        | ⊕r match    | r inc        | yes |
| 10 |        |           |            |              |             | r no inc     | yes |
| 11 |        |           |            |              | no ⊕r match | r mismem     | no  |
| 12 |        |           |            |              |             | no r mismem  | no  |
| 13 |        |           |            | r not inc    | ⊕r match    | r inc        | yes |
| 14 |        |           |            |              |             | r no inc     | yes |
| 15 |        |           |            |              | no ⊕r match | r mismem     | no  |
| 16 |        |           |            |              |             | no r mismem  | no  |
| 17 |        | acc Qa1   | r match    |              | ⊕r match    |              | yes |
| 18 |        |           |            |              | no ⊕r match |              | no  |
| 19 |        |           | no r match |              | ⊕r match    |              | yes |
| 20 |        |           |            |              | no ⊕r match |              | no  |
| 21 | mismem |           |            |              |             |              | no  |
| 22 | inc    |           |            |              | ⊕r match    | r inc        | yes |
| 23 |        |           |            |              |             | not r inc    | yes |
| 24 |        |           |            |              | no ⊕r match |              | no  |

Table A.5: a partition on q.Qk ∪ Qei.Qk based on execution of Path 1 in the commutative diagram

Proof (Theorem 5.5 η–join keys): We wish to show that ⊕ s.$S_k$ is the same regardless of which path is taken in the commutative diagram of Figure 5.1 (with η-join substituted for cartesian product). We need to show formally that ⊕sp1,$S_k$ = ⊕ sp2.$S_k$. The partitions in Tables A.4 and A.5 represent partitions on the inputs (and outputs) of paths 2 and 1 respectively. We will show the equivalence $\oplus sp1.S_k = \oplus sp2.S_k$ by showing that $\oplus sp1.S_k = \oplus sp2.S_k$ and that $\oplus sp2.S_k = \oplus sp1.S_k$. In general, two sets which are a subset of one another, are also equal.

We note from Table A.5 that tuples corresponding to items 1, 2, 5, 6, 9, 10, 13, 14, 18, 19, 22, and 23 result in $\oplus sp1$. As seen in Table A.4 for path 2, keys under items 1, 2, 3, 5, 7, 8, 10, and 12 result in $\oplus sp2$. The two tables below show the subset relationships between items (i.e., keys) specified in paths 1 and 2. For example, the first row shows that item 1 in Table A.5 representing path 1 is subsumed by (i.e., is a subset of) item 7 in Table A.4 representing Table 2.

| Item from Table A.5 (Path 1) | Item from Table A.4 (path 2) which subsumes it |
|---|---|
| 1 | 7 |
| 2 | 7 |
| 5 | 7 |
| 6 | 7 |
| 9 | 10 |
| 10 | 10 |
| 13 | 10 |
| 14 | 10 |
| 17 | 2 |
| 19 | 5 |
| 22 | 12 |
| 23 | 12 |

| Item from Table A.4 (Path 2) | Item from Table A.5 (path 1) which subsumes it |
|---|---|
| 1 | 17 |
| 2 | 17 |
| 3 | 17 |
| 5 | 19 |
| 7 | 1 |
| 8 | 1 |
| 10 | 13 |
| 12 | 22 |

Proof (Theorem 5.6 η-join attributes): Let $\oplus s_{p1}$ and $\oplus s_{p2}$ be the two $\oplus s$ tables - as derived by path 1 and path 2 respectively in Figure 5.1. We have already shown that $\oplus s_{p1}.K = \oplus s_{p2}.K$. If we can show that the attribute values in $\oplus s_{p1}$ and $\oplus s_{p2}$ are equal, then it is proven that $EPC_\eta$ is error preserving.

We again distinguish the two legs within each path. For path 1 (path 2), call the first leg 1' (2') and the second leg 1'' (2''), respectively. So, in Figure 5.1, $\oplus q$ and $\oplus r$ are the result of leg 1', s and $s_e$ are the result of 2', $\oplus s_{p1}$ is the result of leg 1'', and $\oplus s_{p2}$ is the result of leg 2''.

We need only to analyze partition elements from table A.4 for which the value on $Q_k$ results in $\oplus s$. We will use the following terminology. Let the image ($\Phi$) of a tuple $q_1 \in q$ on a table r having tuple $r_1$ where $q_1.Q_{a1} = r_1.R_k$ be a tuple $s_1$ on S such that $s_1.Q = q_1$ and $s_1.R = r_1$. So the image of the tuple $q_1 = $ <John, Doctor> on a table r = {<Carpenter, Tradesperson>, <Doctor, Professional>} is the joined tuple that matches on Doctor, i.e., <John, Doctor, Professional>. We write $\Phi(q_1, r) = s_1$. In general, $s.S_k$ subset-of $q.Q_k$, i.e., no keys can be added in deriving s from q and r. Therefore, given a tuple $s_1 \in \oplus s.S_{qk}$, there exists a tuple $q_1 \in (q_m \cup q_{ei})$ such that $q_1.Q_k = s_1.S_k$.

The objects identified as resulting in $\oplus s$ correspond to items 1, 2, 3, 5, 7, 8, 10, and 12. For each item, we will show that the attribute values on $\oplus s_{p1}.Ra$ are the same as those on $\oplus s_{p2}.Ra$. As in the previous proof, we ignore atributes on Q as their propagation behavior is trivial and would unnecessarily complicate the calculus. This is the canonical case in which $Q.Qa$ contains only $Q.Q_{a1}$. In all cases, path 1 yields $\oplus s_1 = \Phi(\oplus q_1, \oplus r)$. The task will be then to show that the same value results in $\oplus s_2$. In all cases, by path 2, $\oplus s_1 = \oplus(\Phi(q_1, r), s_e)$.

Item 1: Since, for item 1, $s_e$ has no error tuple for $S_k = q_1.Q_k$ (see column G), then $\oplus(\Phi(q_1, r), s_e) = \Phi(q_1, r)$. Since $q_1$ and $r_1$ are accurate for this case, $\Phi(q_1, r) = \Phi(\oplus q_1, \oplus r)$.

Item 2: Since, for item 2, $s_e$ has no error tuple such that $S_k = q_1.Q_k$, then $\oplus(\Phi(q_1, r), s_e) = \Phi(q_1, r)$. Also in this case, $\Phi(q_1, r) = \Phi(q_1, \oplus r)$ by the fact of the acc in column F. Since $q_1$ is accurate for this case, then $q_1 = \oplus q_1$ so $\Phi(q_1, \oplus r) = \Phi(\oplus q_1, \oplus r)$.

Item 3: In item 3, $s_{ea}$ has an error tuple such that $S_k = q_1.Q_k$. It contains accuracy corrections in $r_1.Ra$ relative to $r_1.R_k$ - and since $q_1$ is accurate, the same corrections apply relative to the object in $q_1.Q_k$, so that $\oplus(\Phi(q_1, r), s_e) = \Phi(q_1, \oplus r)$. Since $q_1$ is accurate for this case, then $q_1 = \oplus q_1$ so $\Phi(q_1, \oplus r) = \Phi(\oplus q_1, \oplus r)$.

Item 5: Since $q_1$ is accurate for this case, then $q_1 = \oplus q_1$ so $\oplus(\Phi(q_1, r), s_e) = \oplus(\Phi(\oplus q_1, r), s_e)$. For an item 5 tuple in q, there exists an $r_1 \in r_{ei}$ and $s_{ei}$ has an error tuple $s_2$ such that $s_2.S_k = q_1.Q_k$ and $s_2.Ra = r_1.Ra$. $r_1.Ra$ by definition contains accurate attributes for the object $r_1.R_k$, and in this case, because $q_1.Q_{a1}$ is accurate, these are also the attributes for $q_1.Q_{a1}$ on Ra. Thus, $\oplus(\Phi(\oplus q_1, r), s_e) = \Phi(\oplus q_1, \oplus r)$. ◊

Item 7: Since, for item 7, the inaccuracy tuple placed in $s_{ea}$ affects only $Q_{a1}$ and $\Phi(q_1, r)$ is accurate by definition on Ra, then $\oplus(\Phi(q_1, r), s_e) = \oplus(\Phi(q_1, \oplus r), s_e)$. As only $q_1.Q_{a1}$ is corrected by $s_{ea}.Q_{a1}$, then $\oplus(\Phi(q_1, \oplus r), s_e) = \Phi(\oplus q_1, \oplus r)$. ◊

Item 8: In item 8, the inaccuracy tuple placed in $s_{ea}$ affects both $Q_{a1}$ and Ra. $\Phi(q_1, r)$ is inaccurate by definition on both $Q_{a1}$ and Ra, but is corrected for both by the tuple in $s_{ea}$. So $\oplus(\Phi(q_1, r), s_e) = \oplus(\Phi(\oplus q_1, r), s_e) = \Phi(\oplus q_1, \oplus r), s_e)$. As only $q_1.Q_{a1}$ is corrected by $s_{ea}.Q_{a1}$, then $\oplus(\Phi(q_1, \oplus r), s_e) = \Phi(\oplus q_1, \oplus r)$. ◊

Item 10: In item 10, an inaccuracy in $q_1.Q_{a1}$ causes failure to match, resulting in an incomplete. $\Phi(q_1, r)$ is inaccurate by definition on $Q_{a1}$ and fails to match as a result so that an error tuple is placed in $s_{ei}$. This tuple is defined on kay value $q_1.Q_{a1}$ with attribute values from $\oplus q_1$ and $\oplus r_1$, so by definition $\oplus(\Phi(q_1, r), s_e) = Ra$, but is corrected for both by the tuple in $s_{ea}$. So $\oplus(\Phi(q_1, r), s_e) = \oplus(\Phi(\oplus q_1, r), s_e) = \Phi(\oplus q_1, \oplus r), s_e)$. As only $q_1.Q_{a1}$ is corrected by $s_{ea}.Q_{a1}$, then by definition $\oplus(\Phi(q_1, \oplus r), s_e) = \Phi(\oplus q_1, \oplus r)$. ◊

Item 12: In item 12, an incompleteness in q ($q_1 \in q_{ei}$ - column 12) causes failure to match, resulting in an element of $s_{ei}$ containing values from $q_1$ and $\approx r$. So by definition $\oplus(\Phi(q_1, r), s_e) = Ra$, but is corrected for both by the tuple in $s_{ea}$. So $\oplus(\Phi(q_1, r), s_e) = \oplus(\Phi(\oplus q_1, r), s_e) = \Phi(\oplus q_1, \oplus r), s_e)$. As only $q_1.Q_{a1}$ is corrected by $s_{ea}.Q_{a1}$, then again by definition $\oplus(\Phi(q_1, \oplus r), s_e) = \Phi(\oplus q_1, \oplus r)$. ◊

Proof (Theorem 5.7 project case 1 keys): As in the selection proof, we define a partition on the universe of key values in $r.R_k \cup r_{ei}.R_k$. Let the partition consist of elements: $r_c.R_k$, $r_{ea}.R_k$, $r_{ei}.R_k$, and $r_{em}.R_k$, and call these four sets A, B, C, and D.

Consider path 1. After leg 1' $\oplus r.R_k = r.R_k + r_{ei}.R_k - r_{em}.R_k = r_c.R_k + r_{ea}.R_k + r_{ei}.R_k = A + B + C$. By the definition of a projection over a key, the key values remain so that $\oplus sp1.S_k = \oplus r.R_k$ by path 1. Consider path 2. The result 2 of leg 2' has $s.S_k = r.R_k = A + B + D$. In the result, $s_{ei}.S_k = r_{ei}.R_k$ and and $s_{em}.S_k = r_{em}.R_k$ by calculus formulas 7a and 7c respectively. So in leg 2", $s_{ei}.S_k$ is added and $s_{em}.S_k$ is taken away, so that $\oplus sp2.S_k = (A + B + D) + C - D = A + B + C$ as in path 1. ◊

Proof (Theorem 5.8 project case 1 attributes): In the proof of Theorem 5.7, we identified the key values in $\oplus s$ as those in $(r_c.R_k \cup r_{ea}.R_k \cup r_{ei}.R_k)$. We consider each of these three partition elements separately.

| $r_c.R_k$ |
|---|
| Consider path 1. Let r1 be any tuple in rc. By definition, there is no tuple in re.k having key value r1.Rk so after leg 1', $\oplus r$ contains the tuple r2 = r1. The projection of leg 1" keeps a subset S of the attributes in R, yielding in $\oplus sp1$ a tuple r3 = r2.S = r1.S. Consider path 2. In leg 2', the standard projection defines s and the calculus computes se. Let s1 be the tuple in s with value s1 = r1.S. As seen from the 7a-c calculus, no tuple results in se having key value r1.Rk, so the table correction to s yields the tuple s2 in $\oplus sp2$ such that s2 = r1.S. Thus both $\oplus sp1$ and $\oplus sp2$ have, for key value, the key value r1.Rk. |
| $r_{ea}.R_k$ |
| Consider path 1. Let r2 be any tuple in rea. By definition, there is a corrseponding tuple r1 in r such that r1.Rk = r2.Rk. After leg 1', $\oplus r$ contains a tuple r2 = $\oplus$(r1, re1). The projection of leg 1" keeps a subset S of the attribtues in R, yielding a tuple = r2.S in $\oplus sp1$. Consider path 2. In leg 2', let s1 be the tuple in s with value s1 = r1.S. As seen from the 7b calculus, there will exist a tuple s2 = r2.S in sea (whenever there are inaccruacies in the attributes of S), so the table correction of s yields a tuple s2 in $\oplus sp2$ such that s2 = $\oplus$(s1, se1). Since se1.S = re1.S and r1.Rk = s1.Sk, then in $\oplus sp1$ and $\oplus sp2$, the key value r1.Rk has the same tuple value $\oplus$(s1, se1) = $\oplus$(r1, re1).S. |

| $r_{ei}.R_k$ |
|---|
| Consider path 1. Let r1 be any tuple in rei. By definition, r1 is the correct tuple for the key value r1.Rk. After leg 1', ⊕r contains the tuple r2 = r1. The projection of leg 1" keeps a subset S of the attribtues in R, yielding a tuple = r2.S in ⊕sp1. Consider path 2. In leg 2', there will be no tuple in s having key value re1.Rk since it was missing from r. As seen from the 7a calculus, there will exist a tuple s1 = r1.S in sei. So the table correction of s in leg 2" yields a tuple = s1 in ⊕sp2. Therefore, for key value r1.Rk, the attribute values in both ⊕sp1 and ⊕sp2 have values = r1.S. |

Table A.6: for proof of attribute equivalence on Projection case 1

◊

Proof (Theorem 5.9 project case 2 keys):

This proof strategy is identical to that for Theorem 5.7. The partition table is below.

|    | s1.S ∈ rc.S | s1.S ∈ {r1.S, ∃r1 ∈ r, ∃r2 ∈ rea, r1.Rk = r2.Rk} | s1.S ∈ {r1.S, ∃r1 ∈ r, ∃r3 ∈ rem, r1.Rk = r3.Rk} |         |                          | in s                      | in ⊕s                     | error in s - calc formula ident. it | in by path 1? |
|----|------|------|------|------|-----|------|------|------|------|
|    | 3    | 4    | 5    | 6    |     | 9 3t, 4t, or 5t -> t | 10 if 3t or 6t -> t | 11   |      |
|    | rc   | rea  | rem  | in rei | ⊕r_ea. S in r.S |      |      |      |      |
| 1  | T    | T    | T    | T    |     | t    | t    | -    | y    |
| 2  |      |      |      | U    |     | t    | t    | -    | y    |
| 3  |      |      | U    | T    |     | t    | t    | -    | y    |
| 4  |      |      |      | U    |     | t    | t    | -    | y    |
| 5  |      | U    | T    | T    |     | t    | t    | -    | y    |
| 6  |      |      |      | U    |     | t    | t    | -    | y    |
| 7  |      |      | U    | T    |     | t    | t    | -    | y    |
| 8  |      |      |      | U    |     | t    | t    | -    | y    |
| 9  | U    | T    | T    | T    |     | t    | t    | -    | y    |
| 10 |      |      |      | U    |     | t    | T    | -    | y    |
| 11 |      |      |      |      |     |      | U    | mism.| n    |
| 12 |      |      | U    | T    |     | t    | t    | -    | y    |
| 13 |      |      |      | U    |     | t    | T    | -    | y    |
| 14 |      |      |      |      |     |      | U    | mism.| n    |
| 15 |      | U    | T    | T    |     | t    | t    | -    | y    |
| 16 |      |      |      | U    |     | t    | T    | -    | y    |
| 17 |      |      |      |      |     |      | U    | mism.| n    |

| 18 | | U | T | | u | t | incomplete | y |

Table A.7: Proof of key equivalence in Projection case 2

References

[1] (1995, 7-20-1995). IRS Preparing a Tough Audit for Groups of Unwary Taxpayers. *New York Times*, p. 1.

[2] Abiteboul, S., Hull, R., & Vianu, V. Foundations of Databases. Addison-Wesley, Reading, 1995.

[3] Agmon, A., & Ahituv, N. Assessing Data Reliability in an Information System. *Journal of Management Information Systems*, 1987.

[4] Atkinson, K. E. Elementary Numerical Analysis. John Wiley & Sons, New York, 1985.

[5] Ballou, D. P., & Kumar.Tayi, G. Methodology for Allocating Resources for Data Quality Enhancement. *Communications of the ACM, 32*, 3: 320-329, 1989.

[6] Ballou, D. P., & Pazer, H. L. Modeling Data and Process Quality in Multi-input, Multi-output Information Systems. *Management Science, 31*, 2: 150-162, 1985.

[7] Barabba, V. P. Proceedings of the 1980 Conference on Census Undercount., Arlington, Va., 1980.

[8] Barbara, D., Garcia-Molina, H., & Porter, D. The Management of Probabilistic Data. *IEEE Transactions on Knowledge and Data Engineering, 4*, 5: 487-502, 1992.

[9] Ben-ari, M. Mathematical Logic for Computer Science. Prentice Hall, Int'l, Englewood Cliffs, 1993.

[10] Biemer, P., Groves, R., Lyberg, L., Mathiowetz, N., & Sudman, S. (Ed(s)). *Measurement Errors in Surveys*, John Wiley & Sons, New York ,1991.

[11] Biemer, P., & Stokes, S. L. Approaches to the Modeling of Measurement Error. In *Measurement Errors in Surveys*, John Wiley & Sons, New York, 1991.

[12] Biskup, J. A Foundation of Codd's Relational Maybe Operations. *ACM Transactions on Database Systems, 8*, 4: 608-636, 1983.

[13] Bunge, M. Semantics I: Sense and Reference. D. Reidel Publishing Company, Boston, 1974.

[14] Bunge, M. Semantics II: Interpretation and Truth. D. Reidel Publishing Company, Boston, 1974.

[15] Bunge, M. Ontology I: The Furniture of the World. D. Reidel Publishing Company, Boston, 1977.

[16] Bunge, M. Ontology II: A World of Systems. D. Reidel Publishing Company, Boston, 1979.

[17] Bunge, M. Epistemology & Methodology I: Exploring the World. Reidel, Boston, 1983.

[18] Cavallo, R., & Pittarelli, M. The Theory of Probabilistic Databases. *Proceedings of the Thirteenth International Conference on Very Large Databases*: 71-81, Brighton, England, 1987.

[19] Codd, E. F. A relational model of data for large shared data banks. *Communications of the ACM*, 13, 6: 377-387, 1970.

[20] Codd, E. F. Extending the relational database model to capture more meaning. *ACM Transactions on Database Systems*, 4, 4: 397-434, 1979.

[21] Collett, C., Huhns, M. N., & Shen, W. Resource Integration Using a Large Knowledge Base in Carnot. , 1991.

[22] Demichiel, L. G. Resolving Database Incompatibilities: An Approach to Performing Relational Operations over Mismatched Domains. *IEEE Transactions on Knowledge and Data Engineering*, 1, 4: 485-493, 1989.

[23] Deming, W. E. Statistical Adjustment of Data. General Publishsing, Toronto, 1938.

[24] Drake, A. W. Fundamentals of Applied Probability Theory. McGraw-Hill, New York, 1967.

[25] Farley, J. U., & Howard, J. A. Control of "error" in market research data. Lexington Books, Lexington, MA, 1975.

[26] Fuller, W. A. Measurement Error Models. John Wiley & Sons, New York, 1987.

[27] Grant, J. Incomplete Information in a Relational Database. *Annales Societis Mathematicae Polonae; Fundamenta Informaticae, III*, 3: 363-378, 1980.

[28] Grimmett, G. R., & Stirzaker, D. R. Probability and Random Processes. Clarendon, Oxford, 1982.

[29] Imielinski, T., & Lipski, W. Incomplete Information in Relational Databases. *Journal of the ACM, 31*, 4, 1984.

[30] Johnson, J. R., Leitch, R. A., & Neter, J. Characteristics of Errors in Accounts Receivable and Inventory Audits. *Accounting Review, 56*, April: 270-293, 1981.

[31] Kennedy, P. A Guide to Econometrics. MIT Press, Cambridge, Mass, 1985.

[32] Kish, L. Diverse Adjustments for Missing Data. *Proceedings of the 1980 Conference on Census Undercount*, Arlington, Va., 1980.

[33] Klug, A. Equivalence of Relational Algebra and Relational Calculus Query Languages having Aggregate Functions. *Journal of the ACM, 29*, 3: 699-717, 1982.

[34] Kon, H. B., Madnick, S. E., & Siegel, M. D. (1995). Data Error: a Representation and Propagation Model No. MIT Composite Information Systems Laboratory, Internal working paper.

[35] Kon, H. B., Madnick, S. E., & Siegel, M. D. Good Answers from Bad Data: a Data Management Strategy. *Fifth Workshop on Information Technologies and Systems (WITS)*, Amsterdam, 1995.

[36] Laudon, K. C. Data Quality and Due Process in Large Interorganizational Record Systems. *CACM, 29*, 1, 1986.

[37] LePage, N. Data Quality Control at United States Fidelity and Guaranty Company. In G. E. Liepens & V. R. R. Uppuluri,(Ed(s.)), *Data Quality Control: Theory and Pragmatics*: 25-41, Marcel Dekker, Inc., New York, 1990.

[38] Lipski, W. On Semantic Issues Connected With Incomplete Information Databases. *ACM Transactions on Database Systems, 4*, 3: 262-296, 1979.

[39] Litwin, W., & Abdellatif, A. Multidatabase interoperability. *IEEE Computer,* : 10-18, 1986.

[40] Madnick, S. E. The Voice of the Coustomer: Innovative and Useful Research Directions. *19th International Conference on Very Large Databases*: 701-704, Dublin, Ireland, 1993.

[41] Madnick, S. E. Evolution to Very MANY Large Databases: Dealing With Large Scale Semantic Heterogeneity. *Proceedings of the 21st Very Large Database Conference,* Zurich, 1995.

[42] Madnick, S. E., & Wang, R. Y. (1992). *Introduction to the Total Data Quality Management (TDQM) Research Program; TDQM-92-01.* Massachusetts Institute of Technology, TDQM Working Paper.

[43] Maier, D. The Theory of Relational Databases. Computer Science Press, Rockville, MD, 1983.

[44] McCarthy, J. L. Metadata Management for Large Statistical Databases. *8th International Conference on Very Large Databases*: 234-243, Mexico City, Mexico, 1982.

[45] McCarthy, J. L. Scientific Information = Data + Meta-data, U.S. Naval Postgraduate School, Department of Statistics. Monterey, CA, 1984.

[46] Morey, R. C. Estimating and Improving Quality of Information in the MIS. *Communications of the ACM, 25,* May, 1982.

[47] Motro, A. Integrity = Validity + Completeness. *ACM Transactions on Database Systems, 14,* 4, 1989.

[48] Pall, G. A. Quality Process Management. Prentice-Hall, Inc., Englewood Cliffs, NJ, 1987.

[49] Paradice, D. B., & Fuerst, W. L. An MIS Data Quality Methodology Based on Optimal Error Detection. *Spring*: 48-65, 1991.

[50] Patterson, B. Panel Discussion: The Need for Data Quality. *19th International Conference on Very Large Databases*: 709, Dublin, Ireland, 1993.

[51] Reddy, M. P., & Wang, R. Y. Estimating Data Accuracy in a Federated Database Environment. *6th International CISMOD Conference*, Bombay, India, 1995.

[52] Reiter, R. Towards a Logical Reconstruction of Relational Database Theory. In M. Brodie, J. Mylopolous, & J. Schmidt,(Ed(s.)), *On Conceptual Modeling: Perspectives from AI, Databases, and Programming Languages*, Springer-Verlag, New York, 1984.

[53] Reiter, R. A Sound and Sometimes Complete Query Evaluation Algorithm for Relational Databases with Null Values. *Journal of the ACM, 33*, 2: 349-370, 1986.

[54] Sciore, E., Siegel, M., & Rosenthal, A. Using Semantic Values to Facilitate Interoperability Among Heterogenous Information Systems. *ACM Transactions on Database Sytems, 19*, 2: 254-290, 1994.

[55] Selinger, P. G. Predictions and Challenges for Database Systems in the Year 2000. *19th International Conference on Very Large Databases*: 667-675, Dublin, Ireland, 1993.

[56] Siegel, M., & Madnick, S. Context Interchange: Sharing the Meaning of Data. *SIGMOD Record, ACM Press, 20*, 4: 77-79 (December), 1991.

[57] Siegel, M., & Madnick, S. E. A metadata approach to resolving semantic conflicts. *17th International Conference on Very Large Databases*, Barcelona, Spain, 1991.

[58] Ullman, J. D. Principles of Database Systems. Computer Science Press, Rockville, MD, 1982.

[59] Wand, Y., & Weber, R. Mario Bunge's Ontology as a Formal Foundation for Information Systems Concepts. In P. Weingartner & G. J. W. Dorn,(Ed(s.)), *Studies on Mario Bunge's Treatise*, Rodopi, Amsterdam, 1990.

[60] Wang, R. Y., Kon, H. B., & Madnick, S. E. Data Quality Requirements Analysis and Modeling in Data Engineering. *9th IEEE Conference on Data Engineering*, Vienna, Austria, 1993.

[61] Wang, R. Y., Reddy, M. P., & Kon, H. B. Toward Quality Data: An Attribute-based Approach. *Journal of Decision Support Systems, 13*: 349-372, 1995.

[62] Wang, R. Y., Storey, V., & Firth, C. A Framework for Data Quality Research. *IEEE Transactions on Knowledge and Data Engineering, 7*, 4: 623-640, 1995.

[63] Wang, R. Y., & Wand, Y. Anchoring Data Quality Dimensions in Ontological Foundations. *Communications of the ACM, forthcoming,* 1996.

[64] Wang, Y. R., & Madnick, S. E. A Polygen Model for Heterogeneous Database Systems: The Source Tagging Perspective. *Proceedings of the Sixteenth International Conference on Very Large Databases*: 519-538, Brisbane, Australia, 1990.

[65] Weddell, G. E. Reasoning about Functional Dependencies Generalized for Semantic Data Models. *ACM Transactions on Database Systems, 17,* 1: 32-64, 1992.

[66] West, M., & Winkler, R. L. Data Base Error Trapping and Prediction. *86,* 416: 987-996, 1991.

[67] Wiederhold, G. Mediators in the Architecture of Future Information Systems. *IEEE Computer,* , March, 1992.

[68] Wong, E. A Statistical Approach to Incomplete Information in Database Systems. *ACM Transactions on Database Systems, 7,* 3: 470, 1982.

[69] Zarkovich. Quality of Statistical Data. Food and Agriculture Organization of the United Nations, Rome, 1966.

What is claimed is:

1. A system for performing data processing on a structured data set, comprising
   a query mechanism for providing logical operations for selectively processing said structured data set to generate a query result signal,
   a memory device having storage for an error model, said error model comprising error model data representative of error in said structured data set and probability data representative of a probability distribution of said error in said structured data set, and
   a propagation monitor for detecting propagation of said error from said structured data set to said query result signal and for generating in response thereto an error measure signal representative of error in said query result signal.

2. A system according to claim 1 wherein said propagation monitor includes
   a query interface, coupled to said query mechanism, for monitoring said logical operations, and
   a memory interface, coupled to said memory device, for accessing said error model data and wherein said propagation monitor processes said error model data as a function of said logical operations to generate said error measure signal.

3. A system according to claim 1 further comprising
   an instruction parser responsive to said logical operations, for generating a set of query instructions for processing said error model and said structured data set to generate said error measure signal.

4. A system according to claim 1 further comprising
   a table generator for providing said error measure signal as a table having storage for error tuples each being representative of an error in associated tuples of said query result signal.

5. A system according to claim 1 wherein said structured data set includes classification data and attribute data, and wherein said system further comprises
   means for generating said error measure as a set of tables that store classification errors and attribute errors of said query result signal.

6. A system according to claim 1 wherein said propagation monitor comprises
   an attribute monitor for detecting propagation of an attribute inaccuracy from said error model to said query result signal.

7. A system according to claim 1 wherein said propagation monitor comprises
   a class mismember monitor for monitoring propagation of a class mismember error to said query result signal.

8. A system according to claim 1 wherein said propagation monitor comprises
   a class incompletion monitor, for monitoring propagation of a class incompleteness error to said query result signal.

9. A system according to claim 1 wherein said error model comprises storage for possibility data representative of a non-zero probability of error in said structured data set.

10. A system according to claim 1 further comprising
    an iteration processor for iteratively processing said error model, as a function of said probability data, to generate a plurality of error measure signals representative of a probability distribution of error in said query result signal.

11. A system according to claim 1 further comprising:
    a functional processor for selecting, responsive to said probability data, a closed-form statistical function for processing said probability data.

12. A system according to claim 1 farther comprising:
    a data characteristic processor for generating portions of said probability data as a function of a predetermined characteristic of a data element in said structured data set.

13. A system according to claim 5 further comprising:
    means for modifying portions of said error model data as a function of an interpretation map.

14. A method for measuring error in a query result signal generated from a structured data set, comprising the steps of
    providing an error model representative of error in said structured data set and probability data representative of a probability distribution for said error in said structured data set,
    identifying an instruction signal representative of logical operations for processing said structured data set to generate said query result signal, and
    processing said structured data set and error model as a function of said instruction signal to generate an error measure representative of error in said query result signal.

15. A method according to claim 14 wherein said step of providing said error model includes the steps of
    providing a reference data set having reference data for comparison, and
    comparing said reference data set with said structured data set to determine differences therebetween.

16. A method according to claim 14 wherein said step of providing said error model includes the step of
    organizing said error model as a data table having class level and attribute level characteristics and having a plurality of tuples each corresponding to a set of tuples within said structured data set.

17. A method according to claim 16 wherein said step of providing said error model includes the further step of
    providing a plurality of said data tables to store class-level and attribute level error data.

18. A method according to claim 14 wherein said step of providing said error model includes the further step of
    providing tuple level error measures.

19. A method according to claim 16 wherein said step of providing probability data comprises the further steps of
    identifying a portion of said data table having a selected characteristic, and
    providing conditional probability data for said identified portion.

20. A method according to claim 14 including the further steps of
    processing said probability data to generate a plurality of error state tables, each being representative of a set of possible errors in said structured data set, and
    processing said error state tables to generate a plurality of error measures, each being representative of possible errors within said query result signal.

21. A method according to claim 14 including the further step of
    processing said probability data as a function of said instruction signal to generate an error measure representative of a probability distribution for error in said query result signal.

22. A system according to claim 1 wherein said error model is defined as a mathematical difference between a given state of said structured data set and a true world state of said structured data set.

23. A system according to claim 1, wherein said error model is defined as a correction mapping from a given state of said structured data set to a true world state of said structured data set.

24. A system according to claim 1 wherein said logical operations select at least one input table from said structured data set, said at least one input table comprising input columns and input rows, said input columns comprising at least one input key column identifying input functional dependencies among said input columns, and said query result signal comprises at least one output table comprising an output structure comprising output columns, output rows, and output functional dependencies, said output structure being determined by said logical operations and by said input functional dependencies.

25. A system according to claim 24, wherein said output columns comprise at least one output key column for identifying said output functional dependencies among said output columns, wherein said output key column is different from said at least one input key column.

26. A system according to claim 25 wherein said at least one input table comprises an input row number representing the number of said input rows in said at least one input table, said at least one output table comprises an output row number representing the number of said output rows in said at least one output table, and said output structure determines said output row number, wherein said output row number is less than said input row number responsive to removal of a portion of said input key column.

27. A method according to claim 14 further comprising the steps of selecting at least one input table from said structured data set, said at least one input table comprising input columns and input rows, identifying input functional dependencies among said input columns using at least one input key column, and determining an output structure for at least one output table comprising output columns, output rows, and output functional dependencies, using said logical operations and said input functional dependencies.

28. A method according to claim 27 further comprising the step of identifying output functional dependencies among said output columns using at least one output key column, wherein said output key column is different from said input key column.

29. A method according to claim 27 further comprising the steps of determining in input row number representing the number of said input rows in said at least one input table, and determining by said output structure an output row number representing the number of said output rows in said at least one output table, wherein said output row number is less than said input row number responsive to removal of a portion of said input key column.

* * * * *